(12) United States Patent
Yao et al.

(10) Patent No.: US 12,436,365 B2
(45) Date of Patent: Oct. 7, 2025

(54) ZOOM LENS, CAMERA MODULE, AND MOBILE TERMINAL

(71) Applicant: HUAWEI TECHNOLOGIES CO., LTD., Guangdong (CN)

(72) Inventors: Xiuwen Yao, Wuhan (CN); Shaopan Zhou, Dongguan (CN); Yuanlin Jia, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 364 days.

(21) Appl. No.: 17/896,155

(22) Filed: Aug. 26, 2022

(65) Prior Publication Data

US 2023/0003971 A1 Jan. 5, 2023

Related U.S. Application Data

(63) Continuation of application No. PCT/CN2020/140443, filed on Dec. 28, 2020.

(30) Foreign Application Priority Data

Feb. 29, 2020 (CN) .......................... 202010132347.7

(51) Int. Cl.
*G02B 9/60* (2006.01)
*G02B 7/10* (2021.01)

(52) U.S. Cl.
CPC .................. *G02B 9/60* (2013.01); *G02B 7/10* (2013.01)

(58) Field of Classification Search
CPC .............. G02B 9/60; G02B 15/145129; G02B 15/145113; G02B 15/145121; G02B 15/145105
See application file for complete search history.

(56) References Cited

U.S. PATENT DOCUMENTS

| 5,414,562 A | 5/1995 | Ueda |
| 5,966,245 A | 10/1999 | Nagaoka |
| 7,813,051 B2 | 10/2010 | Saori |

(Continued)

FOREIGN PATENT DOCUMENTS

| CN | 101196611 A | 6/2008 |
| CN | 101369048 A | 2/2009 |

(Continued)

OTHER PUBLICATIONS

European Search Report for EP Application No. 20921444.4 dated Jun. 26, 2023, 8 pages.

(Continued)

*Primary Examiner* — Joseph P Martinez

(57) ABSTRACT

The technology of this application relates to a zoom lens, a camera module, and a mobile terminal. The zoom lens includes a plurality of lens groups, for example, a first lens group, a second lens group, a third lens group, a fourth lens group, and a fifth lens group that are arranged from an object side to an image side. The first lens group is a lens group with a positive focal power, the second lens group is a lens group with a negative focal power, and the third lens group is a lens group with a positive focal power. The fourth lens group is a lens group with a positive focal power or a negative focal power, and the fifth lens group is a lens group with a positive focal power or a negative focal power.

19 Claims, 92 Drawing Sheets

(56) References Cited

U.S. PATENT DOCUMENTS

| | | |
|---|---|---|
| 2007/0002443 A1 | 1/2007 | Toyama |
| 2009/0168179 A1 | 7/2009 | Toyoda |
| 2013/0050535 A1* | 2/2013 | Kuroda .......... G02B 15/145129 359/683 |
| 2017/0363846 A1 | 12/2017 | Takada |
| 2019/0086638 A1 | 3/2019 | Lee |
| 2022/0075163 A1* | 3/2022 | Tang .................... G02B 15/143 |

FOREIGN PATENT DOCUMENTS

| | | |
|---|---|---|
| CN | 101373263 A | 2/2009 |
| CN | 102819100 A | 12/2012 |
| CN | 103336354 B | 6/2015 |
| CN | 104965298 A | 10/2015 |
| CN | 104698576 B | 4/2017 |
| JP | H0534598 A | 2/1993 |
| JP | H08146295 A | 6/1996 |
| JP | 2005084283 A | 3/2005 |
| JP | 2008134334 A | 6/2008 |
| JP | 2013037063 A | 2/2013 |
| JP | WO2013125603 * | 2/2013 ............. G02B 13/18 |
| JP | 2013050650 A | 3/2013 |
| JP | 2014228810 A | 12/2014 |
| WO | 2013125603 A1 | 8/2013 |
| WO | 2014103559 A2 | 7/2014 |
| WO | 2019097669 A1 | 5/2019 |

OTHER PUBLICATIONS

Office Action for Japanese Application No. 2022-551724 dated Sep. 4, 2023, 15 pages.

Big lock, Chapter 10: Seven ways to achieve optical zoom in mobile phone cameras, May 3, 2018, https://blog.csdn.net/donghuaisuo/article/details/80176726, 5 pages.

Office Action for Chinese Application No. 202010132347 dated Jun. 16, 2022, 10 pages.

Office Action for Chinese Application No. 202010132347 dated Jan. 13, 2022, 9 pages.

International Search Report for Application No. PCT/CN2020/140443 dated Feb. 29, 2020, 207 pages.

* cited by examiner

ZOOM LENS, CAMERA MODULE, AND MOBILE TERMINAL

CROSS-REFERENCE TO RELATED APPLICATIONS

This application is a continuation of International Application No. PCT/CN2020/140443, filed on Dec. 28, 2020, which claims priority to Chinese Patent Application No. 202010132347.7, filed on Feb. 29, 2020. The disclosures of the aforementioned applications are hereby incorporated by reference in their entireties.

TECHNICAL FIELD

This application relates to the field of terminal technologies, and in particular, to a zoom lens, a camera module, and a mobile terminal.

BACKGROUND

In recent years, with development of science and technology, there is an ever-increasing demand for photographing using a mobile phone, and a wider zoom range, a higher resolution, higher imaging quality, and the like have raised higher requirements on a mobile phone lens. A lens with a single focal length range and a digital zoom manner can no longer meet a consumer requirement.

However, high-magnification optical zoom of lenses of mobile phones currently released in the market is basically "jumpy" zoom. To be specific, two or three lenses with different focal lengths are carried to implement hybrid optical zoom in combination with algorithm-based digital zoom. However, the jumpy digital zoom is based on a plurality of cameras with different focal lengths. The jumpy digital zoom is continuous zoom implemented based on algorithm-based processing, and is not actual continuous zoom. A disadvantage of the jumpy digital zoom lies in the following: In a zoom process, imaging definition of the jumpy digital zoom for a part outside a range of a focal length of the plurality of cameras is lower than that of continuous optical zoom, affecting photographing quality.

SUMMARY

This application provides a zoom lens, a camera module, and a mobile terminal, to improve photographing quality of a zoom lens.

According to a first aspect, a zoom lens is provided, and the zoom lens is applied to a mobile terminal, such as a mobile phone or a tablet computer. The zoom lens includes a plurality of lens groups, for example, a first lens group, a second lens group, a third lens group, a fourth lens group, and a fifth lens group that are arranged from an object side to an image side. The first lens group is a lens group with a positive focal power. The second lens group is a lens group with a negative focal power. The third lens group is a lens group with a positive focal power. The fourth lens group is a lens group with a positive focal power or a negative focal power. The fifth lens group is a lens group with a positive focal power or a negative focal power. The first lens group, the third lens group, and the fifth lens group are fixed lens groups. The second lens group and the fourth lens group are lens groups for focusing during zooming. The second lens group serves as a zoom lens group, and the second lens group is capable of sliding between the first lens group and the third lens group along an optical axis. The fourth lens group serves as a compensation lens group, and is configured to perform focal length compensation after focusing is performed on the second lens group. The fourth lens group is capable of sliding between the third lens group and the fifth lens group along the optical axis. It can be learned from the foregoing description that, the second lens group and the fourth lens group are disposed to implement continuous focusing on the zoom lens, thereby improving photographing quality of the zoom lens.

In a specific feasible implementation solution, all lenses included in the first lens group, the second lens group, the third lens group, the fourth lens group, and the fifth lens group meet the following: N≤a quantity of aspheric surfaces≤2*N, where N is a total quantity of lenses; and the quantity of aspheric surfaces is a quantity of aspheric surfaces in all the lenses in the first lens group, the second lens group, the third lens group, the fourth lens group, and the fifth lens group.

In a specific feasible implementation solution, the total quantity N of lenses in the first lens group, the second lens group, the third lens group, the fourth lens group, and the fifth lens group meets the following: 7≤N≤12.

In a specific feasible implementation solution, a ratio of a movement stroke of the second lens group along the optical axis to a total length from a surface of the zoom lens that is closest to the object side to an imaging plane is greater than or equal to 0.1 and less than or equal to 0.3.

In a specific feasible implementation solution, a ratio of a movement stroke of the fourth lens group along the optical axis to the total length from the surface of the zoom lens that is closest to the object side to the imaging plane is greater than or equal to 0.01 and less than or equal to 0.25.

In a specific feasible implementation solution, a maximum clear aperture of the first lens group, the second lens group, the third lens group, the fourth lens group, and the fifth lens group meets the following: 4 mm≤the maximum clear aperture≤15 mm. An occupied space is reduced.

In a specific feasible implementation solution, a focal length f1 of the first lens group and an effective focal length ft of the zoom lens at a telephoto end meet the following: 0.3≤|f1/ft|≤1.5; a focal length f2 of the second lens group and ft meet the following: 0.10≤|f2/ft|≤0.5; a focal length f3 of the third lens group and ft meet the following: 0.10≤|f3/ft|≤0.5; a focal length f4 of the fourth lens group and ft meet the following: 0.3≤|f4/ft|≤1.3; and a focal length f5 of the fifth lens group and ft meet the following: 0.5≤|f5/ft|≤4.0.

In a specific feasible implementation solution, the first lens group to the fifth lens group may use a different combination form, for example:

starting from an object side, sequentially, a ratio of a focal length f1 of a first lens group G1 with a positive focal power to an effective focal length ft of a lens at a telephoto end is |f1/ft|=0.76; a ratio of a focal length f2 of a second lens group G2 with a negative focal power to the effective focal length ft of the lens at the telephoto end is |f2/ft|=0.26; a ratio of a focal length f3 of a third lens group G3 with a positive focal power to the effective focal length ft of the lens at the telephoto end is |f3/ft|=0.28; a ratio of a focal length f4 of a fourth lens group G4 with a negative focal power to the effective focal length ft of the lens at the telephoto end is |f4/ft|=0.68; and a ratio of a focal length f5 of a fifth lens group G5 with a positive focal power to the effective focal length ft of the lens at the telephoto end is |f5/ft|=2.52; or starting from an object side, sequentially, a ratio of a focal length f1 of a first lens group G1 with a positive focal power to an effective focal length ft of a lens at a telephoto end is |f1/ft|=0.62; a ratio of a focal length f2 of a second lens group G2 with a negative focal power to the effective focal length ft of the lens at the telephoto end is |f2/ft|=0.20; a ratio of a focal length f3 of a third lens group G3 with a positive focal power to the effective focal length ft of the lens at the telephoto end is |f3/ft|=0.28; a ratio of a focal length f4 of a fourth lens group G4 with a positive focal power to the effective focal length ft of the lens at the telephoto end is |f4/ft|=0.84; and a ratio of a focal length f5 of a fifth lens group G5 with a positive focal power to the effective focal length ft of the lens at the telephoto end is |f5/ft|=1.36; or starting from an object side, sequentially, a ratio of a focal length f1 of a first lens group G1 with a positive focal power to an effective focal length ft of a lens at a telephoto end is |f1/ft|=0.61; a ratio of a focal length f2 of a second lens group G2 with a negative focal power to the effective focal length ft of the lens at the telephoto end is |f2/ft|=0.20; a ratio of a focal length f3 of a third lens group G3 with a positive focal power to the effective focal length ft of the lens at the telephoto end is |f3/ft|=0.31; a ratio of a focal length f4 of a fourth lens group G4 with a positive focal power to the effective focal length ft of the lens at the telephoto end is |f4/ft|=0.66; and a ratio of a focal length f5 of a fifth lens group G5 with a positive focal power to the effective focal length ft of the lens at the telephoto end is |f5/ft|=1.83; or starting from an object side, sequentially, a ratio of a focal length f1 of a first lens group G1 with a positive focal power to an effective focal length ft of a lens at a telephoto end is |f1/ft|=1.06; a ratio of a focal length f2 of a second lens group G2 with a negative focal power to the effective focal length ft of the lens at the telephoto end is |f2/ft|=0.28; a ratio of a focal length f3 of a third lens group G3 with a positive focal power to the effective focal length ft of the lens at the telephoto end is |f3/ft|=0.21; a ratio of a focal length f4 of a fourth lens group G4 with a negative focal power to the effective focal length ft of the lens at the telephoto end is |f4/ft|=0.60; and a ratio of a focal length f5 of a fifth lens group G5 with a positive focal power to the effective focal length ft of the lens at the telephoto end is |f5/ft|=1.91; or starting from an object side, sequentially, a ratio of a focal length f1 of a first lens group G1 with a positive focal power to an effective focal length ft of a lens at a telephoto end is |f1/ft|=0.93; a ratio of a focal length f2 of a second lens group G2 with a negative focal power to the effective focal length ft of the lens at the telephoto end is |f2/ft|=0.26; a ratio of a focal length f3 of a third lens group G3 with a positive focal power to the effective focal length ft of the lens at the telephoto end is |f3/ft|=0.20; a ratio of a focal length f4 of a fourth lens group G4 with a negative focal power to the effective focal length ft of the lens at the telephoto end is |f4/ft|=0.53; and a ratio of a focal length f5 of a fifth lens group G5 with a negative focal power to the effective focal length ft of the lens at the telephoto end is |f5/ft|=3.06; or starting from an object side, sequentially, a ratio of a focal length f1 of a first lens group G1 with a positive focal power to an effective focal length ft of a lens at a telephoto end is |f1/ft|=0.79; a ratio of a focal length f2 of a second lens group G2 with a negative focal power to the effective focal length ft of the lens at the telephoto end is |f2/ft|=0.26; a ratio of a focal length f3 of a third lens group G3 with a positive focal power to the effective focal length ft of the lens at the telephoto end is |f3/ft|=0.30; a ratio of a focal length f4 of a fourth lens group G4 with a negative focal power to the effective focal length ft of the lens at the telephoto end is |f4/ft|=1.26; and a ratio of a focal length f5 of a fifth lens group G5 with a positive focal power to the effective focal length ft of the lens at the telephoto end is |f5/ft|=2.58.

In a specific feasible implementation solution, the first lens group includes at least one lens with a negative focal power.

In a specific feasible implementation solution, the zoom lens further includes a prism or a reflector, where the prism or the reflector is located on an object side of the first lens group; and the prism or the reflector is configured to reflect light to the first lens group. Periscopic photographing is implemented, and a space for lens placement is improved.

In a specific feasible implementation solution, a lens in each of the first lens group, the second lens group, the third lens group, the fourth lens group, and the fifth lens group has a cutout for height reduction. An occupied space is reduced.

In a specific feasible implementation solution, an image height IMH of the zoom lens and the effective focal length ft of the zoom lens at the telephoto end meet the following: $0.02 \leq |IMH/ft| \leq 0.20$.

In a specific feasible implementation solution, a ratio of the effective focal length ft of the zoom lens at the telephoto end to an effective focal length fw of the zoom lens at a wide-angle end meet the following: $1 \leq |ft/fw| \leq 3.7$.

In a specific feasible implementation solution, an object distance range from infinity to a near-object distance can be implemented for the zoom lens. A continuous zoom range is increased.

According to a second aspect, a camera module is provided. The camera module includes a camera chip and the zoom lens according to any one of the foregoing implementation solutions, where light is capable of passing through the zoom lens and being irradiated to the camera chip. The second lens group and the fourth lens group are disposed to implement continuous focusing on the zoom lens, thereby improving photographing quality of the zoom lens.

According to a third aspect, a mobile terminal is provided. The mobile terminal may be a mobile phone, a tablet computer, a notebook computer, or the like. The mobile terminal includes a housing and the zoom lens according to any one of the foregoing implementation solutions that is disposed in the housing. The second lens group and the fourth lens group are disposed to implement continuous focusing on the zoom lens, thereby improving photographing quality of the zoom lens.

BRIEF DESCRIPTION OF DRAWINGS

FIG. 56c shows example horizontal chromatic aberration curves of the zoom lens shown in FIG. 53 in a T state;

FIG. 57a shows example distortion curves of the zoom lens shown in FIG. 53 in a W state;

FIG. 57b shows an example optical distortion percentage of the zoom lens shown in FIG. 53 in a W state;

FIG. 58a shows example distortion curves of the zoom lens shown in FIG. 53 in an M1 state;

FIG. 58b shows an example optical distortion percentage of the zoom lens shown in FIG. 53 in an M1 state;

FIG. 59a shows example distortion curves of the zoom lens shown in FIG. 53 in a T state;

FIG. 59b shows an example optical distortion percentage of the zoom lens shown in FIG. 53 in a T state;

FIG. 60 shows another example zoom lens; and

FIG. 61 is an example schematic diagram of application of the zoom lens shown in FIG. 60 in a mobile phone.

DESCRIPTION OF EMBODIMENTS

To facilitate understanding of a zoom lens provided in embodiments of this application, meanings of English short names in this application are as follows:

| | | |
|---|---|---|
| F# | F-number | An F-number/aperture is a relative value (a reciprocal of a relative aperture) obtained based on a focal length of the zoom lens divided by a clear aperture of the zoom lens. A smaller F-number of the aperture indicates a larger amount of light admitted in one unit time. A larger F-number of the aperture indicates a smaller depth of field, and bokeh occurs in photographing. This is similar to an effect of a long-focus zoom lens. |
| FOV | Field of View | Field of view |
| TTL | Total Track Length | A total track length refers specifically to a total length from a surface closest to an object side to an imaging plane. TTL is a main factor for forming a camera height. |
| MIC | Maximum Image Circle | Maximum image circle diameter |
| BFL | Back Focal Length | Back focal length |
| CRA | Chief Ray Angle | Chief ray angle |
| IMH | Image height | Image height |

A lens with a positive focal power has a positive focal length and an effect of focusing light.

A lens with a negative focal power has a negative focal length and diffuses light.

A fixed lens group in the embodiments of this application refers to a lens group that is in the zoom lens and whose location is fixed.

A zoom lens group in the embodiments of this application refers to a lens group that is in the zoom lens and that moves to adjust a focal length of the zoom lens.

A compensation lens group in the embodiments of this application refers to a lens group that moves in coordination with a zoom lens group and that is configured for focusing.

Figure 1:
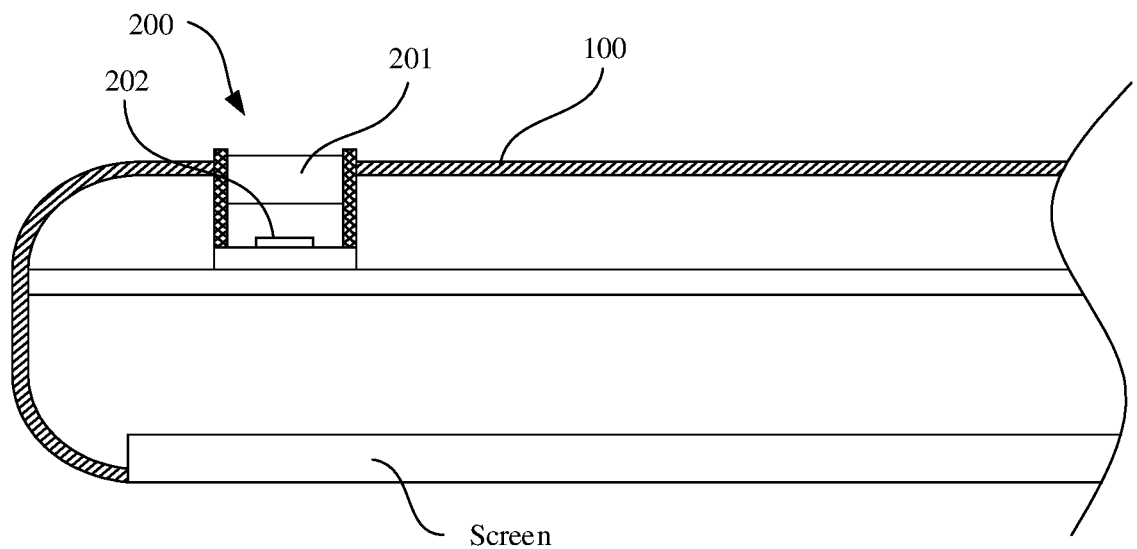
FIG. 1 shows an example cutaway drawing of a mobile phone.

To facilitate understanding of the zoom lens provided in the embodiments of this application, an application scenario of the zoom lens provided in the embodiments of this application is first described. The zoom lens provided in the embodiments of this application is applied to a camera module of a mobile terminal. The mobile terminal may be a common mobile terminal such as a mobile phone, a tablet computer, or a notebook computer. FIG. 1 shows a cutaway drawing of a mobile phone. A lens 201 of a camera module 200 is fixed to a housing 100 of the mobile terminal, and a camera chip 202 is fixed inside the housing 100. During use, light passes through the lens 201 and is irradiated to the camera chip 202. The camera chip 202 converts an optical signal into an electrical signal and performs imaging, to implement a photographing effect. The camera module 200 in a conventional technology usually uses a plurality of lenses with different focal lengths to increase a range of a focal length. To be specific, two or three lenses with different focal lengths are carried to implement hybrid optical zoom in combination with algorithm-based digital zoom. However, jumpy digital zoom is based on a plurality of cameras with different focal lengths. The jumpy digital zoom is continuous zoom implemented based on algorithm-based processing, and is not actual continuous zoom. An imaging effect is not good enough. Therefore, an embodiment of this application provides a zoom lens.

To facilitate understanding of the zoom lens provided in this embodiment of this application, the following describes the zoom lens provided in this embodiment of this application with reference to specific accompanying drawings and embodiments.

Figure 2:
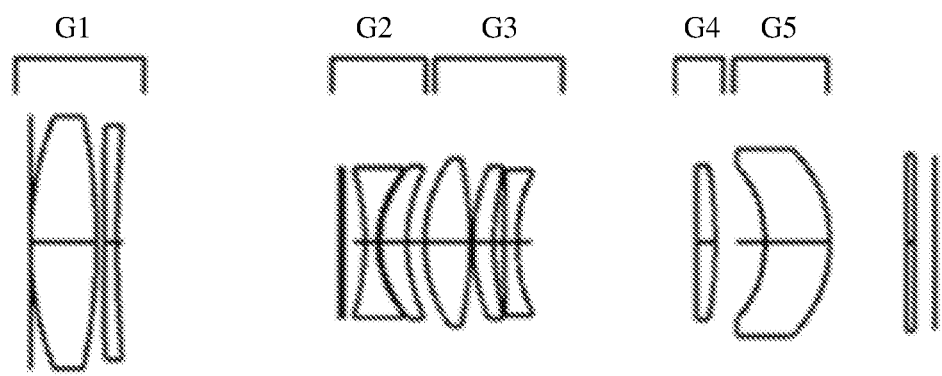
FIG. 2 shows an example zoom lens according to an embodiment of this application.

FIG. 2 shows an example of a zoom lens according to an embodiment of this application. In FIG. 2, the zoom lens includes five lens groups: a first lens group G1, a second lens group G2, a third lens group G3, a fourth lens group G4, and a fifth lens group G5 that are arranged from an object side to an image side. The first lens group G1 is a lens group with a positive focal power. The second lens group G2 is a lens group with a negative focal power. The third lens group G3 is a lens group with a positive focal power. The fourth lens group G4 is a lens group with a positive focal power or a negative focal power. The fifth lens group G5 is a lens group with a positive focal power or a negative focal power. A lens group with a positive focal power has a positive focal length and an effect of focusing light. A lens group with a negative focal power has a negative focal length and can diffuse light. In this embodiment of this application, a focal length of each lens group meets a specific proportional relationship with a long focal length of the zoom lens. For example, a focal length f1 of the first lens group G1 and an effective focal length ft of the zoom lens at a telephoto end meet the following: $0.3 \le |f1/ft| \le 1.5$; a focal length f2 of the second lens group G2 and ft meet the following: $0.10 \le |f2/ft| \le 0.5$; a focal length f3 of the third lens group G3 and ft meet the following: $0.10 \le |f3/ft| \le 0.5$; a focal length f4 of the fourth lens group G4 and ft meet the following: $0.3 \le |f4/ft| \le 1.3$; and a focal length f5 of the fifth lens group G5 and ft meet the following: $0.5 \le |f5/ft| \le 4.0$. In addition, a ratio of the effective focal length ft of the zoom lens at the telephoto end to an effective focal length fw of the zoom lens at a wide-angle end meet the following: $1 \le |ft/fw| \le 3.7$.

Still referring to FIG. 2, the first lens group G1 includes two lenses, the second lens group G2 includes two lenses, the third lens group G3 includes three lenses, the fourth lens group G4 includes one lens, and the fifth lens group G5 includes one lens. However, in the zoom lens provided in this embodiment of this application, a specific quantity of lenses in each lens group is not specifically limited, and only a total quantity of lenses is limited. For example, each lens group includes a different quantity of lenses, such as one lens, two lenses, or more than two lenses. When each lens group includes a different quantity of lenses, a total quantity N of lenses in the first lens group G1, the second lens group G2, the third lens group G3, the fourth lens group G4, and the fifth lens group G5 needs to meet the following: $7 \le N \le 12$. For example, N is a different positive integer, such as 7, 8, 9, 10, 11, or 12. In addition, all lenses included in the first lens group G1, the second lens group G2, the third lens group G3, the fourth lens group G4, and the fifth lens group G5 meet the following: N≤a quantity of aspheric surfaces≤2*N. N is the total quantity of lenses. The quantity of aspheric surfaces is a quantity of aspheric surfaces in all the lenses in the first lens group, the second lens group, the third lens group, the fourth lens group, and the fifth lens group. For example, when N is from 7 to 12, the quantity of aspheric surfaces may be different surfaces such as 7, 9, 10, 14, 16, 18, 20, 22, or 24. The aspheric surface is a light-transmitting surface of a lens.

Still referring to FIG. 2, in the foregoing five lens groups, the first lens group G1, the third lens group G3, and the fourth lens group G4 are fixed lens groups, and the second lens group G2 and the fourth lens group G4 are lens groups movable relative to the first lens group G1, the third lens group G3, and the fifth lens group G5. The second lens group G2 serves as a zoom lens group and is capable of sliding between the first lens group G1 and the third lens group G3 along an optical axis. The fourth lens group G4 is a compensation lens group configured to perform focal length compensation after focusing is performed on the second lens group G2, and the fourth lens group G4 is capable of sliding between the third lens group G3 and the fifth lens group G5 along the optical axis. When focusing needs to be performed, the first lens group G1 and the third lens group G3 need to be moved. To facilitate understanding of the movement of the second lens group G2 and the fourth lens group G4 provided in this embodiment of this application, the following description is provided.

Figure 3A:
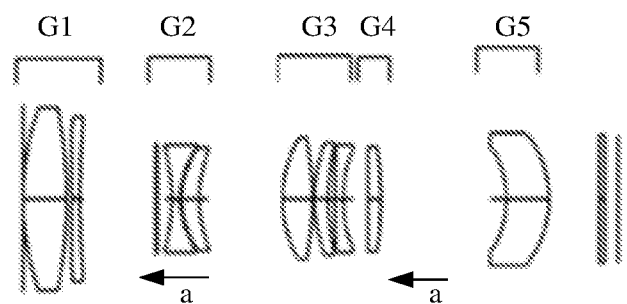
FIG. 3a to FIG. 3c show example focusing processes of the zoom lens shown in FIG. 2.
Figure 3B:
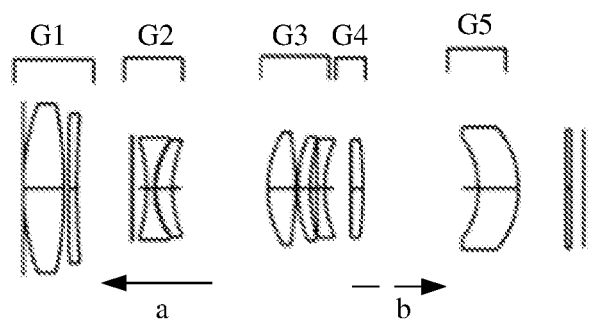
Figure 3C:
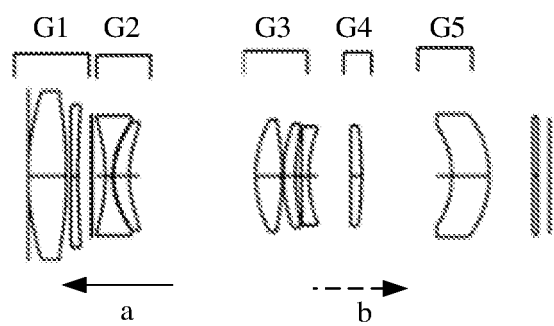

FIG. 3a to FIG. 3c show a focusing process of the zoom lens shown in FIG. 2. For directions indicated by straight-line arrows in FIG. 3a to FIG. 3c: a solid-line arrow points from an image side to an object side, and a dashed-line arrow points from the object side to the image side. In FIG. 3a, the second lens group G2 slides from a location close to the third lens group G3 towards the first lens group G1 along a direction indicated by a straight-line arrow a; and the fourth lens group G4 slides from a location close to the fifth lens group G5 to a location close to the third lens group G3 along the direction indicated by the solid-line arrow a. In FIG. 3b, the second lens group G2 continues to slide along the direction indicated by the straight-line arrow a, and the fourth lens group G4 slides from a location close to the third lens group G3 towards the fifth lens group G5 along a direction indicated by a dashed-line arrow b. In FIG. 3c, the second lens group G2 continues to slide to a location close to the first lens group G1 along the direction indicated by the straight-line arrow a, and the fourth lens group G4 continues to slide towards the fifth lens group G5 along the location indicated by the dashed-line arrow b. In the sliding process of the second lens group G2 and the fourth lens group G4, a movement stroke of the second lens group G2 along the optical axis meets the following: a ratio of the movement stroke of the second lens group along the optical axis to a total length from a surface of the zoom lens that is closest to the object side to an imaging plane is greater than or equal to 0.1 and less than or equal to 0.3. For example, the ratio of the movement stroke of the second lens group G2 along the optical axis to the total length from the surface of the zoom lens that is closest to the object side to the imaging plane is 0.1, 0.2, 0.3, or the like. A movement stroke of the fourth lens group G4 along the optical axis meets the following: a ratio of the movement stroke of the fourth lens group along the optical axis to the total length from the surface of the zoom lens that is closest to the object side to the imaging plane is greater than or equal to 0.01 and less than or equal to 0.25. For example, the ratio of the movement stroke of the fourth lens group G4 along the optical axis to the total length from the surface of the zoom lens that is closest to the object side to the imaging plane is 0.05, 0.1, 0.15, 0.2, or the like.

Figure 4:
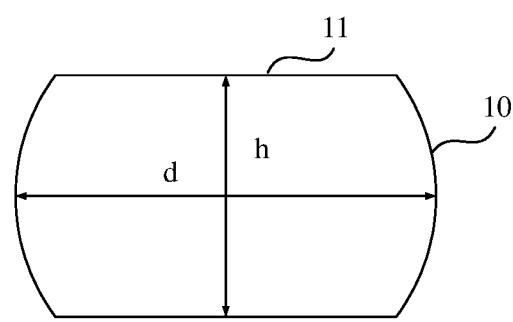
FIG. 4 is an example schematic diagram of a structure of one lens in a first lens group.

FIG. 4 shows an example of a lens 10 in the first lens group G1. In FIG. 4, d is a maximum clear aperture of the lens 10 and h is a height of the lens 10. The maximum clear aperture refers to a maximum diameter of the lens 10. A cutout 11 is provided on the lens 10 to reduce the height of the lens 10, so that his less than d. In this embodiment of this application, each lens in the first lens group G1, the second lens group G2, the third lens group G3, the fourth lens group G4, and the fifth lens group G5 uses a lens structure similar to that shown in FIG. 4, so as to increase a luminous flux, and reduce a size in a height direction. Certainly, an irregularly-shaped hole may further be provided in an electronic cutting manner. This can also increase the luminous flux and reduce the size in the height direction. A maximum clear aperture for the first lens group G1, the second lens group G2, the third lens group G3, the fourth lens group G4, and the fifth lens group G5 meets the following: 4 mm≤the maximum clear aperture≤15 mm. The maximum clear aperture of a lens in the foregoing lens groups may be 4 mm, 6.5 mm, 8 mm, 10 mm, 12 mm, 14.5 mm, or another size, so that the zoom lens can balance an amount of light admitted and a space occupied by the lens. In addition, a lens in each of the first lens group G1, the second lens group G2, the third lens group G3, the fourth lens group G4, and the fifth lens group G5 has a cutout for height reduction. If a vertical height of each lens is less than or equal to 6 mm, a height of the zoom lens is greatly reduced.

When the foregoing structure is used, for the zoom lens in FIG. 2, a ratio of its total track length to its effective focal length at the telephoto end (TTL/ft) can reach 0.8 to 1.2, and a ratio of its image height to its effective focal length at the telephoto end (IMH/ft) is 0.02 to 0.2.

To facilitate understanding of an effect of the zoom lens provided in this embodiment of this application, the following describes in detail an imaging effect of the zoom lens with reference to a specific embodiment.

Figure 5:
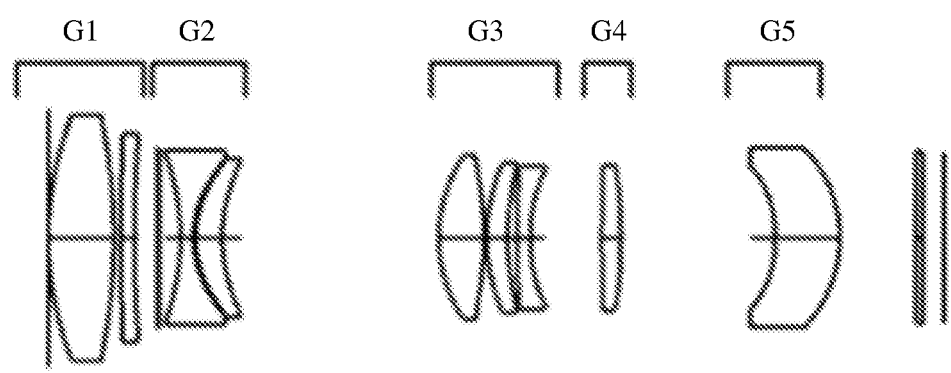
FIG. 5 shows an example first specific zoom lens.

FIG. 5 shows an example of a first specific zoom lens. In FIG. 5, starting from an object side, sequentially, lens groups meet the following: a ratio of a focal length f1 of a first lens group G1 with a positive focal power to an effective focal length ft of the zoom lens at a telephoto end is |f1/ft|=0.76; a ratio of a focal length f2 of a second lens group G2 with a negative focal power to the effective focal length ft of the zoom lens at the telephoto end is |f2/ft|=0.26; a ratio of a focal length f3 of a third lens group G3 with a positive focal power to the effective focal length ft of the zoom lens at the telephoto end is |f3/ft|=0.28; a ratio of a focal length f4 of a fourth lens group G4 with a negative focal power to the effective focal length ft of the zoom lens at the telephoto end is |f4/ft|=0.68; and a ratio of a focal length f5 of a fifth lens group G5 with a positive focal power to the effective focal length ft of the zoom lens at the telephoto end is |f5/ft|=2.52.

Still referring to FIG. 5, the zoom lens provided in this embodiment of this application includes 10 lenses with a focal power and 18 aspheric surfaces. The aspheric surface is a surface type of a lens surface. The first lens group G1 includes 2 lenses, and the 2 lenses respectively have a positive focal power and a negative focal power along a direction from the object side to an image side. The second lens group G2 includes 3 lenses, and the 3 lenses respectively have a negative focal power, a negative focal power, and a positive focal power along the direction from the object side to the image side. The third lens group G3 includes 3 lenses, and the 3 lenses respectively have a positive focal power, a positive focal power, and a negative focal power along the direction from the object side to the image side. The fourth lens group G4 includes 1 lens with a negative focal power. The fifth lens group G5 includes 1 lens with a positive focal power. The first lens group G1 and the third lens group G3 each include at least one lens with a negative focal power, and at least one of the foregoing lenses is a glass lens. A maximum clear aperture of the lenses in the first lens group G1, the second lens group G2, the third lens group G3, the fourth lens group G4, and the fifth lens group G5 is 7.1 mm. Table 1a lists a curvature, a thickness, a refractive index, and an Abbe coefficient of each lens in the zoom lens in a wide-angle state. Table 1b lists an aspheric coefficient of each lens.

TABLE 1a

| | R | | Thickness | | nd | | vd |
|---|---|---|---|---|---|---|---|
| R1 | 7.39 | d1 | 1.59 | n1 | 1.59 | v1 | 67.0 |
| R2 | −35.80 | a1 | 0.06 | | | | |

TABLE 1a-continued

| | R | Thickness | | nd | | vd |
|---|---|---|---|---|---|---|
| R3 | 22.84 | d2 | 0.40 | n2 | 1.82 | v2 | 24.1 |
| R4 | 10.76 | a2 | 0.50 | | | |
| R5 | −38.21 | d3 | 0.35 | n3 | 1.54 | v3 | 56.0 |
| R6 | 6.48 | a3 | 0.75 | | | |
| R7 | 6.49 | d4 | 0.32 | n4 | 1.54 | v4 | 56.0 |
| R8 | 2.51 | a4 | 0.06 | | | |
| R9 | 2.66 | d5 | 0.60 | n5 | 1.67 | v5 | 19.2 |
| R10 | 3.49 | a5 | 5.43 | | | |
| R11 | 4.16 | d6 | 0.88 | n6 | 1.54 | v6 | 56.0 |
| R12 | 73.52 | a6 | 0.60 | | | |
| R13 | 11.57 | d7 | 1.08 | n7 | 1.54 | v7 | 56.0 |
| R14 | −5.53 | a7 | 0.07 | | | |
| R15 | −4.75 | d8 | 1.40 | n8 | 1.67 | v8 | 19.2 |
| R16 | −13.53 | a8 | 2.58 | | | |
| R17 | 8.84 | d9 | 0.32 | n9 | 1.54 | v9 | 56.0 |
| R18 | 4.17 | a9 | 2.60 | | | |
| R19 | 8.56 | d10 | 1.10 | n10 | 1.67 | v10 | 19.2 |
| R20 | 10.54 | a10 | 1.51 | | | |

TABLE 1b

| | | Aspheric coefficient | | | | | |
|---|---|---|---|---|---|---|---|
| | Type | A2 | A3 | A4 | A5 | A6 | A7 |
| 1 | Even aspheric surface | −8.11E−05 | −2.24E−06 | −4.97E−07 | 5.11E−08 | −1.87E−09 | 0.00E+00 |
| 2 | Even aspheric surface | 2.40E−04 | −1.06E−05 | 6.45E−07 | −2.15E−08 | 0.00E+00 | 0.00E+00 |
| 5 | Even aspheric surface | 2.05E−02 | −1.84E−03 | 1.72E−04 | −1.82E−05 | 3.68E−07 | 0.00E+00 |
| 6 | Even aspheric surface | 1.45E−02 | 2.34E−03 | −4.06E−04 | 8.15E−05 | −4.94E−07 | 0.00E+00 |
| 7 | Even aspheric surface | −3.03E−02 | 4.15E−03 | 2.92E−05 | −3.20E−05 | 4.37E−07 | 0.00E+00 |
| 8 | Even aspheric surface | −2.10E−02 | −2.49E−03 | 4.84E−04 | 2.68E−05 | −2.24E−05 | 0.00E+00 |
| 9 | Even aspheric surface | −2.15E−02 | −1.80E−04 | 3.14E−05 | −3.45E−05 | 2.74E−06 | 0.00E+00 |
| 10 | Even aspheric surface | −3.18E−02 | 5.15E−03 | −6.84E−04 | −2.95E−05 | 1.39E−05 | 0.00E+00 |
| 11 | Even aspheric surface | −1.99E−03 | −6.54E−05 | 4.76E−07 | 2.85E−06 | 0.00E+00 | 0.00E+00 |
| 12 | Even aspheric surface | 6.31E−04 | −6.76E−06 | 5.23E−05 | 2.18E−06 | 0.00E+00 | 0.00E+00 |
| 13 | Even aspheric surface | 2.53E−03 | −1.03E−04 | 4.83E−06 | 4.71E−06 | −1.35E−07 | 0.00E+00 |
| 14 | Even aspheric surface | 5.51E−03 | 6.72E−05 | −1.10E−04 | 8.60E−06 | −2.97E−08 | 0.00E+00 |
| 15 | Even aspheric surface | 1.01E−02 | 4.07E−04 | −7.79E−05 | −3.65E−08 | 0.00E+00 | 0.00E+00 |
| 16 | Even aspheric surface | 8.78E−03 | 4.96E−04 | 3.59E−05 | 1.43E−06 | 0.00E+00 | 0.00E+00 |
| 17 | Even aspheric surface | −9.66E−03 | 1.61E−03 | −2.86E−04 | 1.26E−05 | 1.68E−12 | 0.00E+00 |
| 18 | Even aspheric surface | −1.03E−02 | 1.82E−03 | −3.76E−04 | 2.12E−05 | −1.73E−12 | 0.00E+00 |
| 19 | Even aspheric surface | 2.42E−03 | 9.06E−05 | −2.08E−05 | −3.21E−06 | 0.00E+00 | 0.00E+00 |
| 20 | Even aspheric surface | 1.87E−03 | 2.63E−04 | −6.98E−05 | −2.16E−06 | 0.00E+00 | 0.00E+00 |

In the 18 aspheric surfaces of the zoom lens listed in Table 1b, a surface type z of each of the even aspheric surfaces may be defined by, including but not limited to, the following aspheric surface formula:

$$z = \frac{cr^2}{1+\sqrt{1|Kc^2r^2}} + A_2r^4 + A_3r^6 + A_4r^8 + A_5r^{10} + A_6r^{12} + A_7r^{14}$$

z is a vector height of the aspheric surface, r is a radial coordinate of the aspheric surface, c is a spherical curvature of a vertex of the aspheric surface, and K is a conic constant. In this embodiment, a value of K is 0, and A2, A3, A4, A5, A6, and A7 are aspheric coefficients.

Still referring to FIG. 5, for the zoom lens, a ratio of its total track length to its effective focal length at the telephoto end (TTL/ft) is 1.06, and a ratio of its image height to its effective focal length at the telephoto end (IMH/ft) is 0.12. In FIG. 5, the zoom lens further has a stop (not shown in the figure). The stop is located on an object side of the third lens group G3, and certainly may alternatively be arranged in another lens group. For example, the stop is arranged on an object side or an image side of the first lens group G1 or the fifth lens group G5, or is arranged on an object side or an image side of the second lens group G2 or the fourth lens group G4.

As shown in FIG. 5, locations of the first lens group G1, the third lens group G3, and the fifth lens group G5 are fixed relative to an imaging plane, and the second lens group G2 and the fourth lens group G4 move along an optical axis to implement zooming.

Figure 6:
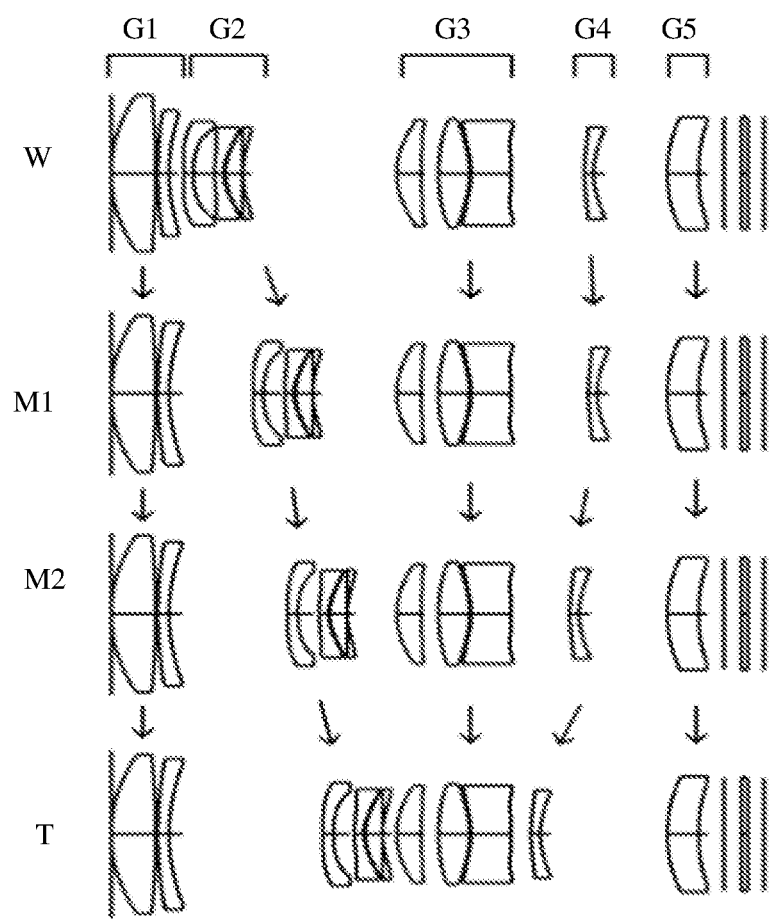
FIG. 6 shows an example zoom process of a zoom lens.

FIG. 6 shows a zoom process of the zoom lens. The zoom lens has four focal length states: W represents a wide-angle end state, M1 represents a first intermediate focal length state, M2 represents a second intermediate focal length state, and T represents a telephoto state. Relative locations of the lens groups corresponding to the wide-angle end state of the zoom lens are as follows: the second lens group G2 is close to the image side of the first lens group G1, and the fourth lens group G4 is close to an image side of the third lens group G3. Upon zooming from the wide-angle end state W to the first intermediate focal length state M1, the second lens group G2 moves towards the third lens group G3, and the fourth lens group G4 moves towards the fifth lens group G5. Upon zooming from the first intermediate focal length state M1 to the second intermediate focal length state M2, the second lens group G2 moves towards the third lens group G3, and the fourth lens group moves towards the third lens group G3. Upon zooming from the first intermediate focal length state M1 to the telephoto state T, the second lens group G2 moves towards the third lens group G3, and the fourth lens group G4 moves towards the fifth lens group G5.

It can be seen from FIG. 6 that, when the zoom lens is zoomed from the wide-angle state to the telephoto state, the second lens group G2 moves towards an image space (close to the third lens group G3), and a distance between the fourth lens group G4 and the third lens group G3 first increases and then decreases. A ratio of a movement stroke of the second lens group G2 along the optical axis to the TTL is 0.21, and a ratio of a movement stroke of the fourth lens group G4 along the optical axis to the TTL is 0.09. Correspondingly, reference can be made to Table 1c and Table 1d. Table 1c lists basic parameters of the zoom lens, and Table 1d lists distances between the lens groups in cases that the zoom lens is in the W, M1, M2, and T states.

TABLE 1c

|  | W | M1 | M2 | T |
|---|---|---|---|---|
| Focal length F | 9.2 mm | 14 mm | 17.5 mm | 21.8 mm |
| F number | 2.673 | 2.674 | 2.663 | 3.073 |
| Image height IMH | 2.6 mm | 2.6 mm | 2.6 mm | 2.6 mm |
| Half FOV | 16.02° | 10.457° | 8.38° | 6.78° |
| BFL | 3.44 mm | 3.44 mm | 3.44 mm | 3.44 mm |
| TTL | 23.0 mm | 23.0 mm | 23.0 mm | 23.0 mm |
| Designed wavelength | 650 nm, 610 nm, 555 nm, 510 nm, and 470 nm | | | |

TABLE 1d

|  | W | M1 | M2 | T |
|---|---|---|---|---|
| a2 | 0.50 mm | 2.97 mm | 4.18 mm | 5.43 mm |
| a4 | 5.43 mm | 2.96 mm | 1.74 mm | 0.50 mm |
| a6 | 2.58 mm | 2.71 mm | 2.07 mm | 0.70 mm |
| a7 | 2.60 mm | 2.47 mm | 3.11 mm | 4.48 mm |

Simulation is performed on the zoom lens shown in FIG. 5. The following describes in detail simulation effects thereof with reference to accompanying drawings.

Figure 7A:
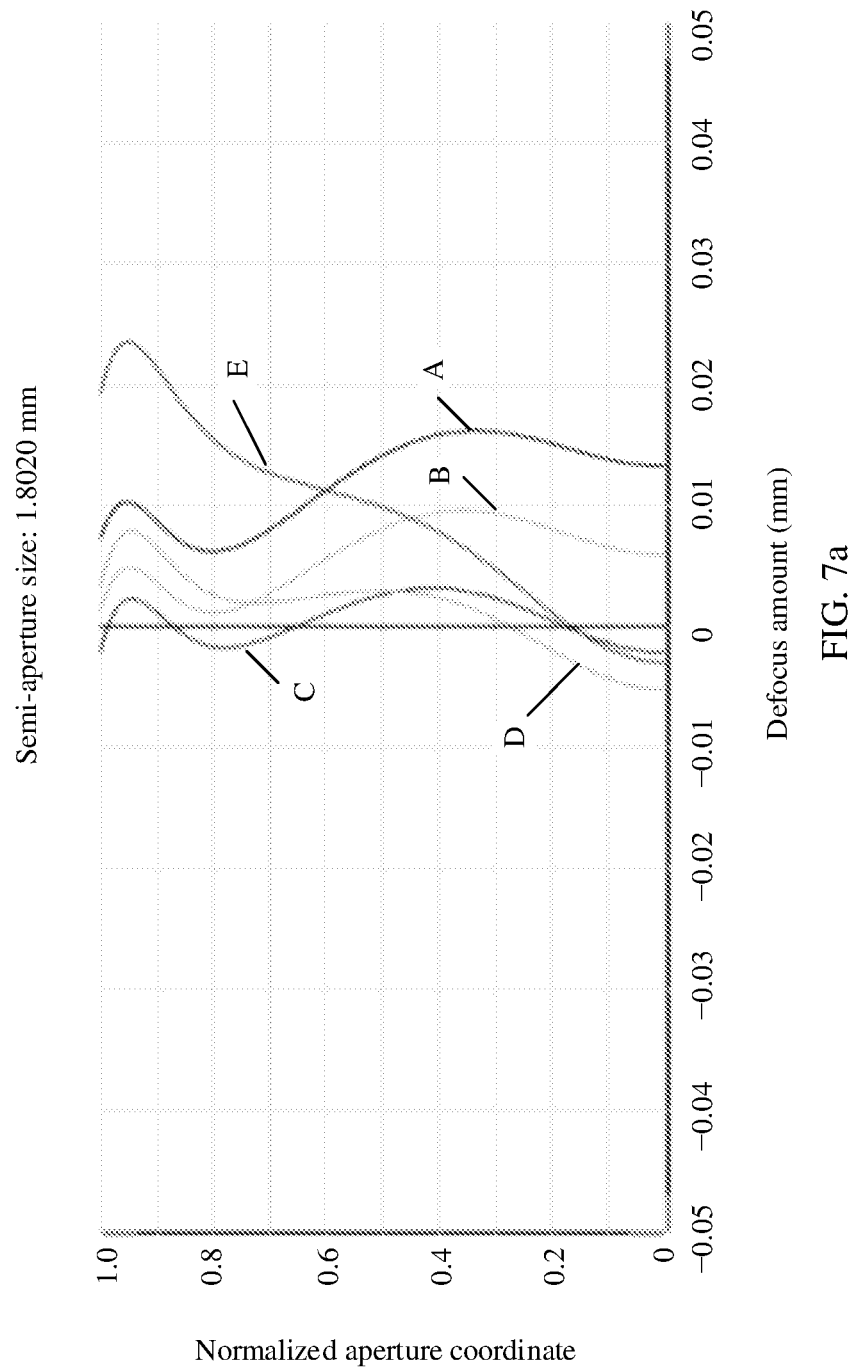
FIG. 7a shows example simulation results, of the zoom lens shown in FIG. 5 in a W state, of depth of focus locations for light with different wavelengths.

FIG. 7a shows simulation results, of the zoom lens shown in FIG. 5 in the W state, of depth of focus locations for light with the wavelengths of 650 nm, 610 nm, 555 nm, 510 nm, and 470 nm. A represents the light with the wavelength of 650 nm, and a defocus amount of the light A ranges from 0.005 mm to 0.018 mm. B represents the light with the wavelength of 610 nm, and a defocus amount of the light B ranges from 0 mm to 0.01 mm. C represents the light with the wavelength of 555 nm, and a defocus amount of the light C ranges from −0.005 mm to 0.005 mm. D represents the light with the wavelength of 510 nm, and a defocus amount of the light D ranges from −0.005 mm to 0.005 mm. E represents the light with the wavelength of 470 nm, and a defocus amount of the light E ranges from −0.007 mm to 0.025 mm.

Figure 7B:
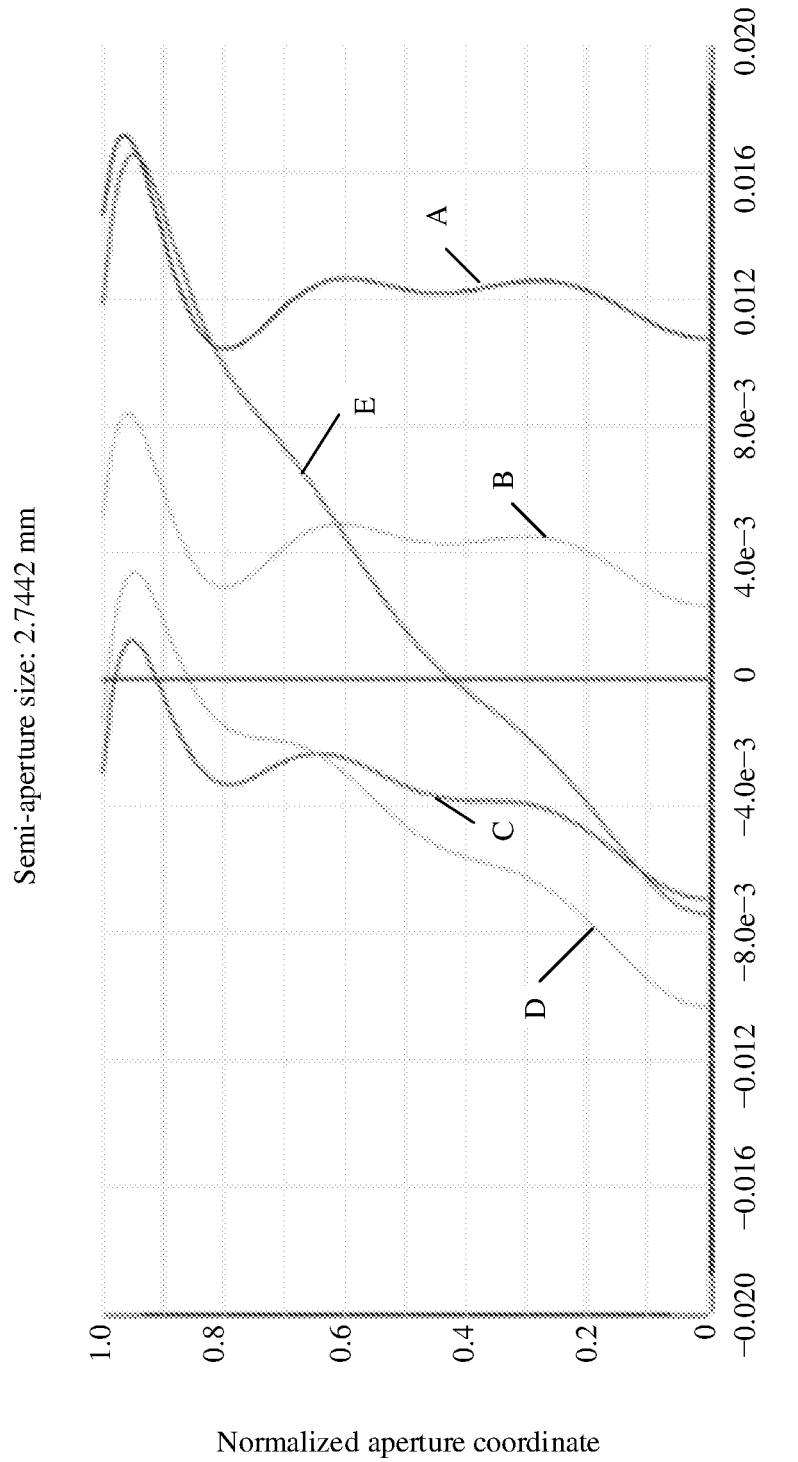
FIG. 7b shows example simulation results, of the zoom lens shown in FIG. 5 in an M1 state, of depth of focus locations for light with different wavelengths.

FIG. 7b shows simulation results, of the zoom lens shown in FIG. 5 in the M1 state, of depth of focus locations for light with the wavelengths of 650 nm, 610 nm, 555 nm, 510 nm, and 470 nm. A represents the light with the wavelength of 650 nm, and a defocus amount of the light A ranges from 0.008 mm to 0.018 mm. B represents the light with the wavelength of 610 nm, and a defocus amount of the light B ranges from 0.002 mm to 0.009 mm. C represents the light with the wavelength of 555 nm, and a defocus amount of the light C ranges from −0.007 mm to 0.004 mm. D represents the light with the wavelength of 510 nm, and a defocus amount of the light D ranges from −0.01 mm to 0.004 mm. E represents the light with the wavelength of 470 nm, and a defocus amount of the light E ranges from −0.007 mm to 0.018 mm.

Figure 7C:
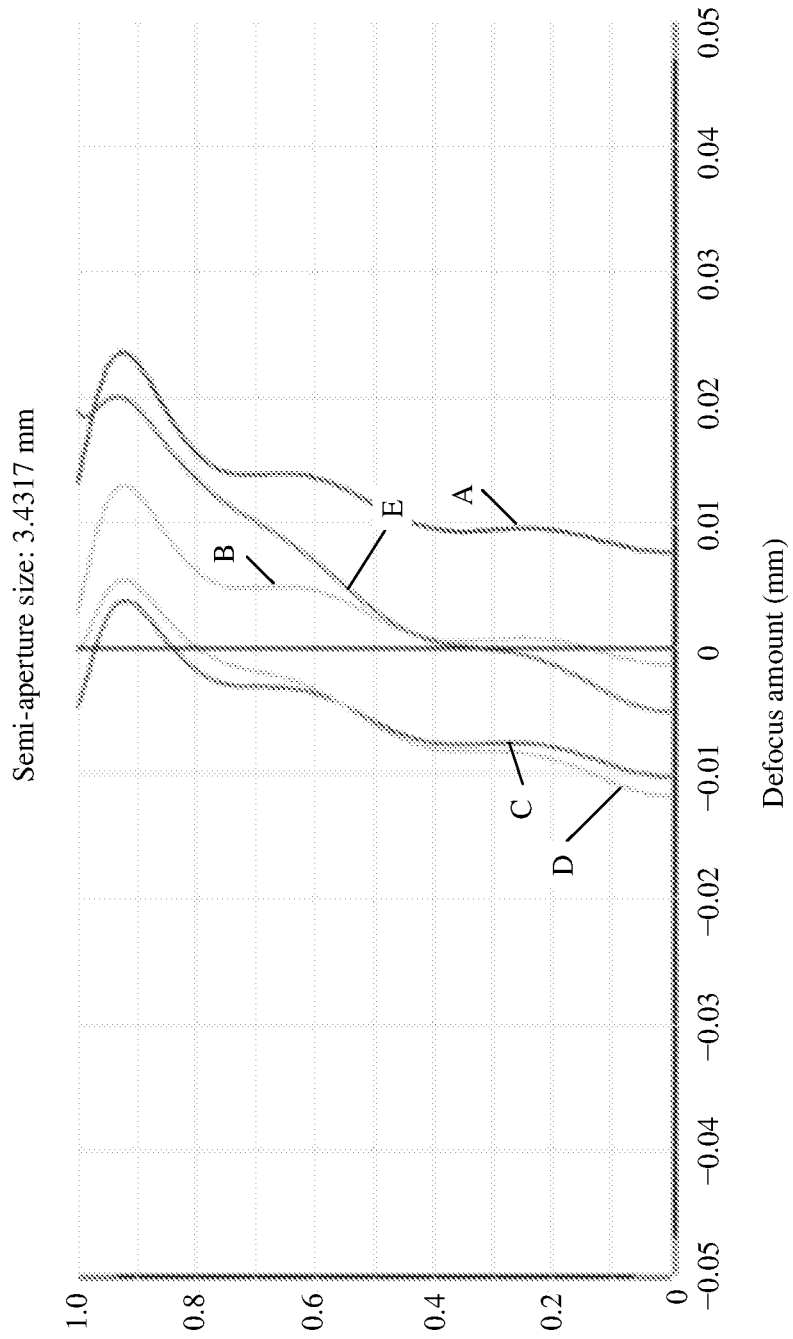
FIG. 7c shows example simulation results, of the zoom lens shown in FIG. 5 in an M2 state, of depth of focus locations for light with different wavelengths.

FIG. 7c shows simulation results, of the zoom lens shown in FIG. 5 in the M2 state, of depth of focus locations for light with the wavelengths of 650 nm, 610 nm, 555 nm, 510 nm, and 470 nm. A represents the light with the wavelength of 650 nm, and a defocus amount of the light A ranges from 0.008 mm to 0.025 mm. B represents the light with the wavelength of 610 nm, and a defocus amount of the light B ranges from −0.008 mm to 0.014 mm. C represents the light with the wavelength of 555 nm, and a defocus amount of the light C ranges from −0.01 mm to 0.005 mm. D represents the light with the wavelength of 510 nm, and a defocus amount of the light D ranges from −0.012 mm to 0.004 mm. E represents the light with the wavelength of 470 nm, and a defocus amount of the light E ranges from −0.007 mm to 0.02 mm.

Figure 7D:
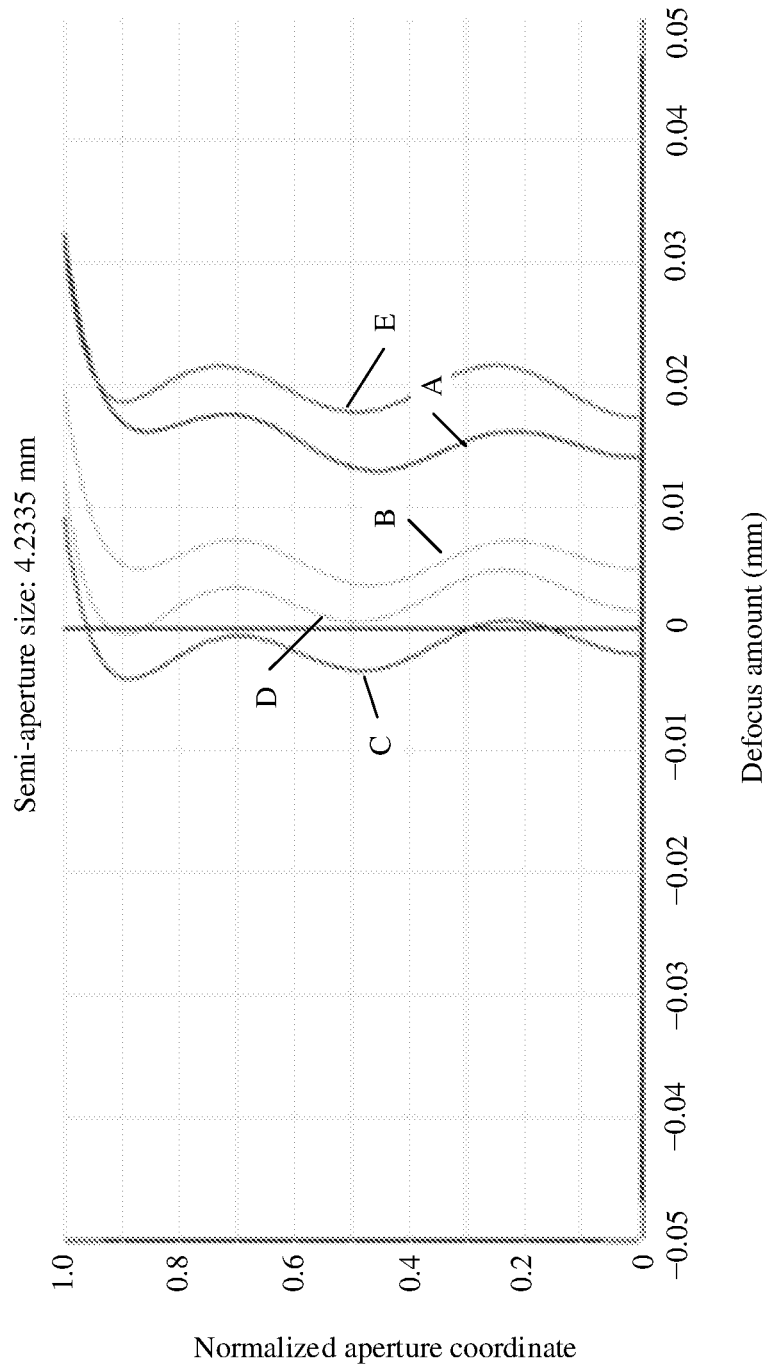
FIG. 7d shows example simulation results, of the zoom lens shown in FIG. 5 in a T state, of depth of focus locations for light with different wavelengths.

FIG. 7d shows simulation results, of the zoom lens shown in FIG. 5 in the telephoto state, of depth of focus locations for light with the wavelengths of 650 nm, 610 nm, 555 nm, 510 nm, and 470 nm. A represents the light with the wavelength of 650 nm, and a defocus amount of the light A ranges from 0.012 mm to 0.035 mm. B represents the light with the wavelength of 610 nm, and a defocus amount of the light B ranges from 0.003 mm to 0.02 mm. C represents the light with the wavelength of 555 nm, and a defocus amount of the light C ranges from −0.005 mm to 0.01 mm. D represents the light with the wavelength of 510 nm, and a defocus amount of the light D ranges from −0.001 mm to 0.015 mm. E represents the light with the wavelength of 470 nm, and a defocus amount of the light E ranges from 0.017 mm to 0.035 mm.

It can be seen from FIG. 7a, FIG. 7b, FIG. 7c, and FIG. 7d that, the defocus amounts of the light with the different wavelengths each fall within a very small range. An axial aberration of the zoom lens in each of the W, M1, M2, and T states is controlled within a very small range.

Figure 8A:
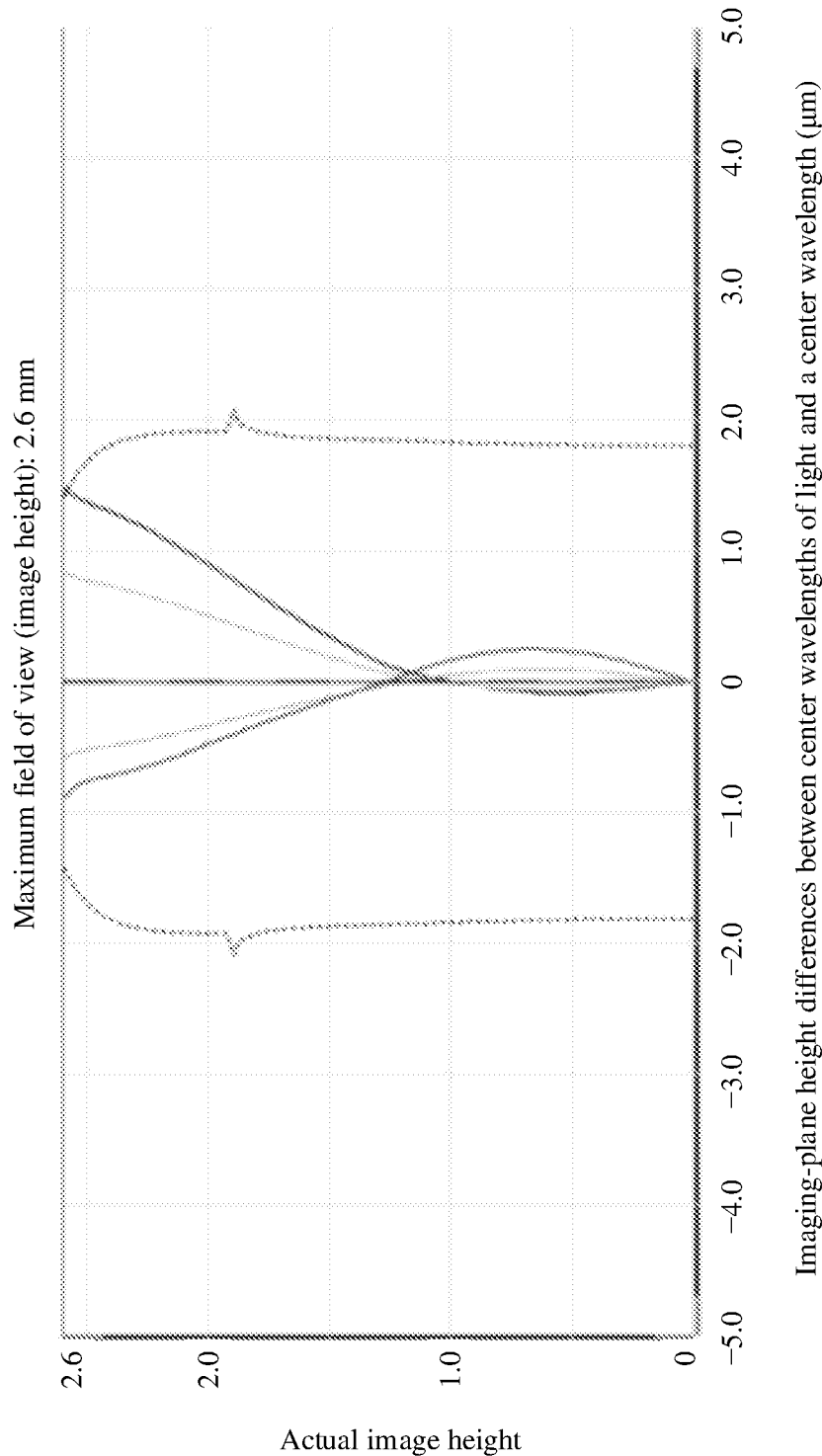
FIG. 8a shows an example horizontal chromatic aberration curves of the zoom lens shown in FIG. 5 in a W state.

FIG. 8a shows horizontal chromatic aberration curves of the zoom lens in the W state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 8a that, horizontal chromatic aberrations of the five curves each fall within the diffraction limit.

Figure 8B:
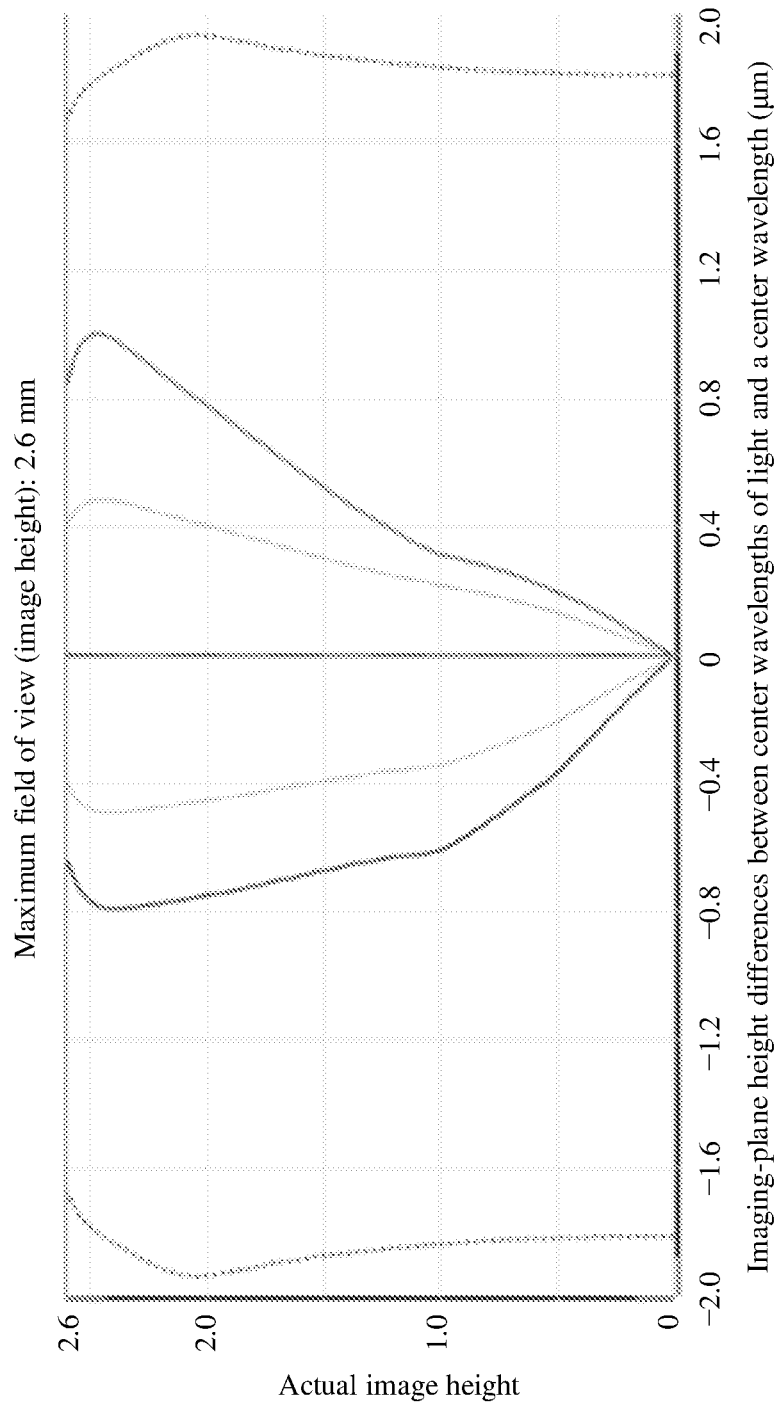
FIG. 8b shows an example horizontal chromatic aberration curves of the zoom lens shown in FIG. 5 in an M1 state.

FIG. 8b shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 8b that, horizontal chromatic aberrations of the five curves each fall within the diffraction limit.

Figure 8C:
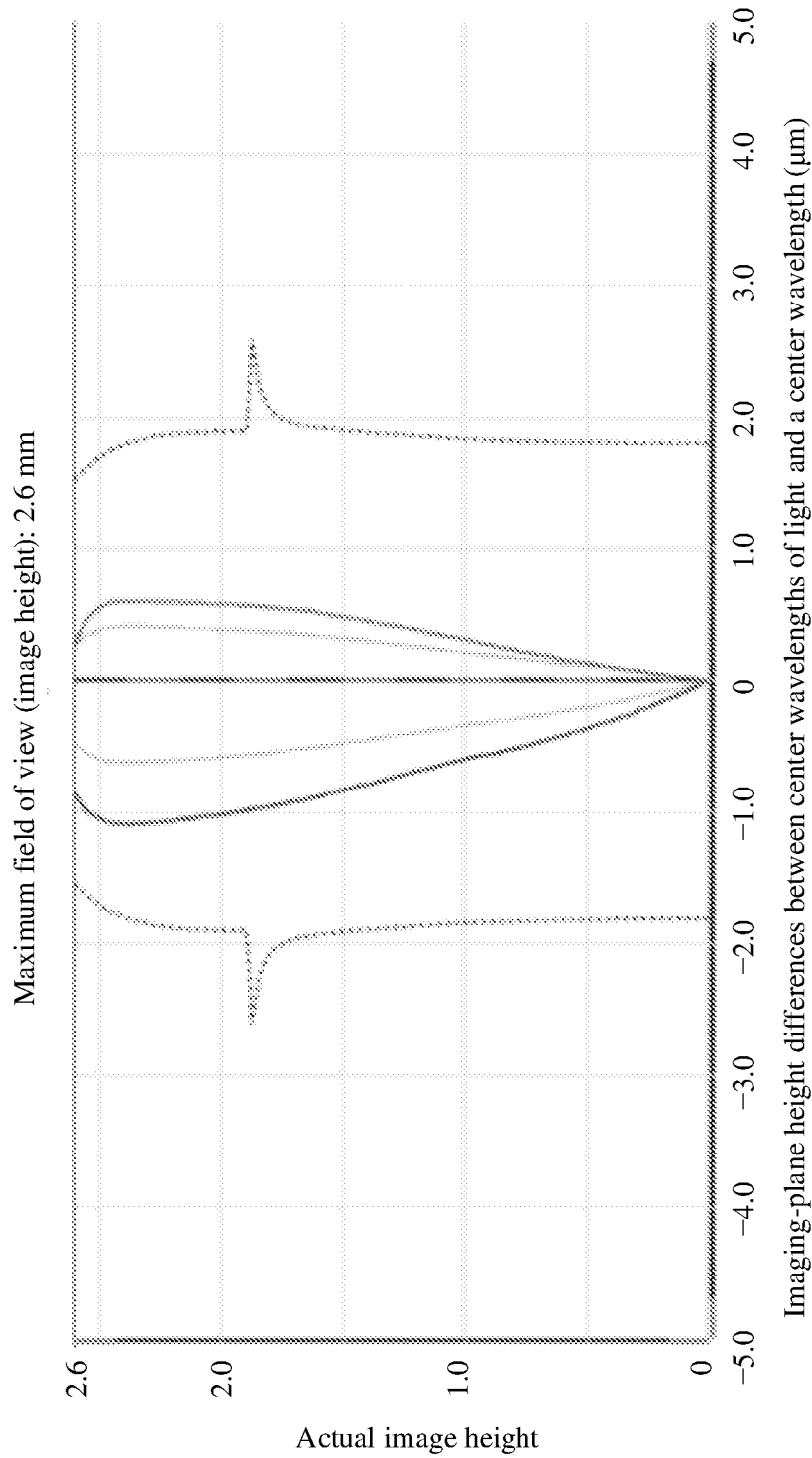
FIG. 8c shows an example horizontal chromatic aberration curves of the zoom lens shown in FIG. 5 in an M2 state.

FIG. 8c shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 8c that, horizontal chromatic aberrations of the five curves each fall within the diffraction limit.

Figure 8D:
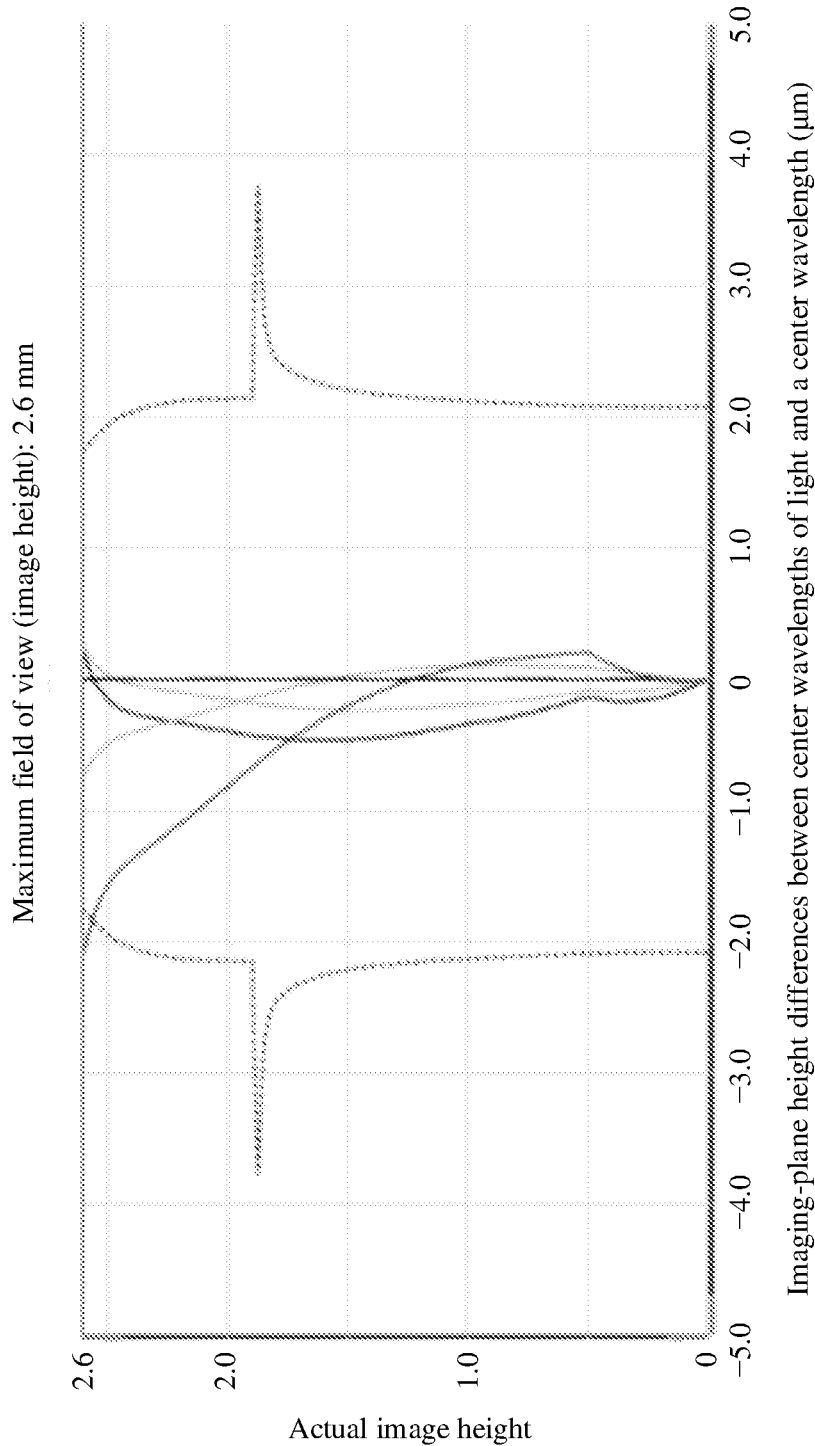
FIG. 8d shows an example horizontal chromatic aberration curves of the zoom lens shown in FIG. 5 in a T state.

FIG. 8d shows horizontal chromatic aberration curves of the zoom lens in the T state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 8d that, horizontal chromatic aberrations of the five curves each fall within the diffraction limit.

Figure 9A:
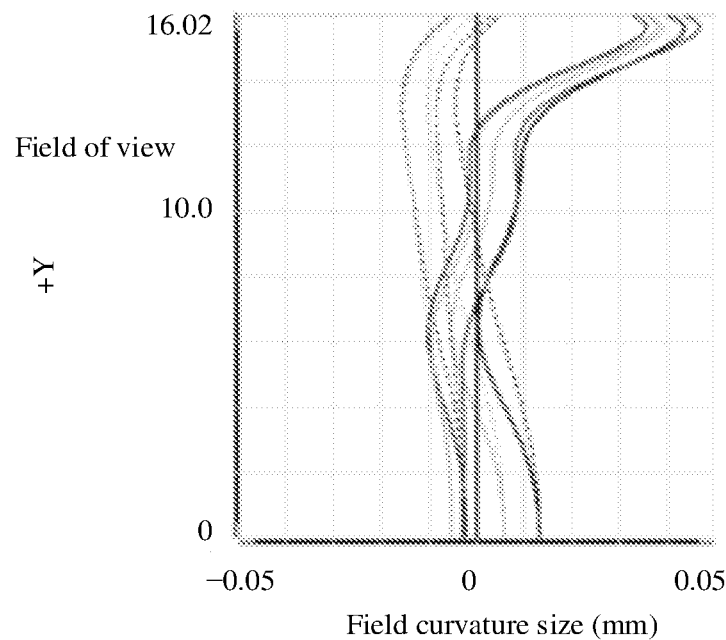
FIG. 9a shows example distortion curves of the zoom lens shown in FIG. 5 in a W state.
Figure 9B:
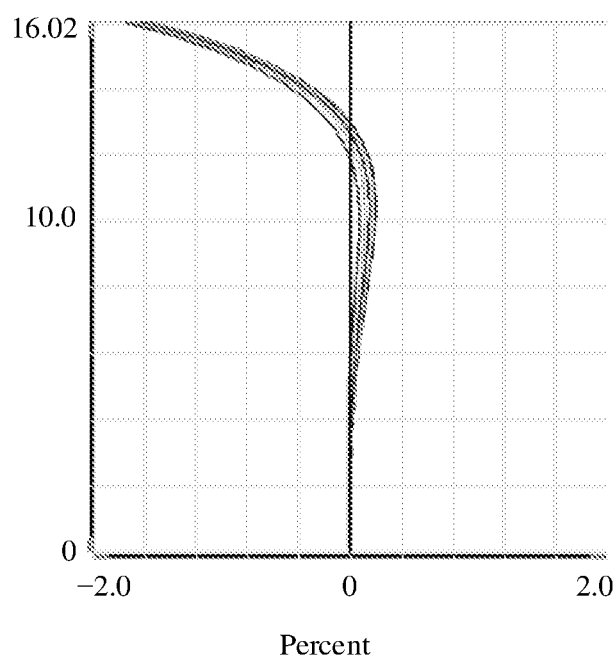
FIG. 9b shows an example optical distortion percentage of the zoom lens shown in FIG. 5 in a W state.

FIG. 9a shows distortion curves of the zoom lens in the W state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 9a that, the difference between the imaging deformation and the ideal shape is very small. FIG. 9b can be obtained by performing percentage calculation on the imaging deformation and the ideal shape of the light in FIG. 9a. It can be seen from FIG. 9b that, the zoom lens controls an optical distortion within a range of less than 2%.

Figure 10A:
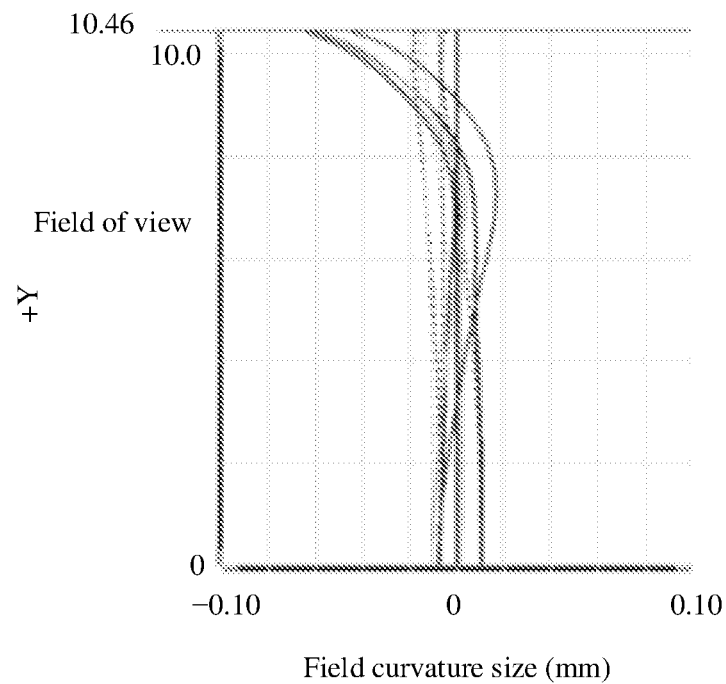
FIG. 10a shows example distortion curves of the zoom lens shown in FIG. 5 in an M1 state.
Figure 10B:
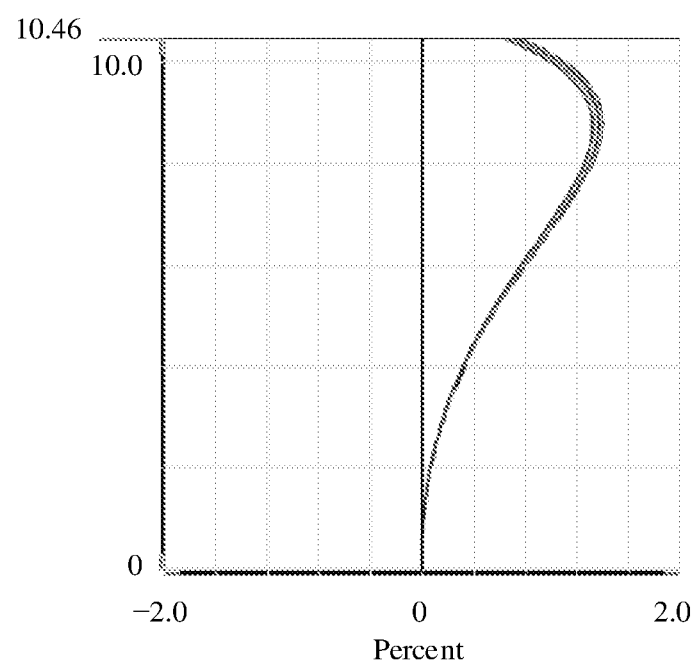
FIG. 10b shows an example optical distortion percentage of the zoom lens shown in FIG. 5 in an M1 state.

FIG. 10a shows distortion curves of the zoom lens in the M1 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 10a that, the difference between the imaging deformation and the ideal shape is very small. FIG. 10b can be obtained by performing percentage calculation on the imaging deformation and the ideal shape of the light in FIG. 10a. It can be seen from FIG. 10b that, the zoom lens controls an optical distortion within a range of less than 2%.

Figure 11A:
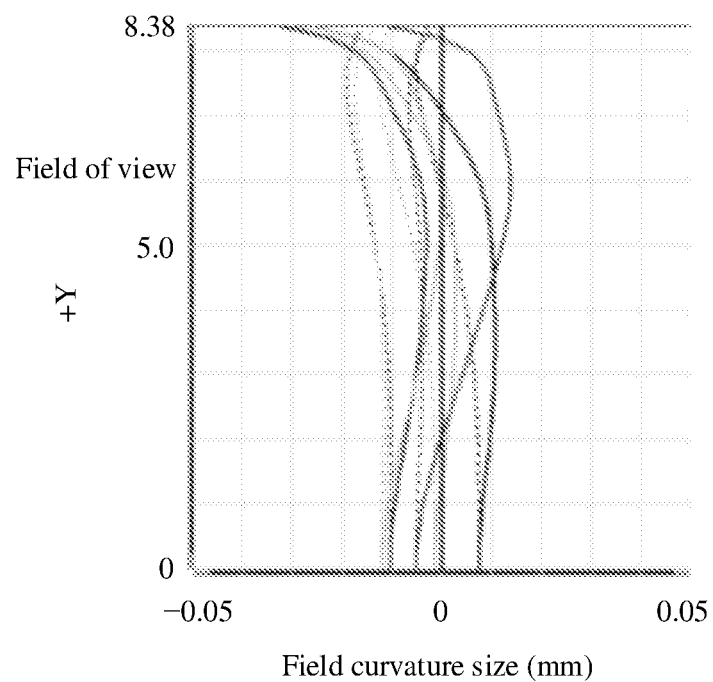
FIG. 11a shows example distortion curves of the zoom lens shown in FIG. 5 in an M2 state.
Figure 11B:
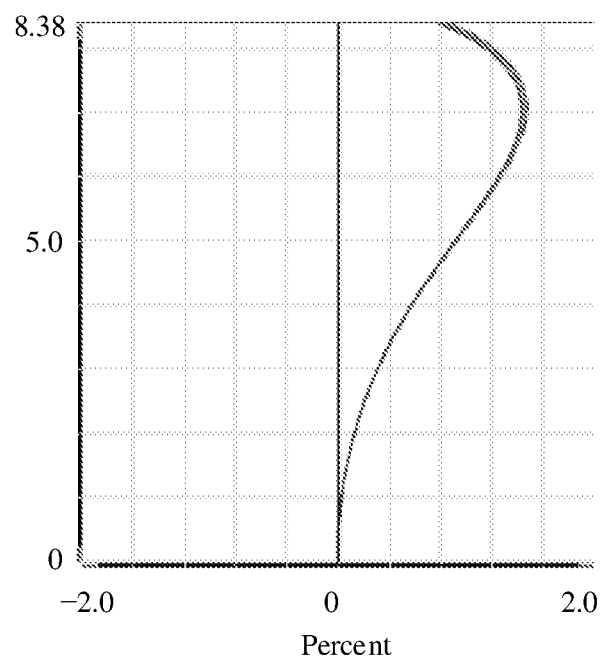
FIG. 11b shows an example optical distortion percentage of the zoom lens shown in FIG. 5 in an M2 state.

FIG. 11a shows distortion curves of the zoom lens in the M2 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 11a that, the difference between the imaging deformation and the ideal shape is very small. FIG. 11b can be obtained by performing percentage calculation on the imaging deformation and the ideal shape of the light in FIG. 11a. It can be seen from FIG. 11b that, the zoom lens controls an optical distortion within a range of less than 2%.

Figure 12A:
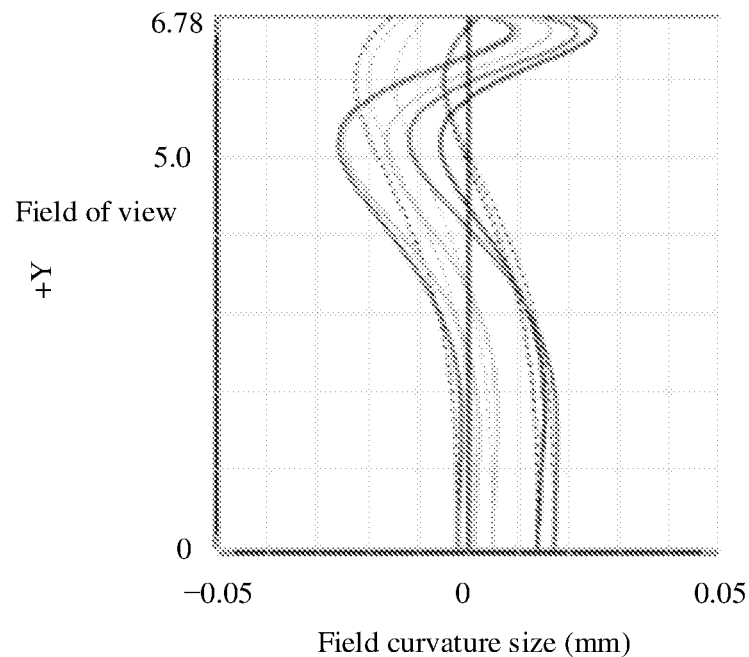
FIG. 12a shows example distortion curves of the zoom lens shown in FIG. 5 in a T state.
Figure 12B:
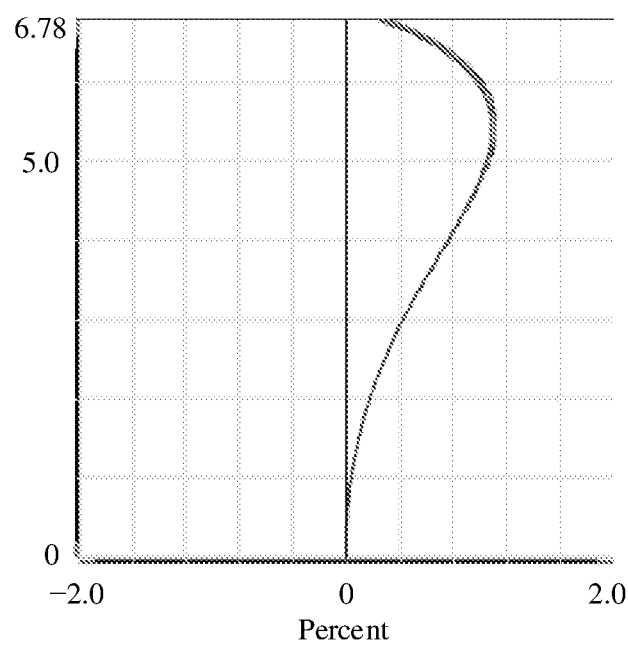
FIG. 12b shows an example optical distortion percentage of the zoom lens shown in FIG. 5 in a T state.

FIG. 12a shows distortion curves of the zoom lens in the T state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 12a that, the difference between the imaging deformation and the ideal shape is very small. FIG. 12b can be obtained by performing percentage calculation on the imaging deformation and the ideal shape of the light in FIG. 12a. It can be seen from FIG. 12b that, the zoom lens controls an optical distortion within a range of less than 2%.

Figure 13:
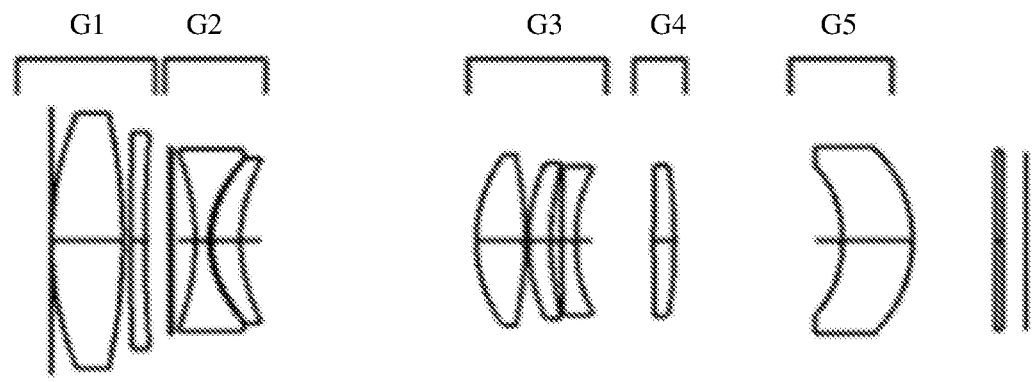
FIG. 13 shows an example second specific zoom lens.

FIG. 13 shows an example of a second specific zoom lens. Starting from an object side, sequentially, lens groups meet the following: a ratio of a focal length f1 of a first lens group G1 with a positive focal power to an effective focal length ft of the zoom lens at a telephoto end is |f1/ft|=0.62; a ratio of a focal length f2 of a second lens group G2 with a negative focal power to the effective focal length ft of the zoom lens at the telephoto end is |f2/ft|=0.20; a ratio of a focal length f3 of a third lens group G3 with a positive focal power to the effective focal length ft of the zoom lens at the telephoto end is |f3/ft|=0.28; a ratio of a focal length f4 of a fourth lens group G4 with a positive focal power to the effective focal length ft of the zoom lens at the telephoto end is |f4/ft|=0.84; and a ratio of a focal length f5 of a fifth lens group G5 with a positive focal power to the effective focal length ft of the zoom lens at the telephoto end is |f5/ft|=1.36.

Still referring to FIG. 13, the zoom lens includes 9 lenses with a focal power, and the 9 lenses include 16 aspheric surfaces. The aspheric surface is a surface type of a lens surface. The first lens group G1 includes 2 lenses, and the 2 lenses respectively have a positive focal power and a negative focal power along a direction from the object side to an image side. The second lens group G2 includes 2 lenses, and the 2 lenses respectively have a negative focal power and a positive focal power along the direction from the object side to the image side. The third lens group G3 includes 3 lenses, and the 3 lenses respectively have a positive focal power, a positive focal power, and a negative focal power along the direction from the object side to the image side. The fourth lens group G4 includes 1 lens with a positive focal power.

The fifth lens group G5 includes 1 lens with a positive focal power. The first lens group G1 and the third lens group G3 each include at least one lens with a negative focal power. A maximum clear aperture of the lenses in the first lens group G1, the second lens group G2, the third lens group G3, the fourth lens group G4, and the fifth lens group G5 is 7.2 mm. Table 2a lists a curvature, a thickness, a refractive index, and an Abbe coefficient of each lens in the zoom lens in a wide-angle state. Table 2b lists an aspheric coefficient of each lens.

TABLE 2a

|  | R | Thickness |  | nd |  | vd |
|---|---|---|---|---|---|---|
| R1 | 9.77 | d1 | 1.87 | n1 | 1.50 | v1 | 81.6 |
| R2 | −16.30 | a1 | 0.21 |  |  |  |
| R3 | 228.10 | d2 | 0.36 | n2 | 1.92 | v2 | 18.9 |

TABLE 2a-continued

|  | R | Thickness |  | nd |  | vd |
|---|---|---|---|---|---|---|
| R4 | 36.47 | a2 | 1.32 |  |  |  |
| R5 | −6.90 | d3 | 0.36 | n3 | 1.54 | v3 | 56.0 |
| R6 | 3.01 | a3 | 0.07 |  |  |  |
| R7 | 3.01 | d4 | 0.75 | n4 | 1.67 | v4 | 19.2 |
| R8 | 4.44 | a4 | 6.17 |  |  |  |
| R9 | 4.32 | d5 | 1.29 | n5 | 1.54 | v5 | 56.0 |
| R10 | −8.80 | a5 | 0.07 |  |  |  |
| R11 | 5.44 | d6 | 0.59 | n6 | 1.66 | v6 | 20.4 |
| R12 | 7.01 | a6 | 0.30 |  |  |  |
| R13 | −172.98 | d7 | 0.36 | n7 | 1.54 | v7 | 56.0 |
| R14 | 6.00 | a7 | 2.03 |  |  |  |
| R15 | 38.51 | d8 | 0.54 | n8 | 1.67 | v8 | 19.2 |
| R16 | −17.86 | a8 | 4.40 |  |  |  |
| R17 | −3.99 | d9 | 1.83 | n9 | 1.52 | v9 | 64.2 |
| R18 | −4.07 | a9 | 2.16 |  |  |  |

TABLE 2b

Aspheric coefficient

| | Type | A2 | A3 | A4 | A5 | A6 | A7 |
|---|---|---|---|---|---|---|---|
| R1 | Even aspheric surface | −1.97E−05 | −1.65E−05 | 3.80E−06 | −5.46E−07 | 3.49E−08 | −9.14E−10 |
| R2 | Even aspheric surface | 1.94E−04 | 6.42E−06 | −1.93E−06 | 9.43E−08 | 5.79E−10 | −2.03E−10 |
| R5 | Even aspheric surface | 5.36E−04 | 1.43E−04 | −2.21E−05 | 8.41E−07 | 1.02E−07 | −7.31E−09 |
| R6 | Even aspheric surface | −2.78E−03 | −3.49E−04 | −4.76E−05 | 2.28E−07 | −5.55E−07 | 5.50E−08 |
| R7 | Even aspheric surface | −3.77E−03 | −4.20E−04 | −4.25E−05 | 3.52E−08 | −1.80E−07 | −4.32E−08 |
| R8 | Even aspheric surface | −3.10E−03 | 2.25E−05 | −3.43E−05 | 4.30E−06 | −3.67E−07 | −3.53E−08 |
| R9 | Even aspheric surface | −1.28E−03 | 4.53E−05 | 3.87E−06 | 3.73E−07 | 2.60E−08 | −6.91E−10 |
| R10 | Even aspheric surface | 2.57E−03 | −5.48E−05 | 1.10E−05 | −5.28E−07 | 5.16E−08 | −7.12E−09 |
| R11 | Even aspheric surface | 4.26E−04 | −1.16E−04 | −1.52E−05 | −3.29E−06 | 6.25E−07 | −6.93E−08 |
| R12 | Even aspheric surface | −2.01E−03 | −2.94E−04 | −2.55E−05 | 3.44E−06 | 5.82E−07 | −4.88E−08 |
| R13 | Even aspheric surface | 4.49E−03 | −6.31E−04 | 9.25E−05 | −1.34E−05 | 7.66E−07 | −5.45E−18 |
| R14 | Even aspheric surface | 6.30E−03 | −2.82E−04 | 1.09E−04 | −1.55E−05 | −1.60E−17 | −1.21E−17 |
| R15 | Even aspheric surface | −1.97E−03 | −1.70E−04 | 1.70E−05 | −1.69E−06 | −3.53E−16 | 1.19E−17 |
| R16 | Even aspheric surface | −1.72E−03 | −1.16E−04 | 1.07E−05 | −1.03E−06 | 4.34E−16 | 1.92E−18 |
| R17 | Even aspheric surface | −4.96E−03 | −2.98E−04 | 7.22E−05 | −1.03E−05 | 3.44E−16 | 9.96E−19 |
| R18 | Even aspheric surface | −1.51E−03 | −1.35E−05 | 2.58E−05 | −3.08E−06 | 1.16E−07 | −3.96E−17 |

In the 16 aspheric surfaces of the zoom lens listed in Table 2b, a surface type z of each of the even aspheric surfaces may be defined by, including but not limited to, the following aspheric surface formula:

$$z = \frac{cr^2}{1+\sqrt{1|Kc^2r^2}} + A_2r^4 + A_3r^6 + A_4r^8 + A_5r^{10} + A_6r^{12} + A_7r^{14}$$

z is a vector height of the aspheric surface, r is a radial coordinate of the aspheric surface, c is a spherical curvature of a vertex of the aspheric surface, and K is a conic constant. In this embodiment, a value of K is 0, and A2, A3, A4, A5, A6, and A7 are aspheric coefficients.

Still referring to FIG. 13, for the zoom lens, a ratio of its total track length to its effective focal length at the telephoto end (TTL/ft) is 0.95, and a ratio of its image height to its effective focal length at the telephoto end (IMH/ft) is 0.09. In FIG. 13, the zoom lens further has a stop (not shown in the figure). The stop is located on an object side of the third lens group G3, and certainly may alternatively be arranged in another lens group. For example, the stop is arranged on an object side or an image side of the first lens group G1 or the fifth lens group G5, or is arranged on an object side or an image side of the second lens group G2 or the fourth lens group G4.

As shown in FIG. 13, locations of the first lens group G1, the third lens group G3, and the fifth lens group G5 are fixed relative to an imaging plane, and the second lens group G2 and the fourth lens group G4 move along an optical axis to implement zooming.

Figure 14:
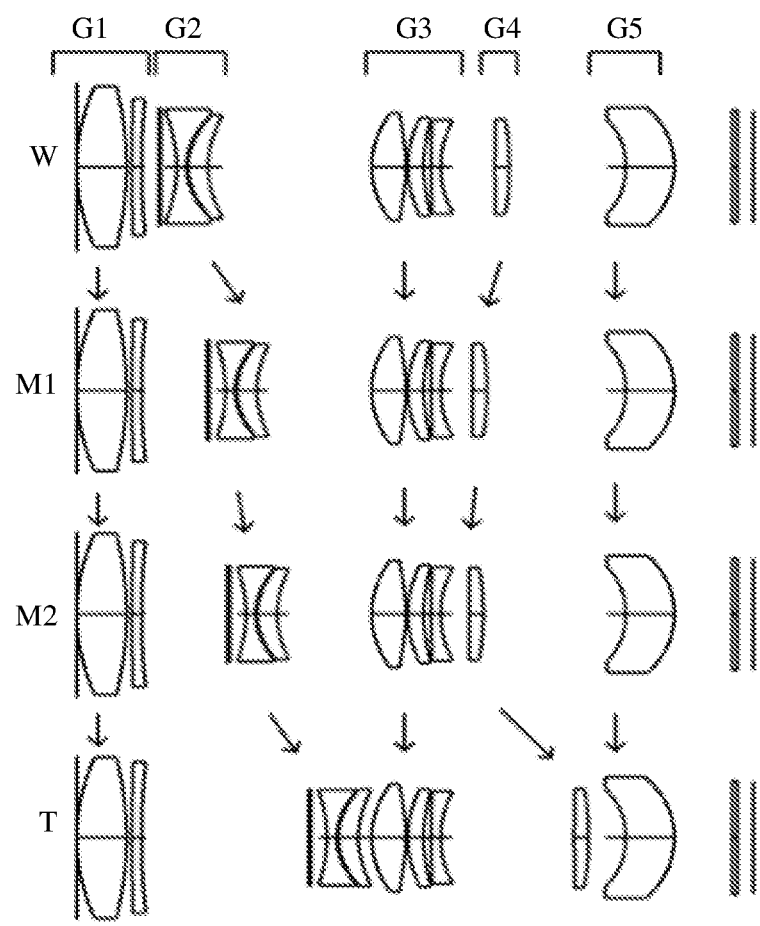
FIG. 14 shows an example zoom process of a zoom lens.

FIG. 14 shows a zoom process of the zoom lens. The zoom lens has four focal length states: W represents a wide-angle end state, M1 represents a first intermediate focal length state, M2 represents a second intermediate focal length state, and T represents a telephoto state. Relative locations of the lens groups corresponding to the W state of the zoom lens are as follows: the second lens group G2 is close to the image side of the first lens group G1, and the fourth lens group G4 is close to an image side of the third lens group G3. Upon zooming from the wide-angle end state W to the first intermediate focal length state M1, the second lens group G2 moves towards the third lens group G3, and the fourth lens group G4 moves towards the third lens group G3. Upon zooming from the first intermediate focal length state M1 to the second intermediate focal length state M2, the second lens group G2 moves towards the third lens group G3, and the fourth lens group G4 moves towards the third lens group G3. Upon zooming from the first intermediate focal length state M1 to the telephoto state T, the second lens group G2 moves towards the third lens group G3, and the fourth lens group G4 moves towards the fifth lens group G5.

It can be seen from FIG. 14 that, when the zoom lens is zoomed from the wide-angle state to the telephoto state, the second lens group G2 moves towards an image space (close to the third lens group G3), and a distance between the fourth lens group G4 and the third lens group G3 first decreases and then increases. A ratio of a movement stroke of the second lens group G2 along the optical axis to the TTL is 0.22, and a ratio of a movement stroke of the fourth lens group G4 along the optical axis to the TTL is 0.156. Correspondingly, reference can be made to Table 2c and Table 2d. Table 2c lists basic parameters of the zoom lens, and Table 2d lists distances between the lens groups in cases that the zoom lens is in the W, M1, M2, and T states.

TABLE 2c

| | W | M1 | M2 | T |
|---|---|---|---|---|
| Focal length F | 9.3 mm | 13 mm | 15.04 mm | 26.8 mm |
| F number | 2.927 | 2.986 | 2.997 | 3.722 |
| Image height IMH | 2.5 mm | 2.5 mm | 2.5 mm | 2.5 mm |
| Half FOV | 15.4° | 10.792° | 9.265° | 5.05° |
| BFL | 2.97 mm | 2.97 mm | 2.97 mm | 2.97 mm |
| TTL | 25.5 mm | 25.5 mm | 25.5 mm | 25.5 mm |
| Designed wavelength | 650 nm, 610 nm, 555 nm, 510 nm, and 470 nm | | | |

TABLE 2d

| | W | M1 | M2 | T |
|---|---|---|---|---|
| a2 | 1.32 mm | 3.16 mm | 3.93 mm | 6.99 mm |
| a4 | 6.17 mm | 4.33 mm | 3.56 mm | 0.50 mm |
| a7 | 2.03 mm | 1.19 mm | 1.05 mm | 5.03 mm |
| a8 | 4.40 mm | 5.24 mm | 5.38 mm | 1.40 mm |

Simulation is performed on the zoom lens shown in FIG. 13. The following describes in detail simulation effects thereof with reference to accompanying drawings.

Figure 15A:
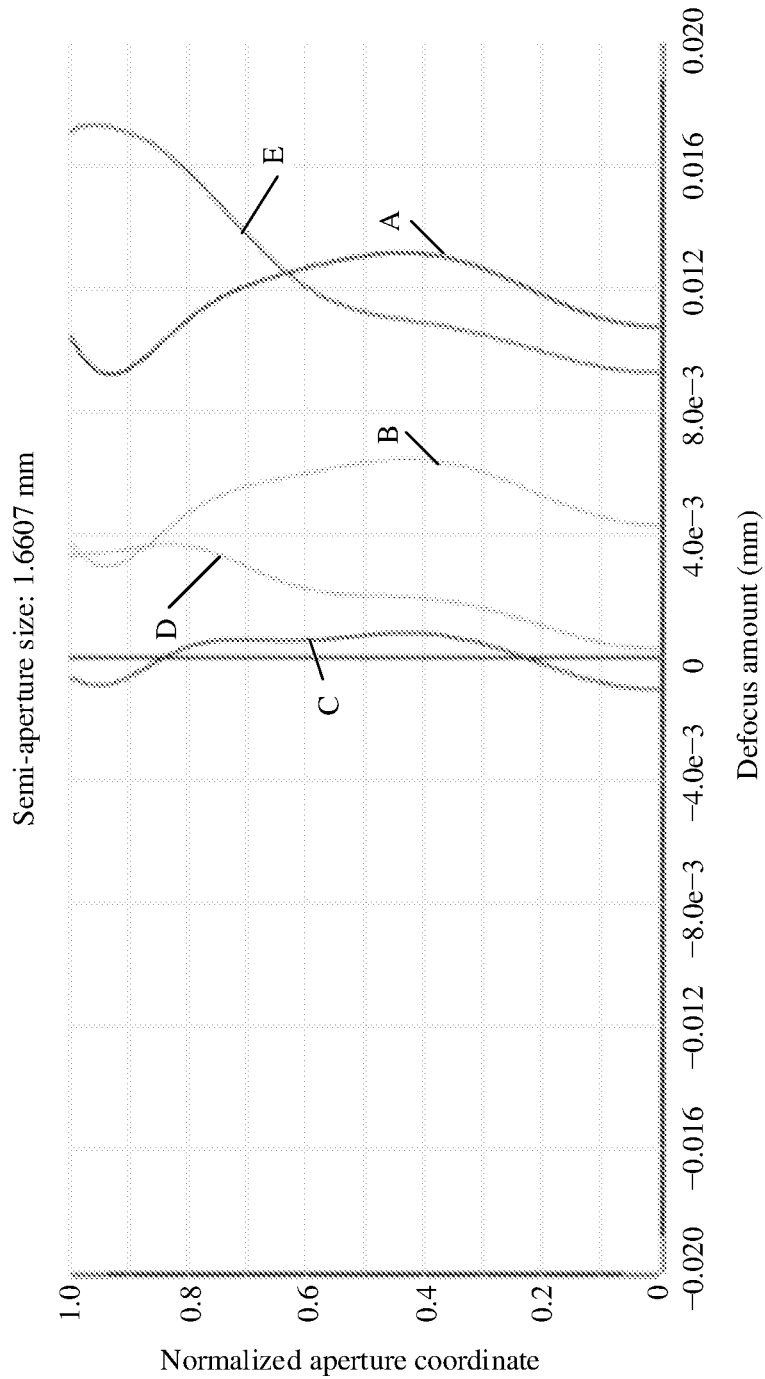
FIG. 15a shows example simulation results, of the zoom lens shown in FIG. 13 in a W state, of depth of focus locations for light with different wavelengths.

FIG. 15a shows simulation results, of the zoom lens shown in FIG. 13 in the W state, of depth of focus locations for light with the wavelengths of 650 nm, 610 nm, 555 nm, 510 nm, and 470 nm. A represents the light with the wavelength of 650 nm, and a defocus amount of the light A ranges from 0.008 mm to 0.014 mm. B represents the light with the wavelength of 610 nm, and a defocus amount of the light B ranges from 0.002 mm to 0.006 mm. C represents the light with the wavelength of 555 nm, and a defocus amount of the light C ranges from −0.002 mm to 0.002 mm. D represents the light with the wavelength of 510 nm, and a defocus amount of the light D ranges from 0 mm to 0.004 mm. E represents the light with the wavelength of 470 nm, and a defocus amount of the light E ranges from 0.01 mm to 0.018 mm.

Figure 15B:
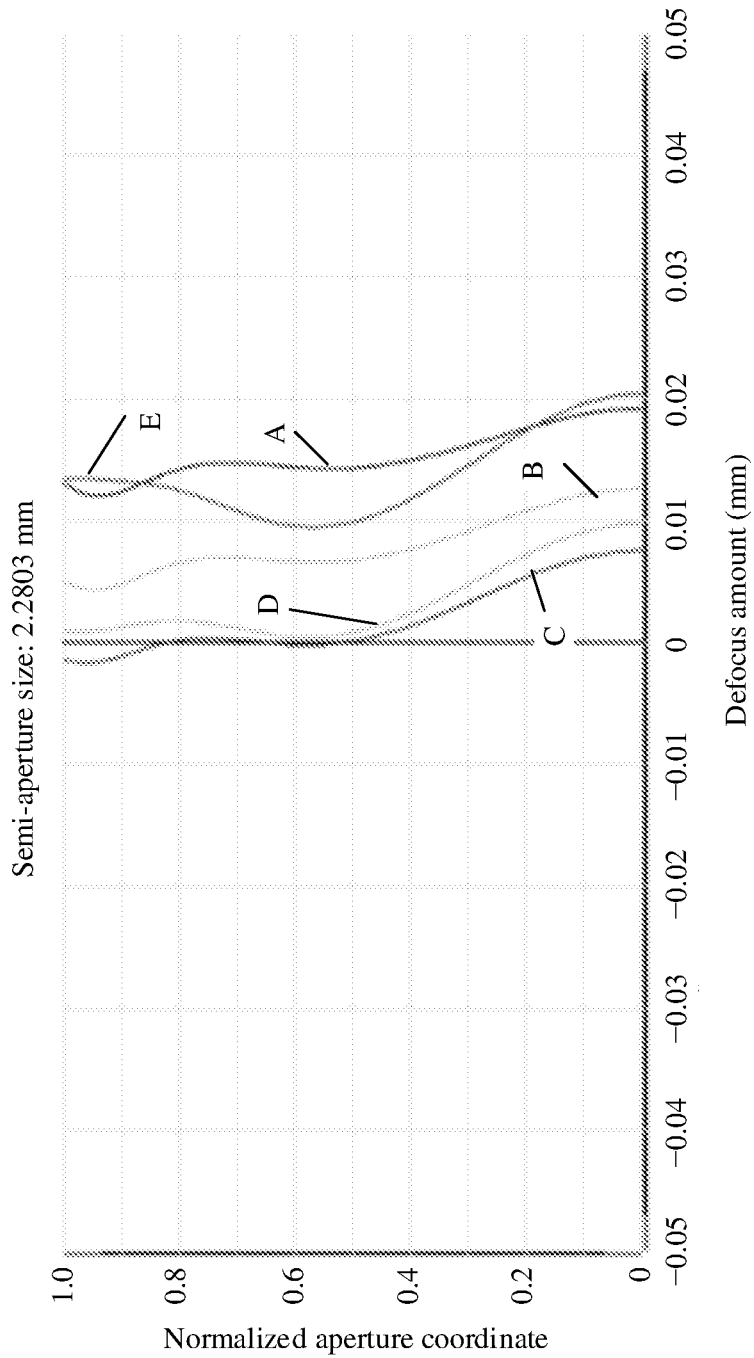
FIG. 15b shows example simulation results, of the zoom lens shown in FIG. 13 in an M1 state, of depth of focus locations for light with different wavelengths.

FIG. 15b shows simulation results, of the zoom lens shown in FIG. 13 in the M1 state, of depth of focus locations for light with the wavelengths of 650 nm, 610 nm, 555 nm, 510 nm, and 470 nm. A represents the light with the wavelength of 650 nm, and a defocus amount of the light A ranges from 0.01 mm to 0.02 mm. B represents the light with the wavelength of 610 nm, and a defocus amount of the light B ranges from 0.004 mm to 0.014 mm. C represents the light with the wavelength of 555 nm, and a defocus amount of the light C ranges from −0.008 mm to 0.008 mm. D represents the light with the wavelength of 510 nm, and a defocus amount of the light D ranges from 0 mm to 0.01 mm. E represents the light with the wavelength of 470 nm, and a defocus amount of the light E ranges from 0.008 mm to 0.022 mm.

Figure 15C:
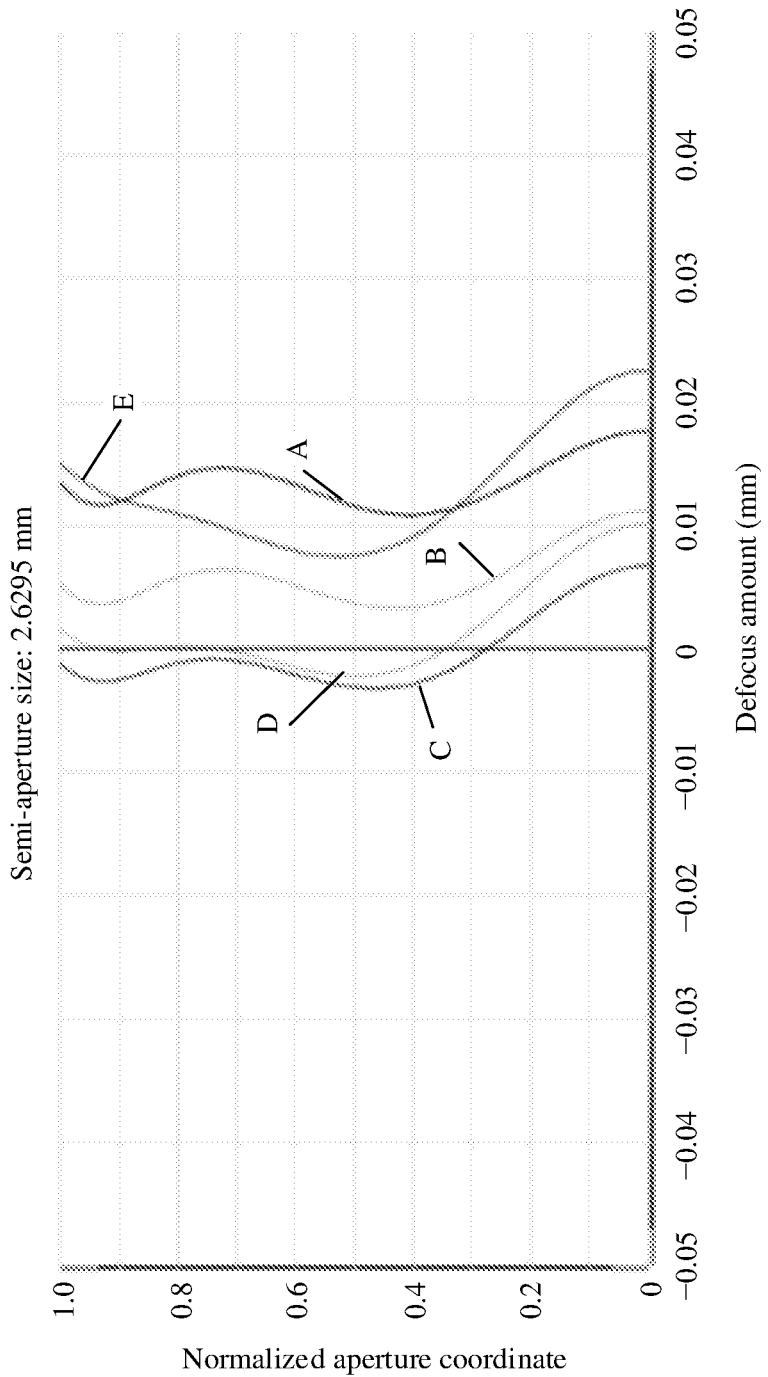
FIG. 15c shows example simulation results, of the zoom lens shown in FIG. 13 in an M2 state, of depth of focus locations for light with different wavelengths.

FIG. 15c shows simulation results, of the zoom lens shown in FIG. 13 in the M2 state, of depth of focus locations for light with the wavelengths of 650 nm, 610 nm, 555 nm, 510 nm, and 470 nm. A represents the light with the wavelength of 650 nm, and a defocus amount of the light A ranges from 0.01 mm to 0.02 mm. B represents the light with the wavelength of 610 nm, and a defocus amount of the light B ranges from 0.02 mm to 0.012 mm. C represents the light with the wavelength of 555 nm, and a defocus amount of the light C ranges from −0.004 mm to 0.007 mm. D represents the light with the wavelength of 510 nm, and a defocus amount of the light D ranges from −0.004 mm to 0.01 mm.

E represents the light with the wavelength of 470 nm, and a defocus amount of the light E ranges from 0.006 mm to 0.024 mm.

Figure 15D:
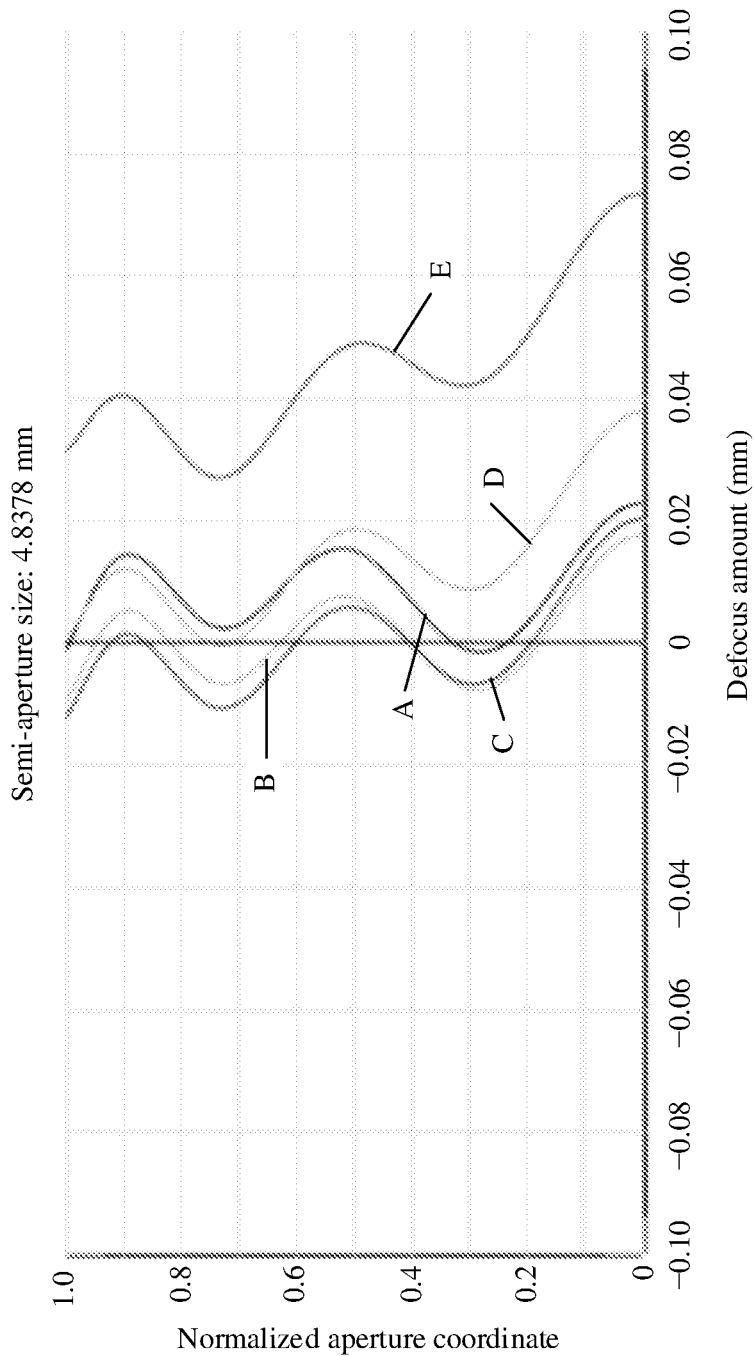
FIG. 15d shows example simulation results, of the zoom lens shown in FIG. 13 in a T state, of depth of focus locations for light with different wavelengths.

FIG. 15d shows simulation results, of the zoom lens shown in FIG. 13 in the telephoto state, of depth of focus locations for light with the wavelengths of 650 nm, 610 nm, 555 nm, 510 nm, and 470 nm. A represents the light with the wavelength of 650 nm, and a defocus amount of the light A ranges from −0.002 mm to 0.02 mm. B represents the light with the wavelength of 610 nm, and a defocus amount of the light B ranges from −0.008 mm to 0.018 mm. C represents the light with the wavelength of 555 nm, and a defocus amount of the light C ranges from −0.008 mm to 0.02 mm. D represents the light with the wavelength of 510 nm, and a defocus amount of the light D ranges from −0.002 mm to 0.038 mm. E represents the light with the wavelength of 470 nm, and a defocus amount of the light E ranges from 0.022 mm to 0.075 mm.

It can be seen from FIG. 15a, FIG. 15b, FIG. 15c, and FIG. 15d that, the defocus amounts of the light with the different wavelengths each fall within a very small range. An axial aberration of the zoom lens in each of the W, M1, M2, and T states is controlled within a very small range.

Figure 16A:
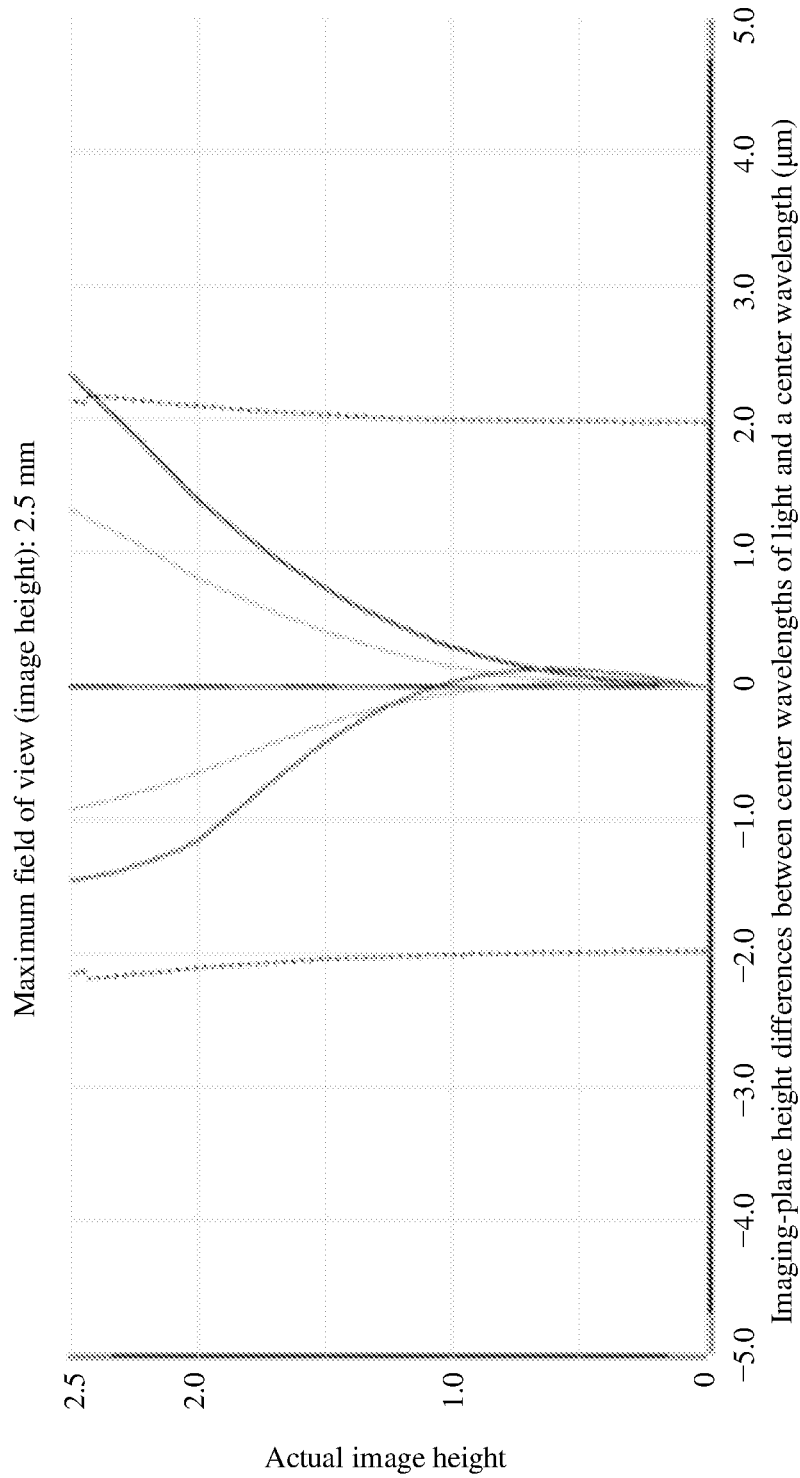
FIG. 16a shows example horizontal chromatic aberration curves of the zoom lens shown in FIG. 13 in a W state.

FIG. 16a shows horizontal chromatic aberration curves of the zoom lens in the W state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 16a that, horizontal chromatic aberrations of the five curves each substantially fall within the diffraction limit.

Figure 16B:
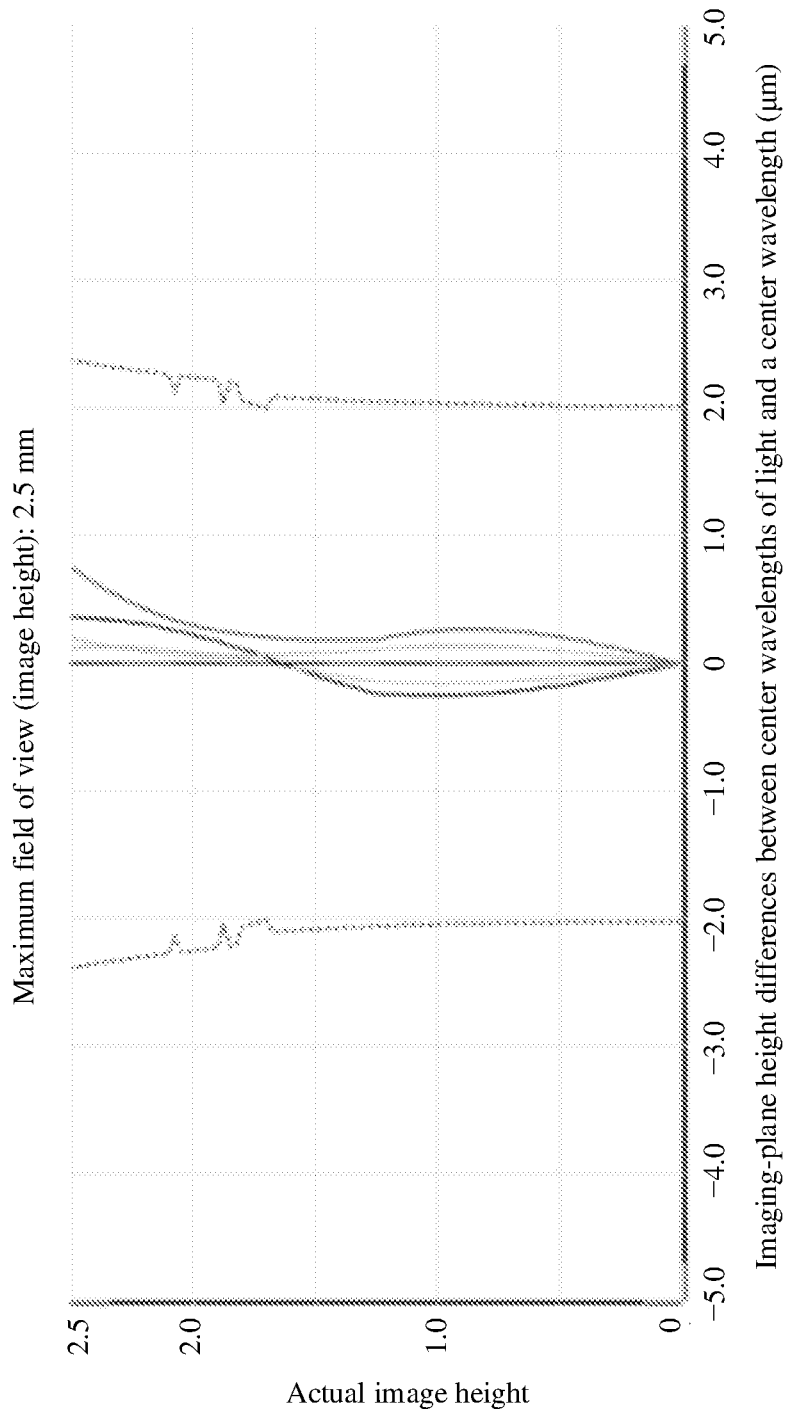
FIG. 16b shows example horizontal chromatic aberration curves of the zoom lens shown in FIG. 13 in an M1 state.

FIG. 16b shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 16b that, horizontal chromatic aberrations of the five curves each fall within the diffraction limit.

Figure 16C:
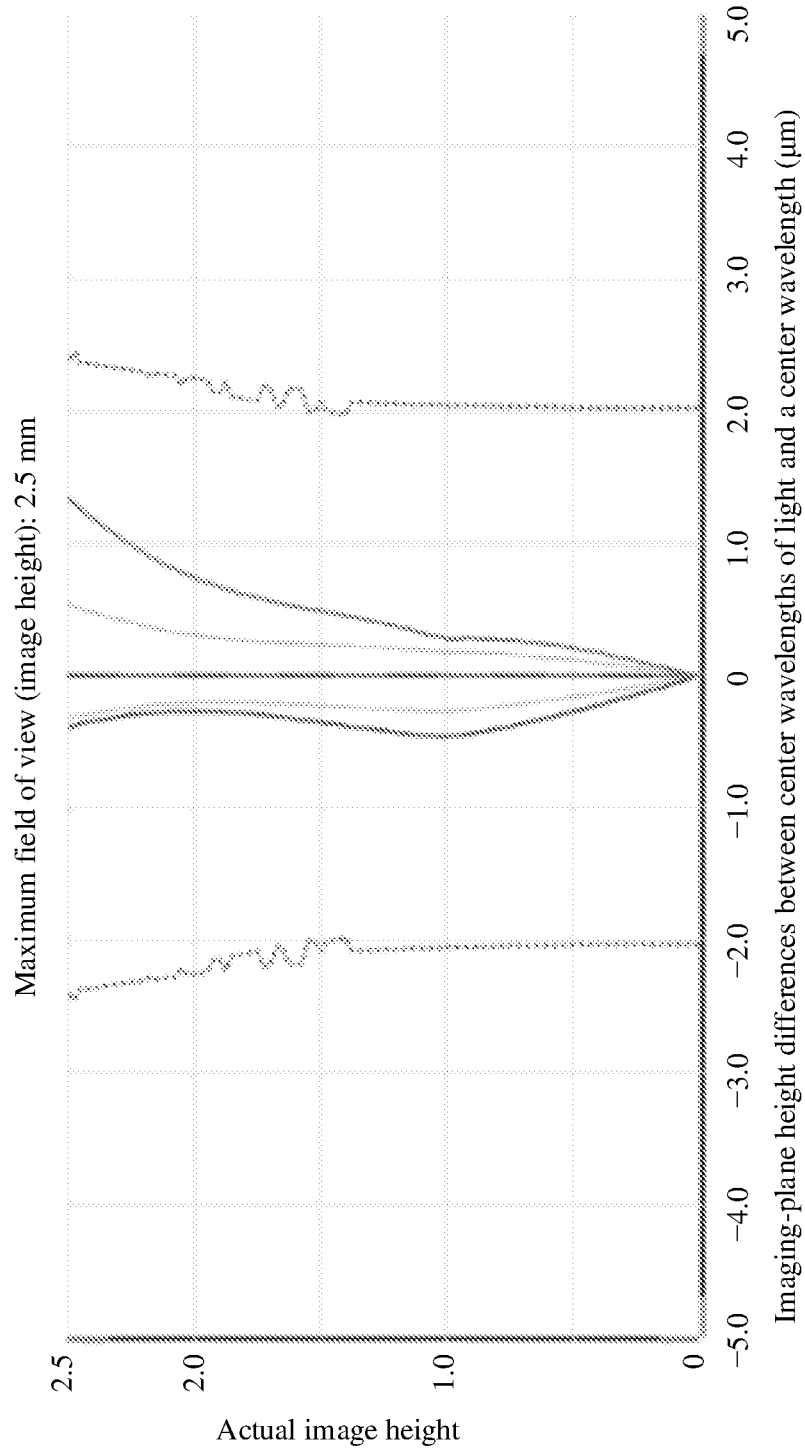
FIG. 16c shows example horizontal chromatic aberration curves of the zoom lens shown in FIG. 13 in an M2 state.

FIG. 16c shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −3.0 to 3.0. It can be seen from FIG. 16c that, horizontal chromatic aberrations of the five curves each fall within the diffraction limit.

Figure 16D:
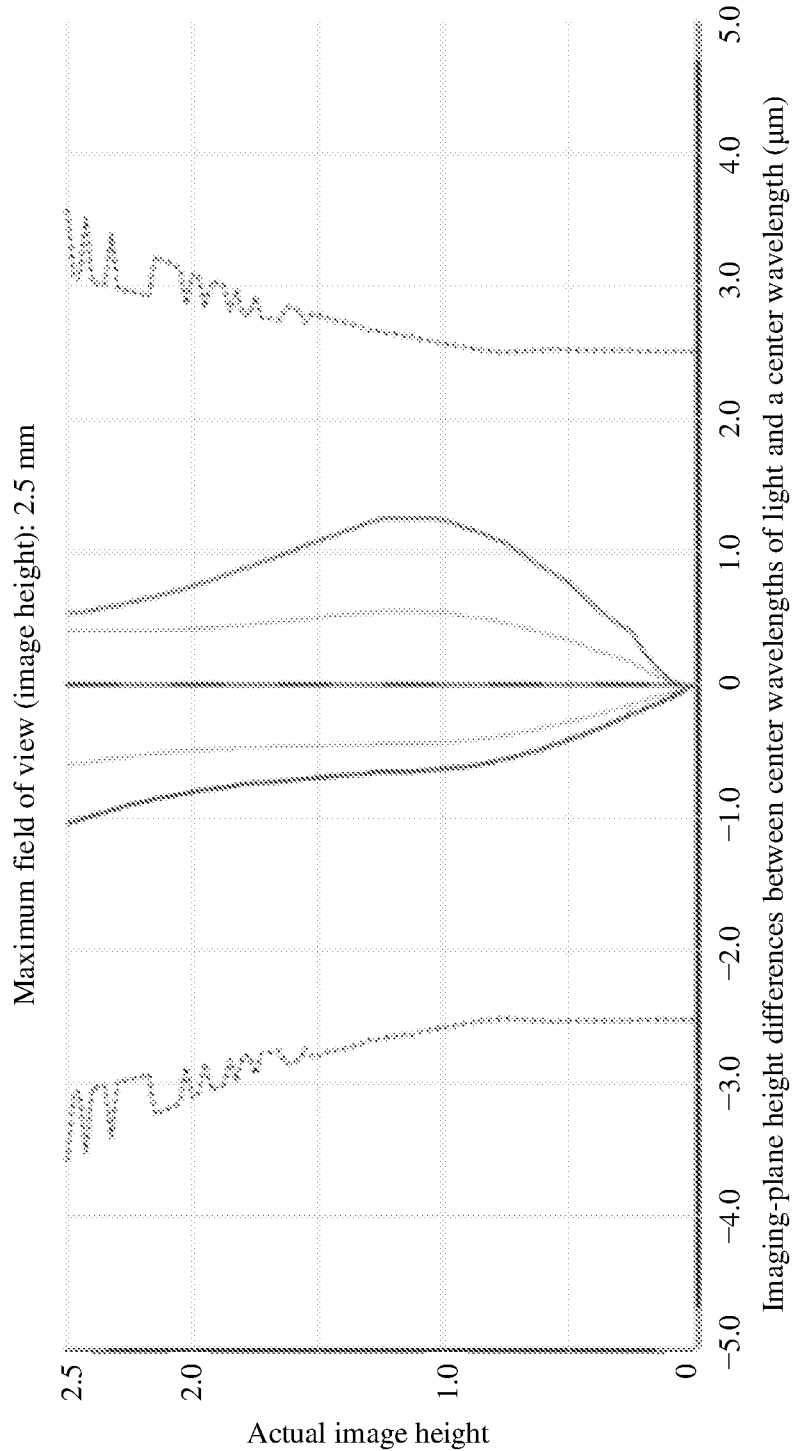
FIG. 16d shows example horizontal chromatic aberration curves of the zoom lens shown in FIG. 13 in a T state.

FIG. 16d shows horizontal chromatic aberration curves of the zoom lens in the T state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 16d that, horizontal chromatic aberrations of the five curves each fall within the diffraction limit.

Figure 17A:
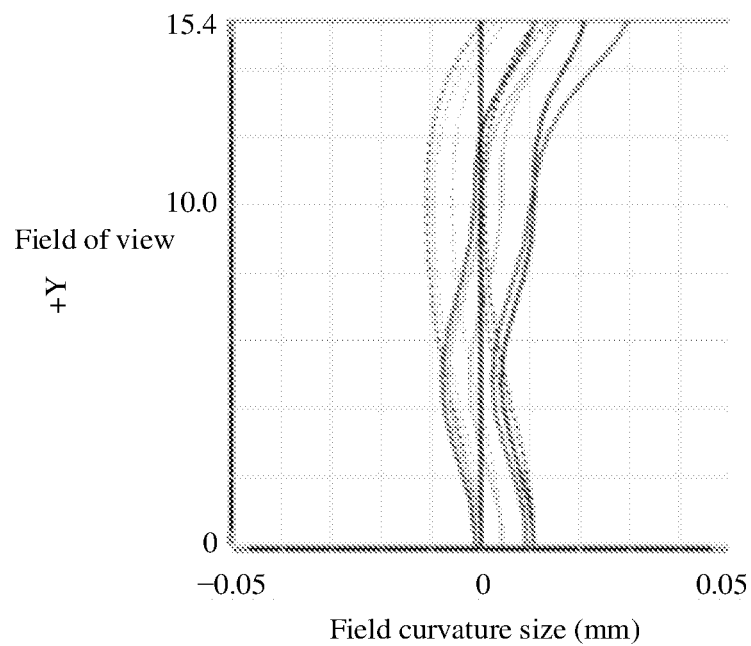
FIG. 17a shows example distortion curves of the zoom lens shown in FIG. 13 in a W state.
Figure 17B:
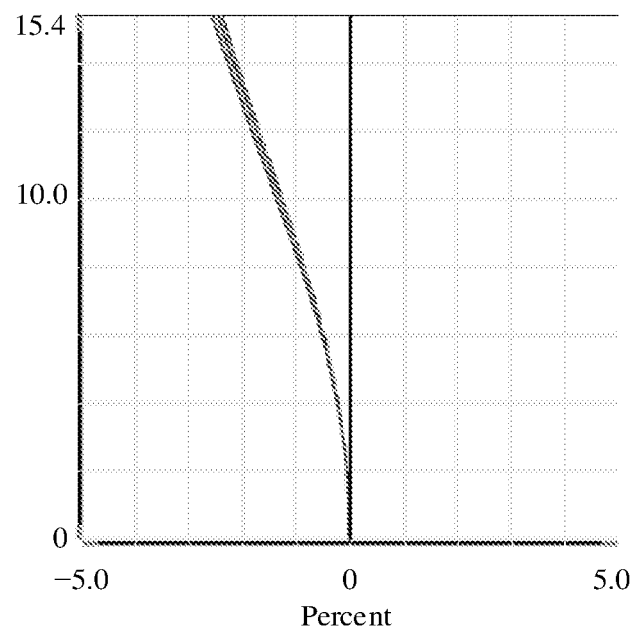
FIG. 17b shows an example optical distortion percentage of the zoom lens shown in FIG. 13 in a W state.

FIG. 17a shows distortion curves of the zoom lens in the W state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 17a that, the difference between the imaging deformation and the ideal shape is very small. FIG. 17b can be obtained by performing percentage calculation on the imaging deformation and the ideal shape of the light in FIG. 17a. It can be seen from FIG. 17b that, the zoom lens controls an optical distortion within a range of less than 3%.

Figure 18A:
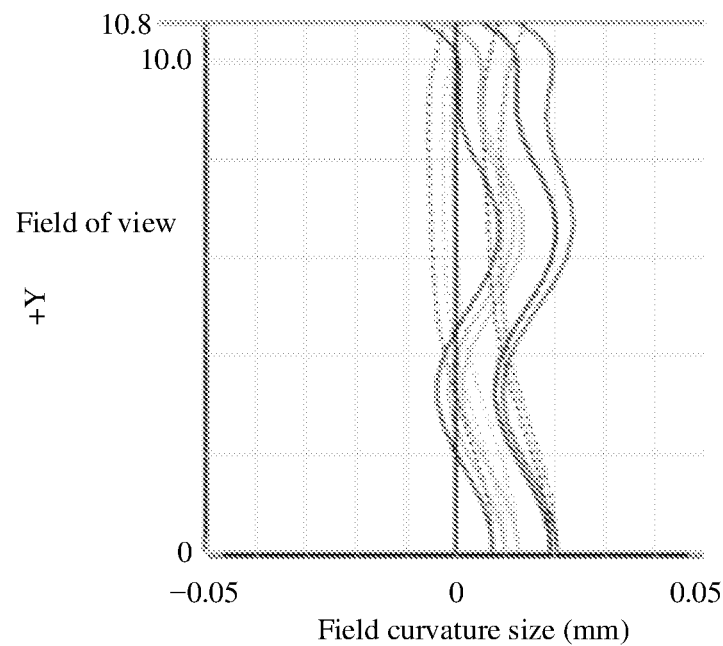
FIG. 18a shows example distortion curves of the zoom lens shown in FIG. 13 in an M1 state.
Figure 18B:
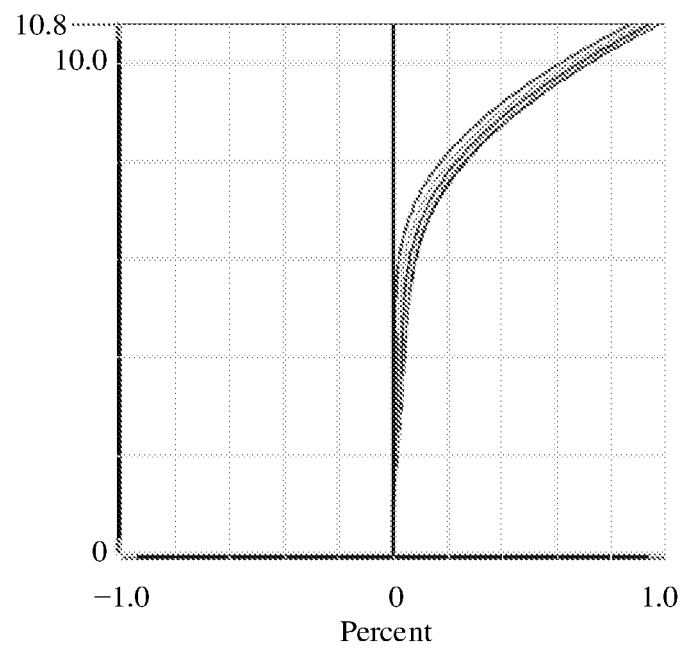
FIG. 18b shows an example optical distortion percentage of the zoom lens shown in FIG. 13 in an M1 state.

FIG. 18a shows distortion curves of the zoom lens in the M1 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 18a that, the difference between the imaging deformation and the ideal shape is very small. FIG. 18b can be obtained by performing percentage calculation on the imaging deformation and the ideal shape of the light in FIG. 18a. It can be seen from FIG. 18b that, the zoom lens controls an optical distortion within a range of less than 3%.

Figure 19A:
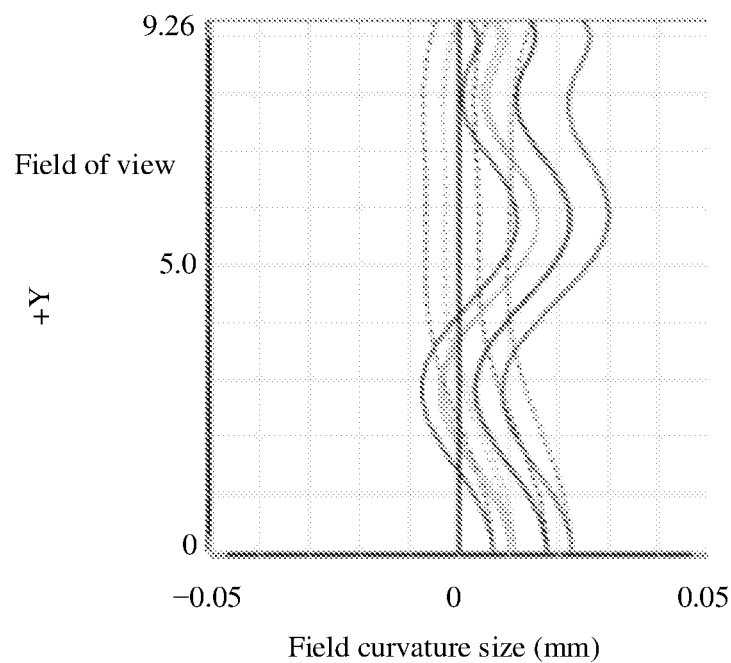
FIG. 19a shows example distortion curves of the zoom lens shown in FIG. 13 in an M2 state.
Figure 19B:
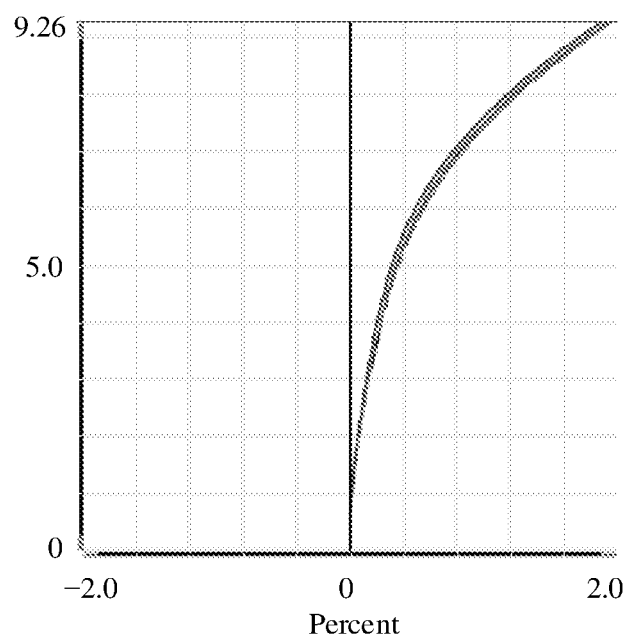
FIG. 19b shows an example optical distortion percentage of the zoom lens shown in FIG. 13 in an M2 state.

FIG. 19a shows distortion curves of the zoom lens in the M2 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 19a that, the difference between the imaging deformation and the ideal shape is very small. FIG. 19b can be obtained by performing percentage calculation on the imaging deformation and the ideal shape of the light in FIG. 19a. It can be seen from FIG. 19b that, the zoom lens controls an optical distortion within a range of less than 3%.

Figure 20A:
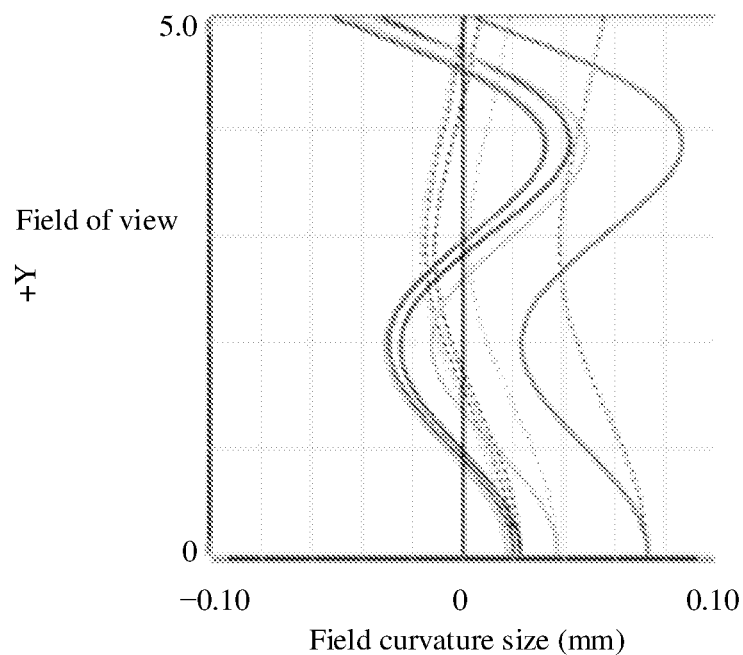
FIG. 20a shows example distortion curves of the zoom lens shown in FIG. 13 in a T state.
Figure 20B:
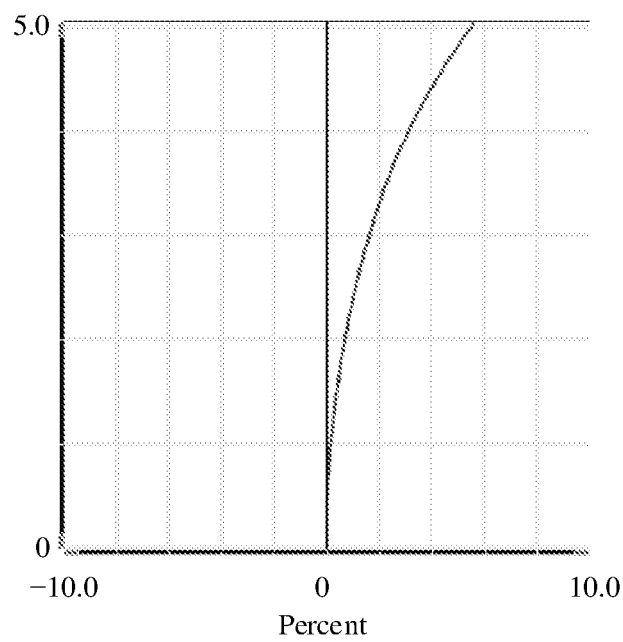
FIG. 20b shows an example optical distortion percentage of the zoom lens shown in FIG. 13 in a T state.

FIG. 20a shows distortion curves of the zoom lens in the T state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 20a that, the difference between the imaging deformation and the ideal shape is very small. FIG. 20b can be obtained by performing percentage calculation on the imaging deformation and the ideal shape of the light in FIG. 20a. It can be seen from FIG. 20b that, the zoom lens controls an optical distortion within a range of less than 3%.

Figure 21:
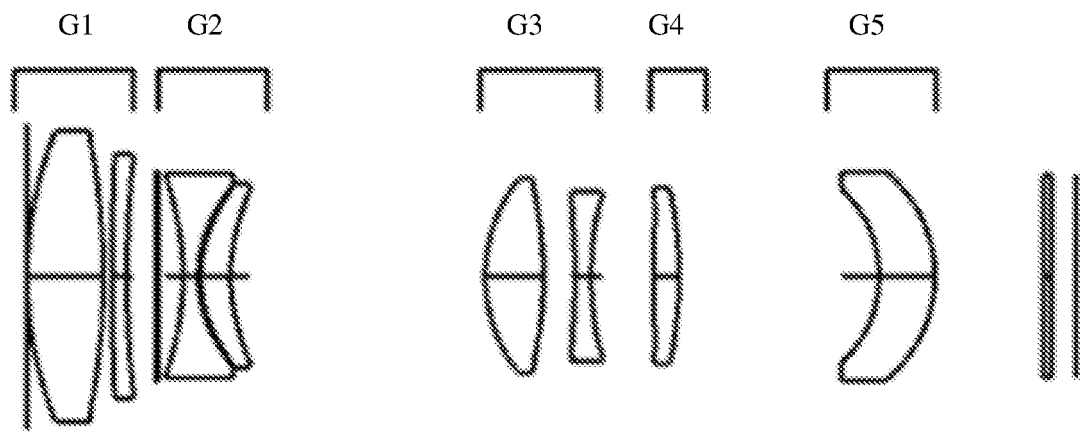
FIG. 21 shows an example third specific zoom lens.

FIG. 21 shows a third specific zoom lens. Starting from an object side, sequentially, lens groups meet the following: a ratio of a focal length f1 of a first lens group G1 with a positive focal power to an effective focal length ft of the zoom lens at a telephoto end is $|f1/ft|=0.61$; a ratio of a focal length f2 of a second lens group G2 with a negative focal power to the effective focal length ft of the zoom lens at the telephoto end is $|f2/ft|=0.20$; a ratio of a focal length f3 of a third lens group G3 with a positive focal power to the effective focal length ft of the zoom lens at the telephoto end is $|f3/ft|=0.31$; a ratio of a focal length f4 of a fourth lens group G4 with a positive focal power to the effective focal length ft of the zoom lens at the telephoto end is $|f4/ft|=0.66$; and a ratio of a focal length f5 of a fifth lens group G5 with a positive focal power to the effective focal length ft of the zoom lens at the telephoto end is $|f5/ft|=1.83$.

Still referring to FIG. 13, the zoom lens includes 8 lenses with a focal power, and the 8 lenses include 14 aspheric surfaces. The aspheric surface is a surface type of a lens surface. The first lens group G1 includes 2 lenses, and the 2 lenses respectively have a positive focal power and a negative focal power along a direction from the object side to an image side. The second lens group G2 includes 2 lenses, and the 2 lenses respectively have a negative focal power and a positive focal power along the direction from the object side to the image side. The third lens group G3 includes 2 lenses, and the 2 lenses respectively have a positive focal power and a negative focal power along the direction from the object side to the image side. The fourth lens group G4 includes 1 lens with a positive focal power. The fifth lens group G5 includes 1 lens with a positive focal power. The first lens group G1 and the third lens group G3 each include at least one lens with a negative focal power. A maximum clear aperture of the lenses in the first lens group G1, the second lens group G2, the third lens group G3, the fourth lens group G4, and the fifth lens group G5 is 7.2 mm. Table 3a lists a curvature, a thickness, a refractive index, and an Abbe coefficient of each lens in the zoom lens in a wide-angle state. Table 3b lists an aspheric coefficient of each lens.

TABLE 3a

| | R | Thickness | | nd | | vd | |
|---|---|---|---|---|---|---|---|
| R1 | 9.47 | d1 | 1.87 | n1 | 1.50 | v1 | 81.6 |
| R2 | −16.92 | a1 | 0.21 | | | | |
| R3 | 68.88 | d2 | 0.36 | n2 | 1.92 | v2 | 18.9 |

TABLE 3a-continued

| | R | Thickness | | nd | | vd | |
|---|---|---|---|---|---|---|---|
| R4 | 26.65 | a2 | 1.37 | | | | |
| R5 | −6.86 | d3 | 0.36 | n3 | 1.54 | v3 | 56.0 |
| R6 | 3.06 | a3 | 0.07 | | | | |
| R7 | 3.05 | d4 | 0.72 | n4 | 1.67 | v4 | 19.2 |
| R8 | 4.47 | a4 | 6.19 | | | | |
| R9 | 3.84 | d5 | 1.42 | n5 | 1.54 | v5 | 56.0 |
| R10 | −8.29 | a5 | 0.76 | | | | |
| R11 | −13.94 | d6 | 0.40 | n6 | 1.66 | v6 | 20.4 |
| R12 | 10.17 | a6 | 1.52 | | | | |
| R13 | 44.07 | d7 | 0.61 | n7 | 1.54 | v7 | 56.0 |
| R14 | −12.29 | a7 | 4.86 | | | | |
| R15 | −3.19 | d8 | 1.36 | n8 | 1.67 | v8 | 19.2 |
| R16 | −3.41 | a8 | 2.63 | | | | |

TABLE 3b

| | | Aspheric coefficient | | | | | |
|---|---|---|---|---|---|---|---|
| | Type | A2 | A3 | A4 | A5 | A6 | A7 |
| R1 | Even aspheric surface | −2.09E−05 | −1.57E−05 | 3.82E−06 | −5.46E−07 | 3.50E−08 | −9.02E−10 |
| R2 | Even aspheric surface | 2.08E−04 | 7.05E−06 | −1.91E−06 | 9.59E−08 | 6.88E−10 | −2.00E−10 |
| R5 | Even aspheric surface | 6.20E−04 | 1.72E−04 | −2.59E−05 | −5.95E−07 | 5.34E−07 | −3.61E−08 |
| R6 | Even aspheric surface | −2.79E−03 | −3.07E−04 | −5.20E−05 | −6.71E−08 | −1.96E−07 | 5.50E−08 |
| R7 | Even aspheric surface | −3.84E−03 | −4.49E−04 | −3.81E−05 | 4.28E−07 | −7.56E−07 | −4.32E−08 |
| R8 | Even aspheric surface | −3.15E−03 | 1.02E−05 | −3.64E−05 | 3.76E−06 | −1.00E−06 | −3.53E−08 |
| R9 | Even aspheric surface | −1.12E−03 | −1.86E−06 | −1.04E−06 | 1.81E−07 | 3.05E−08 | −9.33E−09 |
| R10 | Even aspheric surface | 2.42E−03 | −4.19E−05 | 9.88E−06 | −1.11E−06 | −3.64E−09 | 3.57E−10 |
| R11 | Even aspheric surface | 4.76E−03 | −6.06E−04 | 1.03E−04 | −1.24E−05 | 4.44E−07 | −5.76E−18 |
| R12 | Even aspheric surface | 5.44E−03 | −4.02E−04 | 1.01E−04 | −5.78E−06 | 7.19E−18 | −1.20E−17 |
| R13 | Even aspheric surface | −1.86E−03 | −1.86E−04 | 2.09E−05 | 7.98E−07 | −3.57E−16 | 1.23E−17 |
| R14 | Even aspheric surface | −1.37E−03 | −1.12E−04 | 9.68E−06 | 1.89E−06 | 4.48E−16 | 5.96E−19 |
| R15 | Even aspheric surface | −4.18E−03 | −2.30E−04 | 7.13E−05 | −6.89E−06 | 3.50E−16 | 1.30E−18 |
| R16 | Even aspheric surface | −9.45E−04 | −7.36E−07 | 3.14E−05 | −2.48E−06 | 7.91E−08 | 7.12E−09 |

In the 14 aspheric surfaces of the zoom lens listed in Table 3b, a surface type z of each of the even aspheric surfaces may be defined by, including but not limited to, the following aspheric surface formula:

$$z = \frac{cr^2}{1+\sqrt{1|Kc^2r^2}} + A_2r^4 + A_3r^6 + A_4r^8 + A_5r^{10} + A_6r^{12} + A_7r^{14}$$

z is a vector height of the aspheric surface, r is a radial coordinate of the aspheric surface, c is a spherical curvature of a vertex of the aspheric surface, and K is a conic constant. In this embodiment, a value of K is 0, and A2, A3, A4, A5, A6, and A7 are aspheric coefficients.

Still referring to FIG. 21, for the zoom lens, a ratio of its total track length to its effective focal length at the telephoto end (TTL/ft) is 0.95, and a ratio of its image height to its effective focal length at the telephoto end (IMH/ft) is 0.093. In FIG. 21, the zoom lens further has a stop (not shown in the figure). The stop is located on an object side of the third lens group G3, and certainly may alternatively be arranged in another lens group. For example, the stop is arranged on an object side or an image side of the first lens group G1 or the fifth lens group G5, or is arranged on an object side or an image side of the second lens group G2 or the fourth lens group G4.

As shown in FIG. 21, locations of the first lens group G1, the third lens group G3, and the fifth lens group G5 are fixed relative to an imaging plane, and the second lens group G2 and the fourth lens group G4 move along an optical axis to implement zooming.

Figure 22:
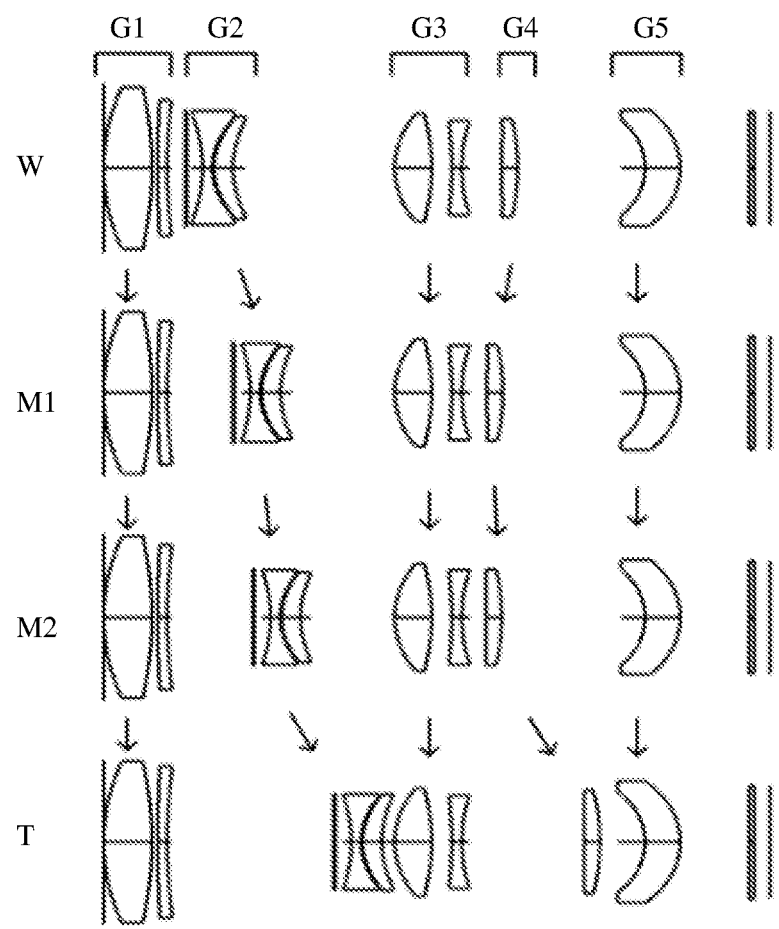
FIG. 22 shows an example zoom process of a zoom lens.

FIG. 22 shows a zoom process of the zoom lens. The zoom lens has four focal length states: W represents a wide-angle end state, M1 represents a first intermediate focal length state, M2 represents a second intermediate focal length state, and T represents a telephoto state. Relative locations of the lens groups corresponding to the W state of the zoom lens are as follows: the second lens group G2 is close to the image side of the first lens group G1, and the fourth lens group G4 is close to an image side of the third lens group G3. Upon zooming from the wide-angle end state W to the first intermediate focal length state M1, the second lens group G2 moves towards the third lens group G3, and the fourth lens group G4 moves towards the third lens group G3. Upon zooming from the first intermediate focal length state M1 to the second intermediate focal length state M2, the second lens group G2 moves towards the third lens group G3, and the fourth lens group G4 moves towards the fifth lens group G5. Upon zooming from the first intermediate focal length state M1 to the telephoto state T, the second lens group G2 moves towards the third lens group G3, and the fourth lens group G4 moves towards the fifth lens group G5.

It can be seen from FIG. 22 that, when the zoom lens is zoomed from the wide-angle state to the telephoto state, the second lens group G2 moves towards an image space (close to the third lens group G3), and a distance between the fourth lens group G4 and the third lens group G3 first decreases and then increases. Upon zooming from the wide-angle state to the telephoto state, a ratio of a movement stroke of the second lens group G2 along the optical axis to the TTL is 0.223, and a ratio of a movement stroke of the fourth lens group G4 along the optical axis to the TTL is 0.147. Correspondingly, reference can be made to Table 3c and Table 3d. Table 3c lists basic parameters of the zoom lens, and Table 3d lists distances between the lens groups in cases that the zoom lens is in the W, M1, M2, and T states.

TABLE 3c

| | W | M1 | M2 | T |
|---|---|---|---|---|
| Focal length F | 9.3 mm | 13 mm | 15.04 mm | 26.8 mm |
| F number | 2.903 | 2.960 | 2.965 | 3.722 |
| Image height IMH | 2.5 mm | 2.5 mm | 2.5 mm | 2.5 mm |
| Half FOV | 15.4° | 10.789° | 9.26° | 5.02° |
| BFL | 3.44 mm | 3.44 mm | 3.44 mm | 3.44 mm |
| TTL | 25.5 mm | 25.5 mm | 25.5 mm | 25.5 mm |
| Designed wavelength | 650 nm, 610 nm, 555 nm, 510 nm, and 470 nm | | | |

TABLE 3d

| | W | M1 | M2 | T |
|---|---|---|---|---|
| a2 | 1.37 mm | 3.19 mm | 3.96 mm | 7.05 mm |
| a4 | 6.19 mm | 4.37 mm | 3.60 mm | 0.50 mm |
| a6 | 1.52 mm | 0.95 mm | 0.90 mm | 4.66 mm |
| a7 | 4.86 mm | 5.43 mm | 5.48 mm | 1.73 mm |

Simulation is performed on the zoom lens shown in FIG. 21. The following describes in detail simulation effects thereof with reference to accompanying drawings.

Figure 23A:
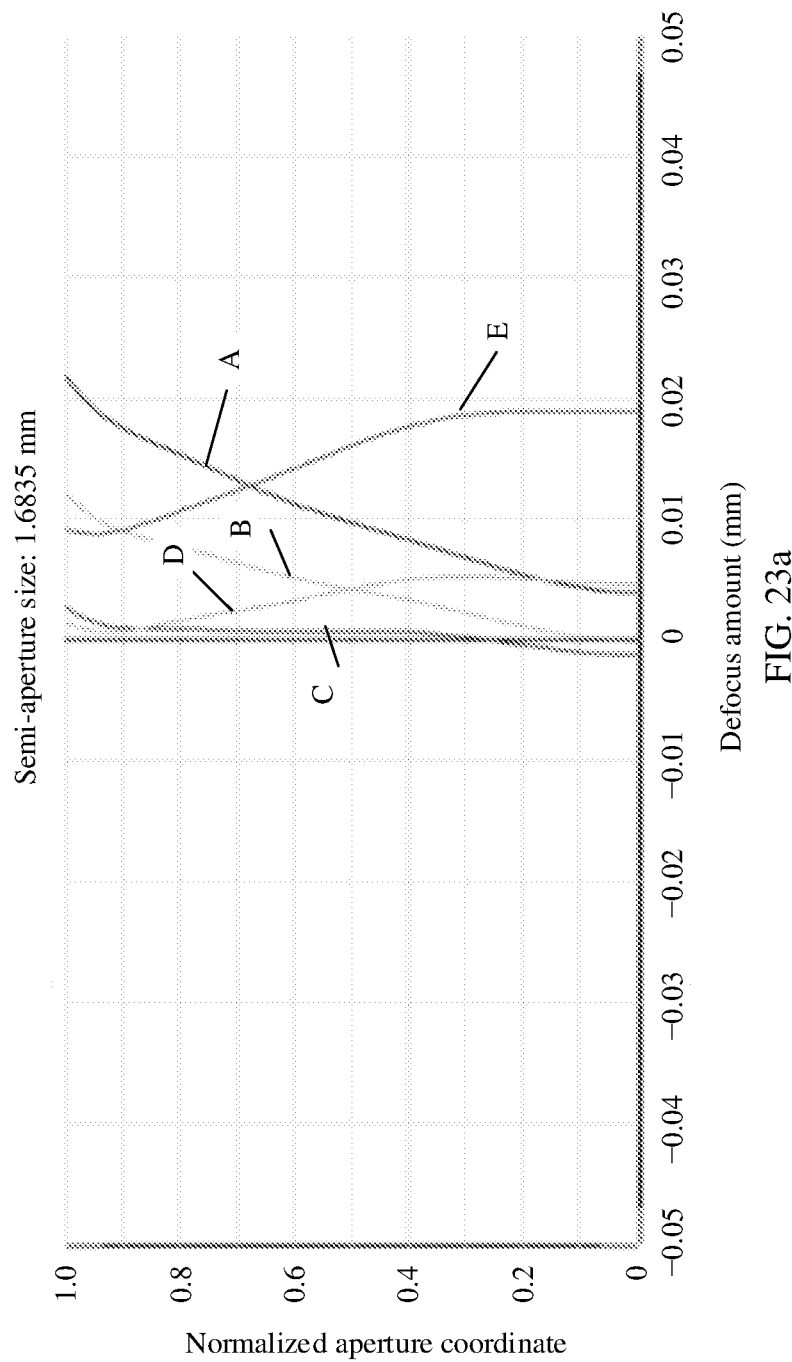
FIG. 23a shows example simulation results, of the zoom lens shown in FIG. 21 in a W state, of depth of focus locations for light with different wavelengths.

FIG. 23a shows simulation results, of the zoom lens shown in FIG. 21 in the W state, of depth of focus locations for light with the wavelengths of 650 nm, 610 nm, 555 nm, 510 nm, and 470 nm. A represents the light with the wavelength of 650 nm, and a defocus amount of the light A ranges from 0.004 mm to 0.022 mm. B represents the light with the wavelength of 610 nm, and a defocus amount of the light B ranges from 0 mm to 0.014 mm. C represents the light with the wavelength of 555 nm, and a defocus amount of the light C ranges from −0.002 mm to 0.004 mm. D represents the light with the wavelength of 510 nm, and a defocus amount of the light D ranges from 0 mm to 0.005 mm. E represents the light with the wavelength of 470 nm, and a defocus amount of the light E ranges from 0.008 mm to 0.018 mm.

Figure 23B:
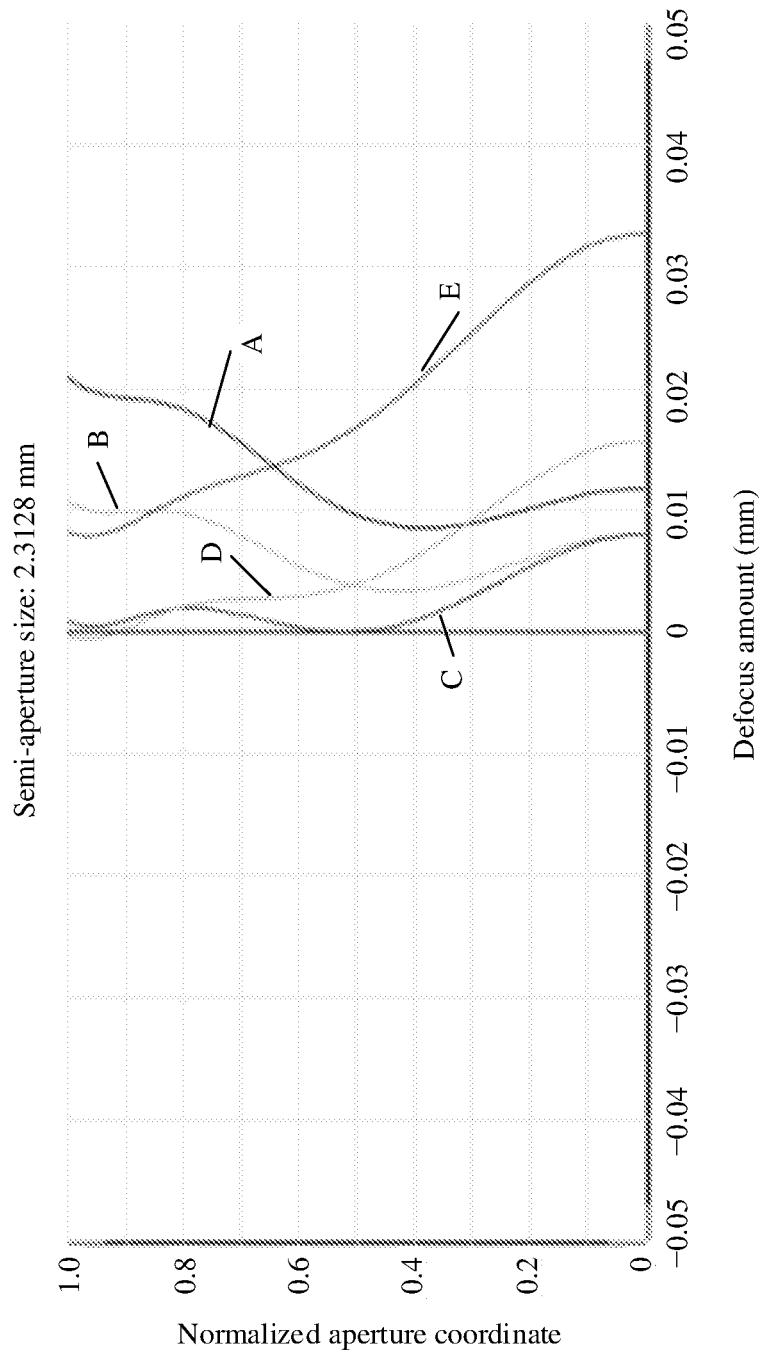
FIG. 23b shows example simulation results, of the zoom lens shown in FIG. 21 in an M1 state, of depth of focus locations for light with different wavelengths.

FIG. 23b shows simulation results, of the zoom lens shown in FIG. 21 in the M1 state, of depth of focus locations for light with the wavelengths of 650 nm, 610 nm, 555 nm, 510 nm, and 470 nm. A represents the light with the wavelength of 650 nm, and a defocus amount of the light A ranges from 0.008 mm to 0.022 mm. B represents the light with the wavelength of 610 nm, and a defocus amount of the light B ranges from 0.004 mm to 0.012 mm. C represents the light with the wavelength of 555 nm, and a defocus amount of the light C ranges from 0 mm to 0.008 mm. D represents the light with the wavelength of 510 nm, and a defocus amount of the light D ranges from −0.002 mm to 0.015 mm. E represents the light with the wavelength of 470 nm, and a defocus amount of the light E ranges from 0.008 mm to 0.032 mm.

Figure 23C:
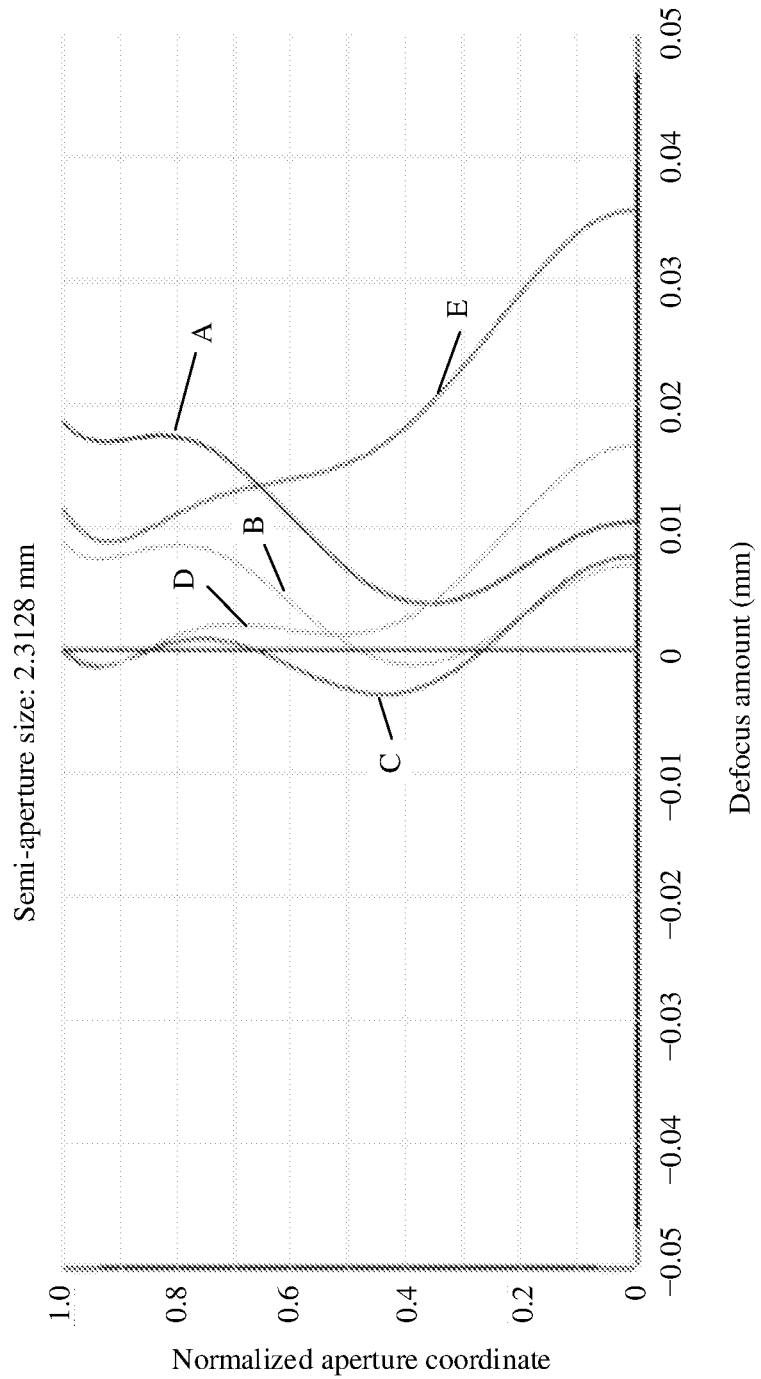
FIG. 23c shows example simulation results, of the zoom lens shown in FIG. 21 in an M2 state, of depth of focus locations for light with different wavelengths.

FIG. 23c shows simulation results, of the zoom lens shown in FIG. 21 in the M2 state, of depth of focus locations for light with the wavelengths of 650 nm, 610 nm, 555 nm, 510 nm, and 470 nm. A represents the light with the wavelength of 650 nm, and a defocus amount of the light A ranges from 0.004 mm to 0.018 mm. B represents the light with the wavelength of 610 nm, and a defocus amount of the light B ranges from −0.02 mm to 0.008 mm. C represents the light with the wavelength of 555 nm, and a defocus amount of the light C ranges from −0.004 mm to 0.008 mm. D represents the light with the wavelength of 510 nm, and a defocus amount of the light D ranges from −0.002 mm to 0.008 mm. E represents the light with the wavelength of 470 nm, and a defocus amount of the light E ranges from 0.008 mm to 0.035 mm.

Figure 23D:
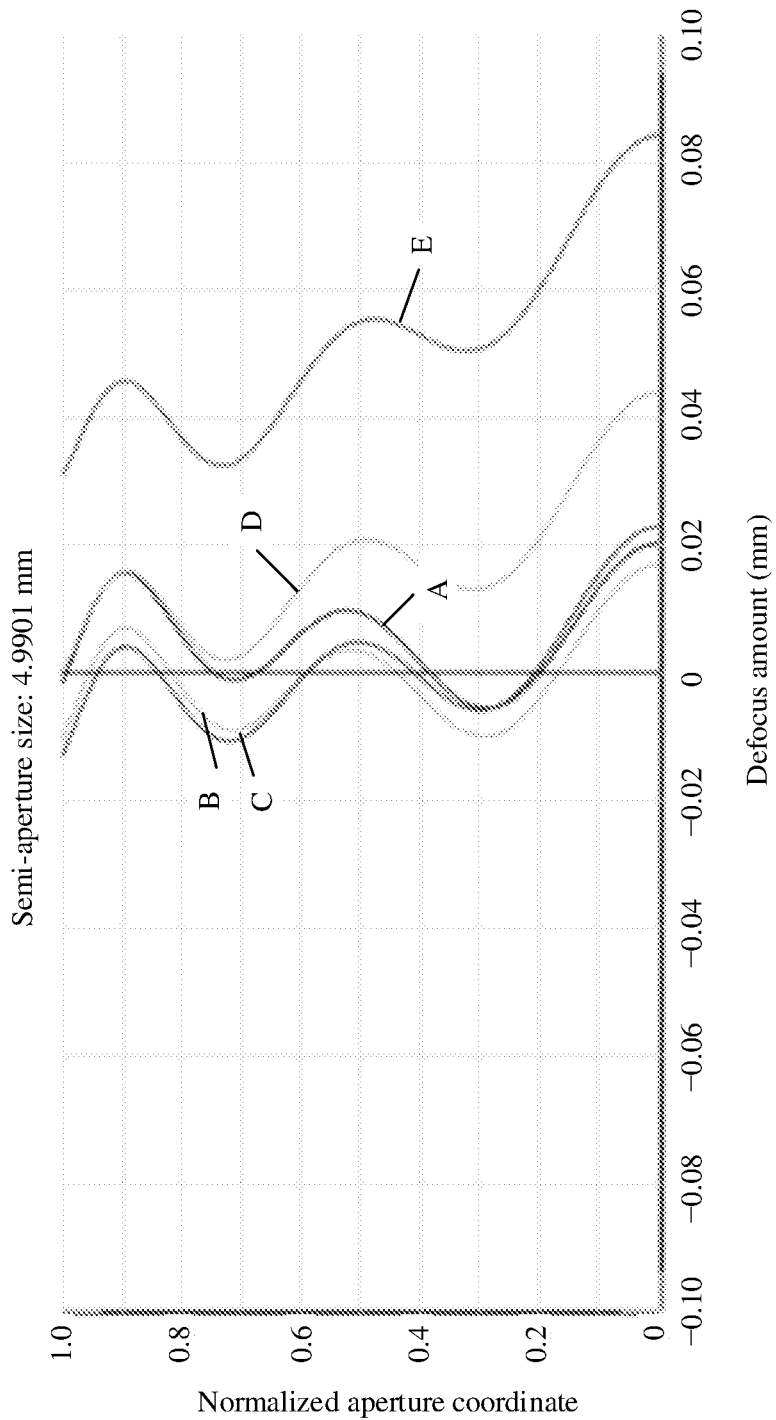
FIG. 23d shows example simulation results, of the zoom lens shown in FIG. 21 in a T state, of depth of focus locations for light with different wavelengths.

FIG. 23d shows simulation results, of the zoom lens shown in FIG. 21 in the telephoto state, of depth of focus locations for light with the wavelengths of 650 nm, 610 nm, 555 nm, 510 nm, and 470 nm. A represents the light with the wavelength of 650 nm, and a defocus amount of the light A ranges from −0.008 mm to 0.018 mm. B represents the light with the wavelength of 610 nm, and a defocus amount of the light B ranges from −0.01 mm to 0.008 mm. C represents the light with the wavelength of 555 nm, and a defocus amount of the light C ranges from −0.012 mm to 0.04 mm. D represents the light with the wavelength of 510 nm, and a defocus amount of the light D ranges from −0.002 mm to 0.045 mm. E represents the light with the wavelength of 470 nm, and a defocus amount of the light E ranges from 0.032 mm to 0.085 mm.

It can be seen from FIG. 23a, FIG. 23b, FIG. 23c, and FIG. 23d that, the defocus amounts of the light with the different wavelengths each fall within a very small range. An axial aberration of the zoom lens in each of the W, M1, M2, and T states is controlled within a very small range.

Figure 24A:
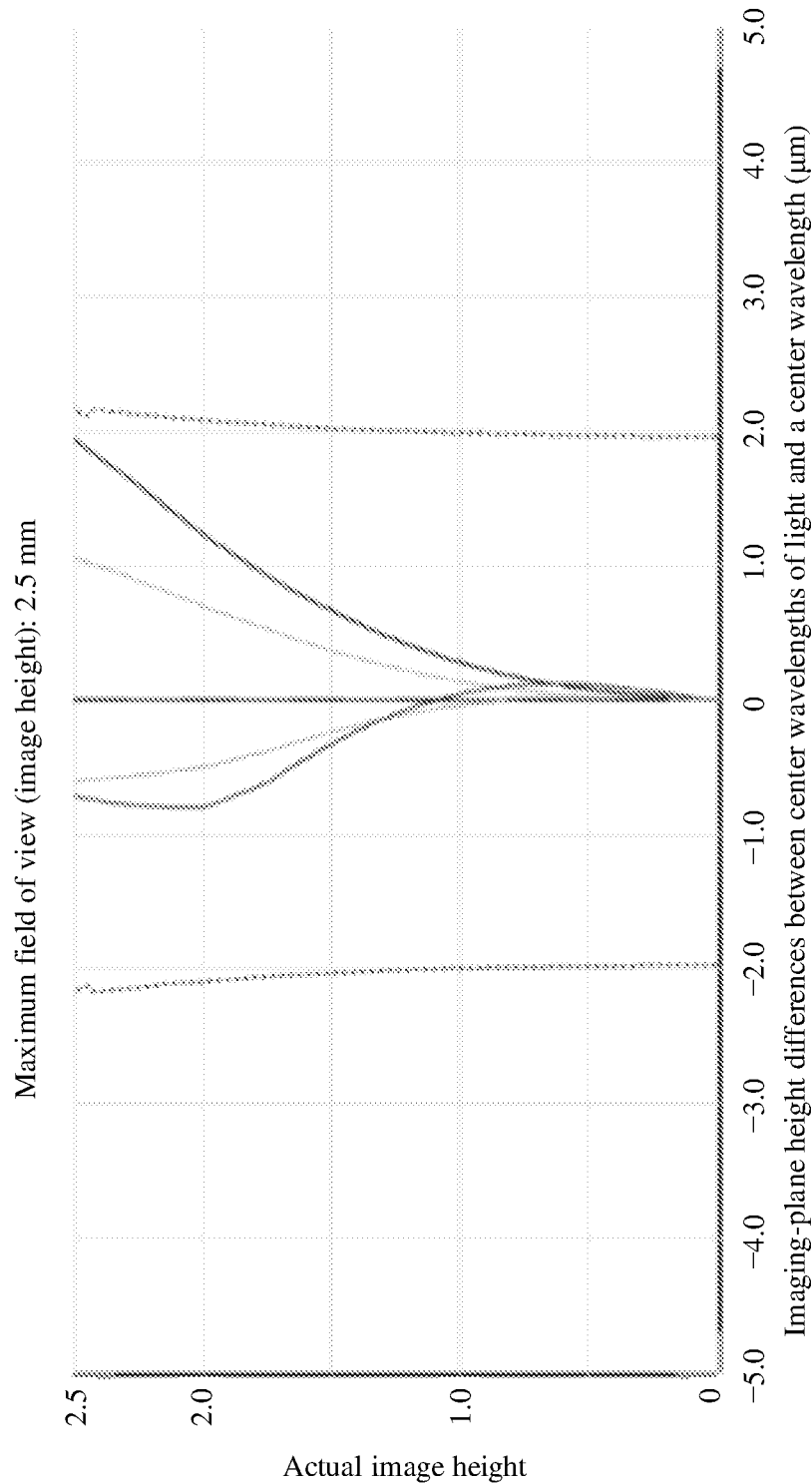
FIG. 24a shows example horizontal chromatic aberration curves of the zoom lens shown in FIG. 21 in a W state.

FIG. 24a shows horizontal chromatic aberration curves of the zoom lens in the W state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 24a that, horizontal chromatic aberrations of the five curves each substantially fall within the diffraction limit.

Figure 24B:
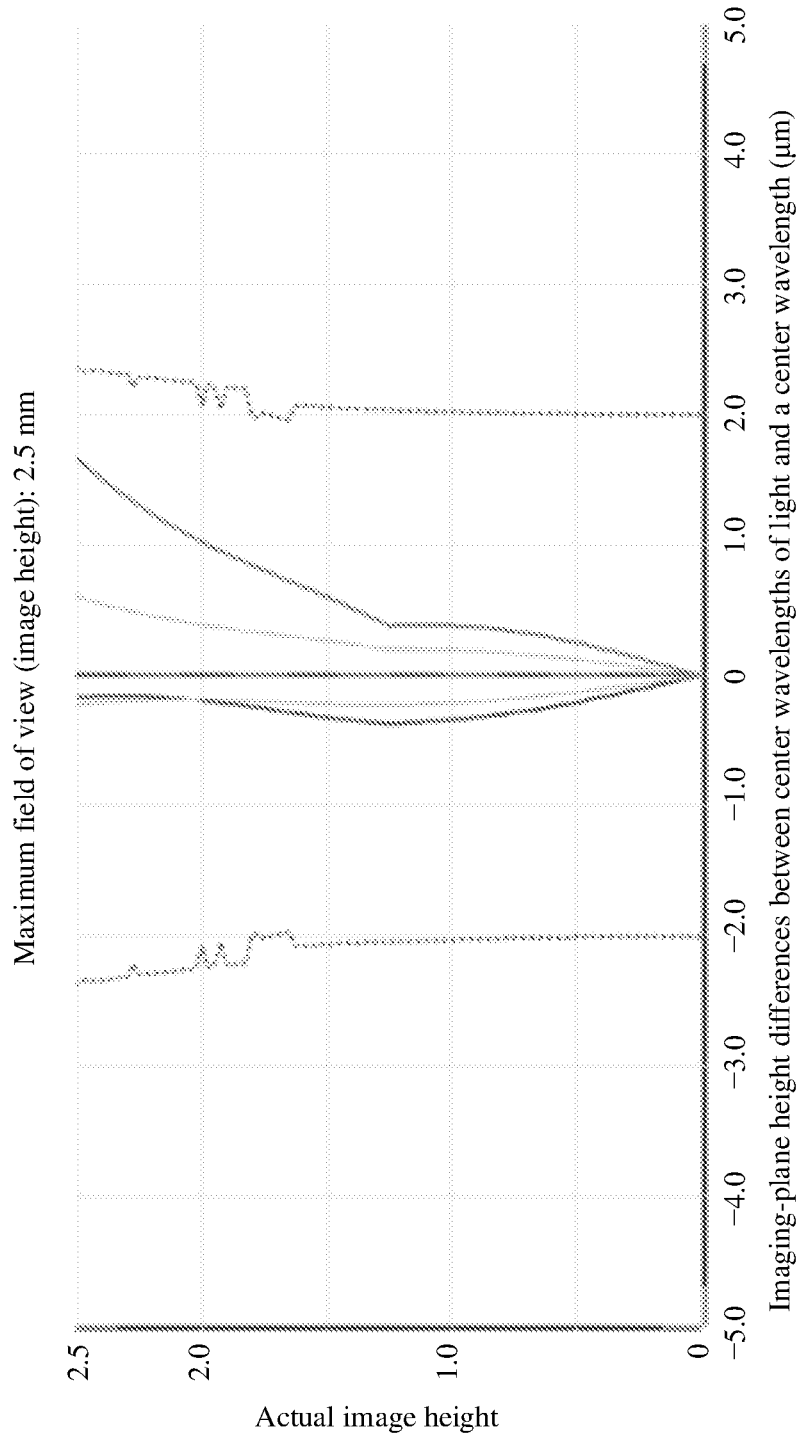
FIG. 24b shows example horizontal chromatic aberration curves of the zoom lens shown in FIG. 21 in an M1 state.

FIG. 24b shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 24b that, horizontal chromatic aberrations of the five curves each fall within the diffraction limit.

Figure 24C:
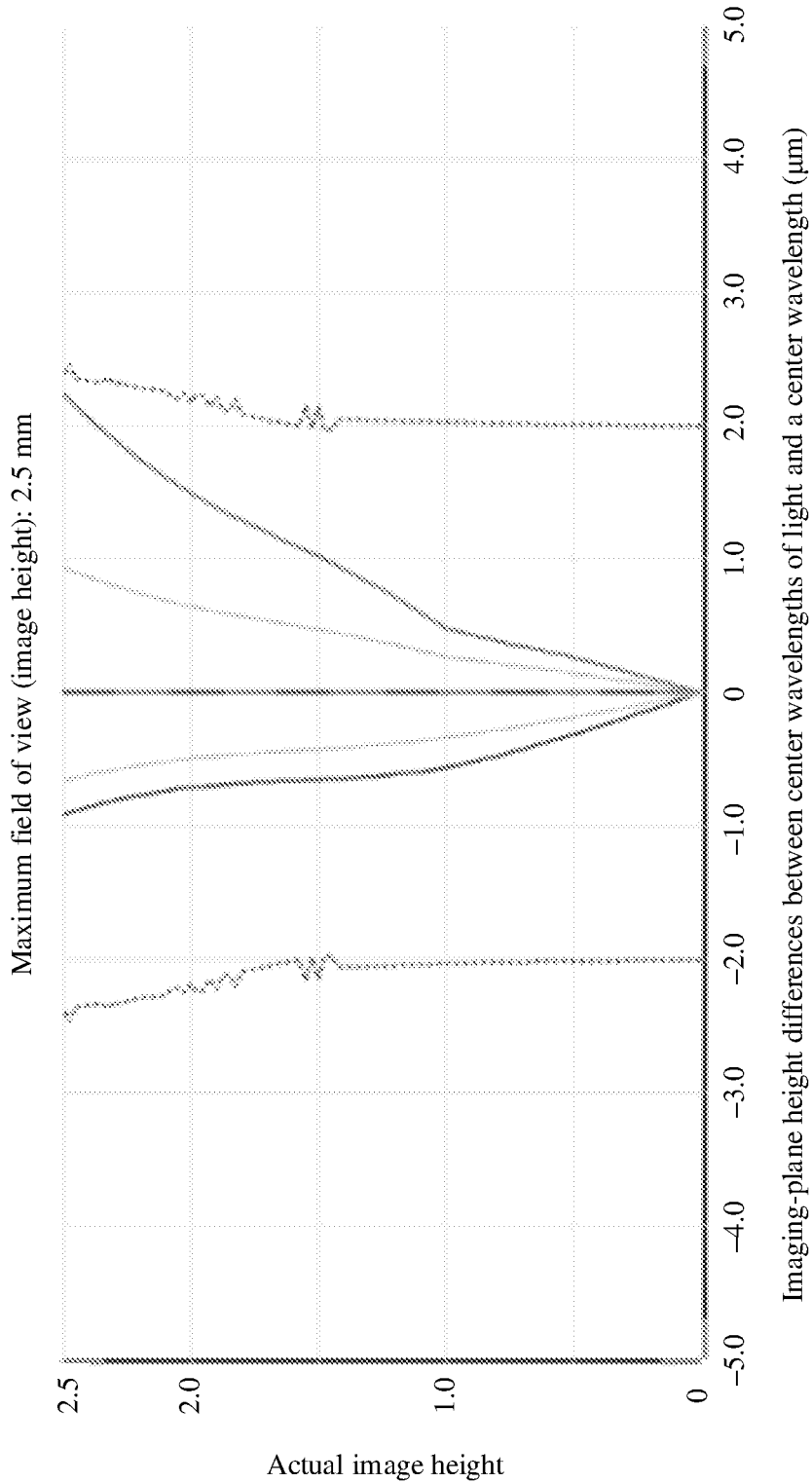
FIG. 24c shows example horizontal chromatic aberration curves of the zoom lens shown in FIG. 21 in an M2 state.

FIG. 24c shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −3.0 to 3.0. It can be seen from FIG. 24c that, horizontal chromatic aberrations of the five curves each fall within the diffraction limit.

Figure 24D:
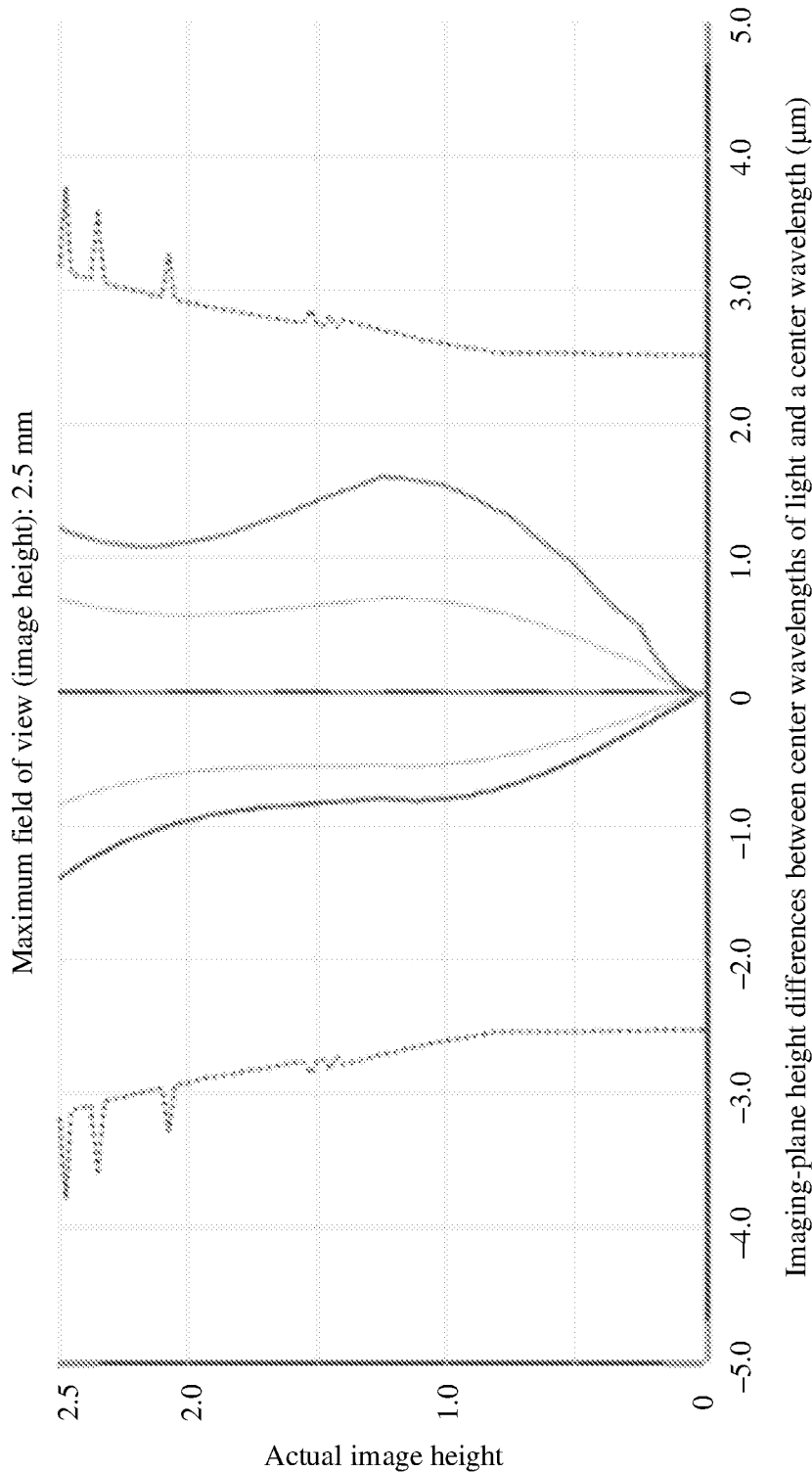
FIG. 24d shows example horizontal chromatic aberration curves of the zoom lens shown in FIG. 21 in a T state.

FIG. 24d shows horizontal chromatic aberration curves of the zoom lens in the T state. Five solid-line curves in the figure are color light with the wavelengths of 650 nm, 610 nm, 555 nm, 510 nm, and 470 nm, respectively. Dashed lines indicate that a diffraction limit ranges from −2.5 to 2.5. It can be seen from FIG. 24d that, horizontal chromatic aberrations of the five curves each fall within the diffraction limit.

Figure 25A:
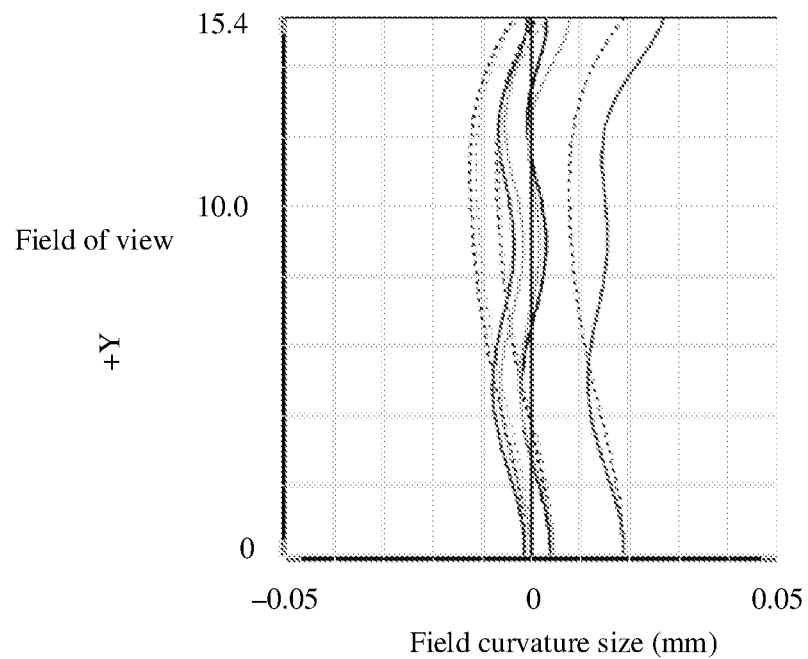
FIG. 25a shows example distortion curves of the zoom lens shown in FIG. 21 in a W state.
Figure 25B:
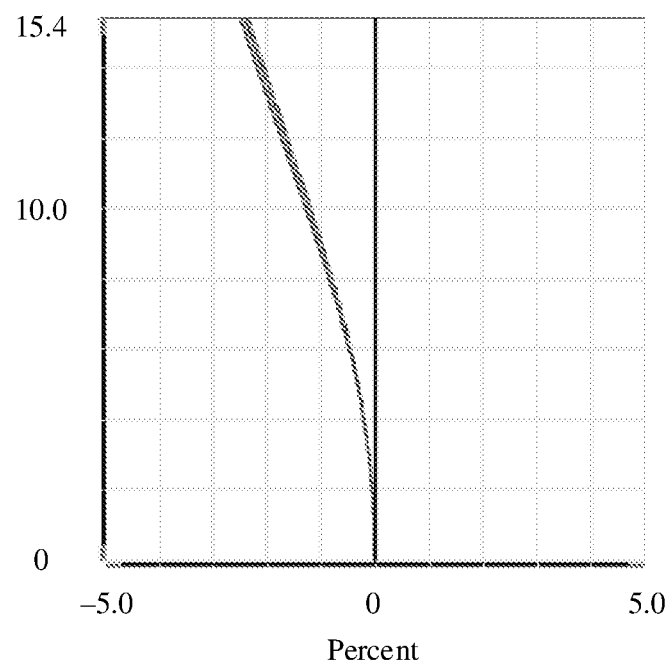
FIG. 25b shows an example optical distortion percentage of the zoom lens shown in FIG. 21 in a W state.

FIG. 25a shows distortion curves of the zoom lens in the W state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 25a that, the difference between the imaging deformation and the ideal shape is very small. FIG. 25b can be obtained by performing percentage calculation on the imaging deformation and the ideal shape of the light in FIG. 25a. It can be seen from FIG. 25b that, the zoom lens controls an optical distortion within a range of less than 3%.

Figure 26A:
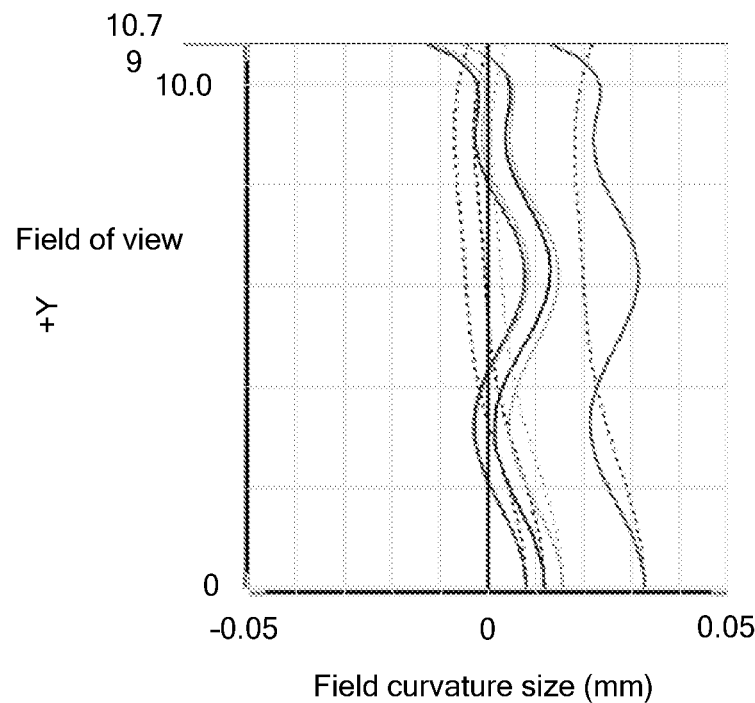
FIG. 26a shows example distortion curves of the zoom lens shown in FIG. 21 in an M1 state.
Figure 26B:
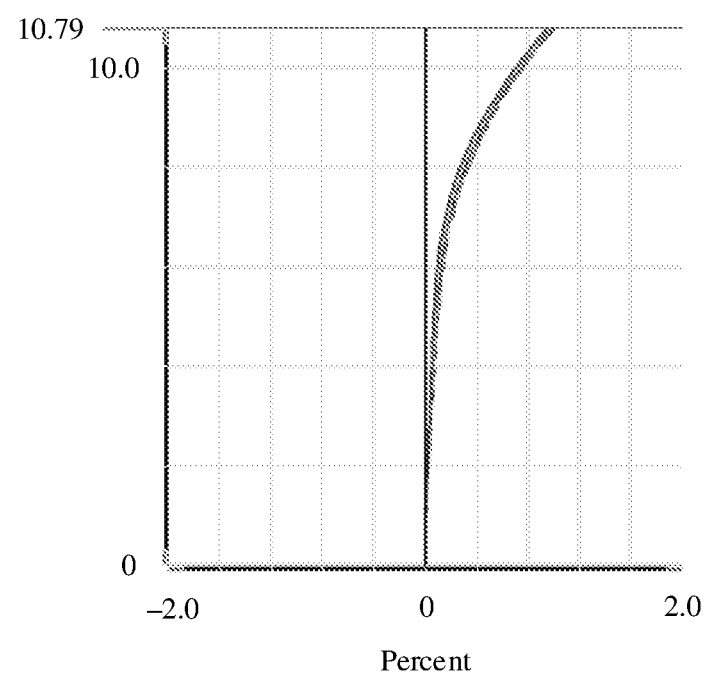
FIG. 26b shows an example optical distortion percentage of the zoom lens shown in FIG. 21 in an M1 state.

FIG. 26a shows distortion curves of the zoom lens in the M1 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 26a that, the difference between the imaging deformation and the ideal shape is very small. FIG. 26b can be obtained by performing percentage calculation on the imaging deformation and the ideal shape of the light in FIG. 26a. It can be seen from FIG. 26b that, the zoom lens controls an optical distortion within a range of less than 2%.

Figure 27A:
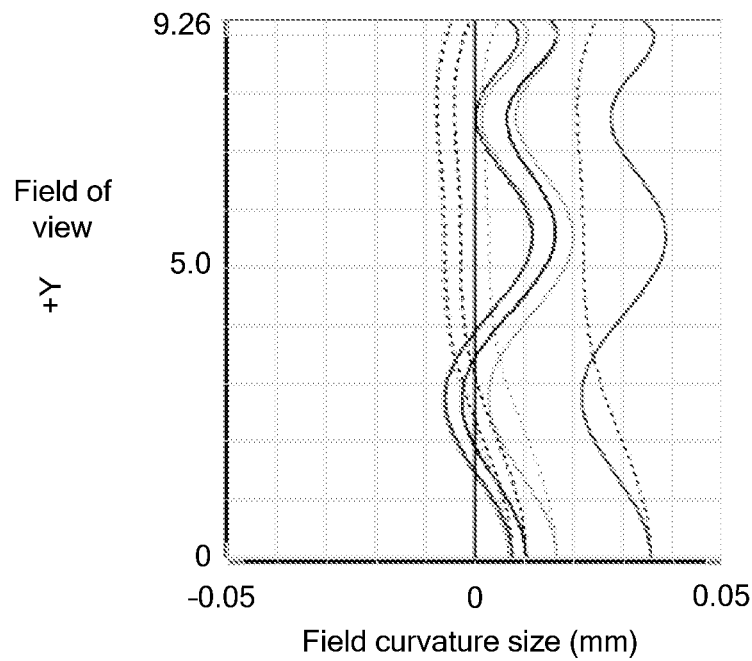
FIG. 27a shows example distortion curves of the zoom lens shown in FIG. 21 in an M2 state.
Figure 27B:
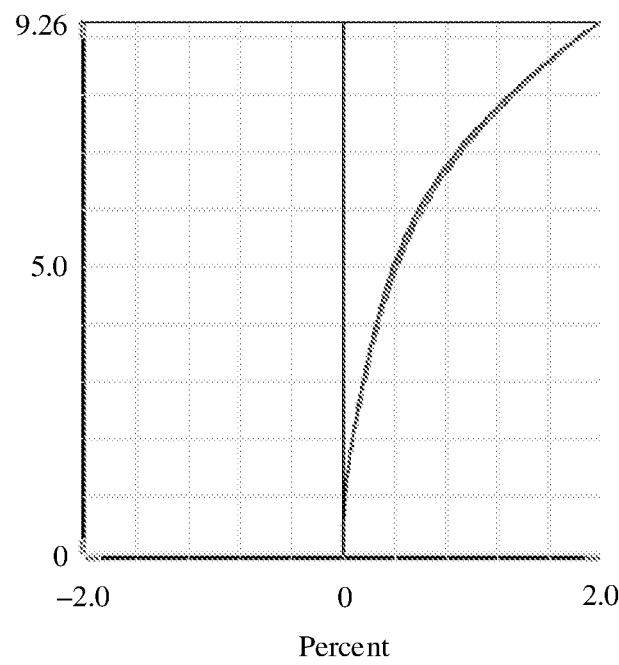
FIG. 27b shows an example optical distortion percentage of the zoom lens shown in FIG. 21 in an M2 state.

FIG. 27a shows distortion curves of the zoom lens in the M2 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 27a that, the difference between the imaging deformation and the ideal shape is very small. FIG. 27b can be obtained by performing percentage calculation on the imaging deformation and the ideal shape of the light in FIG. 27a. It can be seen from FIG. 27b that, the zoom lens controls an optical distortion within a range of less than 2%.

Figure 28A:
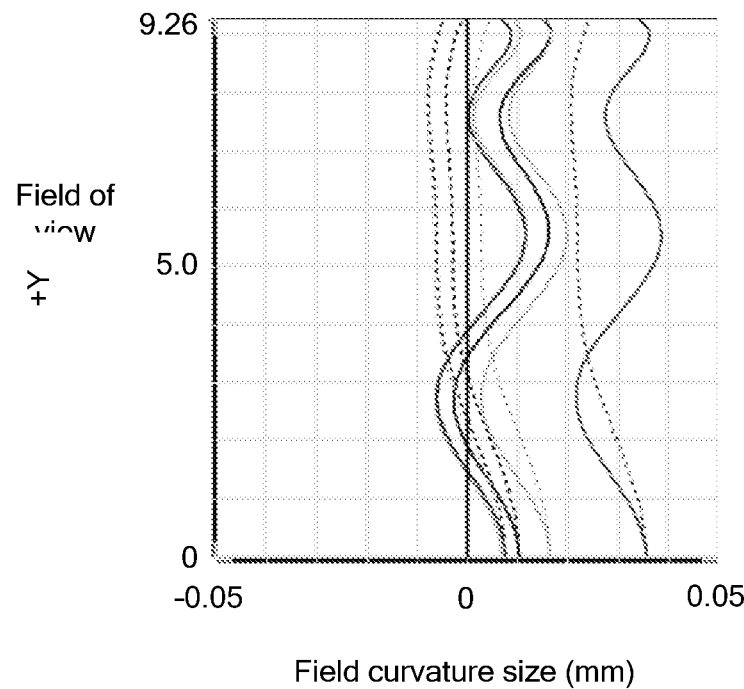
FIG. 28a shows example distortion curves of the zoom lens shown in FIG. 21 in a T state.
Figure 28B:
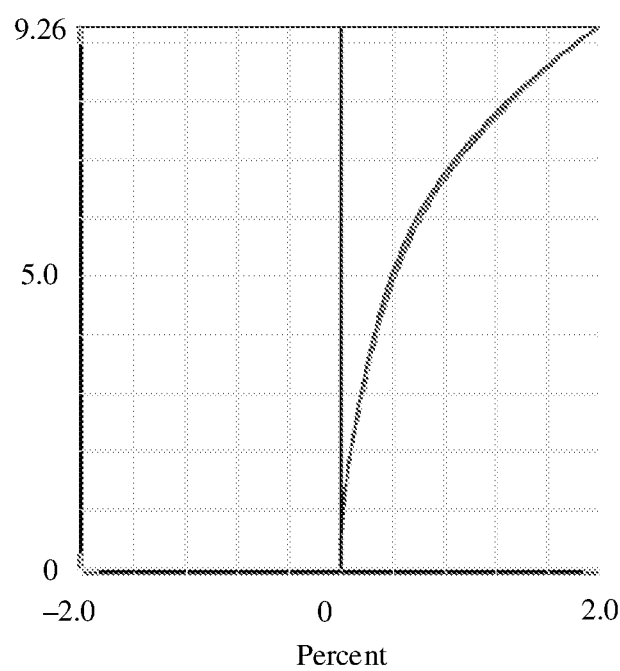
FIG. 28b shows an example optical distortion percentage of the zoom lens shown in FIG. 21 in a T state.

FIG. 28a shows distortion curves of the zoom lens in the T state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 28a that, the difference between the imaging deformation and the ideal shape is very small. FIG. 28b can be obtained by performing percentage calculation on the imaging deformation and the ideal shape of the light in FIG. 28a. It can be seen from FIG. 28b that, the zoom lens controls an optical distortion within a range of less than 2%.

Figure 29:
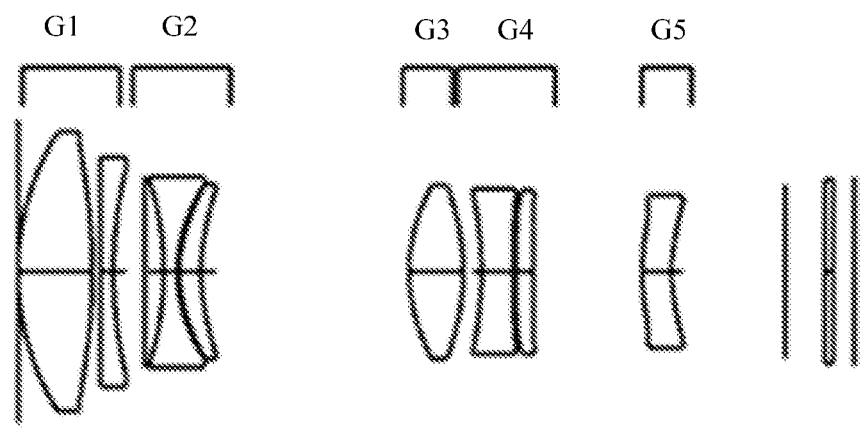
FIG. 29 shows an example fourth specific zoom lens.

FIG. 29 shows a fourth specific zoom lens. Starting from an object side, sequentially, lens groups meet the following: a ratio of a focal length f1 of a first lens group G1 with a positive focal power to an effective focal length ft of the zoom lens at a telephoto end is $|f1/ft|=1.06$; a ratio of a focal length f2 of a second lens group G2 with a negative focal power to the effective focal length ft of the zoom lens at the telephoto end is $|f2/ft|=0.28$; a ratio of a focal length f3 of a third lens group G3 with a positive focal power to the effective focal length ft of the zoom lens at the telephoto end is $|f3/ft|=0.21$; a ratio of a focal length f4 of a fourth lens group G4 with a negative focal power to the effective focal length ft of the zoom lens at the telephoto end is $|f4/ft|=0.60$; and a ratio of a focal length f5 of a fifth lens group G5 with a positive focal power to the effective focal length ft of the zoom lens at the telephoto end is $|f5/ft|=1.91$.

Still referring to FIG. 29, the zoom lens includes 8 lenses with a focal power, and the 8 lenses include 14 aspheric surfaces. The aspheric surface is a surface type of a lens surface. The first lens group G1 includes 2 lenses, and the 2 lenses respectively have a positive focal power and a negative focal power along a direction from the object side to an image side. The second lens group G2 includes 3 lenses, and the 3 lenses respectively have a negative focal power and a positive focal power along the direction from the object side to the image side. The third lens group G3 includes 1 lens with a positive focal power. The fourth lens group G4 includes 2 lenses, and the 2 lenses respectively have a negative focal power and a positive focal power along the direction from the object side to the image side. The fifth lens group G5 includes 1 lens with a positive focal power. The first lens group G1 includes at least one lens with a negative focal power. A maximum clear aperture of the lenses in the first lens group G1, the second lens group G2, the third lens group G3, the fourth lens group G4, and the fifth lens group G5 is 7.4 mm. Table 4a lists a curvature, a thickness, a refractive index, and an Abbe coefficient of each lens in the zoom lens in a wide-angle state. Table 4b lists an aspheric coefficient of each lens.

TABLE 4a

|  | R | Thickness | | nd | | vd | |
|---|---|---|---|---|---|---|---|
| R1 | 6.69 | d1 | 2.05 | n1 | 1.50 | v1 | 81.6 |
| R2 | −13.46 | a1 | 0.21 | | | | |
| R3 | −2454.55 | d2 | 0.36 | n2 | 1.81 | v2 | 33.3 |

TABLE 4a-continued

|  | R | Thickness | | nd | | vd | |
|---|---|---|---|---|---|---|---|
| R4 | 11.05 | a2 | 0 | | | | |
| R5 | −7.46 | d3 | 0.36 | n3 | 1.54 | v3 | 56.0 |
| R6 | 3.52 | a3 | 0.07 | | | | |
| R7 | 3.51 | d4 | 0.59 | n4 | 1.67 | v4 | 19.2 |
| R8 | 5.14 | a4 | 5.72 | | | | |
| R9 | 4.11 | d5 | 1.50 | n5 | 1.54 | v5 | 56.0 |
| R10 | −5.36 | a5 | 0.5 | | | | |
| R11 | −7.90 | d6 | 0.87 | n6 | 1.67 | v6 | 19.2 |
| R12 | 121.20 | a6 | 0.07 | | | | |
| R13 | 64.59 | d7 | 0.47 | n7 | 1.54 | v7 | 56.0 |
| R14 | −178.14 | a7 | 3.01 | | | | |
| R15 | 6.35 | d8 | 0.81 | n8 | 1.54 | v8 | 56.0 |
| R16 | 4.70 | a8 | 3.10 | | | | |

TABLE 4b

| | Aspheric coefficient | | | | | | |
|---|---|---|---|---|---|---|---|
| | Type | A2 | A3 | A4 | A5 | A6 | A7 |
| R1 | Even aspheric surface | −4.88E−05 | −1.35E−05 | 3.70E−06 | −4.99E−07 | 3.18E−08 | −7.77E−10 |
| R2 | Even aspheric surface | 6.18E−04 | 3.41E−06 | −1.95E−06 | 1.64E−07 | −5.01E−09 | 0.00E+00 |
| R5 | Even aspheric surface | −2.35E−04 | 1.94E−04 | −2.83E−05 | 2.07E−06 | −8.63E−08 | 0.00E+00 |
| R6 | Even aspheric surface | −3.58E−03 | −3.20E−04 | 1.70E−05 | 3.88E−06 | 1.92E−07 | 0.00E+00 |
| R7 | Even aspheric surface | −4.21E−03 | −4.33E−04 | 8.10E−07 | −1.71E−06 | 7.34E−07 | 0.00E+00 |
| R8 | Even aspheric surface | −3.00E−03 | 1.25E−05 | −3.83E−05 | −2.63E−06 | 5.01E−07 | 0.00E+00 |
| R9 | Even aspheric surface | −2.45E−03 | −1.92E−05 | −4.94E−06 | 7.14E−08 | 0.00E+00 | 0.00E+00 |
| R10 | Even aspheric surface | 3.07E−03 | −1.10E−04 | 8.64E−06 | −2.70E−07 | 0.00E+00 | 0.00E+00 |
| R11 | Even aspheric surface | 4.67E−03 | −9.64E−04 | 1.16E−04 | −6.59E−06 | 0.00E+00 | 0.00E+00 |
| R12 | Even aspheric surface | 3.80E−03 | −1.92E−04 | 2.85E−05 | −8.97E−06 | 0.00E+00 | 0.00E+00 |
| R13 | Even aspheric surface | 2.13E−03 | 1.34E−03 | −7.88E−05 | −7.03E−06 | 0.00E+00 | 0.00E+00 |
| R14 | Even aspheric surface | 1.55E−03 | 3.12E−04 | 3.88E−05 | −5.61E−06 | 0.00E+00 | 0.00E+00 |
| R15 | Even aspheric surface | −2.19E−03 | −2.02E−03 | 4.35E−05 | −1.06E−05 | 0.00E+00 | 0.00E+00 |
| R16 | Even aspheric surface | −4.49E−05 | −2.17E−03 | 4.82E−05 | 9.20E−06 | 0.00E+00 | 0.00E+00 |

In the 14 aspheric surfaces of the zoom lens listed in Table 4b, a surface type z of each of the even aspheric surfaces may be defined by, including but not limited to, the following aspheric surface formula:

$$z = \frac{cr^2}{1 + \sqrt{1 - |Kc^2r^2|}} + A_2r^4 + A_3r^6 + A_4r^8 + A_5r^{10} + A_6r^{12} + A_7r^{14}$$

z is a vector height of the aspheric surface, r is a radial coordinate of the aspheric surface, c is a spherical curvature of a vertex of the aspheric surface, and K is a conic constant. In this embodiment, a value of K is 0, and A2, A3, A4, A5, A6, and A7 are aspheric coefficients.

Still referring to FIG. 29, for the zoom lens, a ratio of its total track length to its effective focal length at the telephoto end (TTL/ft) is 1.10, and a ratio of its image height to its effective focal length at the telephoto end (IMH/ft) is 0.199. In FIG. 29, the zoom lens further has a stop (not shown in the figure). The stop is located on an object side of the third lens group G3, and certainly may alternatively be arranged in another lens group. For example, the stop is arranged on an object side or an image side of the first lens group G1 or the fifth lens group G5, or is arranged on an object side or an image side of the second lens group G2 or the fourth lens group G4.

As shown in FIG. 29, locations of the first lens group G1, the third lens group G3, and the fifth lens group G5 are fixed relative to an imaging plane, and the second lens group G2 and the fourth lens group G4 move along an optical axis to implement zooming.

Figure 30:
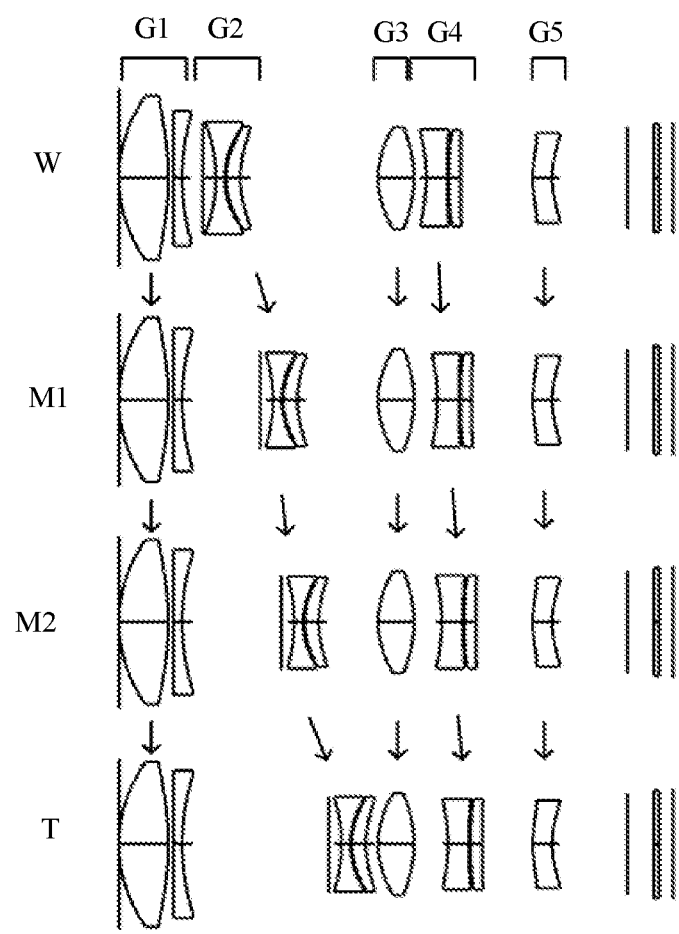
FIG. 30 shows an example zoom process of a zoom lens.

FIG. 30 shows a zoom process of the zoom lens. The zoom lens has four focal length states: W represents a wide-angle end state, M1 represents a first intermediate focal length state, M2 represents a second intermediate focal length state, and T represents a telephoto state. Relative locations of the lens groups corresponding to the W state of the zoom lens are as follows: the second lens group G2 is close to the image side of the first lens group G1, and the fourth lens group G4 is close to an image side of the fifth lens group G5. Upon zooming from the wide-angle end state W to the first intermediate focal length state M1, the second lens group G2 moves towards the third lens group G3, and the fourth lens group G4 moves towards the fifth lens group G5. Upon zooming from the first intermediate focal length state M1 to the second intermediate focal length state M2, the second lens group G2 moves towards the third lens group G3, and the fourth lens group G4 moves towards the fifth lens group G5. Upon zooming from the first intermediate focal length state M1 to the telephoto state T, the second lens group G2 moves towards the third lens group G3, and the fourth lens group G4 moves towards the fifth lens group G5.

It can be seen from FIG. 30 that, when the zoom lens is zoomed from the wide-angle state to the telephoto state, the second lens group G2 moves towards an image space (close to the third lens group G3), and a distance between the fourth lens group G4 and the third lens group G3 increases. Upon zooming from the wide-angle state to the telephoto state, a ratio of a movement stroke of the second lens group G2 along the optical axis to the TTL is 0.23, and a ratio of a movement stroke of the fourth lens group G4 along the optical axis to the TTL is 0.039. Correspondingly, reference can be made to Table 4c and Table 4d. Table 4c lists basic parameters of the zoom lens, and Table 4d lists distances between the lens groups in cases that the zoom lens is in the W, M1, M2, and T states.

TABLE 4c

|  | W | M1 | M2 | T |
|---|---|---|---|---|
| Focal length F | 9.0 mm | 13.0 mm | 15.04 mm | 21.0 mm |
| F number | 2.649 | 2.729 | 2.757 | 2.844 |
| Image height IMH | 2.5 mm | 2.5 mm | 2.5 mm | 2.5 mm |
| Half FOV | 15.87° | 10.72° | 9.20° | 6.51° |
| BFL | 5.03 mm | 5.03 mm | 5.03 mm | 5.03 mm |
| TTL | 23.0 mm | 23.0 mm | 23.0 mm | 23.0 mm |
| Designed wavelength | 650 nm, 610 nm, 555 nm, 510 nm, and 470 nm | | | |

TABLE 4d

|  | W | M1 | M2 | T |
|---|---|---|---|---|
| a2 | 0.00 mm | 3.76 mm | 4.65 mm | 6.60 mm |
| a4 | 5.72 mm | 3.34 mm | 2.46 mm | 0.50 mm |
| a5 | 0.50 mm | 0.97 mm | 1.15 mm | 1.41 mm |
| a7 | 3.01 mm | 2.54 mm | 2.36 mm | 2.10 mm |

Simulation is performed on the zoom lens shown in FIG. 29. The following describes in detail simulation effects thereof with reference to accompanying drawings.

Figure 31A:
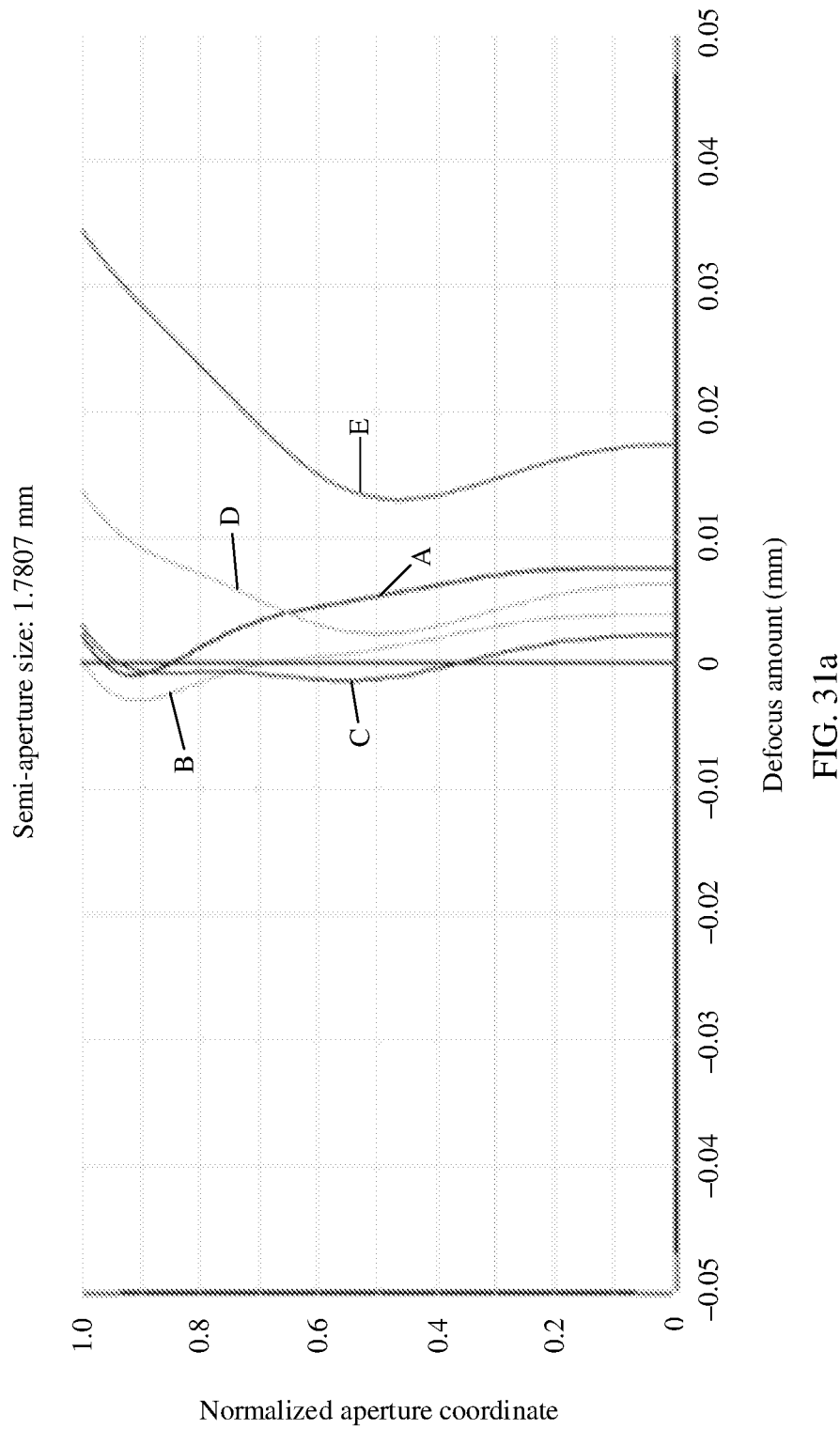
FIG. 31a shows example simulation results, of the zoom lens shown in FIG. 29 in a W state, of depth of focus locations for light with different wavelengths.

FIG. 31a shows simulation results, of the zoom lens shown in FIG. 29 in the W state, of depth of focus locations for light with the wavelengths of 650 nm, 610 nm, 555 nm, 510 nm, and 470 nm. A represents the light with the wavelength of 650 nm, and a defocus amount of the light A ranges from −0.001 mm to 0.008 mm. B represents the light with the wavelength of 610 nm, and a defocus amount of the light B ranges from −0.004 mm to 0.005 mm. C represents the light with the wavelength of 555 nm, and a defocus amount of the light C ranges from −0.002 mm to 0.004 mm. D represents the light with the wavelength of 510 nm, and a defocus amount of the light D ranges from 0.002 mm to 0.015 mm. E represents the light with the wavelength of 470 nm, and a defocus amount of the light E ranges from 0.012 mm to 0.035 mm.

Figure 31B:
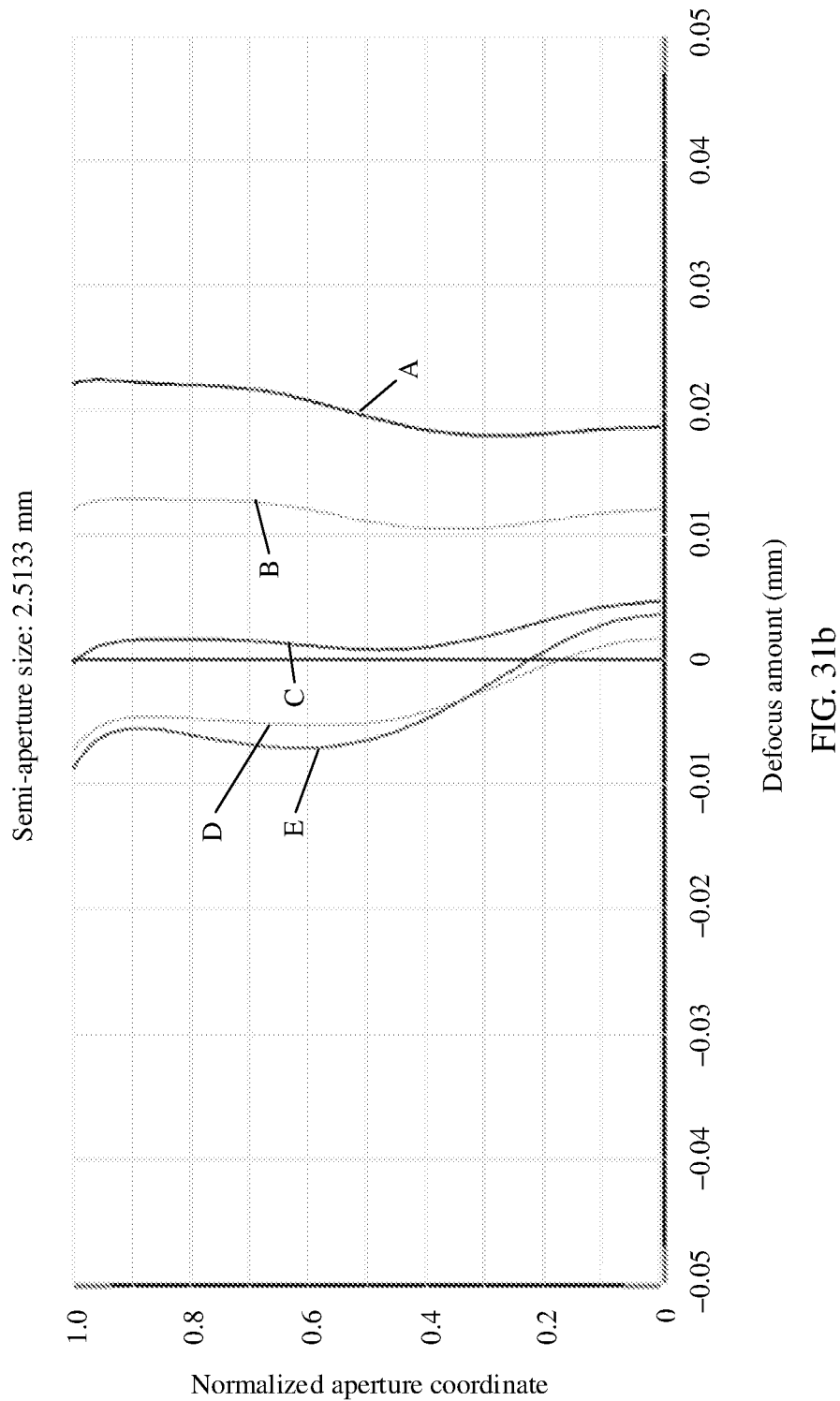
FIG. 31b shows example simulation results, of the zoom lens shown in FIG. 29 in an M1 state, of depth of focus locations for light with different wavelengths.

FIG. 31b shows simulation results, of the zoom lens shown in FIG. 29 in the M1 state, of depth of focus locations for light with the wavelengths of 650 nm, 610 nm, 555 nm, 510 nm, and 470 nm. A represents the light with the wavelength of 650 nm, and a defocus amount of the light A ranges from 0.018 mm to 0.022 mm. B represents the light with the wavelength of 610 nm, and a defocus amount of the light B ranges from 0.01 mm to 0.014 mm. C represents the light with the wavelength of 555 nm, and a defocus amount of the light C ranges from −0.001 mm to 0.006 mm. D represents the light with the wavelength of 510 nm, and a defocus amount of the light D ranges from −0.006 mm to 0.002 mm. E represents the light with the wavelength of 470 nm, and a defocus amount of the light E ranges from −0.008 mm to 0.004 mm.

Figure 31C:
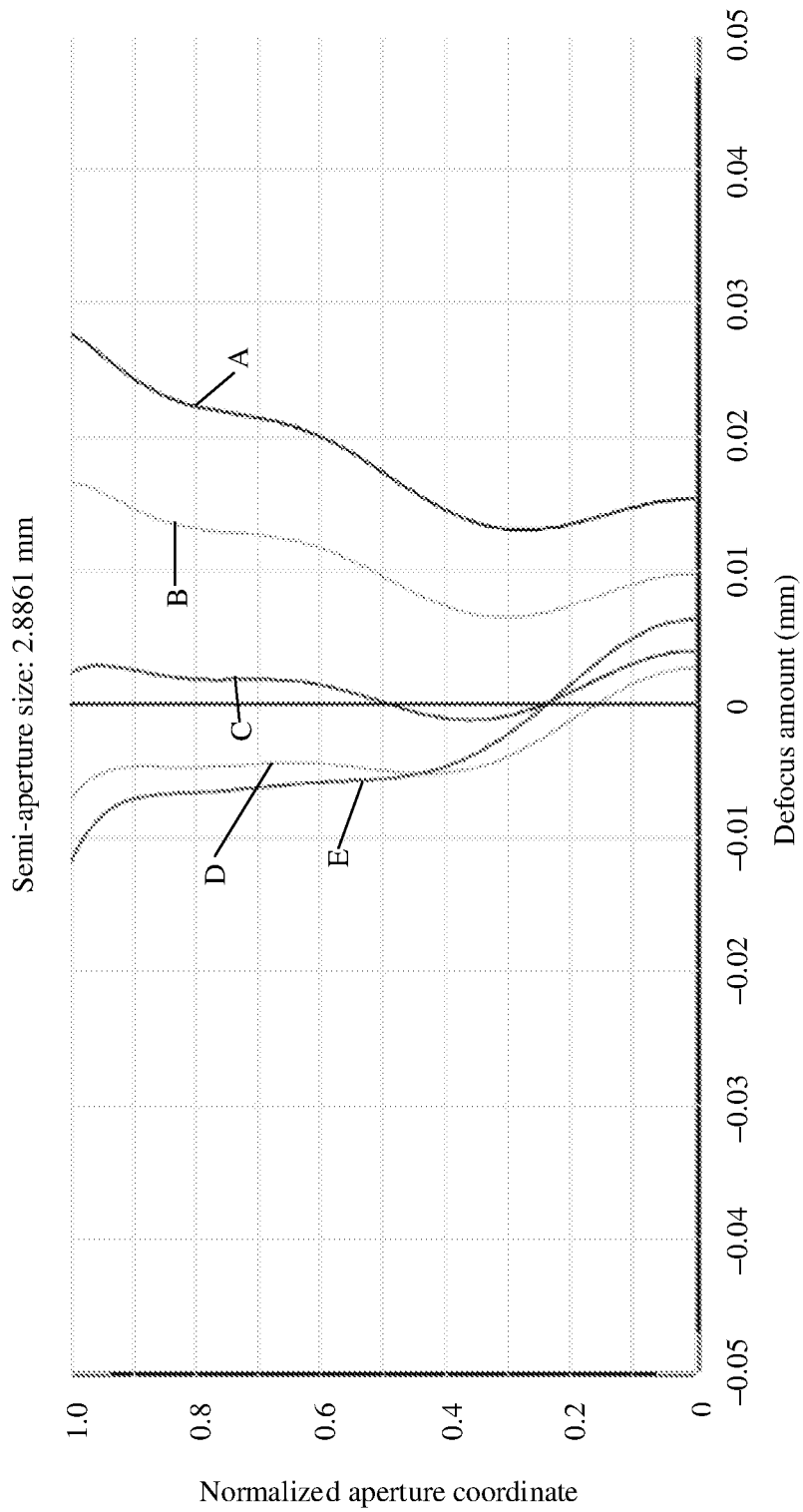
FIG. 31c shows example simulation results, of the zoom lens shown in FIG. 29 in an M2 state, of depth of focus locations for light with different wavelengths.

FIG. 31c shows simulation results, of the zoom lens shown in FIG. 29 in the M2 state, of depth of focus locations for light with the wavelengths of 650 nm, 610 nm, 555 nm, 510 nm, and 470 nm. A represents the light with the wavelength of 650 nm, and a defocus amount of the light A ranges from 0.012 mm to 0.028 mm. B represents the light with the wavelength of 610 nm, and a defocus amount of the light B ranges from 0.005 mm to 0.016 mm. C represents the light with the wavelength of 555 nm, and a defocus amount of the light C ranges from −0.002 mm to 0.006 mm. D represents the light with the wavelength of 510 nm, and a defocus amount of the light D ranges from −0.007 mm to 0.003 mm. E represents the light with the wavelength of 470 nm, and a defocus amount of the light E ranges from −0.012 mm to 0.008 mm.

Figure 31D:
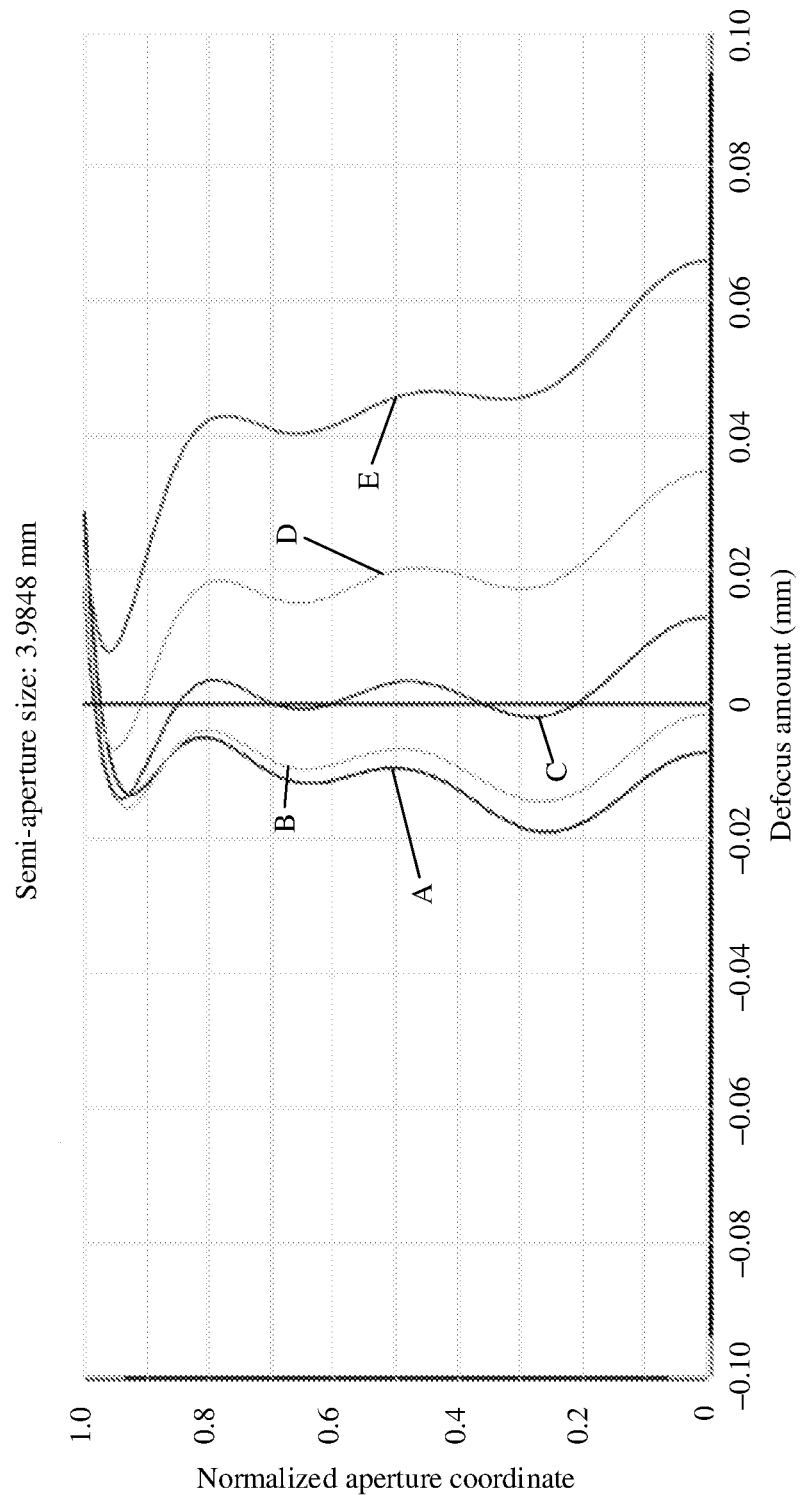
FIG. 31d shows example simulation results, of the zoom lens shown in FIG. 29 in a T state, of depth of focus locations for light with different wavelengths.

FIG. 31d shows simulation results, of the zoom lens shown in FIG. 29 in the telephoto state, of depth of focus locations for light with the wavelengths of 650 nm, 610 nm, 555 nm, 510 nm, and 470 nm. A represents the light with the wavelength of 650 nm, and a defocus amount of the light A ranges from −0.02 mm to 0.018 mm. B represents the light with the wavelength of 610 nm, and a defocus amount of the light B ranges from −0.015 mm to 0.018 mm. C represents the light with the wavelength of 555 nm, and a defocus amount of the light C ranges from −0.012 mm to 0.04 mm. D represents the light with the wavelength of 510 nm, and a defocus amount of the light D ranges from −0.015 mm to 0.03 mm. E represents the light with the wavelength of 470 nm, and a defocus amount of the light E ranges from 0.01 mm to 0.068 mm.

It can be seen from FIG. 31a, FIG. 31b, FIG. 31c, and FIG. 31d that, the defocus amounts of the light with the different wavelengths each fall within a very small range. An axial aberration of the zoom lens in each of the W, M1, M2, and T states is controlled within a very small range.

Figure 32A:
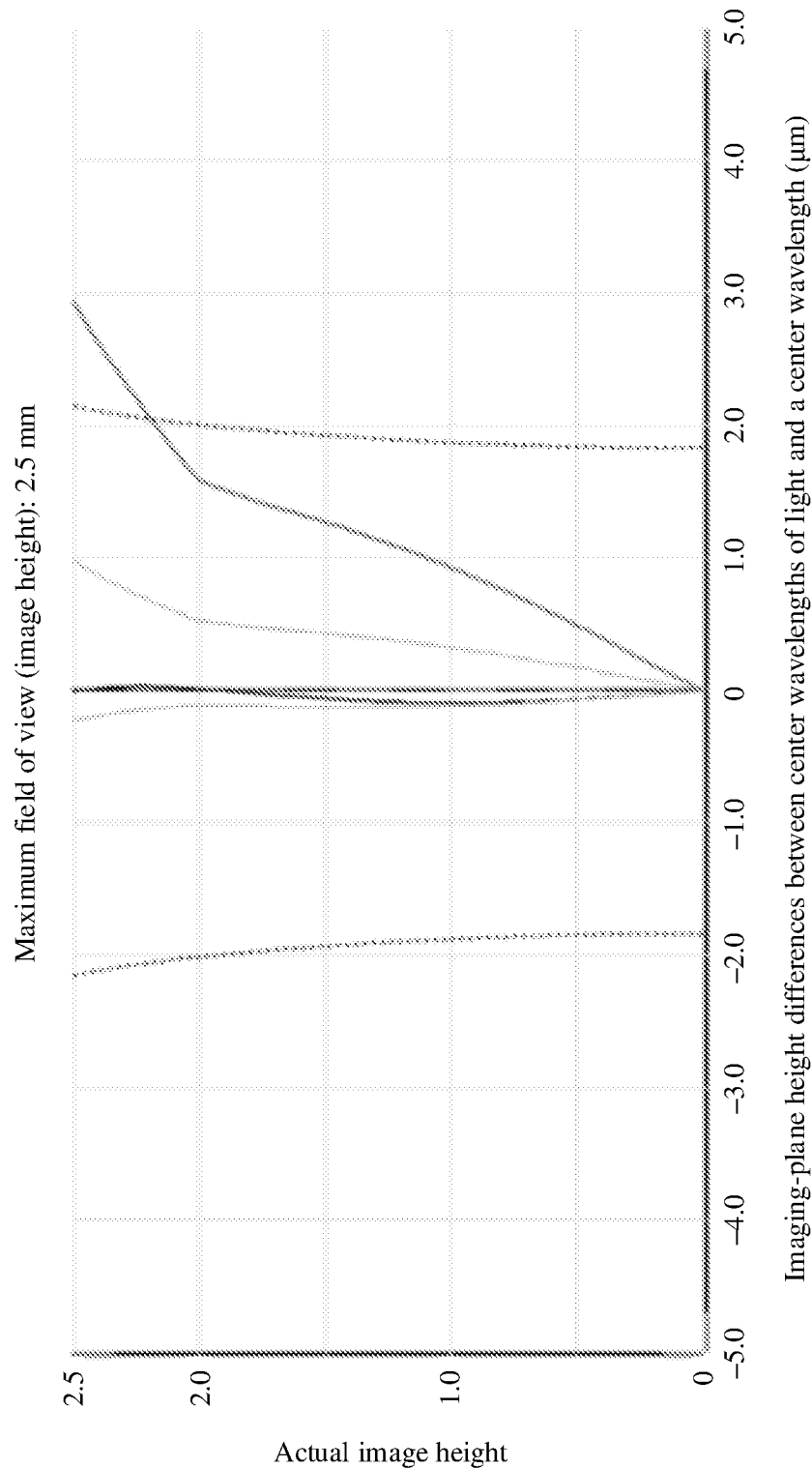
FIG. 32a shows example horizontal chromatic aberration curves of the zoom lens shown in FIG. 29 in a W state.

FIG. 32a shows horizontal chromatic aberration curves of the zoom lens in the W state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 32a that, horizontal chromatic aberrations of the five curves each substantially fall within the diffraction limit.

Figure 32B:
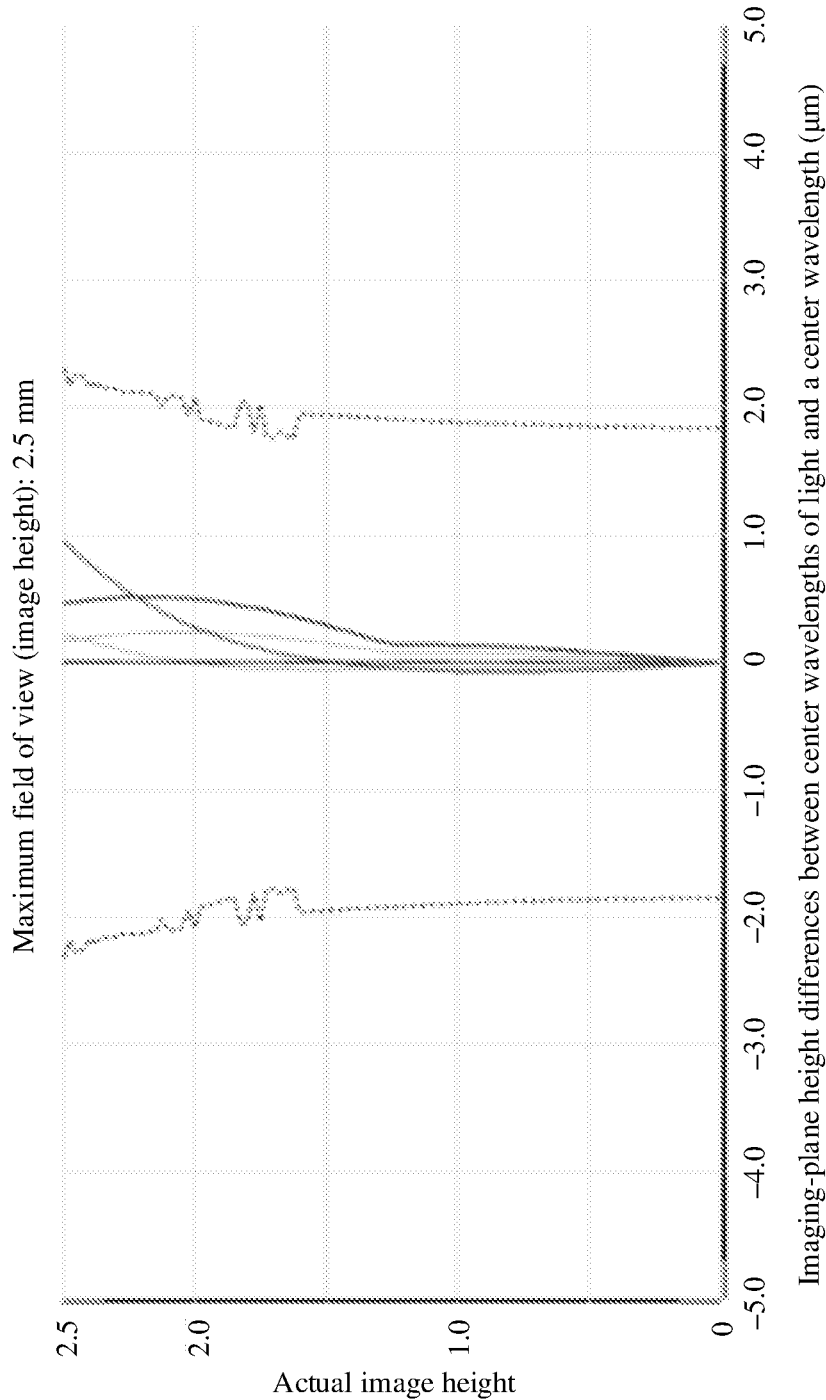
FIG. 32b shows example horizontal chromatic aberration curves of the zoom lens shown in FIG. 29 in an M1 state.

FIG. 32b shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 32b that, horizontal chromatic aberrations of the five curves each fall within the diffraction limit.

Figure 32C:
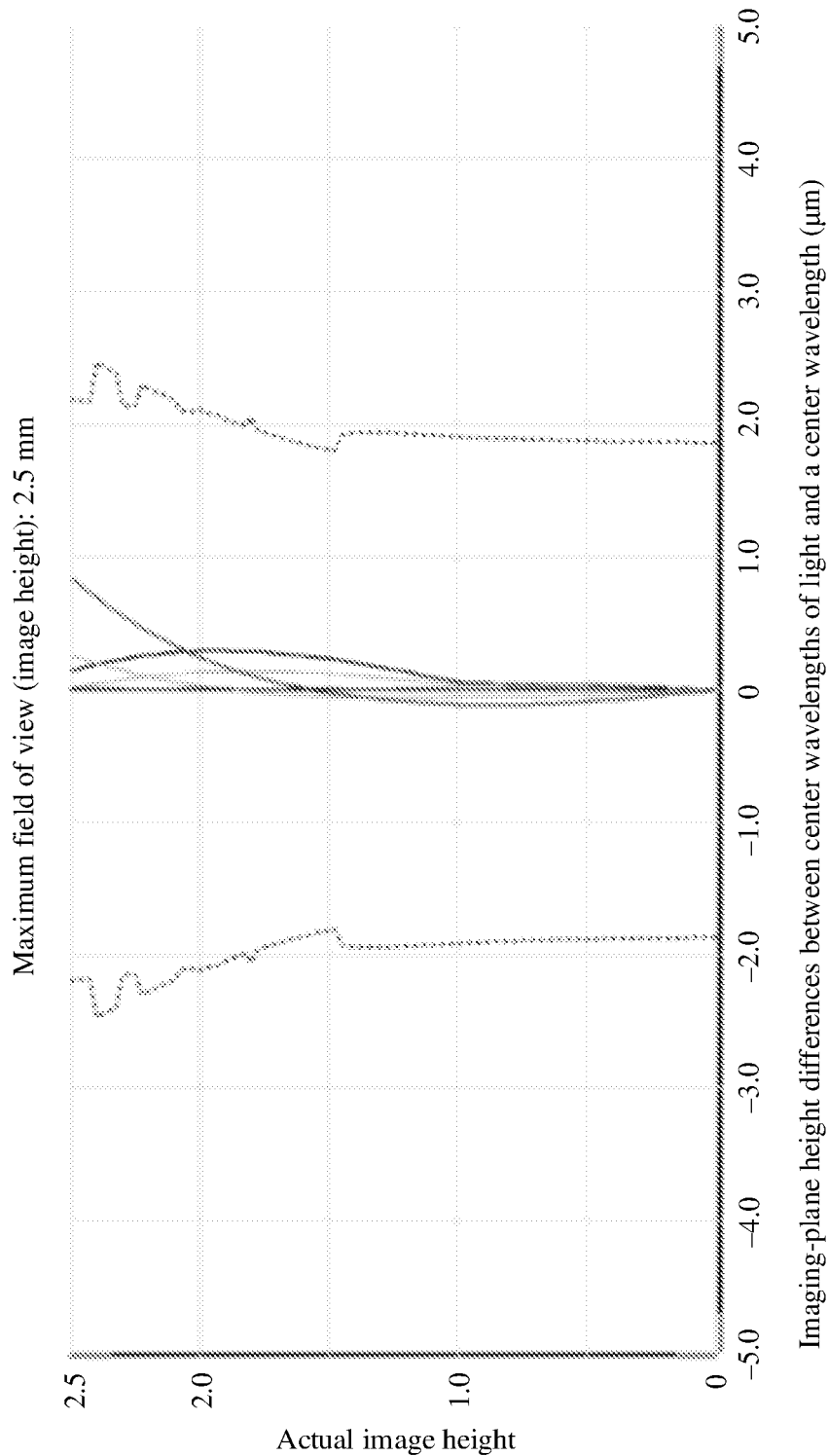
FIG. 32c shows example horizontal chromatic aberration curves of the zoom lens shown in FIG. 29 in an M2 state.

FIG. 32c shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −3.0 to 3.0. It can be seen from FIG. 32c that, horizontal chromatic aberrations of the five curves each fall within the diffraction limit.

Figure 32D:
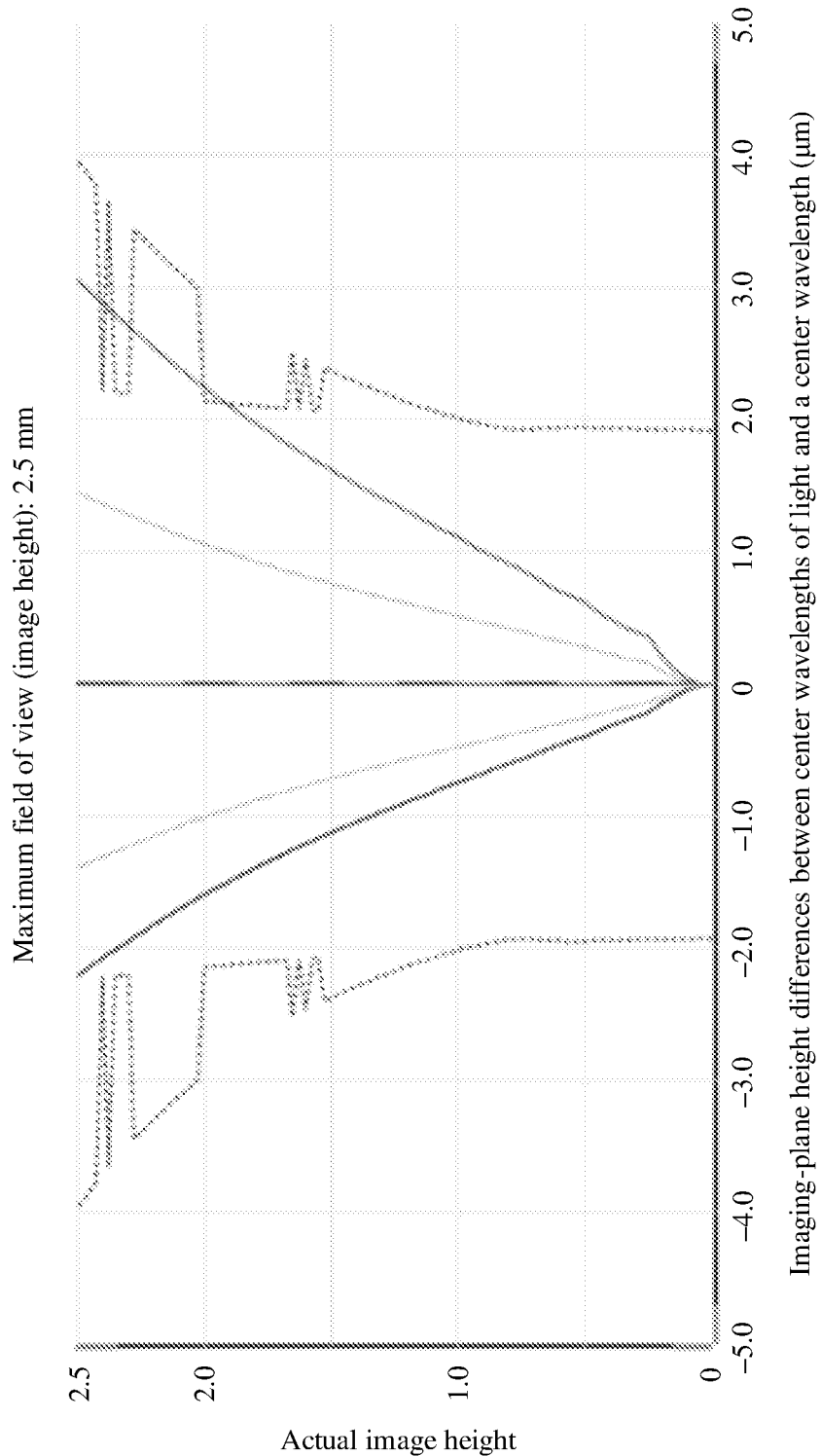
FIG. 32d shows example horizontal chromatic aberration curves of the zoom lens shown in FIG. 29 in a T state.

FIG. 32d shows horizontal chromatic aberration curves of the zoom lens in the T state. Five solid-line curves in the figure are color light with the wavelengths of 650 nm, 610 nm, 555 nm, 510 nm, and 470 nm, respectively. Dashed lines indicate that a diffraction limit ranges from −2.5 to 2.5. It can be seen from FIG. 32d that, horizontal chromatic aberrations of the five curves each fall within the diffraction limit.

Figure 33A:
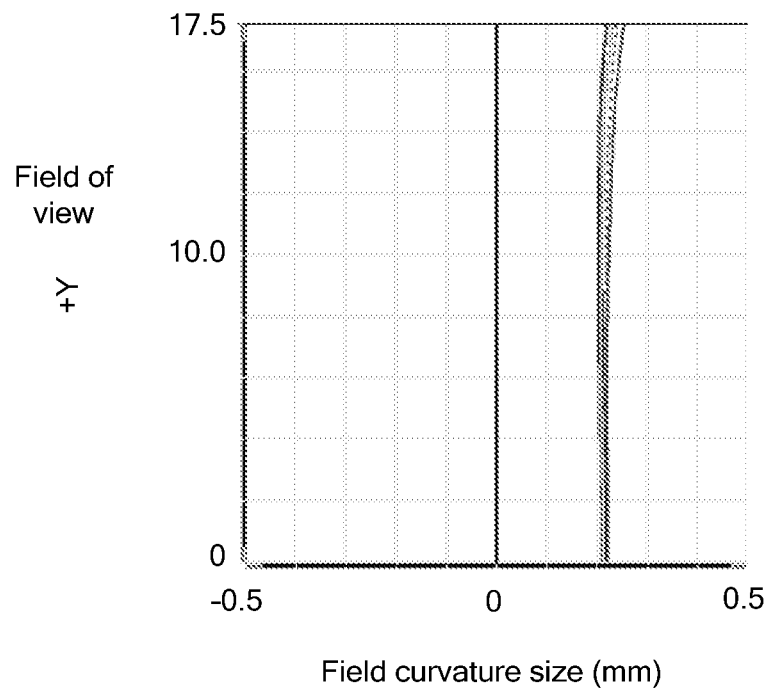
FIG. 33a shows example distortion curves of the zoom lens shown in FIG. 29 in a W state.
Figure 33B:
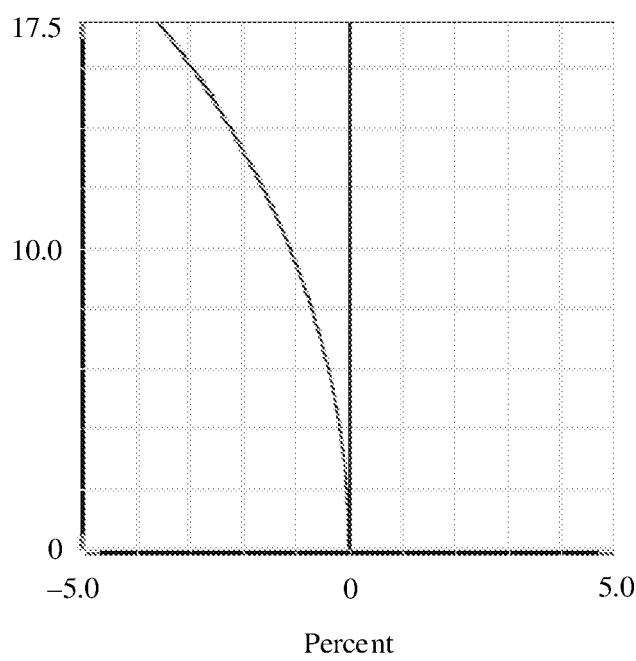
FIG. 33b shows an example optical distortion percentage of the zoom lens shown in FIG. 29 in a W state.

FIG. 33a shows distortion curves of the zoom lens in the W state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 33a that, the difference between the imaging deformation and the ideal shape is very small. FIG. 33b can be obtained by performing percentage calculation on the imaging deformation and the ideal shape of the light in FIG. 33a. It can be seen from FIG. 33b that, the zoom lens controls an optical distortion within a range of less than 5%.

Figure 34A:
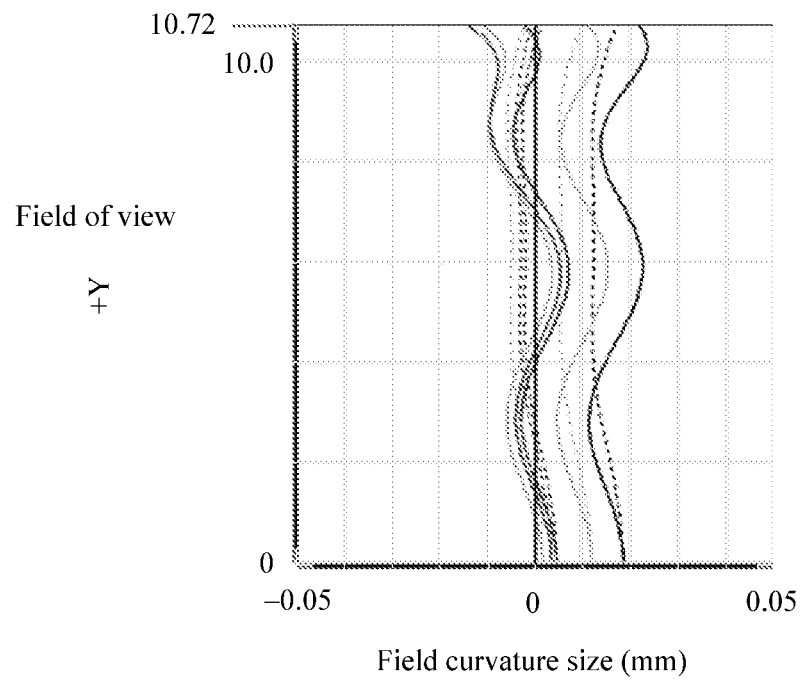
FIG. 34a shows example distortion curves of the zoom lens shown in FIG. 29 in an M1 state.
Figure 34B:
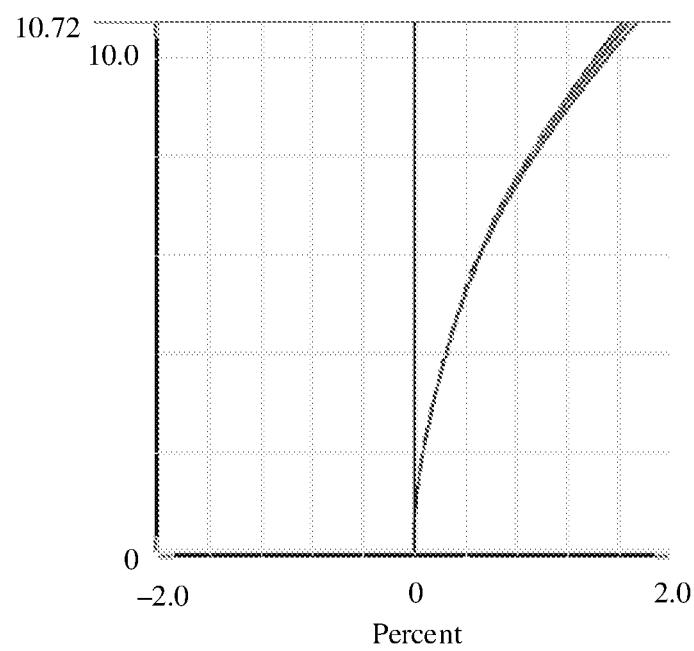
FIG. 34b shows an example optical distortion percentage of the zoom lens shown in FIG. 29 in an M1 state.

FIG. 34a shows distortion curves of the zoom lens in the M1 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 34a that, the difference between the imaging deformation and the ideal shape is very small. FIG. 34b can be obtained by performing percentage calculation on the imaging deformation and the ideal shape of the light in FIG. 34a. It can be seen from FIG. 34b that, the zoom lens controls an optical distortion within a range of less than 2%.

Figure 35A:
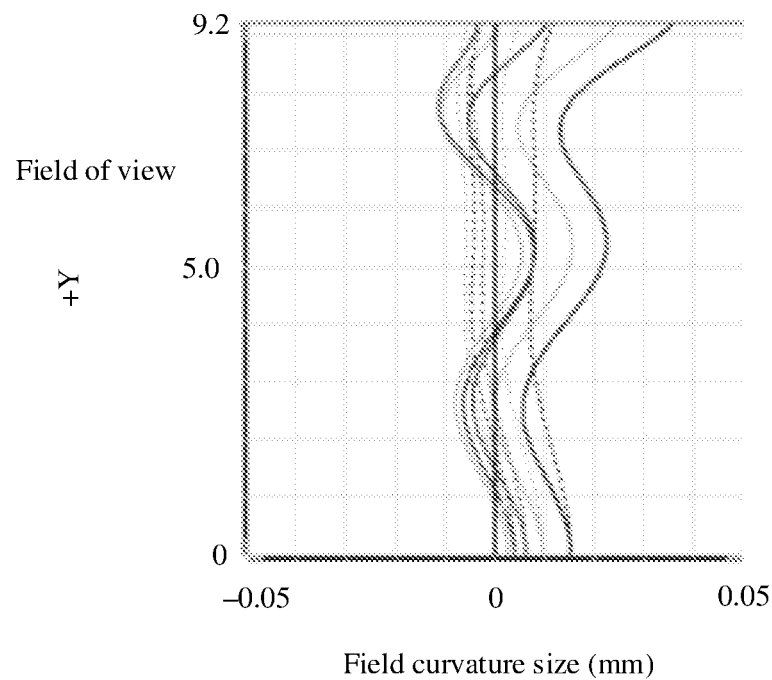
FIG. 35a shows example distortion curves of the zoom lens shown in FIG. 29 in an M2 state.
Figure 35B:
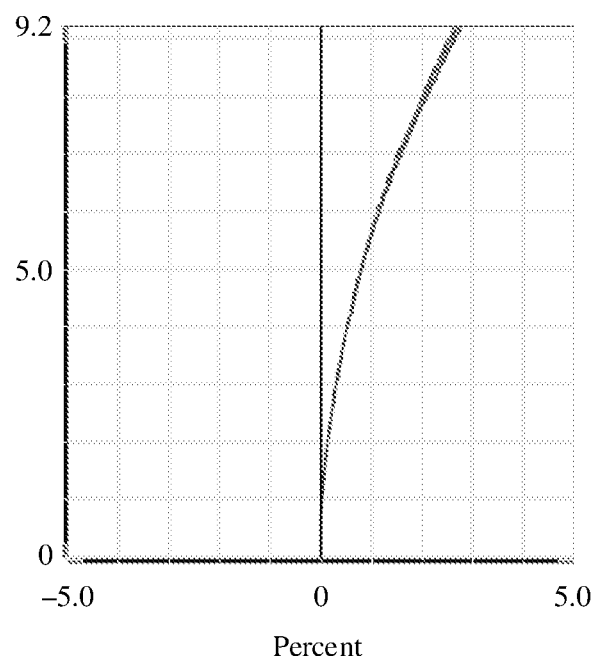
FIG. 35b shows an example optical distortion percentage of the zoom lens shown in FIG. 29 in an M2 state.

FIG. 35a shows distortion curves of the zoom lens in the M2 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 35a that, the difference between the imaging deformation and the ideal shape is very small. FIG. 35b can be obtained by performing percentage calculation on the imaging deformation and the ideal shape of the light in FIG. 35a. It can be seen from FIG. 35b that, the zoom lens controls an optical distortion within a range of less than 5%.

Figure 36A:
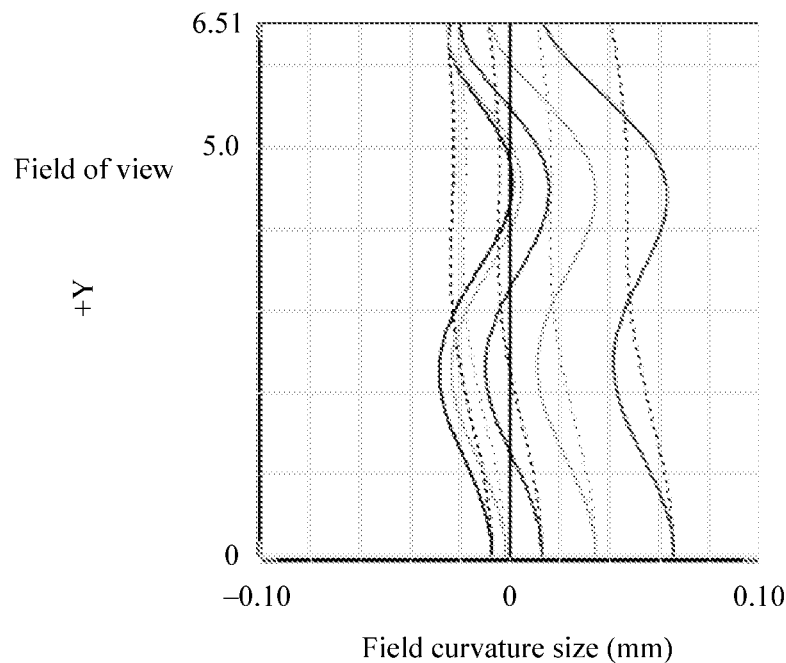
FIG. 36a shows example distortion curves of the zoom lens shown in FIG. 29 in a T state.
Figure 36B:
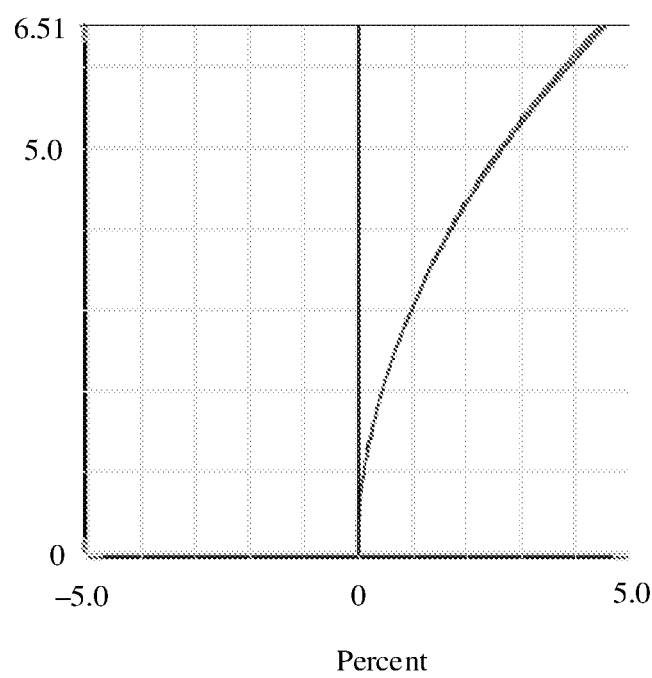
FIG. 36b shows an example optical distortion percentage of the zoom lens shown in FIG. 29 in a T state.

FIG. 36a shows distortion curves of the zoom lens in the T state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 36a that, the difference between the imaging deformation and the ideal shape is very small. FIG. 36b can be obtained by performing percentage calculation on the imaging deformation and the ideal shape of the light in FIG. 36a. It can be seen from FIG. 36b that, the zoom lens controls an optical distortion within a range of less than 5%.

Figure 37:
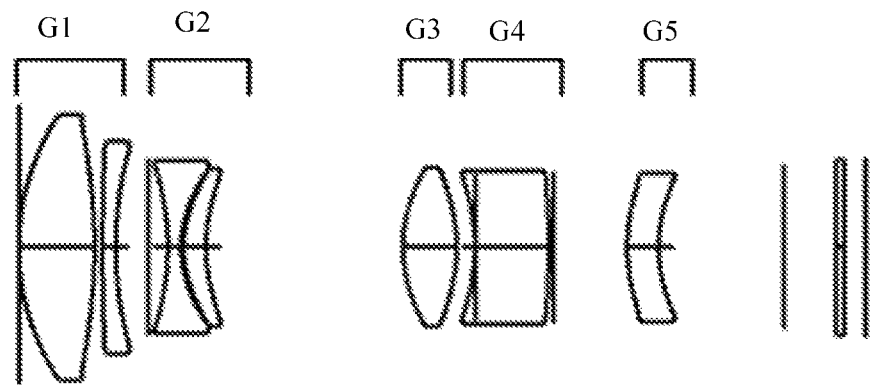
FIG. 37 shows an example fifth specific zoom lens.

FIG. 37 shows a fifth specific zoom lens. Starting from an object side, sequentially, lens groups meet the following: a ratio of a focal length f1 of a first lens group G1 with a positive focal power to an effective focal length ft of the zoom lens at a telephoto end is |f1/ft|=0.93; a ratio of a focal length f2 of a second lens group G2 with a negative focal power to the effective focal length ft of the zoom lens at the telephoto end is |f2/ft|=0.26; a ratio of a focal length f3 of a third lens group G3 with a positive focal power to the effective focal length ft of the zoom lens at the telephoto end is |f3/ft|=0.20; a ratio of a focal length f4 of a fourth lens group G4 with a negative focal power to the effective focal length ft of the zoom lens at the telephoto end is |f4/ft|=0.53; and a ratio of a focal length f5 of a fifth lens group G5 with a negative focal power to the effective focal length ft of the zoom lens at the telephoto end is |f5/ft|=3.06.

Still referring to FIG. 37, the zoom lens includes 7 lenses with a focal power, and the 7 lenses include 12 aspheric surfaces. The aspheric surface is a surface type of a lens surface. The first lens group G1 includes 2 lenses, and the 2 lenses respectively have a positive focal power and a negative focal power along a direction from the object side to an image side. The second lens group G2 includes 2 lenses, and the 2 lenses respectively have a negative focal power and a positive focal power along the direction from the object side to the image side. The third lens group G3 includes 1 lens with a positive focal power. The fourth lens group G4 includes 1 lens with a negative focal power. The fifth lens group G5 includes 1 lens with a negative focal power. The first lens group G1 includes at least one lens with a negative focal power. A maximum clear aperture of the lenses in the first lens group G1, the second lens group G2, the third lens group G3, the fourth lens group G4, and the fifth lens group G5 is 7.4 mm. Table 5a lists a curvature, a thickness, a refractive index, and an Abbe coefficient of each lens in the zoom lens in a wide-angle state. Table 5b lists an aspheric coefficient of each lens.

TABLE 5a

|  | R |  | Thickness | | nd | | vd |
| --- | --- | --- | --- | --- | --- | --- | --- |
| R1 | 6.71 | d1 | 2.06 | n1 | 1.50 | v1 | 81.6 |
| R2 | −14.27 | a1 | 0.21 | | | | |
| R3 | 56.24 | d2 | 0.36 | n2 | 1.81 | v2 | 33.3 |
| R4 | 10.33 | a2 | 1.41 | | | | |
| R5 | −7.39 | d3 | 0.36 | n3 | 1.54 | v3 | 56.0 |
| R6 | 3.14 | a3 | 0.07 | | | | |
| R7 | 3.13 | d4 | 0.60 | n4 | 1.67 | v4 | 19.2 |
| R8 | 4.61 | a4 | 5.35 | | | | |
| R9 | 4.01 | d5 | 1.46 | n5 | 1.54 | v5 | 56.0 |
| R10 | −4.59 | a5 | 0.50 | | | | |
| R11 | −4.72 | d6 | 2.00 | n6 | 1.67 | v6 | 19.2 |
| R12 | −14.90 | a6 | 2.12 | | | | |
| R13 | 5.41 | d7 | 0.86 | n7 | 1.54 | v7 | 56.0 |
| R14 | 4.43 | a7 | 4.82 | | | | |

TABLE 5b

| | | | | Aspheric coefficient | | | |
| --- | --- | --- | --- | --- | --- | --- | --- |
| | Type | A2 | A3 | A4 | A5 | A6 | A7 |
| R1 | Even aspheric surface | −7.05E−05 | −1.30E−05 | 3.44E−06 | −4.71E−07 | 2.96E−08 | −7.13E−10 |
| R2 | Even aspheric surface | 6.09E−04 | 3.43E−06 | −2.16E−06 | 1.75E−07 | −5.12E−09 | 0.00E+00 |
| R5 | Even aspheric surface | −4.13E−04 | 2.17E−04 | −2.72E−05 | 1.71E−06 | −4.66E−08 | 0.00E+00 |
| R6 | Even aspheric surface | −4.83E−03 | −5.88E−04 | 2.41E−05 | 4.84E−06 | 1.92E−07 | 0.00E+00 |
| R7 | Even aspheric surface | −5.78E−03 | −6.81E−04 | −1.85E−05 | −1.09E−06 | 3.99E−07 | 0.00E+00 |
| R8 | Even aspheric surface | −4.00E−03 | −1.21E−05 | −6.20E−05 | −4.01E−06 | 5.01E−07 | 0.00E+00 |
| R9 | Even aspheric surface | −2.32E−03 | −3.17E−05 | −2.59E−06 | −5.79E−07 | 0.00E+00 | 0.00E+00 |
| R10 | Even aspheric surface | 4.74E−03 | −1.11E−04 | −6.53E−07 | 4.67E−07 | 0.00E+00 | 0.00E+00 |
| R11 | Even aspheric surface | 7.74E−03 | −6.34E−04 | 4.01E−05 | −2.84E−07 | 0.00E+00 | 0.00E+00 |
| R12 | Even aspheric surface | 5.50E−03 | −8.26E−04 | 5.89E−05 | −2.33E−06 | 0.00E+00 | 0.00E+00 |
| R13 | Even aspheric surface | 6.10E−03 | −2.31E−03 | 4.06E−05 | −8.80E−06 | 0.00E+00 | 0.00E+00 |
| R14 | Even aspheric surface | 7.32E−03 | −2.05E−03 | −1.47E−04 | 2.33E−05 | 0.00E+00 | 0.00E+00 |

In the 12 aspheric surfaces of the zoom lens shown in FIG. 37, a surface type z of each of the even aspheric surfaces may be defined by, including but not limited to, the following aspheric surface formula:

$$z = \frac{cr^2}{1+\sqrt{1 \mid Kc^2 r^2}} + A_2 r^4 + A_3 r^6 + A_4 r^8 + A_5 r^{10} + A_6 r^{12} + A_7 r^{14}$$

z is a vector height of the aspheric surface, r is a radial coordinate of the aspheric surface, c is a spherical curvature of a vertex of the aspheric surface, and K is a conic constant. In this embodiment, a value of K is 0, and A2, A3, A4, A5, A6, and A7 are aspheric coefficients.

Still referring to FIG. 37, for the zoom lens, a ratio of its total track length to its effective focal length at the telephoto end (TTL/ft) is 1.10, and a ratio of its image height to its effective focal length at the telephoto end (IMH/ft) is 0.119. In FIG. 37, the zoom lens further has a stop (not shown in the figure). The stop is located on an object side of the third lens group G3, and certainly may alternatively be arranged in another lens group. For example, the stop is arranged on an object side or an image side of the first lens group G1 or the fifth lens group G5, or is arranged on an object side or an image side of the second lens group G2 or the fourth lens group G4.

As shown in FIG. 37, locations of the first lens group G1, the third lens group G3, and the fifth lens group G5 are fixed relative to an imaging plane, and the second lens group G2 and the fourth lens group G4 move along an optical axis to implement zooming.

Figure 38:
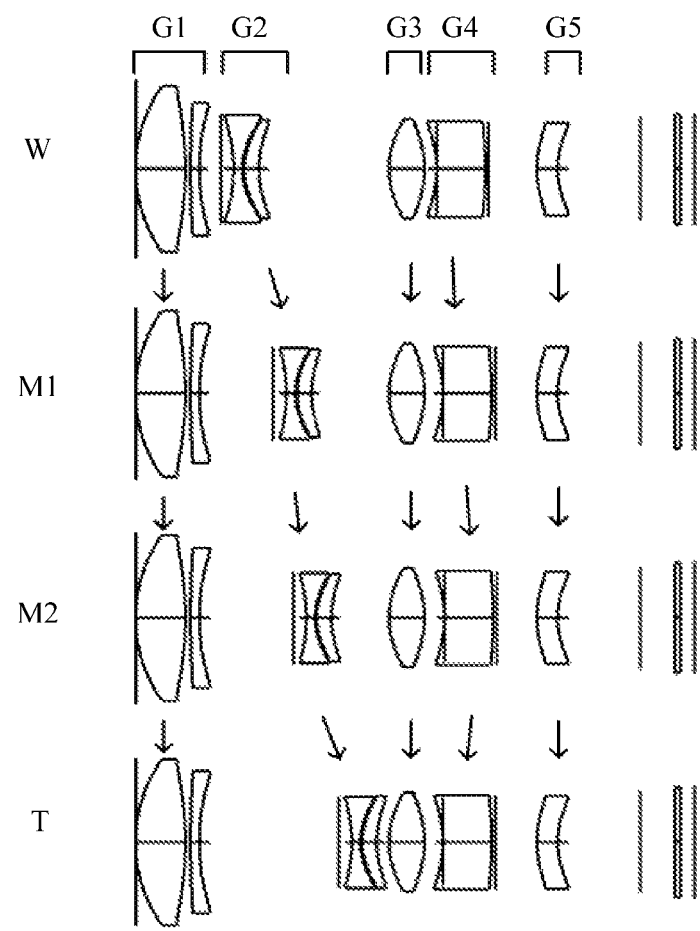
FIG. 38 shows an example zoom process of a zoom lens.

FIG. 38 shows a zoom process of the zoom lens. The zoom lens has four focal length states: W represents a wide-angle end state, M1 represents a first intermediate focal length state, M2 represents a second intermediate focal length state, and T represents a telephoto state. Relative locations of the lens groups corresponding to the W state of the zoom lens are as follows: the second lens group G2 is close to the image side of the first lens group G1, and the fourth lens group G4 is close to an image side of the fifth lens group G5. Upon zooming from the wide-angle end state W to the first intermediate focal length state M1, the second lens group G2 moves towards the third lens group G3, and the fourth lens group G4 moves towards the fifth lens group G5. Upon zooming from the first intermediate focal length state M1 to the second intermediate focal length state M2, the second lens group G2 moves towards the third lens group G3, and the fourth lens group G4 moves towards the fifth lens group G5. Upon zooming from the first intermediate focal length state M1 to the telephoto state T, the second lens group G2 moves towards the third lens group G3, and the fourth lens group G4 moves towards the third lens group G3.

It can be seen from FIG. 38 that, when the zoom lens is zoomed from the wide-angle state to the telephoto state, the second lens group G2 moves towards an image space (close to the third lens group G3), and a distance between the fourth lens group G4 and the third lens group G3 first increases and then decreases. Upon zooming from the wide-angle state to the telephoto state, a ratio of a movement stroke of the second lens group G2 along the optical axis to the TTL is 0.21, and a ratio of a movement stroke of the fourth lens group G4 along the optical axis to the TTL is 0.014. Correspondingly, reference can be made to Table 5c and Table 5d. Table 5c lists basic parameters of the zoom lens, and Table 5d lists distances between the lens groups in cases that the zoom lens is in the W, M1, M2, and T states.

TABLE 5c

|  | W | M1 | M2 | T |
|---|---|---|---|---|
| Focal length F | 9.0 mm | 13.0 mm | 15.0 mm | 21.0 mm |
| F number | 2.651 | 2.716 | 2.734 | 2.956 |
| Image height IMH | 2.5 mm | 2.5 mm | 2.5 mm | 2.5 mm |
| Half FOV | 15.91° | 10.08° | 9.18° | 6.48° |
| BFL | 5.63 mm | 5.63 mm | 5.63 mm | 5.63 mm |
| TTL | 23.0 mm | 23.0 mm | 23.0 mm | 23.0 mm |
| Designed wavelength | 650 nm, 610 nm, 555 nm, 510 nm, and 470 nm | | | |

TABLE 5d

|  | W | M1 | M2 | T |
|---|---|---|---|---|
| a2 | 1.41 mm | 3.58 mm | 4.40 mm | 6.26 mm |
| a4 | 5.35 mm | 3.18 mm | 2.37 mm | 0.50 mm |
| a5 | 0.50 mm | 0.76 mm | 0.83 mm | 0.77 mm |
| a6 | 2.12 mm | 1.86 mm | 1.80 mm | 1.86 mm |

Simulation is performed on the zoom lens shown in FIG. 37. The following describes in detail simulation effects thereof with reference to accompanying drawings.

Figure 39A:
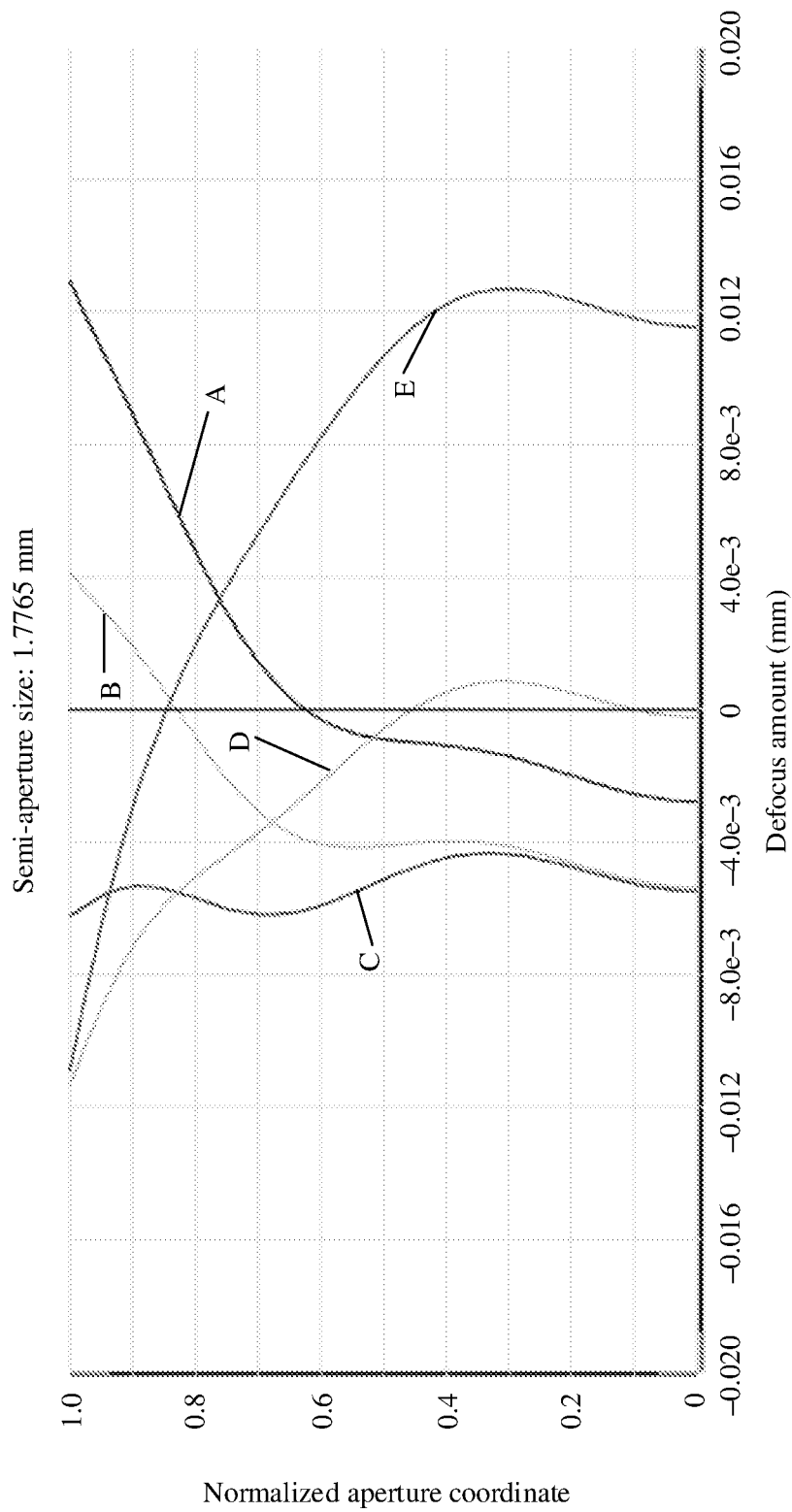
FIG. 39a shows example simulation results, of the zoom lens shown in FIG. 37 in a W state, of depth of focus locations for light with different wavelengths.

FIG. 39a shows simulation results, of the zoom lens shown in FIG. 37 in the W state, of depth of focus locations for light with the wavelengths of 650 nm, 610 nm, 555 nm, 510 nm, and 470 nm. A represents the light with the wavelength of 650 nm, and a defocus amount of the light A ranges from −0.003 mm to 0.014 mm. B represents the light with the wavelength of 610 nm, and a defocus amount of the light B ranges from −0.006 mm to 0.004 mm. C represents the light with the wavelength of 555 nm, and a defocus amount of the light C ranges from −0.006 mm to −0.004 mm. D represents the light with the wavelength of 510 nm, and a defocus amount of the light D ranges from −0.012 mm to 0.002 mm. E represents the light with the wavelength of 470 nm, and a defocus amount of the light E ranges from −0.012 mm to 0.013 mm.

Figure 39B:
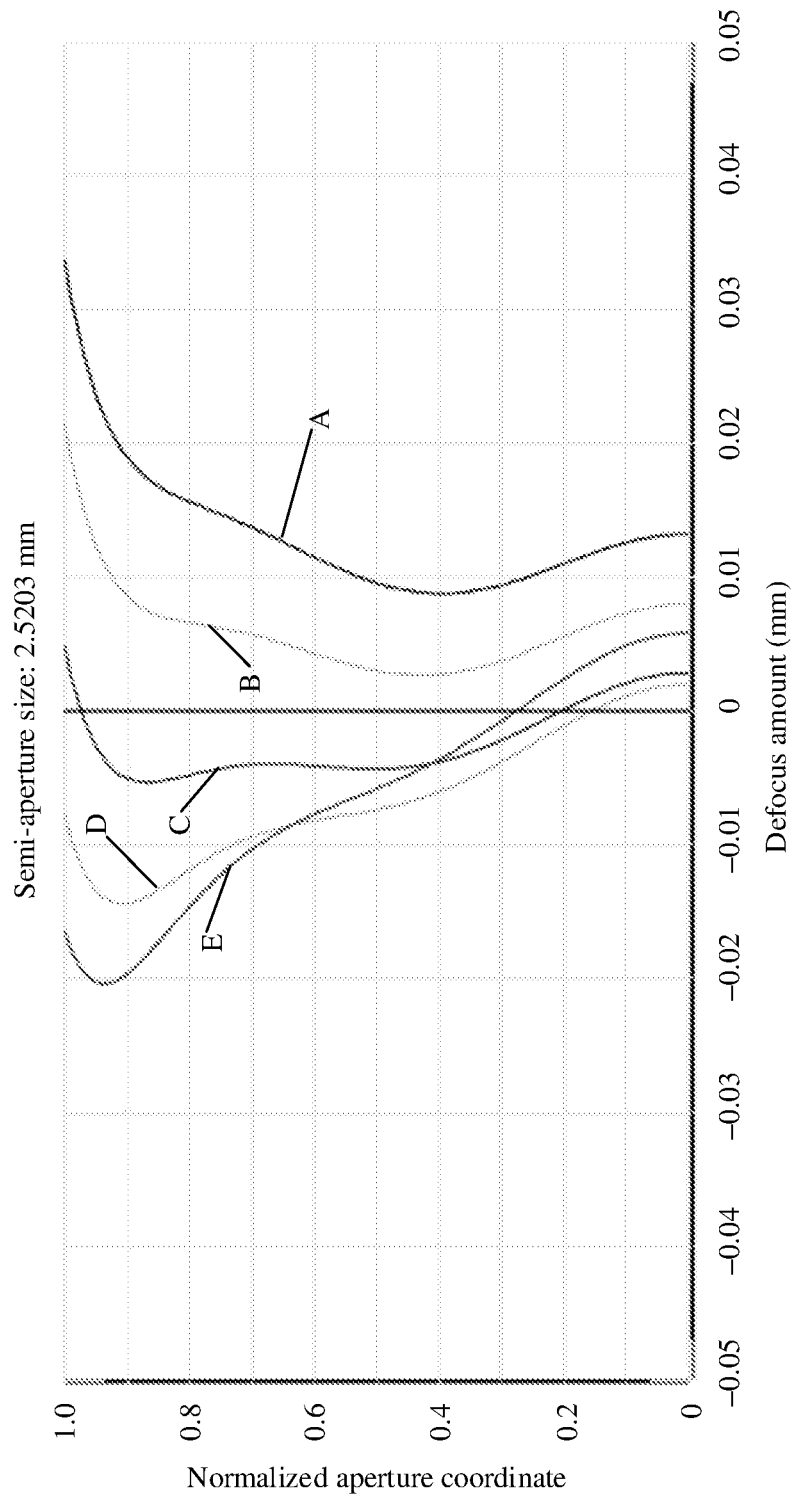
FIG. 39b shows example simulation results, of the zoom lens shown in FIG. 37 in an M1 state, of depth of focus locations for light with different wavelengths.

FIG. 39b shows simulation results, of the zoom lens shown in FIG. 37 in the M1 state, of depth of focus locations for light with the wavelengths of 650 nm, 610 nm, 555 nm, 510 nm, and 470 nm. A represents the light with the wavelength of 650 nm, and a defocus amount of the light A ranges from 0.008 mm to 0.035 mm. B represents the light with the wavelength of 610 nm, and a defocus amount of the light B ranges from 0.002 mm to 0.022 mm. C represents the light with the wavelength of 555 nm, and a defocus amount of the light C ranges from −0.006 mm to 0.006 mm. D represents the light with the wavelength of 510 nm, and a defocus amount of the light D ranges from −0.015 mm to 0.002 mm. E represents the light with the wavelength of 470 nm, and a defocus amount of the light E ranges from −0.02 mm to 0.006 mm.

Figure 39C:
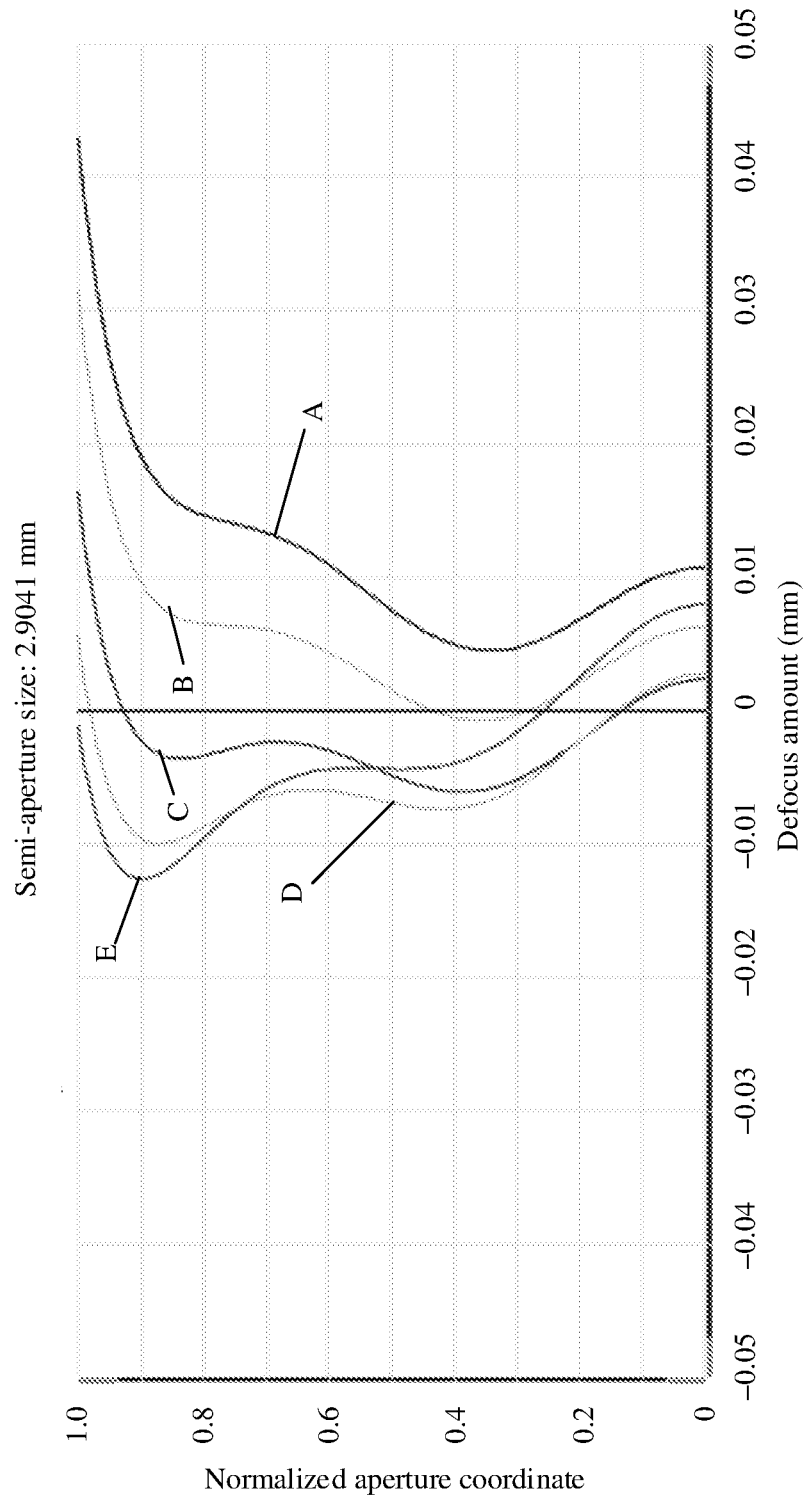
FIG. 39c shows example simulation results, of the zoom lens shown in FIG. 37 in an M2 state, of depth of focus locations for light with different wavelengths.

FIG. 39c shows simulation results, of the zoom lens shown in FIG. 37 in the M2 state, of depth of focus locations for light with the wavelengths of 650 nm, 610 nm, 555 nm, 510 nm, and 470 nm. A represents the light with the wavelength of 650 nm, and a defocus amount of the light A ranges from 0.005 mm to 0.045 mm. B represents the light with the wavelength of 610 nm, and a defocus amount of the light B ranges from −0.001 mm to 0.032 mm. C represents the light with the wavelength of 555 nm, and a defocus amount of the light C ranges from −0.002 mm to 0.016 mm. D represents the light with the wavelength of 510 nm, and a defocus amount of the light D ranges from −0.008 mm to 0.005 mm. E represents the light with the wavelength of 470 nm, and a defocus amount of the light E ranges from −0.012 mm to 0.008 mm.

Figure 39D:
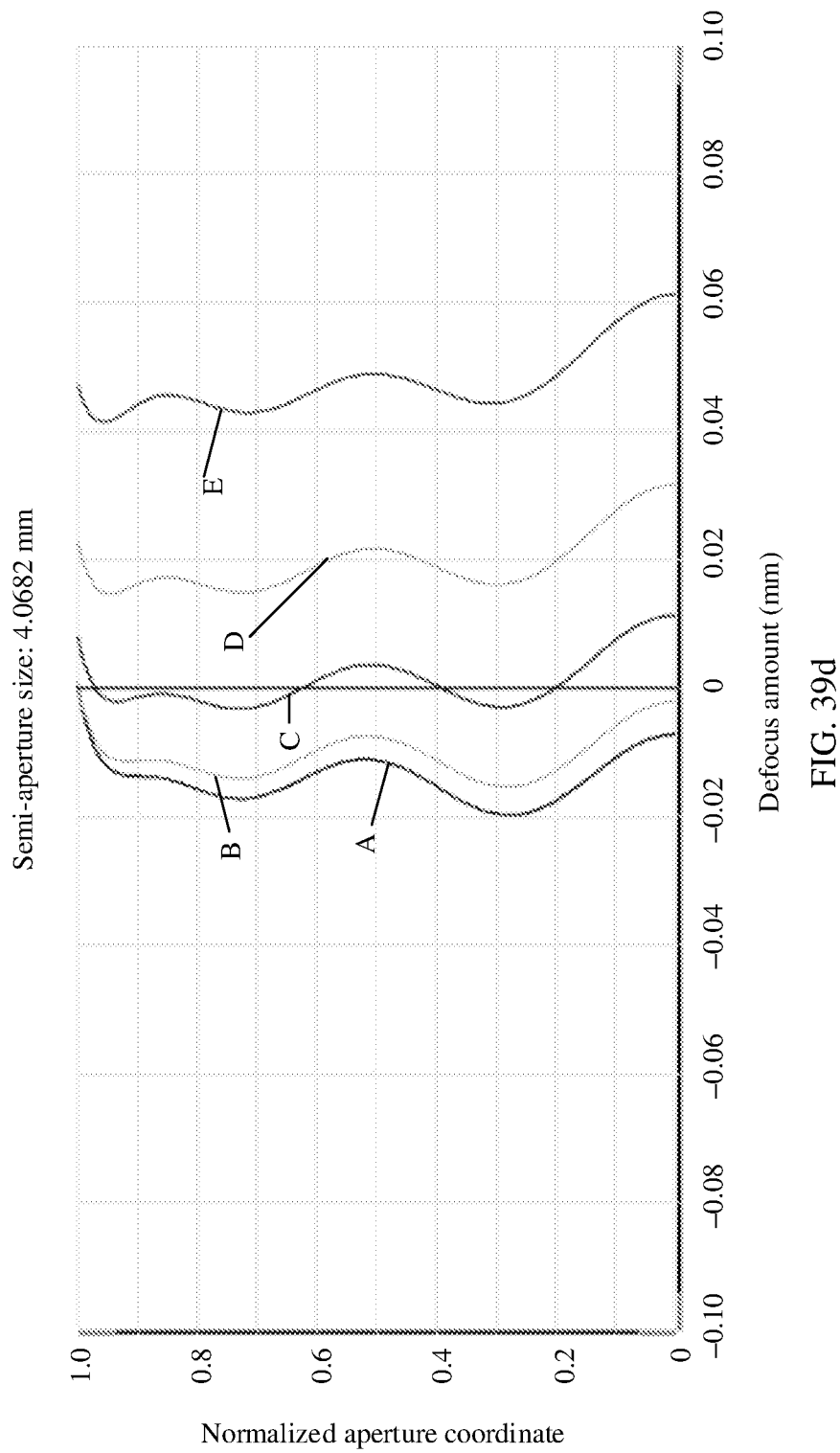
FIG. 39d shows example simulation results, of the zoom lens shown in FIG. 37 in a T state, of depth of focus locations for light with different wavelengths.

FIG. 39d shows simulation results, of the zoom lens shown in FIG. 37 in the telephoto state, of depth of focus locations for light with the wavelengths of 650 nm, 610 nm, 555 nm, 510 nm, and 470 nm. A represents the light with the wavelength of 650 nm, and a defocus amount of the light A ranges from −0.02 mm to 0 mm. B represents the light with the wavelength of 610 nm, and a defocus amount of the light B ranges from −0.018 mm to 0 mm. C represents the light with the wavelength of 555 nm, and a defocus amount of the light C ranges from −0.005 mm to 0.01 mm. D represents the light with the wavelength of 510 nm, and a defocus amount of the light D ranges from 0.015 mm to 0.03 mm. E represents the light with the wavelength of 470 nm, and a defocus amount of the light E ranges from 0.04 mm to 0.06 mm.

It can be seen from FIG. 39a, FIG. 39b, FIG. 39c, and FIG. 39d that, the defocus amounts of the light with the different wavelengths each fall within a very small range. An axial aberration of the zoom lens in each of the W, M1, M2, and T states is controlled within a very small range.

Figure 40A:
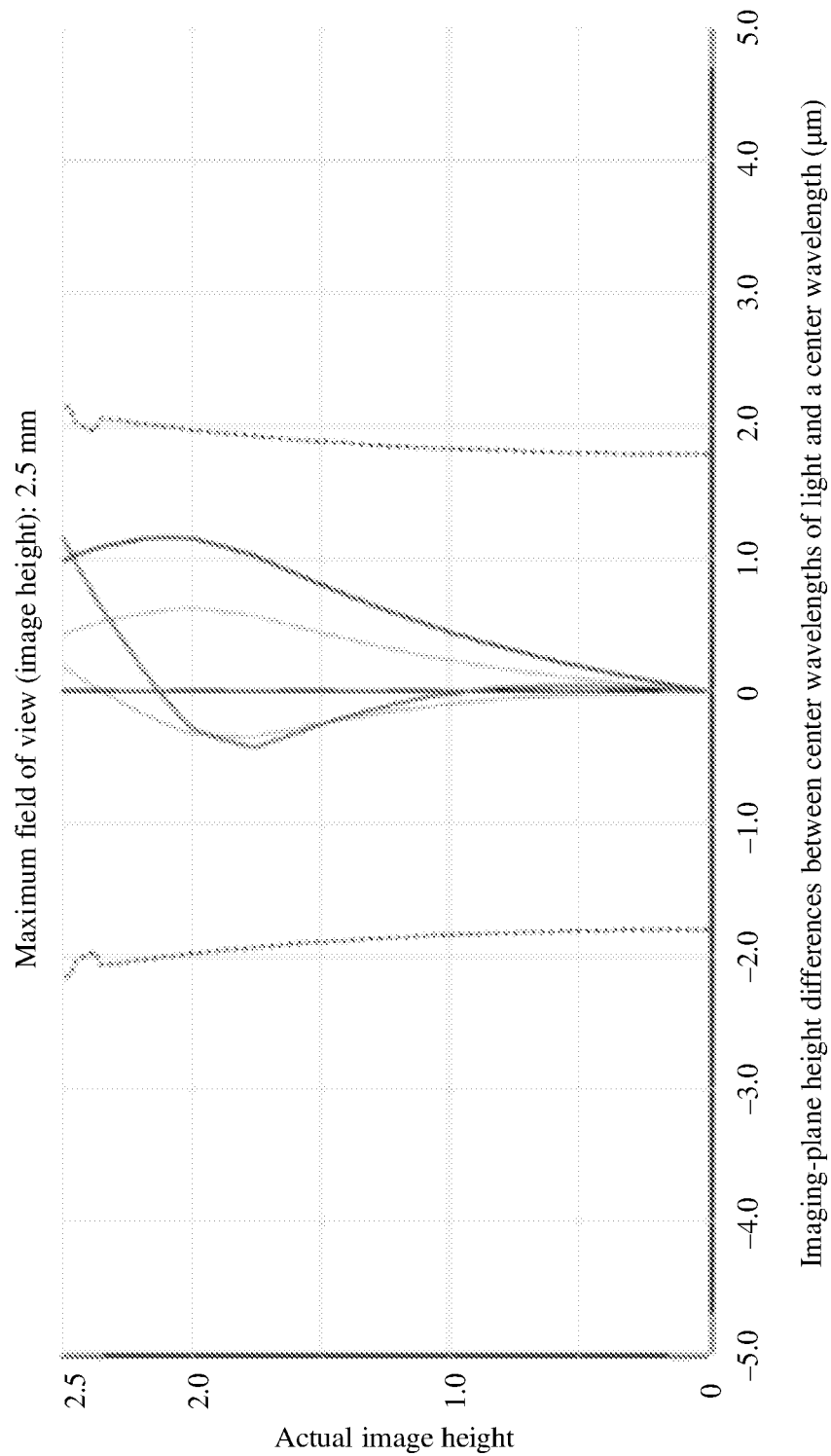
FIG. 40a shows example horizontal chromatic aberration curves of the zoom lens shown in FIG. 37 in a W state.

FIG. 40a shows horizontal chromatic aberration curves of the zoom lens in the W state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 40a that, horizontal chromatic aberrations of the five curves each substantially fall within the diffraction limit.

Figure 40B:
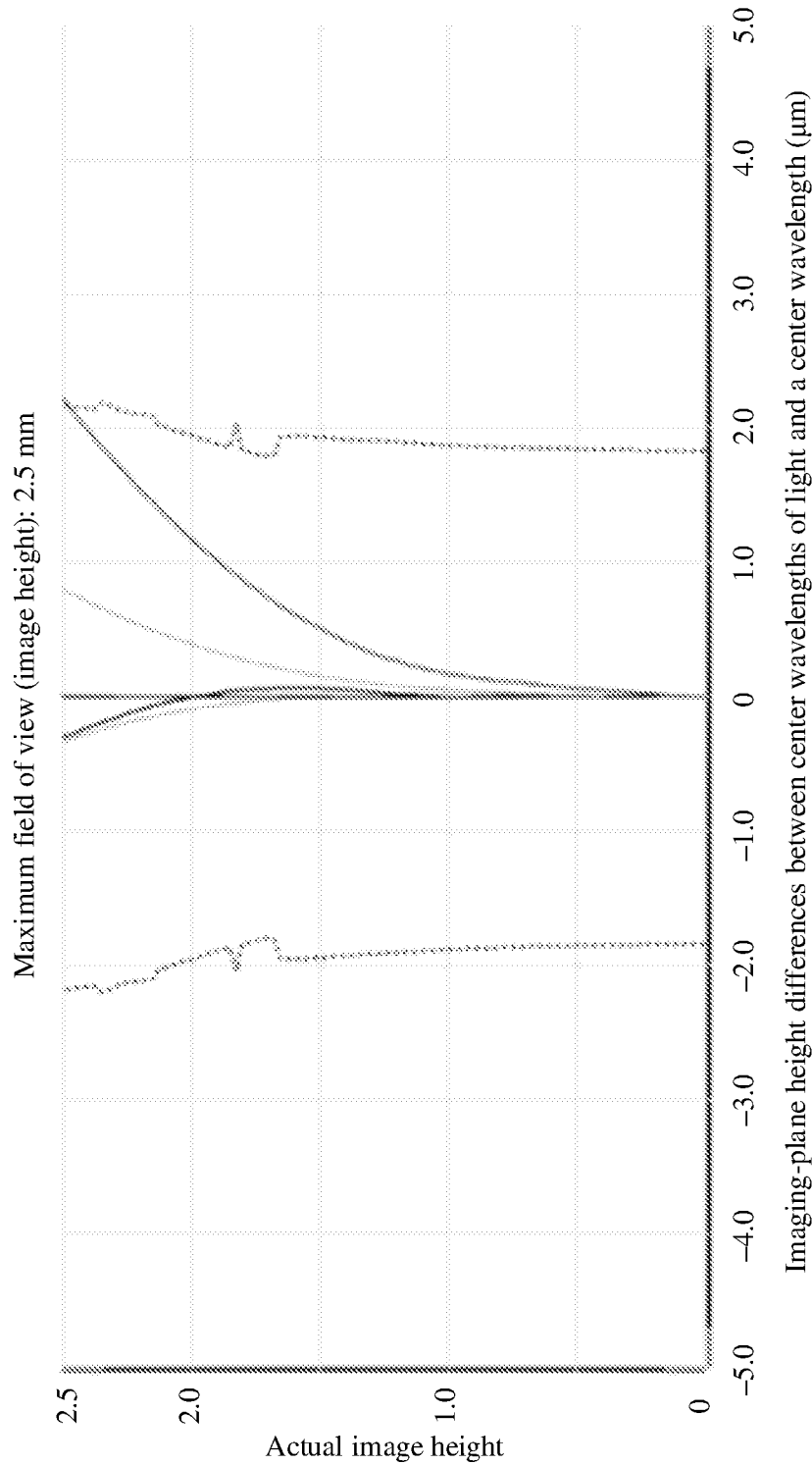
FIG. 40b shows example horizontal chromatic aberration curves of the zoom lens shown in FIG. 37 in an M1 state.

FIG. 40b shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 40b that, horizontal chromatic aberrations of the five curves each fall within the diffraction limit.

Figure 40C:
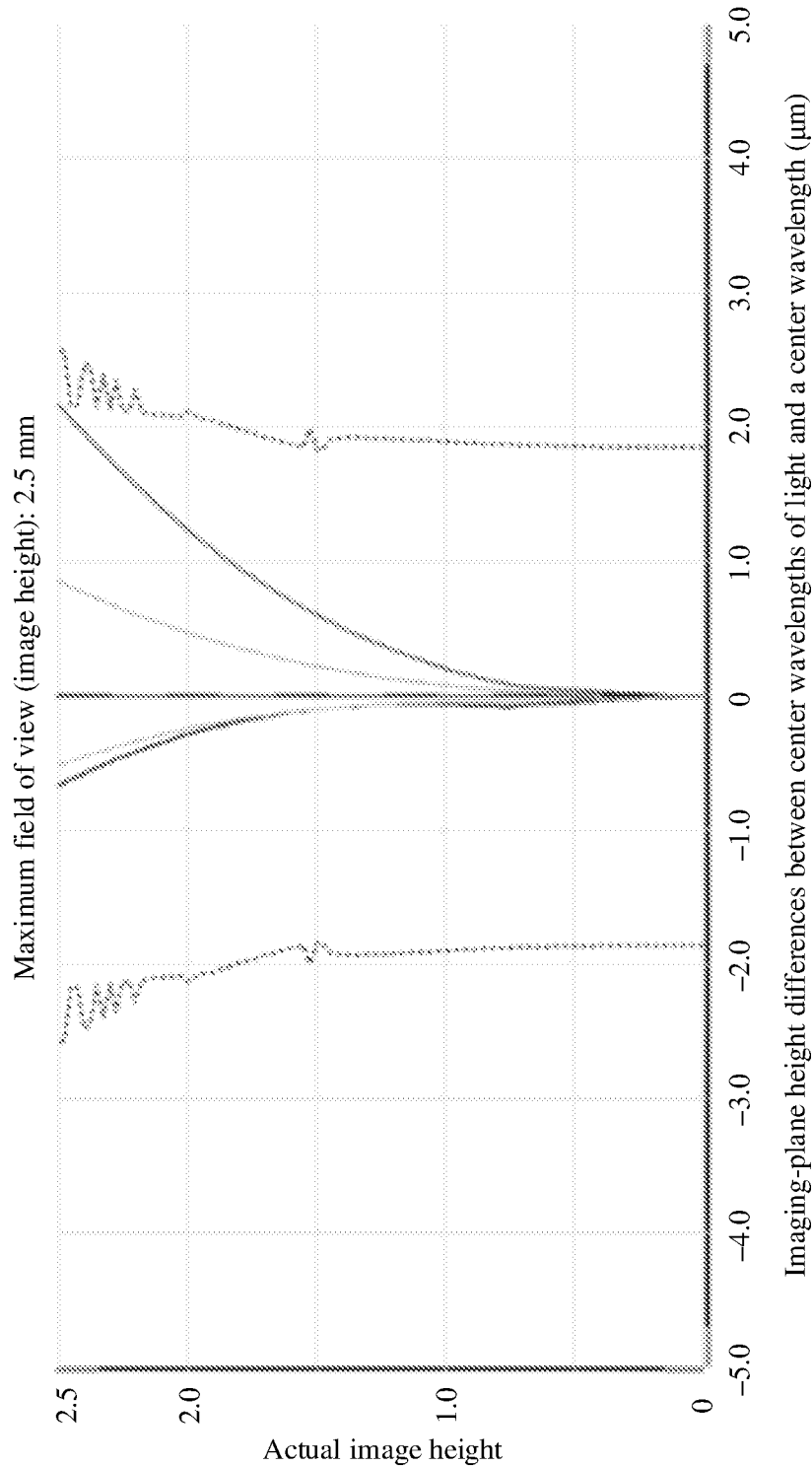
FIG. 40c shows example horizontal chromatic aberration curves of the zoom lens shown in FIG. 37 in an M2 state.

FIG. 40c shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −3.0 to 3.0. It can be seen from FIG. 40c that, horizontal chromatic aberrations of the five curves each fall within the diffraction limit.

Figure 40D:
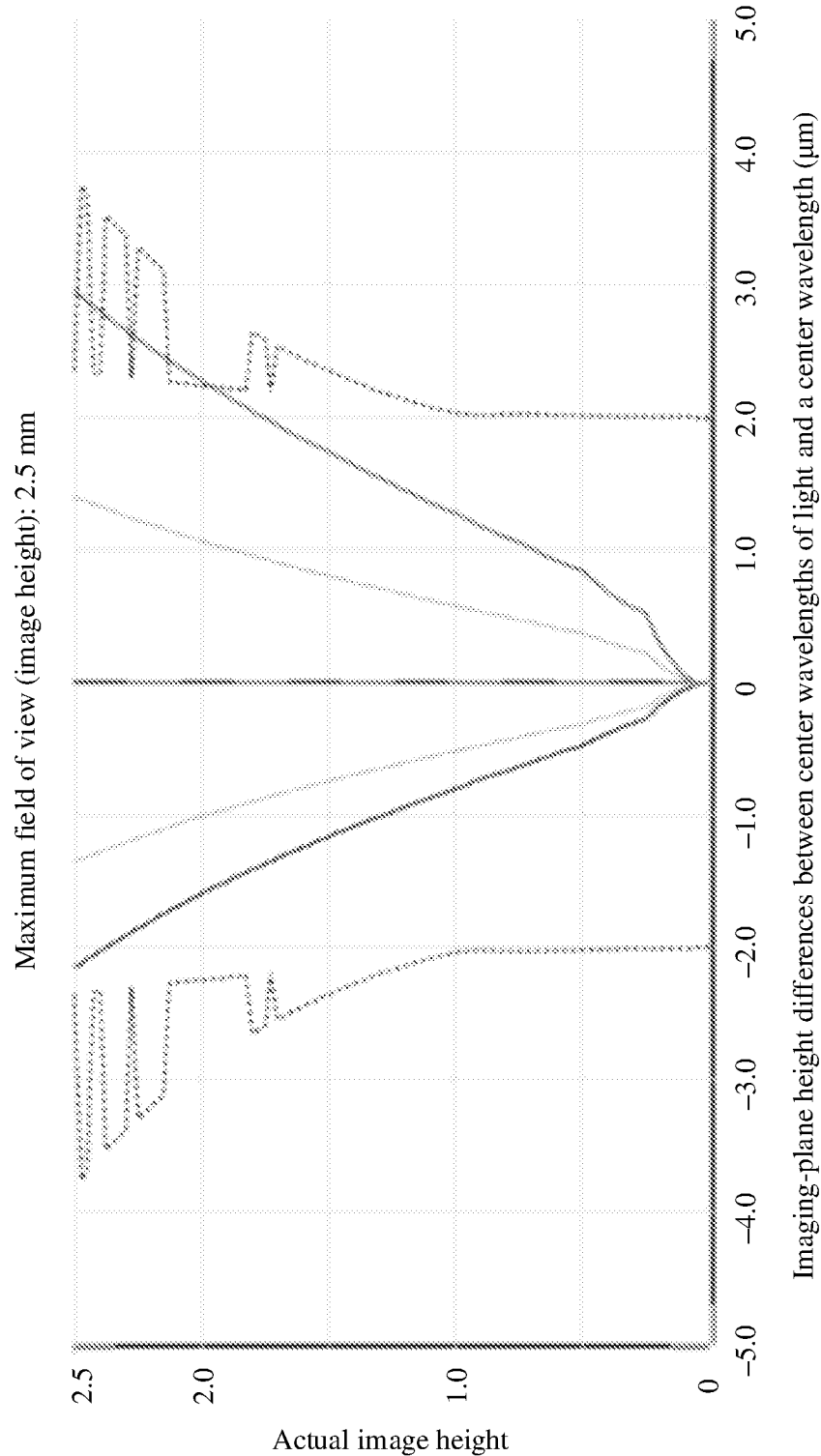
FIG. 40d shows example horizontal chromatic aberration curves of the zoom lens shown in FIG. 37 in a T state.

FIG. 40d shows horizontal chromatic aberration curves of the zoom lens in the T state. Five solid-line curves in the figure are color light with the wavelengths of 650 nm, 610 nm, 555 nm, 510 nm, and 470 nm, respectively. Dashed lines indicate that a diffraction limit ranges from −2.5 to 2.5. It can be seen from FIG. 40d that, horizontal chromatic aberrations of the five curves each fall within the diffraction limit.

Figure 41A:
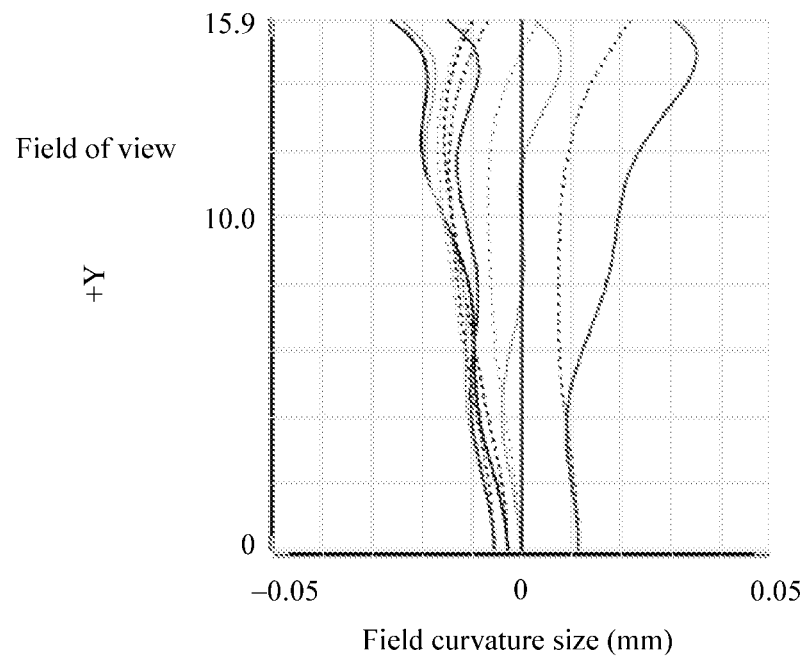
FIG. 41a shows example distortion curves of the zoom lens shown in FIG. 37 in a W state.
Figure 41B:
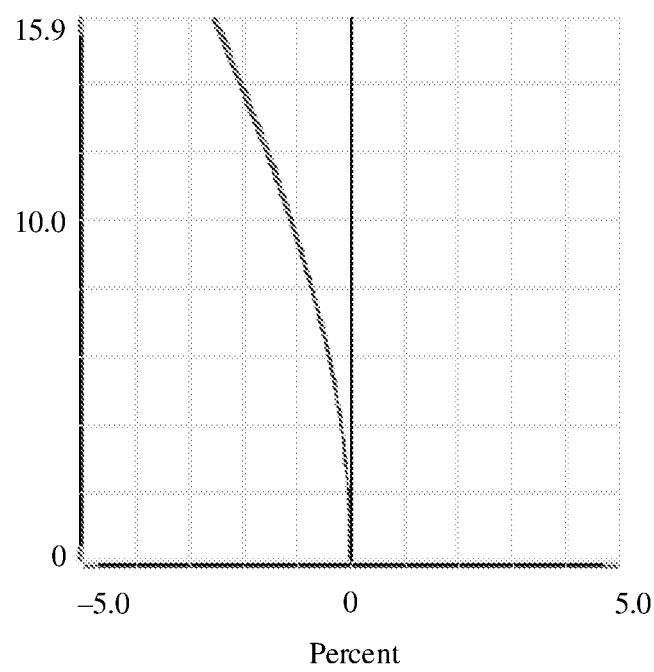
FIG. 41b shows an example optical distortion percentage of the zoom lens shown in FIG. 37 in a W state.

FIG. 41a shows distortion curves of the zoom lens in the W state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 41a that, the difference between the imaging deformation and the ideal shape is very small. FIG. 41b can be obtained by performing percentage calculation on the imaging deformation and the ideal shape of the light in FIG. 41a. It can be seen from FIG. 41b that, the zoom lens controls an optical distortion within a range of less than 5%.

Figure 42A:
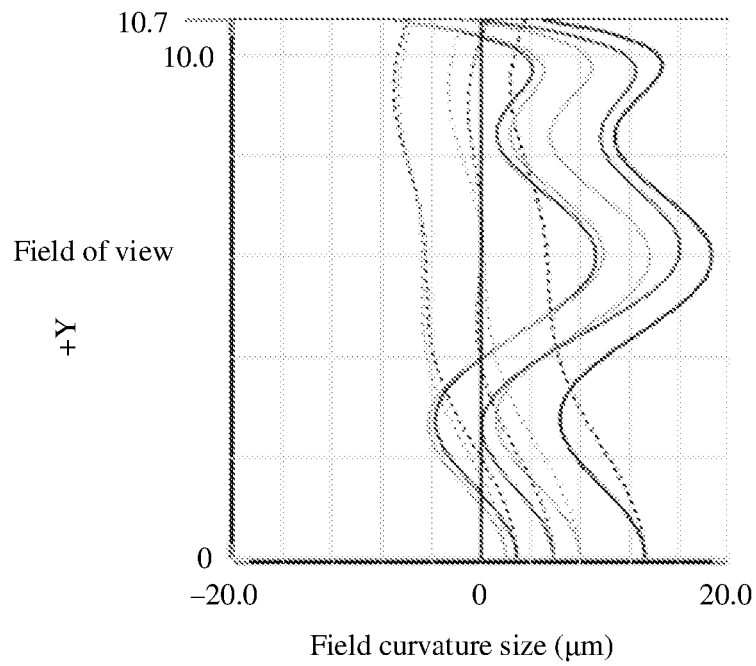
FIG. 42a shows example distortion curves of the zoom lens shown in FIG. 37 in an M1 state.
Figure 42B:
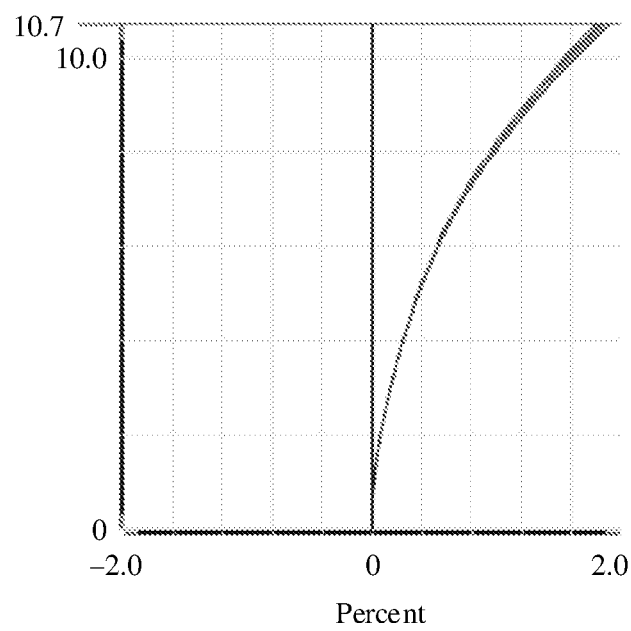
FIG. 42b shows an example optical distortion percentage of the zoom lens shown in FIG. 37 in an M1 state.

FIG. 42a shows distortion curves of the zoom lens in the M1 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 42a that, the difference between the imaging deformation and the ideal shape is very small. FIG. 42b can be obtained by performing percentage calculation on the imaging deformation and the ideal shape of the light in FIG. 42a. It can be seen from FIG. 42b that, the zoom lens controls an optical distortion within a range of less than 2%.

Figure 43A:
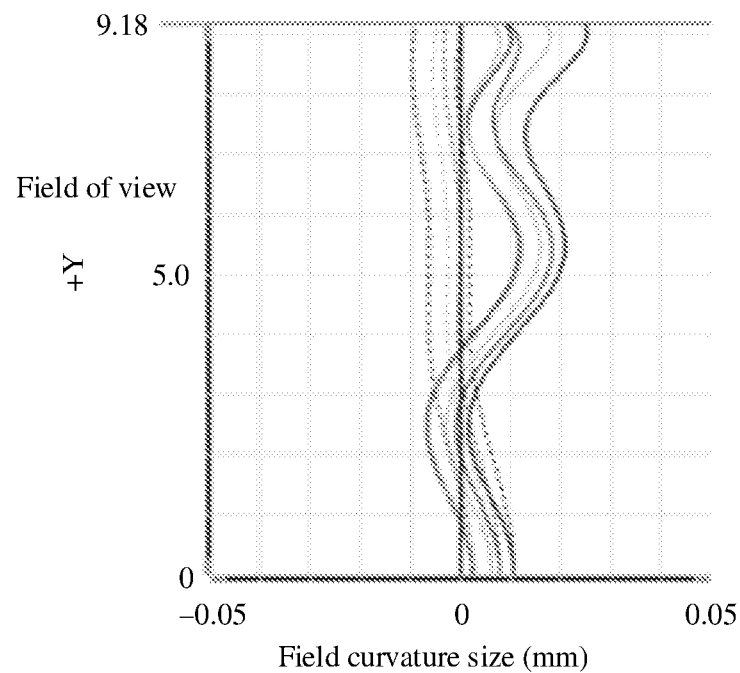
FIG. 43a shows example distortion curves of the zoom lens shown in FIG. 37 in an M2 state.
Figure 43B:
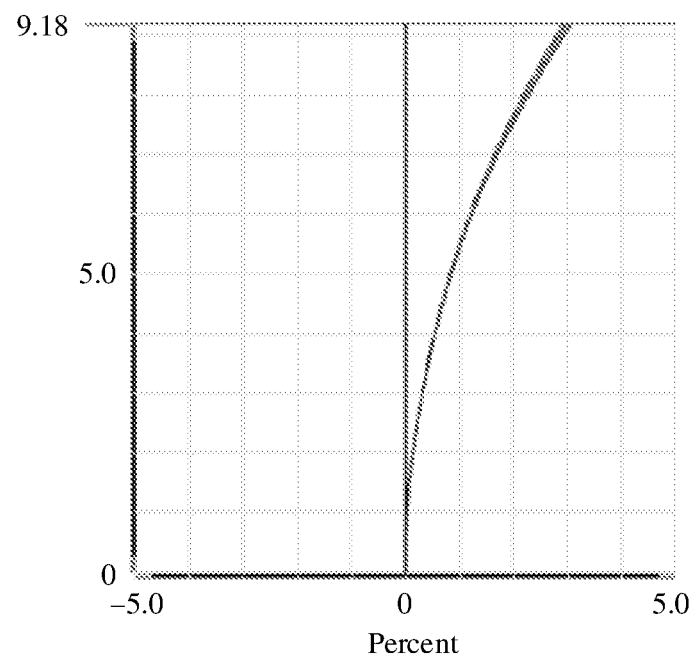
FIG. 43b shows an example optical distortion percentage of the zoom lens shown in FIG. 37 in an M2 state.

FIG. 43a shows distortion curves of the zoom lens in the M2 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 43a that, the difference between the imaging deformation and the ideal shape is very small. FIG. 43b can be obtained by performing percentage calculation on the imaging deformation and the ideal shape of the light in FIG. 43a. It can be seen from FIG. 43b that, the zoom lens controls an optical distortion within a range of less than 5%.

Figure 44A:
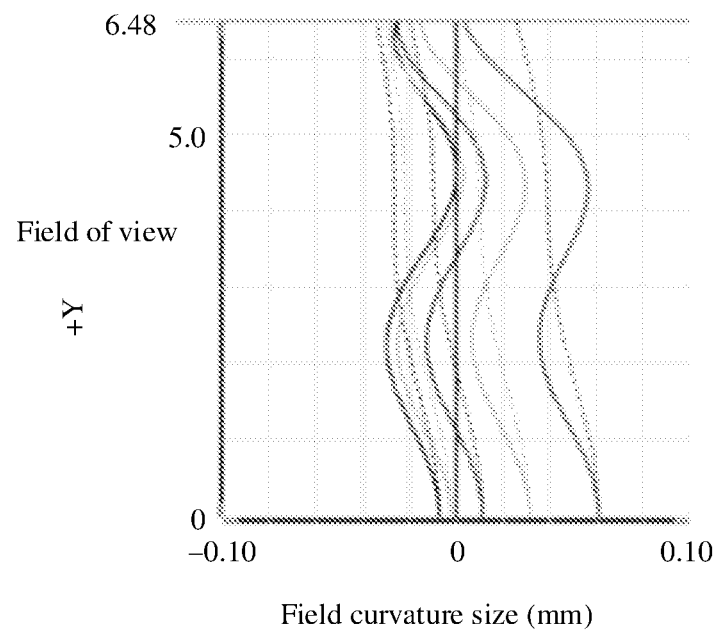
FIG. 44a shows example distortion curves of the zoom lens shown in FIG. 37 in a T state.
Figure 44B:
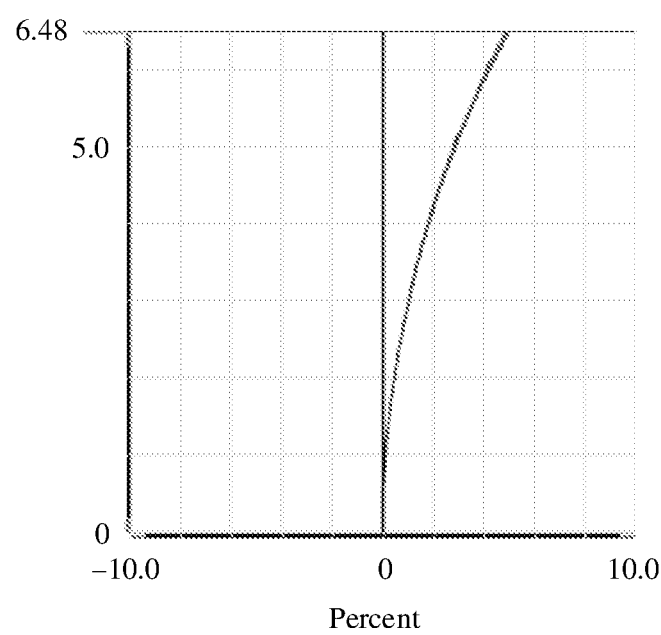
FIG. 44b shows an example optical distortion percentage of the zoom lens shown in FIG. 37 in a T state.

FIG. 44a shows distortion curves of the zoom lens in the T state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 44a that, the difference between the imaging deformation and the ideal shape is very small. FIG. 44b can be obtained by performing percentage calculation on the imaging deformation and the ideal shape of the light in FIG. 44a. It can be seen from FIG. 44b that, the zoom lens controls an optical distortion within a range of less than 5%.

Figure 45:
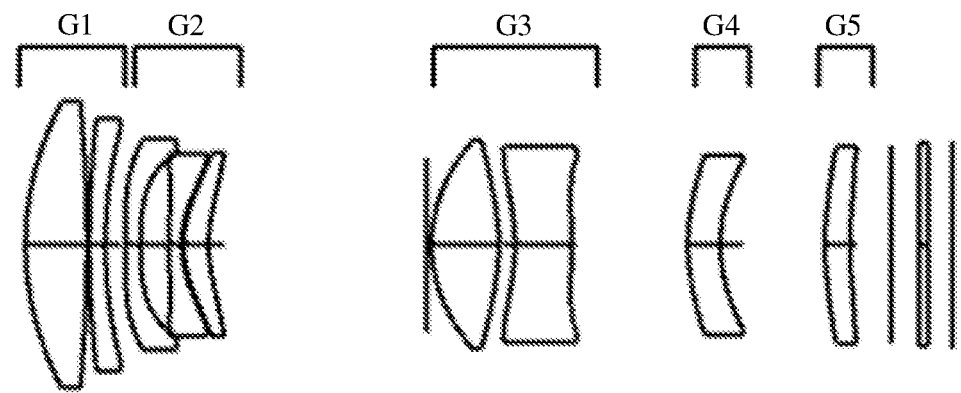
FIG. 45 shows an example sixth specific zoom lens.

FIG. 45 shows a sixth specific zoom lens. Starting from an object side, sequentially, lens groups meet the following: a ratio of a focal length f1 of a first lens group G1 with a positive focal power to an effective focal length ft of the zoom lens at a telephoto end is |f1/ft|=0.79; a ratio of a focal length f2 of a second lens group G2 with a negative focal power to the effective focal length ft of the zoom lens at the telephoto end is |f2/ft|=0.26; a ratio of a focal length f3 of a third lens group G3 with a positive focal power to the effective focal length ft of the zoom lens at the telephoto end is |f3/ft|=0.30; a ratio of a focal length f4 of a fourth lens group G4 with a negative focal power to the effective focal length ft of the zoom lens at the telephoto end is |f4/ft|=1.26; and a ratio of a focal length f5 of a fifth lens group G5 with a positive focal power to the effective focal length ft of the zoom lens at the telephoto end is |f5/ft|=2.58.

Still referring to FIG. 37, the zoom lens includes 9 lenses with a focal power and includes 16 aspheric surfaces. The aspheric surface is a surface type of a lens surface. The first lens group G1 includes 2 lenses, and the 2 lenses respectively have a positive focal power and a negative focal power along a direction from the object side to an image side. The second lens group G2 includes 3 lenses, and the 3 lenses respectively have a negative focal power, a negative focal power, and a positive focal power along the direction from the object side to the image side. The third lens group G3 includes 2 lenses, and the 2 lenses respectively have a positive focal power and a negative focal power along the direction from the object side to the image side. The fourth lens group G4 includes 1 lens with a negative focal power. The fifth lens group G5 includes 1 lens with a positive focal power. The first lens group G1 and the third lens group G3 each include at least one lens with a negative focal power. A maximum clear aperture of the lenses in the first lens group G1, the second lens group G2, the third lens group G3, the fourth lens group G4, and the fifth lens group G5 is 7.1 mm. Table 6a lists a curvature, a thickness, a refractive index, and an Abbe coefficient of each lens in the zoom lens in a wide-angle state. Table 6b lists an aspheric coefficient of each lens.

TABLE 6a

| | R | | Thickness | | nd | vd |
|---|---|---|---|---|---|---|
| R1 | 7.42 | d1 | 1.52 | n1 | 1.59 | v1 | 67.0 |
| R2 | −36.84 | a1 | 0.06 | | | | |
| R3 | 28.18 | d2 | 0.40 | n2 | 1.82 | v2 | 24.1 |
| R4 | 11.59 | a2 | 0.52 | | | | |
| R5 | −21.51 | d3 | 0.35 | n3 | 1.54 | v3 | 56.0 |
| R6 | 9.29 | a3 | 0.70 | | | | |
| R7 | 7.91 | d4 | 0.32 | n4 | 1.54 | v4 | 56.0 |
| R8 | 2.48 | a4 | 0.06 | | | | |
| R9 | 2.60 | d5 | 0.62 | n5 | 1.67 | v5 | 19.2 |
| R10 | 3.41 | a5 | 5.53 | | | | |
| R11 | 3.64 | d6 | 1.67 | n6 | 1.54 | v6 | 56.0 |
| R12 | −5.66 | a6 | 0.40 | | | | |
| R13 | −5.15 | d7 | 1.40 | n7 | 1.67 | v7 | 19.2 |
| R14 | −20.28 | a7 | 2.90 | | | | |
| R15 | 5.26 | d8 | 0.80 | n8 | 1.54 | v8 | 56.0 |
| R16 | 3.68 | a8 | 2.60 | | | | |
| R17 | 6.87 | d9 | 0.62 | n9 | 1.67 | v9 | 19.2 |
| R18 | 8.07 | a9 | 1.72 | | | | |

TABLE 6b

| | Type | A2 | A3 | A4 | A5 | A6 | A7 |
|---|---|---|---|---|---|---|---|
| R1 | Even aspheric surface | −9.87E−05 | −4.60E−06 | −2.93E−07 | 5.55E−08 | −2.90E−09 | 0.00E+00 |
| R2 | Even aspheric surface | 1.73E−04 | −1.15E−05 | 1.06E−06 | −4.65E−08 | 0.00E+00 | 0.00E+00 |
| R5 | Even aspheric surface | 1.99E−02 | −1.87E−03 | 2.18E−04 | −1.90E−05 | 2.16E−07 | 0.00E+00 |
| R6 | Even aspheric surface | 1.34E−02 | 1.72E−03 | −3.27E−04 | 7.31E−05 | −4.94E−07 | 0.00E+00 |
| R7 | Even aspheric surface | −2.98E−02 | 4.22E−03 | −5.99E−05 | −1.83E−05 | −2.65E−07 | 0.00E+00 |
| R8 | Even aspheric surface | −2.01E−02 | −2.29E−03 | 4.40E−04 | 1.45E−06 | −1.56E−05 | 0.00E+00 |
| R9 | Even aspheric surface | −2.10E−02 | −2.18E−04 | −9.29E−06 | −3.05E−05 | 2.92E−06 | 0.00E+00 |
| R10 | Even aspheric surface | −3.08E−02 | 5.00E−03 | −6.65E−04 | −2.20E−05 | 1.19E−05 | 0.00E+00 |
| R11 | Even aspheric surface | −8.81E−04 | −2.43E−05 | −2.13E−05 | 4.97E−06 | −7.52E−07 | 0.00E+00 |
| R12 | Even aspheric surface | 5.10E−03 | 6.47E−05 | −5.52E−06 | −2.87E−06 | 9.24E−08 | 0.00E+00 |
| R13 | Even aspheric surface | 7.99E−03 | 4.74E−04 | −8.94E−05 | 7.32E−06 | 0.00E+00 | 0.00E+00 |
| R14 | Even aspheric surface | 6.75E−03 | 7.90E−04 | −7.37E−05 | 2.15E−05 | 0.00E+00 | 0.00E+00 |
| R15 | Even aspheric surface | −3.91E−03 | 1.23E−04 | −2.95E−05 | 2.01E−06 | 1.72E−12 | 0.00E+00 |
| R16 | Even aspheric surface | −5.72E−03 | 2.36E−04 | −6.91E−05 | 3.74E−06 | −1.76E−12 | 0.00E+00 |
| R17 | Even aspheric surface | −1.12E−02 | 1.22E−03 | −3.76E−05 | 3.16E−06 | 0.00E+00 | 0.00E+00 |
| R18 | Even aspheric surface | −1.41E−02 | 1.70E−03 | −1.02E−04 | 8.59E−06 | 0.00E+00 | 0.00E+00 |

In the 16 aspheric surfaces of the zoom lens shown in FIG. 45, a surface type z of each of the even aspheric surfaces may be defined by, including but not limited to, the following aspheric surface formula:

$$z = \frac{cr^2}{1+\sqrt{1 | Kc^2r^2}} + A_2r^4 + A_3r^6 + A_4r^8 + A_5r^{10} + A_6r^{12} + A_7r^{14}$$

z is a vector height of the aspheric surface, r is a radial coordinate of the aspheric surface, c is a spherical curvature of a vertex of the aspheric surface, and K is a conic constant. In this embodiment, a value of K is 0, and A2, A3, A4, A5, A6, and A7 are aspheric coefficients.

Still referring to FIG. 45, for the zoom lens, a ratio of its total track length to its effective focal length at the telephoto end (TTL/ft) is 1.05, and a ratio of its image height to its effective focal length at the telephoto end (IMH/ft) is 0.117. In FIG. 45, the zoom lens further has a stop (not shown in the figure). The stop is located on an object side of the third lens group G3, and certainly may alternatively be arranged in another lens group. For example, the stop is arranged on an object side or an image side of the first lens group G1 or the fifth lens group G5, or is arranged on an object side or an image side of the second lens group G2 or the fourth lens group G4.

As shown in FIG. 45, locations of the first lens group G1, the third lens group G3, and the fifth lens group G5 are fixed relative to an imaging plane, and the second lens group G2 and the fourth lens group G4 move along an optical axis to implement zooming.

Figure 46:
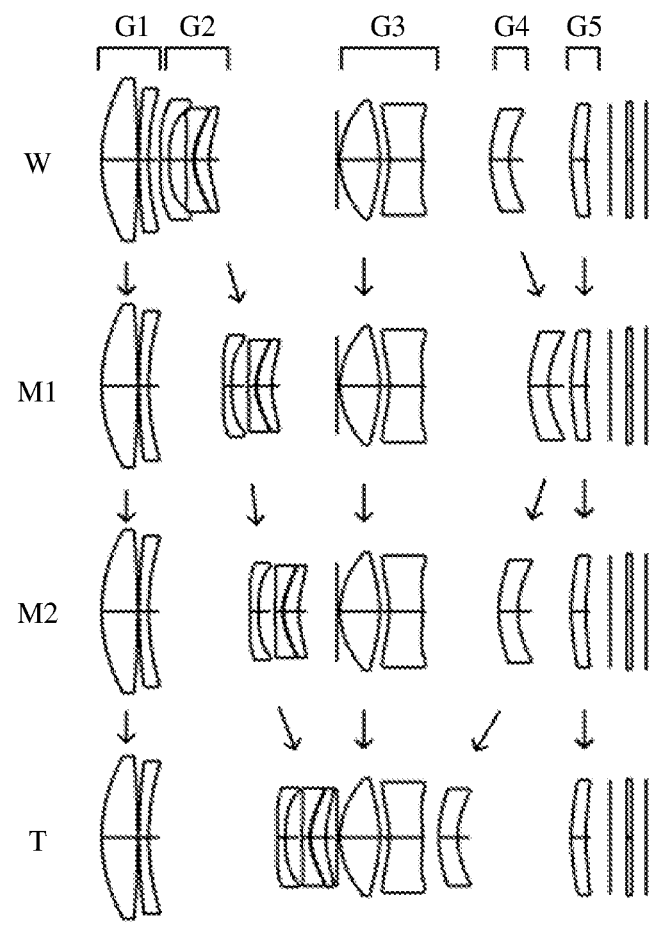
FIG. 46 shows an example zoom process of a zoom lens.

FIG. 46 shows a zoom process of the zoom lens. The zoom lens has four focal length states: W represents a wide-angle end state, M1 represents a first intermediate focal length state, M2 represents a second intermediate focal length state, and T represents a telephoto state. Relative locations of the lens groups corresponding to the W state of the zoom lens are as follows: the second lens group G2 is close to the image side of the first lens group G1, and the fourth lens group G4 is close to an image side of the fifth lens group G5. Upon zooming from the wide-angle end state W to the first intermediate focal length state M1, the second lens group G2 moves towards the third lens group G3, and the fourth lens group G4 moves towards the fifth lens group G5. Upon zooming from the first intermediate focal length state M1 to the second intermediate focal length state M2, the second lens group G2 moves towards the third lens group G3, and the fourth lens group G4 moves towards the third lens group G3. Upon zooming from the first intermediate focal length state M1 to the telephoto state T, the second lens group G2 moves towards the third lens group G3, and the fourth lens group G4 moves towards the third lens group G3.

It can be seen from FIG. 46 that, when the zoom lens is zoomed from the wide-angle state to the telephoto state, the second lens group G2 moves towards an image space (close to the third lens group G3), and a distance between the fourth lens group G4 and the third lens group G3 first increases and then decreases. Upon zooming from the wide-angle state to the telephoto state, a ratio of a movement stroke of the second lens group G2 along the optical axis to the TTL is 0.21, and a ratio of a movement stroke of the fourth lens group G4 along the optical axis to the TTL is 0.17. Correspondingly, reference can be made to Table 6c and Table 6d. Table 6c lists basic parameters of the zoom lens, and Table 6d lists distances between the lens groups in cases that the zoom lens is in the W, M1, M2, and T states.

TABLE 6c

|  | W | M1 | M2 | T |
| --- | --- | --- | --- | --- |
| Focal length F | 9.2 mm | 14 mm | 17.5 mm | 21.8 mm |
| F number | 2.673 | 2.674 | 2.663 | 3.073 |
| Image height IMH | 2.55 mm | 2.55 mm | 2.55 mm | 2.55 mm |
| Half FOV | 15.7° | 10.23° | 8.13° | 6.53° |
| BFL | 2.53 mm | 2.53 mm | 2.53 mm | 2.53 mm |
| TTL | 23.0 mm | 23.0 mm | 23.0 mm | 23.0 mm |
| Designed wavelength | 650 nm, 610 nm, 555 nm, 510 nm, and 470 nm | | | |

TABLE 6d

|  | W | M1 | M2 | T |
| --- | --- | --- | --- | --- |
| a2 | 0.52 mm | 3.16 mm | 4.29 mm | 5.43 mm |
| a5 | 5.53 mm | 2.89 mm | 1.76 mm | 0.62 mm |
| a7 | 2.90 mm | 4.53 mm | 3.24 mm | 0.70 mm |
| a8 | 2.60 mm | 0.97 mm | 2.26 mm | 4.80 mm |

Simulation is performed on the zoom lens shown in FIG. 45. The following describes in detail simulation effects thereof with reference to accompanying drawings.

Figure 47A:
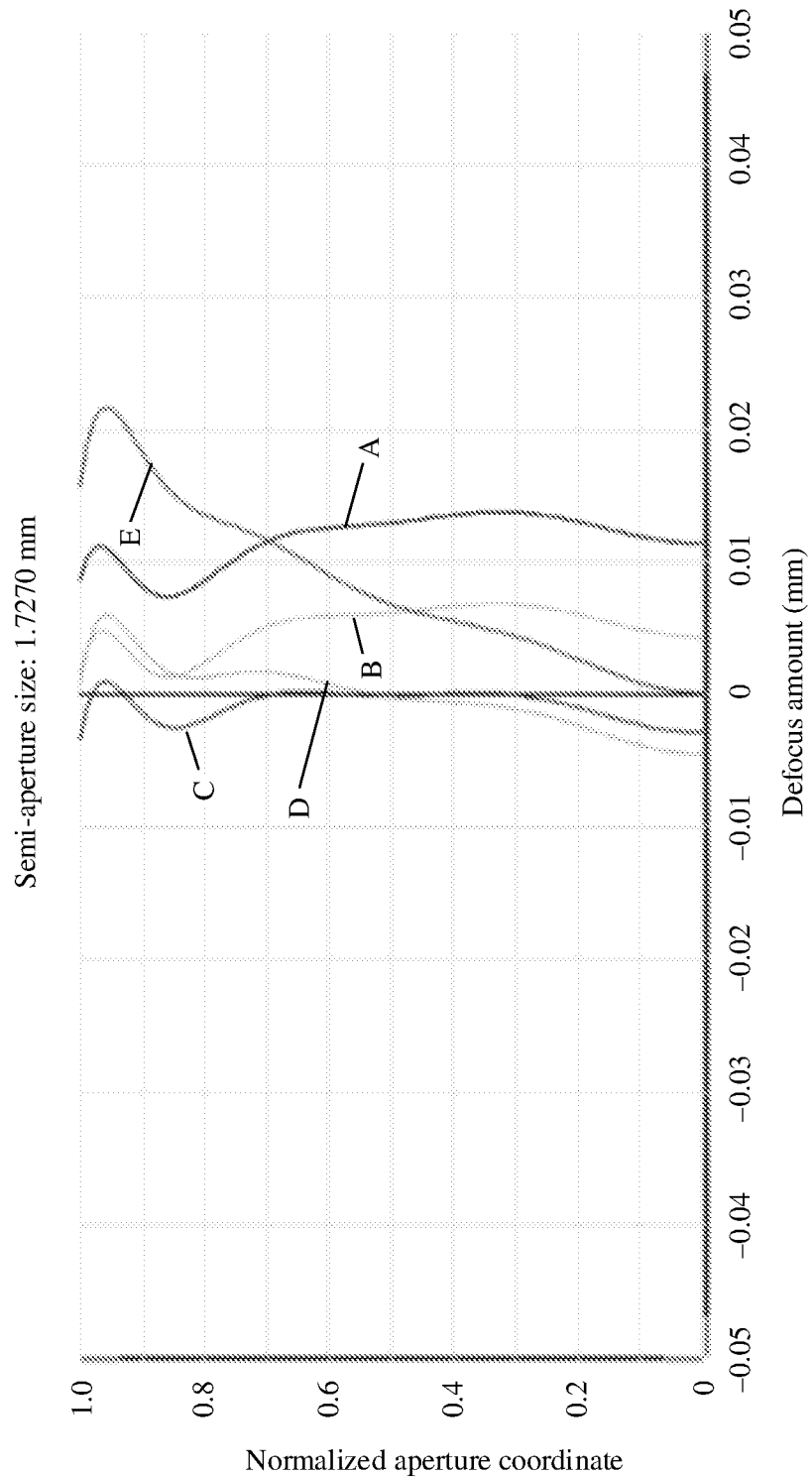
FIG. 47a shows example simulation results, of the zoom lens shown in FIG. 45 in a W state, of depth of focus locations for light with different wavelengths.

FIG. 47a shows simulation results, of the zoom lens shown in FIG. 45 in the W state, of depth of focus locations for light with the wavelengths of 650 nm, 610 nm, 555 nm, 510 nm, and 470 nm. A represents the light with the wavelength of 650 nm, and a defocus amount of the light A ranges from 0.008 mm to 0.015 mm. B represents the light with the wavelength of 610 nm, and a defocus amount of the light B ranges from 0.002 mm to 0.008 mm. C represents the light with the wavelength of 555 nm, and a defocus amount of the light C ranges from −0.004 mm to −0.002 mm. D represents the light with the wavelength of 510 nm, and a defocus amount of the light D ranges from −0.005 mm to 0.008 mm. E represents the light with the wavelength of 470 nm, and a defocus amount of the light E ranges from 0 mm to 0.023 mm.

Figure 47B:
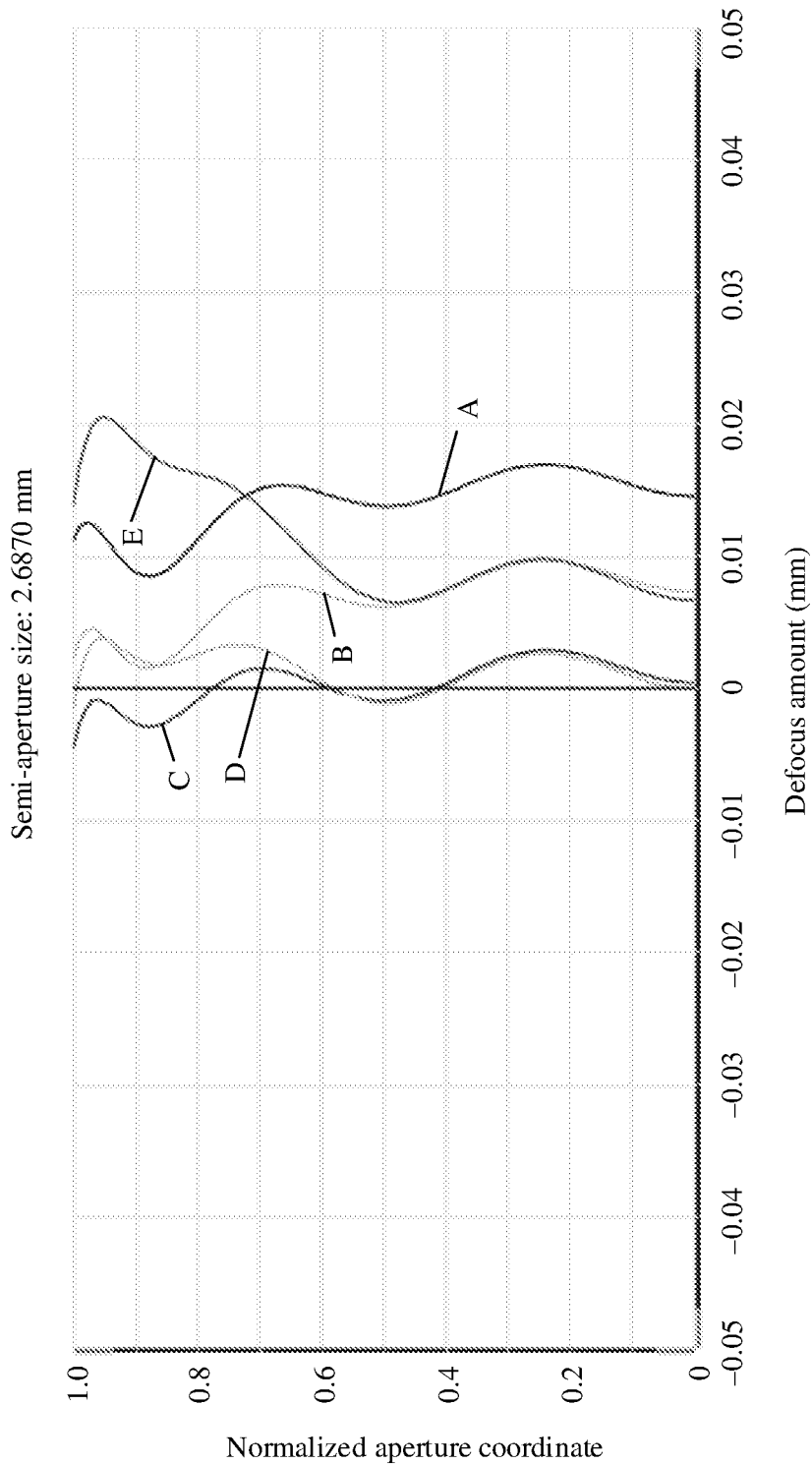
FIG. 47b shows example simulation results, of the zoom lens shown in FIG. 45 in an M1 state, of depth of focus locations for light with different wavelengths.

FIG. 47b shows simulation results, of the zoom lens shown in FIG. 45 in the M1 state, of depth of focus locations for light with the wavelengths of 650 nm, 610 nm, 555 nm, 510 nm, and 470 nm. A represents the light with the wavelength of 650 nm, and a defocus amount of the light A ranges from 0.008 mm to 0.022 mm. B represents the light with the wavelength of 610 nm, and a defocus amount of the light B ranges from 0.002 mm to 0.01 mm. C represents the light with the wavelength of 555 nm, and a defocus amount of the light C ranges from −0.004 mm to 0.004 mm. D represents the light with the wavelength of 510 nm, and a defocus amount of the light D ranges from −0.002 mm to 0.005 mm. E represents the light with the wavelength of 470 nm, and a defocus amount of the light E ranges from 0.006 mm to 0.022 mm.

Figure 47C:
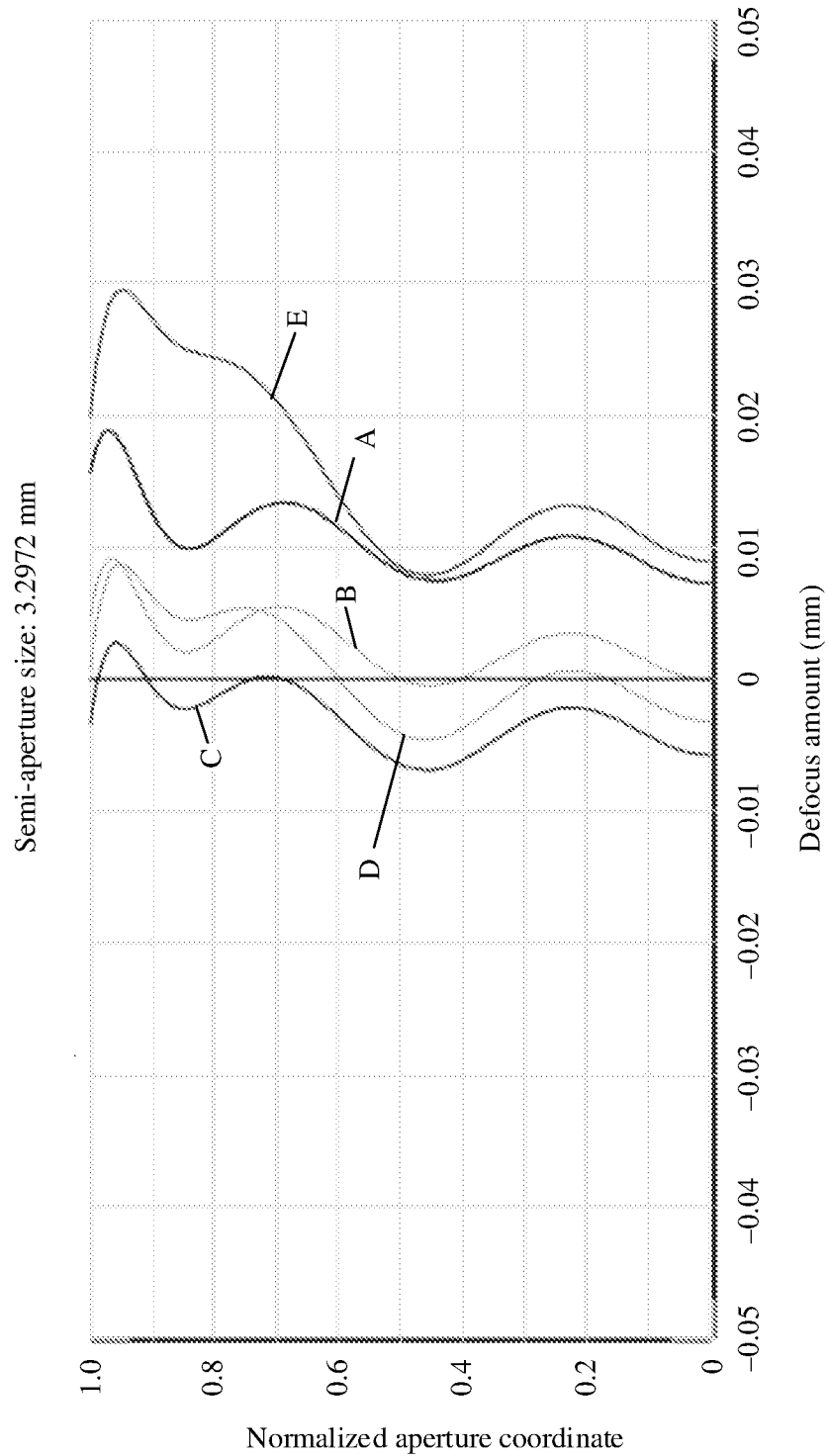
FIG. 47c shows example simulation results, of the zoom lens shown in FIG. 45 in an M2 state, of depth of focus locations for light with different wavelengths.

FIG. 47c shows simulation results, of the zoom lens shown in FIG. 45 in the M2 state, of depth of focus locations for light with the wavelengths of 650 nm, 610 nm, 555 nm, 510 nm, and 470 nm. A represents the light with the wavelength of 650 nm, and a defocus amount of the light A ranges from 0.008 mm to 0.018 mm. B represents the light with the wavelength of 610 nm, and a defocus amount of the light B ranges from −0.001 mm to 0.008 mm. C represents the light with the wavelength of 555 nm, and a defocus amount of the light C ranges from −0.008 mm to 0.004 mm. D represents the light with the wavelength of 510 nm, and a defocus amount of the light D ranges from −0.006 mm to 0.008 mm. E represents the light with the wavelength of 470 nm, and a defocus amount of the light E ranges from 0.008 mm to 0.029 mm.

Figure 47D:
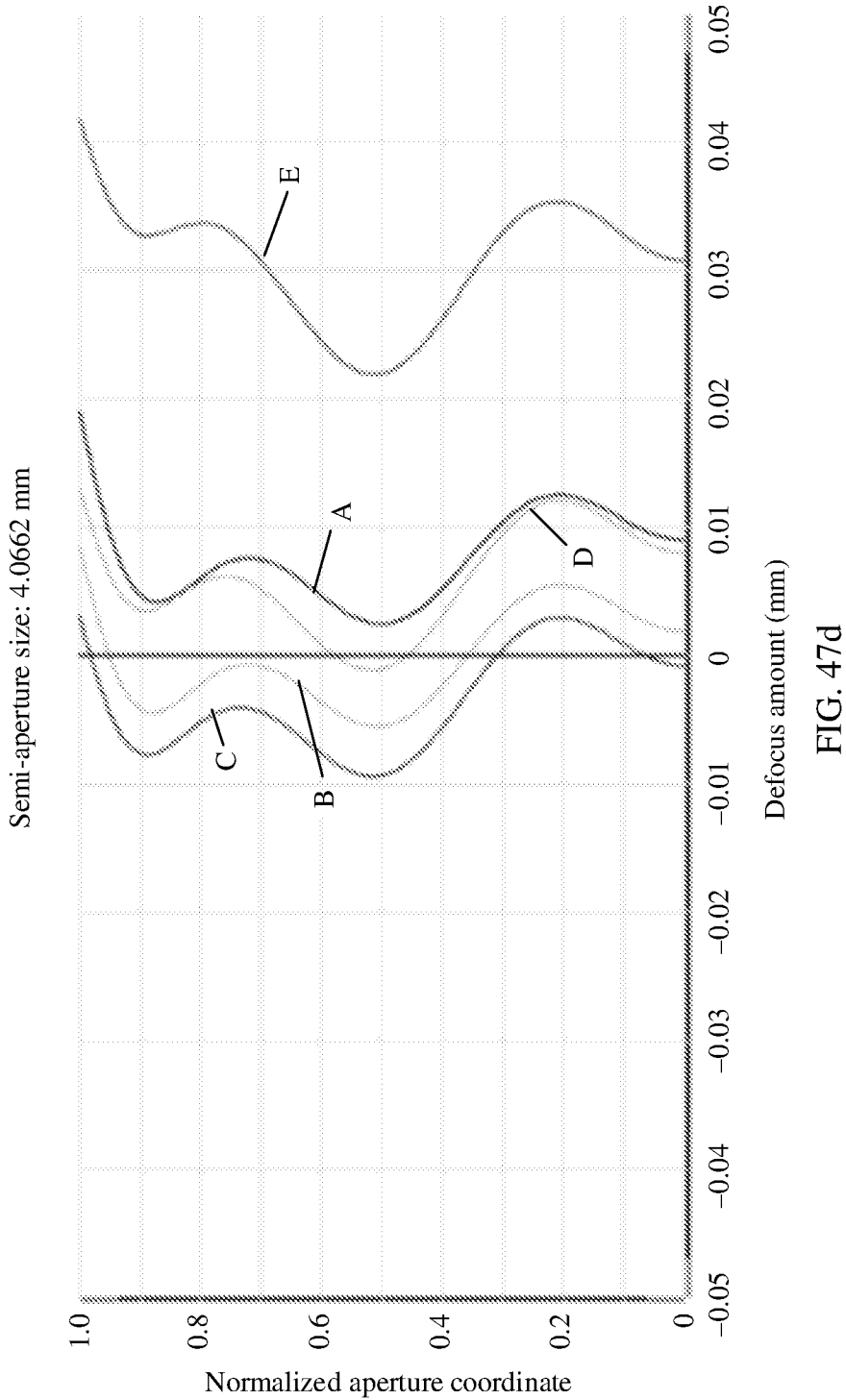
FIG. 47d shows example simulation results, of the zoom lens shown in FIG. 45 in a T state, of depth of focus locations for light with different wavelengths.

FIG. 47d shows simulation results, of the zoom lens shown in FIG. 45 in the telephoto state, of depth of focus locations for light with the wavelengths of 650 nm, 610 nm, 555 nm, 510 nm, and 470 nm. A represents the light with the wavelength of 650 nm, and a defocus amount of the light A ranges from 0.04 mm to 0.019 mm. B represents the light with the wavelength of 610 nm, and a defocus amount of the light B ranges from −0.006 mm to 0.008 mm. C represents the light with the wavelength of 555 nm, and a defocus amount of the light C ranges from −0.01 mm to 0.004 mm. D represents the light with the wavelength of 510 nm, and a defocus amount of the light D ranges from −0.002 mm to 0.12 mm. E represents the light with the wavelength of 470 nm, and a defocus amount of the light E ranges from 0.022 mm to 0.042 mm.

It can be seen from FIG. 47a, FIG. 47b, FIG. 47c, and FIG. 47d that, the defocus amounts of the light with the different wavelengths each fall within a very small range. An axial aberration of the zoom lens in each of the W, M1, M2, and T states is controlled within a very small range.

Figure 48A:
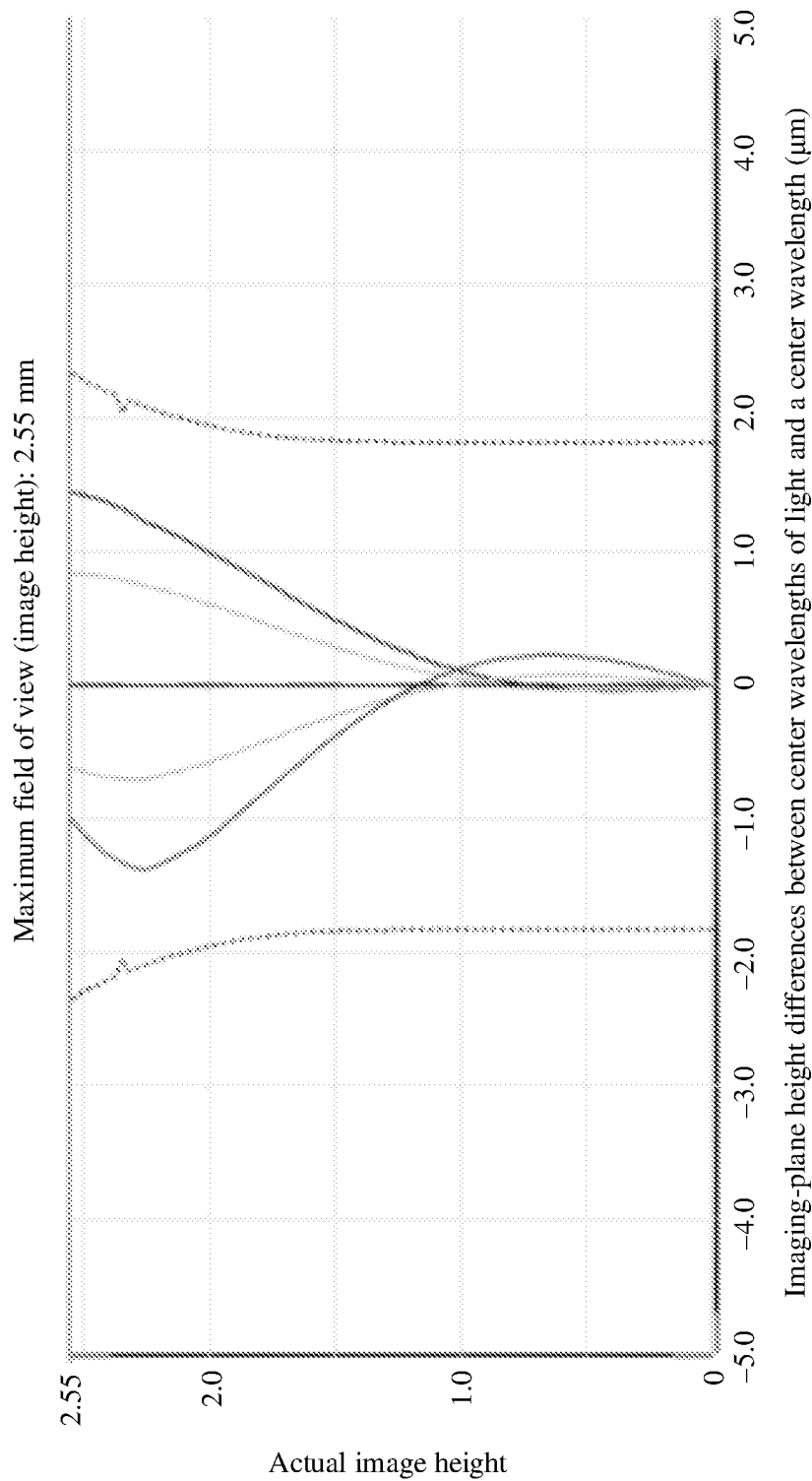
FIG. 48a shows example horizontal chromatic aberration curves of the zoom lens shown in FIG. 45 in a W state.

FIG. 48a shows horizontal chromatic aberration curves of the zoom lens in the W state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 48a that, horizontal chromatic aberrations of the five curves each substantially fall within the diffraction limit.

Figure 48B:
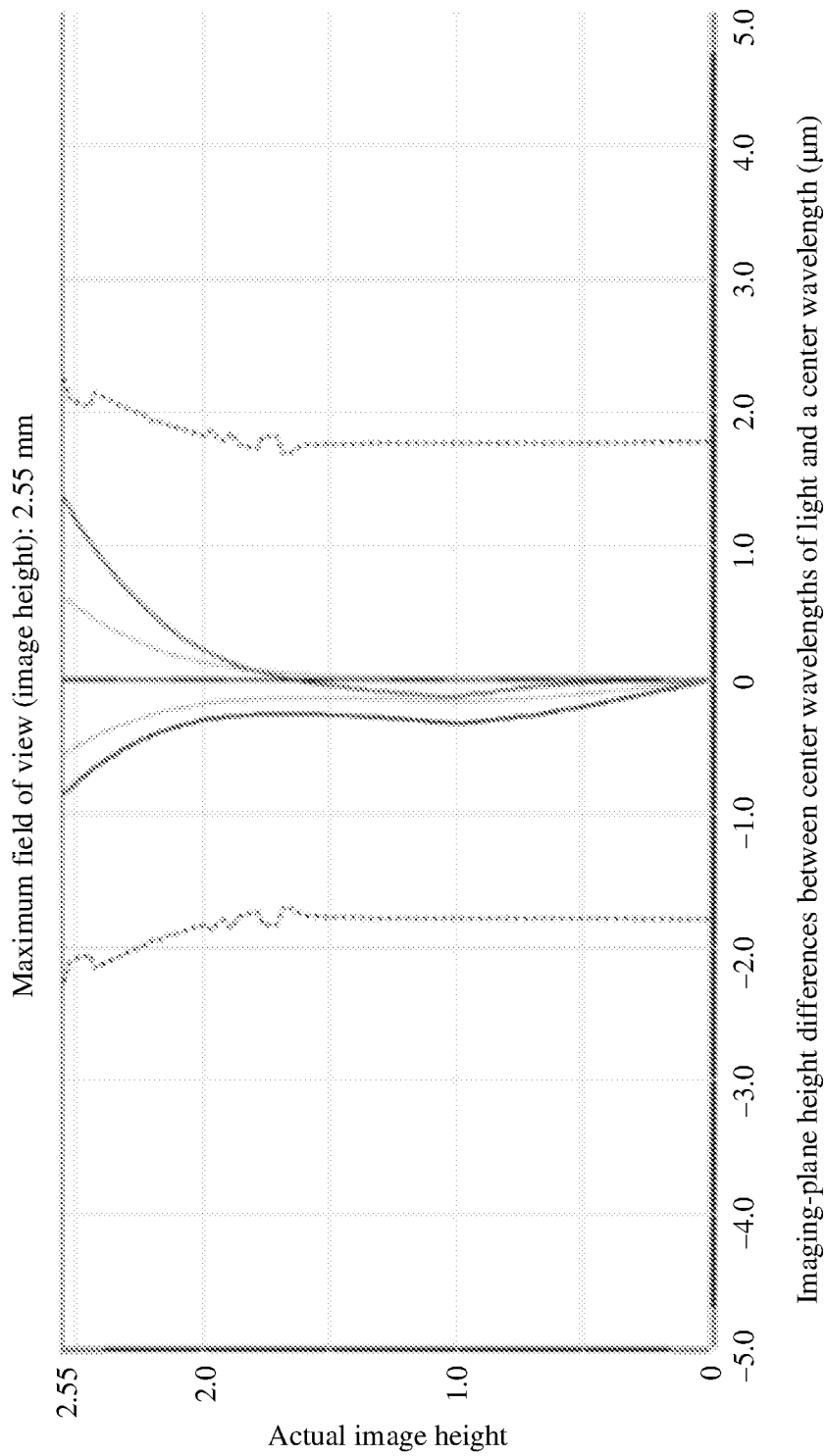
FIG. 48b shows example horizontal chromatic aberration curves of the zoom lens shown in FIG. 45 in an M1 state.

FIG. 48b shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 48b that, horizontal chromatic aberrations of the five curves each fall within the diffraction limit.

Figure 48C:
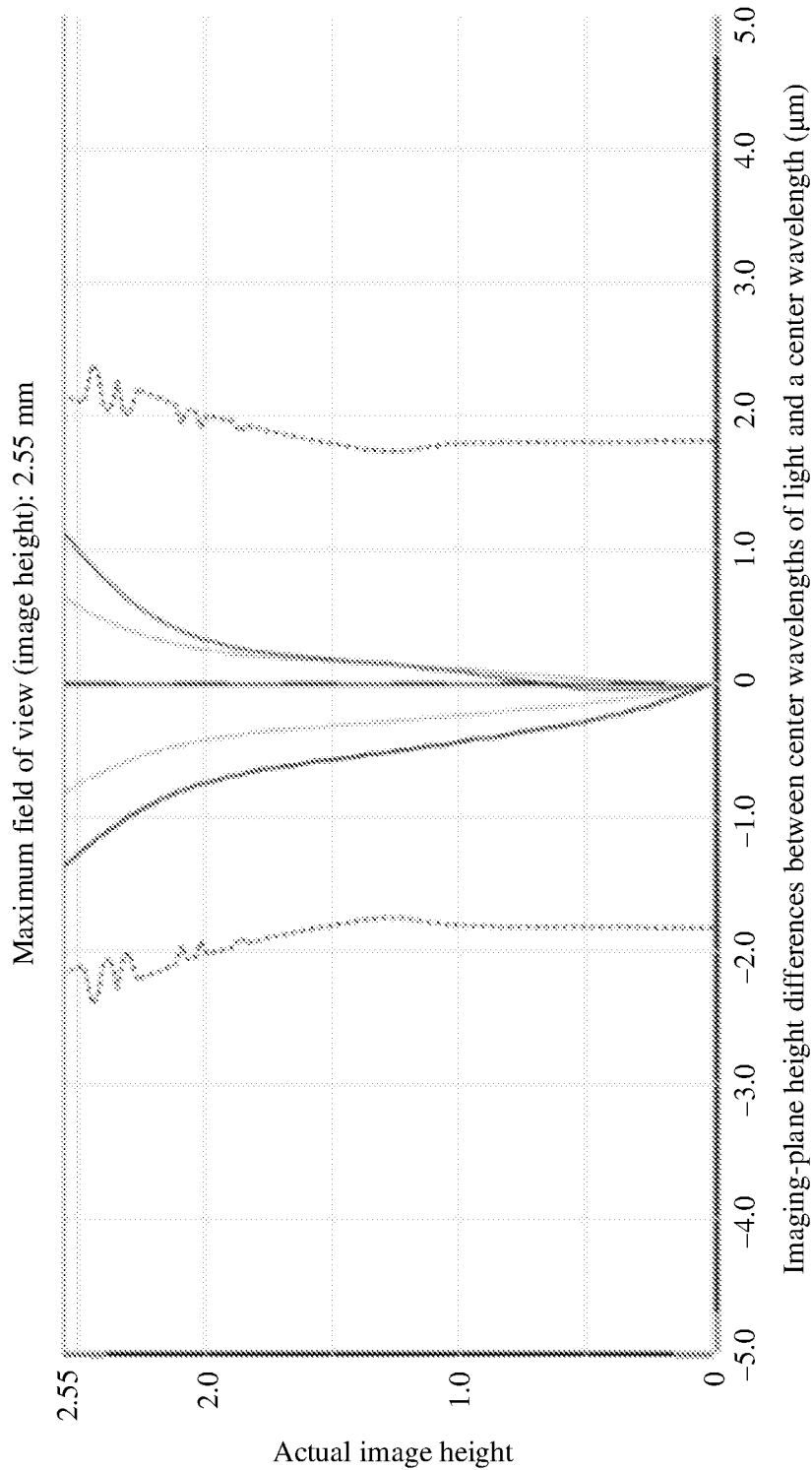
FIG. 48c shows example horizontal chromatic aberration curves of the zoom lens shown in FIG. 45 in an M2 state.

FIG. 48c shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 48c that, horizontal chromatic aberrations of the five curves each fall within the diffraction limit.

Figure 48D:
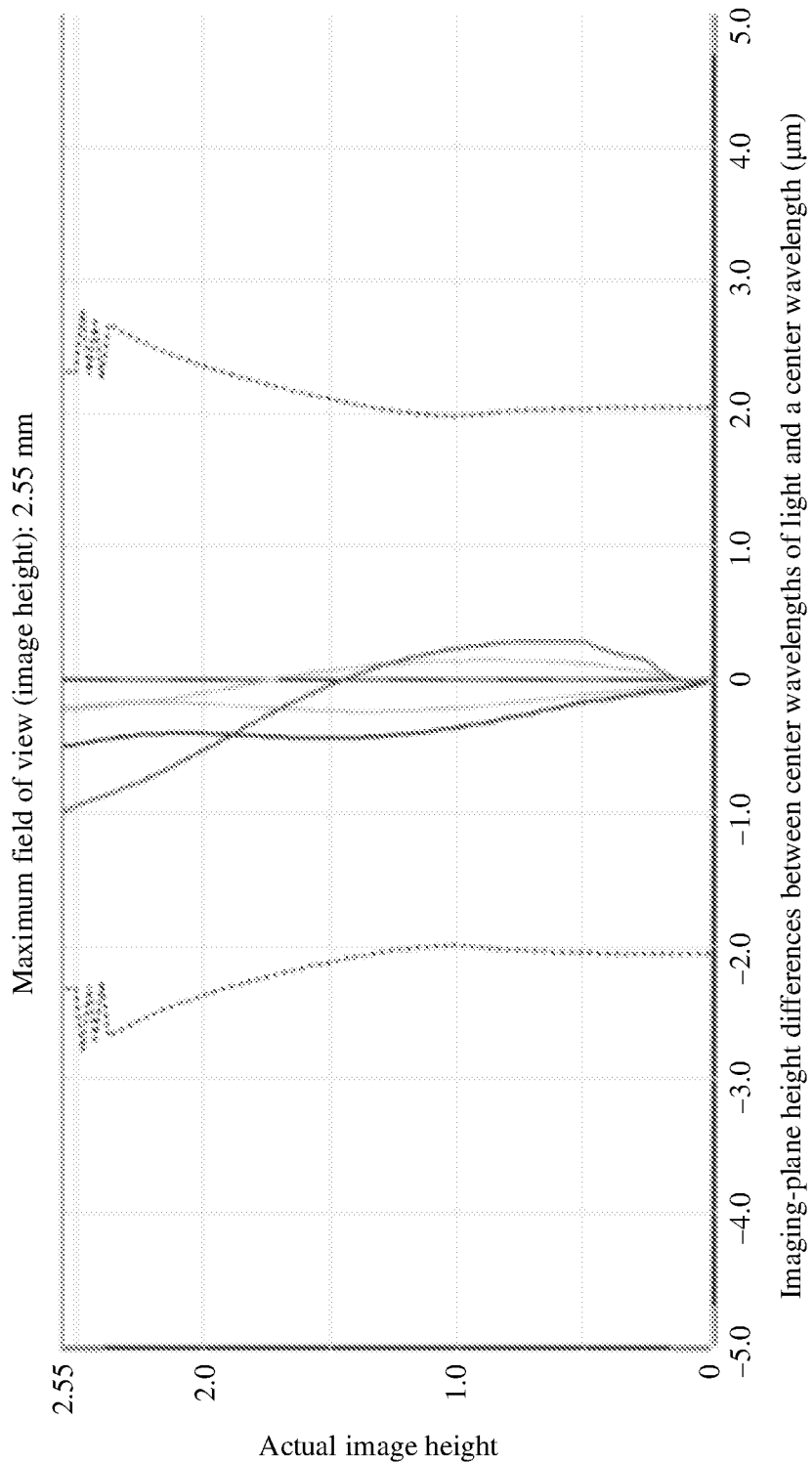
FIG. 48d shows example horizontal chromatic aberration curves of the zoom lens shown in FIG. 45 in a T state.

FIG. 48d shows horizontal chromatic aberration curves of the zoom lens in the T state. Five solid-line curves in the figure are color light with the wavelengths of 650 nm, 610 nm, 555 nm, 510 nm, and 470 nm, respectively. Dashed lines indicate that a diffraction limit ranges from −2.5 to 2.5. It can be seen from FIG. 48d that, horizontal chromatic aberrations of the five curves each fall within the diffraction limit.

Figure 49A:
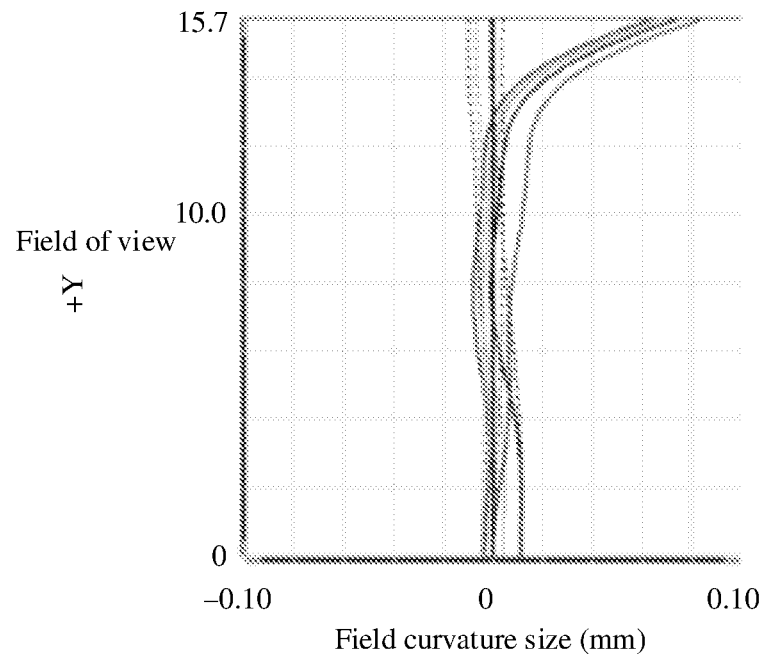
FIG. 49a shows example distortion curves of the zoom lens shown in FIG. 45 in a W state.
Figure 49B:
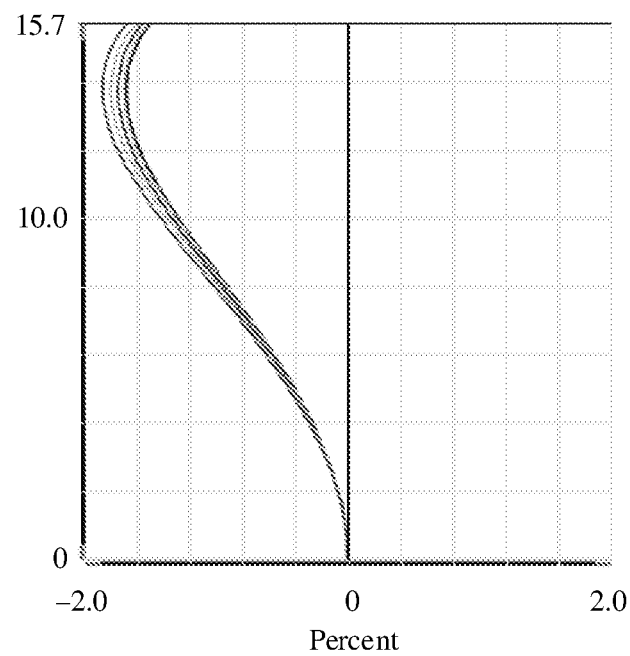
FIG. 49b shows an example optical distortion percentage of the zoom lens shown in FIG. 45 in a W state.

FIG. 49a shows distortion curves of the zoom lens in the W state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 49a that, the difference between the imaging deformation and the ideal shape is very small. FIG. 49b can be obtained by performing percentage calculation on the imaging deformation and the ideal shape of the light in FIG. 49a. It can be seen from FIG. 49b that, the zoom lens controls an optical distortion within a range of less than 2%.

Figure 50A:
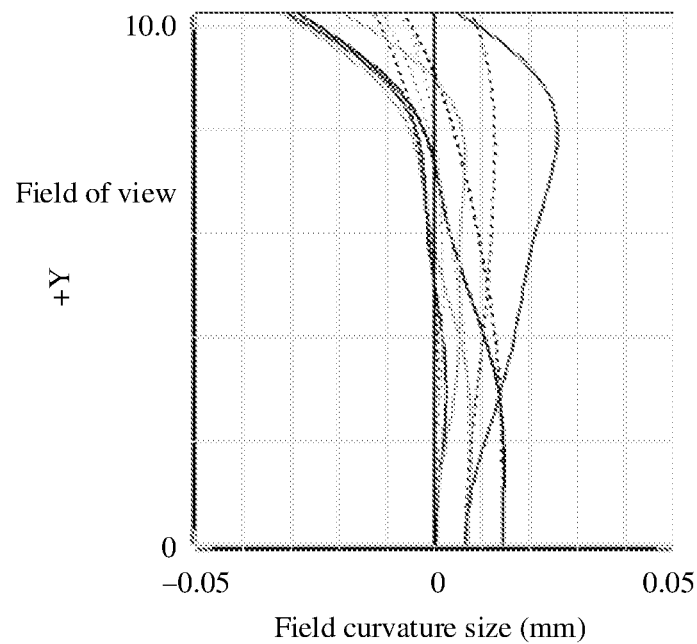
FIG. 50a shows example distortion curves of the zoom lens shown in FIG. 45 in an M1 state.
Figure 50B:
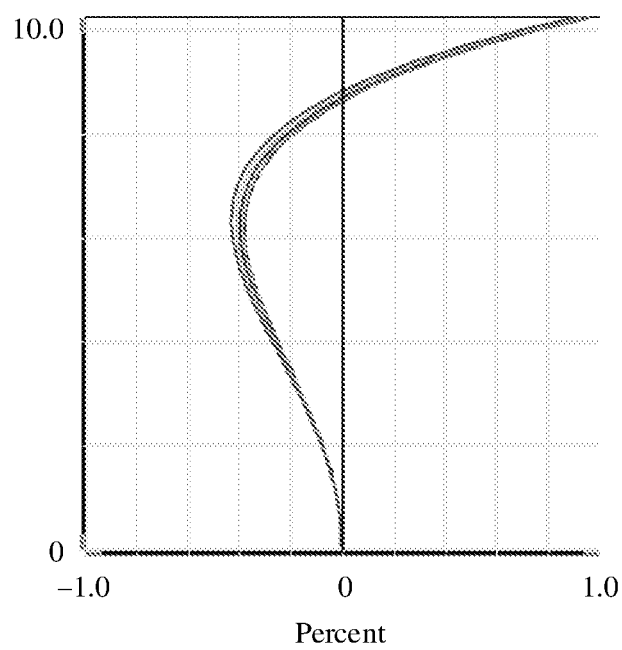
FIG. 50b shows an example optical distortion percentage of the zoom lens shown in FIG. 45 in an M1 state.

FIG. 50a shows distortion curves of the zoom lens in the M1 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 50a that, the difference between the imaging deformation and the ideal shape is very small. FIG. 50b can be obtained by performing percentage calculation on the imaging deformation and the ideal shape of the light in FIG. 50a. It can be seen from FIG. 50b that, the zoom lens controls an optical distortion within a range of less than 1%.

Figure 51A:
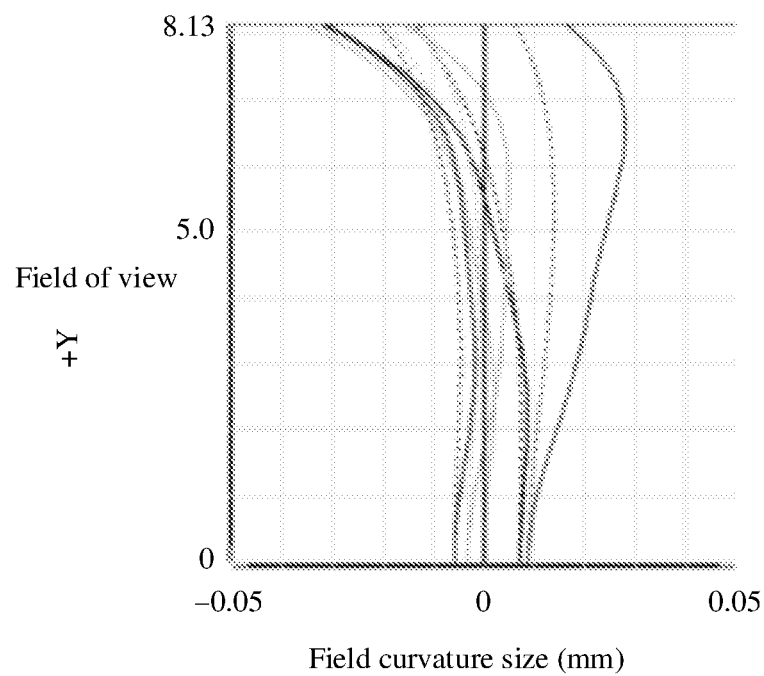
FIG. 51a shows example distortion curves of the zoom lens shown in FIG. 45 in an M2 state.
Figure 51B:
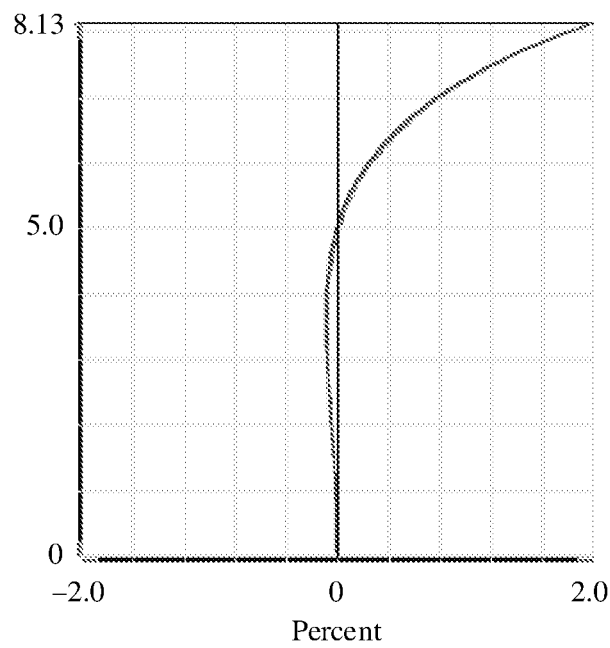
FIG. 51b shows an example optical distortion percentage of the zoom lens shown in FIG. 45 in an M2 state.

FIG. 51a shows distortion curves of the zoom lens in the M2 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 51a that, the difference between the imaging deformation and the ideal shape is very small. FIG. 51b can be obtained by performing percentage calculation on the imaging deformation and the ideal shape of the light in FIG. 51a. It can be seen from FIG. 51b that, the zoom lens controls an optical distortion within a range of less than 2%.

Figure 52A:
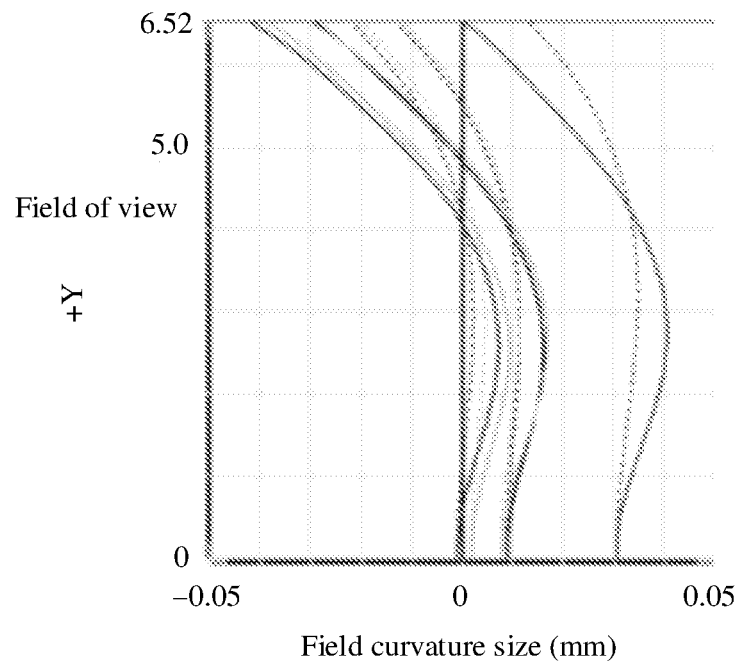
FIG. 52a shows example distortion curves of the zoom lens shown in FIG. 45 in a T state.
Figure 52B:
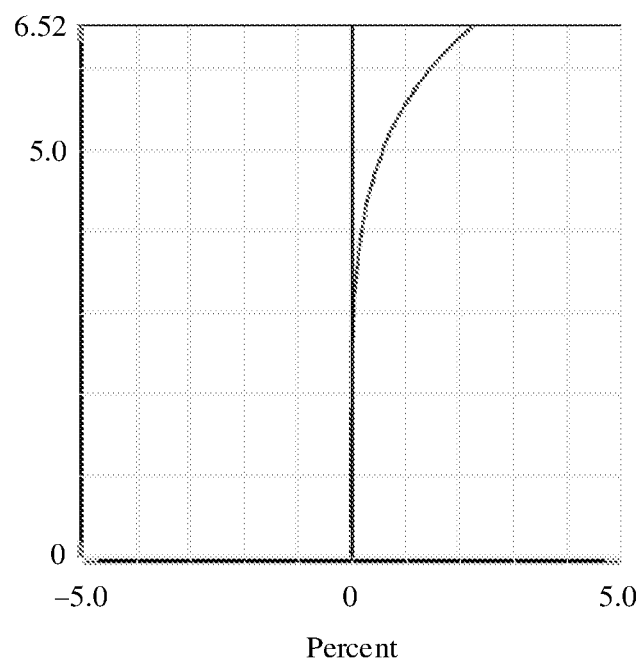
FIG. 52b shows an example optical distortion percentage of the zoom lens shown in FIG. 45 in a T state.

FIG. 52a shows distortion curves of the zoom lens in the T state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 52a that, the difference between the imaging deformation and the ideal shape is very small. FIG. 52b can be obtained by performing percentage calculation on the imaging deformation and the ideal shape of the light in FIG. 52a. It can be seen from FIG. 52b that, the zoom lens controls an optical distortion within a range of less than 3%.

Figure 53:
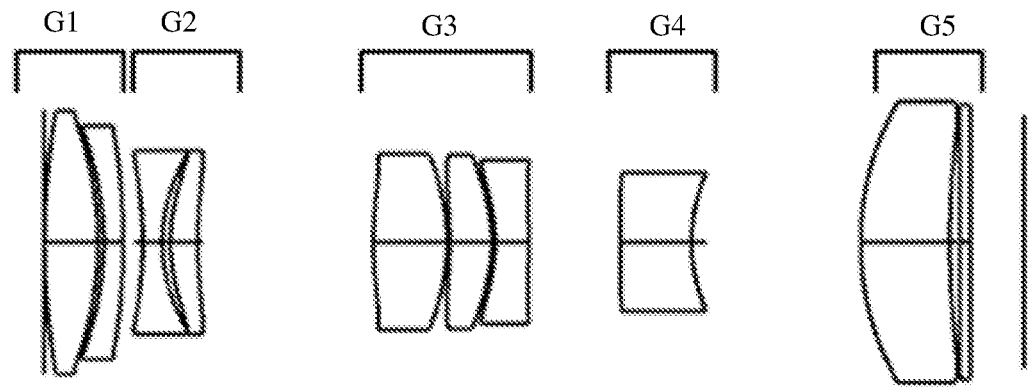
FIG. 53 shows an example sixth specific zoom lens.

FIG. 53 shows a seventh specific zoom lens. Starting from an object side, sequentially, lens groups meet the following: a ratio of a focal length f1 of a first lens group G1 with a positive focal power to an effective focal length ft of the lens at a telephoto end is |f1/ft|=0.67; a ratio of a focal length f2 of a second lens group G2 with a negative focal power to the effective focal length ft of the lens at the telephoto end is |f2/ft|=0.28; a ratio of a focal length f3 of a third lens group G3 with a positive focal power to the effective focal length ft of the lens at the telephoto end is |f3/ft|=0.28; a ratio of a focal length f4 of a fourth lens group G4 with a negative focal power to the effective focal length ft of the lens at the telephoto end is |f4/ft|=0.33; and a ratio of a focal length f5 of a fifth lens group G5 with a positive focal power to the effective focal length ft of the lens at the telephoto end is |f5/ft|=0.57.

Still referring to FIG. 53, the zoom lens includes 9 lenses with a focal power and includes 18 aspheric surfaces. The aspheric surface is a surface type of a lens surface. The first lens group G1 includes 2 lenses, and the 2 lenses respectively have a positive focal power and a negative focal power along a direction from the object side to an image side. The second lens group G2 includes 2 lenses, and the 2 lenses respectively have a negative focal power and a positive focal power along the direction from the object side to the image side. The third lens group G3 includes 3 lenses, and the 3 lenses respectively have a positive focal power, a positive focal power, and a negative focal power along the direction from the object side to the image side. The fourth lens group G4 includes 1 lens with a negative focal power. The fifth lens group G5 includes 1 lens with a positive focal power. The first lens group G1 and the third lens group G3 each include at least one lens with a negative focal power. A maximum clear aperture of the lenses in the first lens group G1, the second lens group G2, the third lens group G3, the fourth lens group G4, and the fifth lens group G5 is 8.288 mm. Table 7a lists a curvature, a thickness, a refractive index, and an Abbe coefficient of each lens in the zoom lens in a wide-angle state. Table 7b lists an aspheric coefficient of each lens.

TABLE 7a

| | R | | Thickness | | nd | | vd |
|---|---|---|---|---|---|---|---|
| R1 | 24.081 | d1 | 1.688 | n1 | 1.78 | v1 | 49.3 |
| R2 | −9.806 | a1 | 0.169 | | | | |
| R3 | −9.474 | d2 | 0.616 | n2 | 1.91 | v2 | 23.0 |
| R4 | −21.787 | a2 | 0.615 | | | | |
| R5 | −12.424 | d3 | 0.616 | n3 | 1.72 | v3 | 52.3 |
| R6 | 4.994 | a3 | 0.259 | | | | |
| R7 | 5.740 | d4 | 0.853 | n4 | 1.67 | v4 | 19.2 |
| R8 | 13.526 | a4 | 5.526 | | | | |
| R9 | 10.466 | d5 | 2.311 | n5 | 1.78 | v5 | 49.2 |
| R10 | −6.960 | a5 | 0.090 | | | | |
| R11 | −12.894 | d6 | 1.324 | n6 | 1.55 | v6 | 55.9 |
| R12 | −5.166 | a6 | 0.104 | | | | |
| R13 | −5.152 | d7 | 1.056 | n7 | 1.76 | v7 | 22.6 |
| R14 | −19.956 | a7 | 2.870 | | | | |
| R15 | 50.009 | d8 | 2.259 | n8 | 1.72 | v8 | 52.4 |
| R16 | 5.446 | a8 | 5.320 | | | | |
| R17 | 9.338 | d9 | 2.800 | n9 | 1.84 | v9 | 43.4 |
| R18 | 30.574 | a9 | 0.319 | | | | |
| R19 | Infinity | d10 | 0.325 | n10 | 1.52 | v10 | 64.2 |
| R20 | Infinity | a10 | 1.680 | | | | |

TABLE 7b

| | Type | A2 | A3 | A4 | A5 | A6 | A7 |
|---|---|---|---|---|---|---|---|
| R1 | Even aspheric surface | −1.32E−05 | −2.23E−06 | −1.93E−07 | 9.70E−09 | 2.00E−10 | 0.00E+00 |
| R2 | Even aspheric surface | 5.26E−04 | −1.43E−05 | 3.09E−07 | 7.88E−10 | 7.71E−11 | 0.00E+00 |
| R3 | Even aspheric surface | 1.19E−05 | 3.64E−05 | −2.28E−06 | 4.72E−08 | 0.00E+00 | 0.00E+00 |
| R4 | Even aspheric surface | −4.60E−04 | 4.64E−05 | −2.73E−06 | 5.81E−08 | 0.00E+00 | 0.00E+00 |
| R5 | Even aspheric surface | 7.01E−04 | −9.51E−05 | 1.00E−05 | −4.04E−07 | 0.00E+00 | 0.00E+00 |
| R6 | Even aspheric surface | −1.07E−03 | 1.02E−04 | −3.63E−05 | 2.86E−06 | 0.00E+00 | 0.00E+00 |
| R7 | Even aspheric surface | −2.16E−03 | 1.67E−04 | −3.49E−05 | −6.02E−07 | 1.38E−07 | 0.00E+00 |
| R8 | Even aspheric surface | −1.20E−03 | −1.59E−05 | −3.27E−08 | −2.42E−06 | 8.67E−08 | 0.00E+00 |
| R9 | Even aspheric surface | −2.32E−03 | −1.59E−04 | −1.18E−05 | 8.52E−07 | 0.00E+00 | 0.00E+00 |
| R10 | Even aspheric surface | 5.41E−04 | −8.99E−06 | −8.88E−06 | 4.03E−07 | 0.00E+00 | 0.00E+00 |
| R11 | Even aspheric surface | 3.37E−03 | 2.21E−04 | −4.38E−07 | −1.93E−06 | 0.00E+00 | 0.00E+00 |
| R12 | Even aspheric surface | 2.68E−03 | 1.27E−04 | −1.86E−05 | 3.04E−07 | 0.00E+00 | 0.00E+00 |
| R13 | Even aspheric surface | 5.03E−03 | −3.05E−05 | −1.46E−06 | 1.25E−06 | −1.32E−08 | 0.00E+00 |
| R14 | Even aspheric surface | 3.69E−03 | −2.39E−06 | 9.13E−06 | 8.79E−07 | 1.67E−08 | 0.00E+00 |
| R15 | Even aspheric surface | 1.77E−04 | 1.06E−05 | 1.22E−06 | −3.32E−06 | 6.51E−07 | −3.96E−08 |
| R16 | Even aspheric surface | 2.08E−04 | 2.63E−05 | −6.54E−06 | −4.37E−06 | 1.03E−06 | −6.89E−08 |
| R17 | Even aspheric surface | 6.07E−05 | 3.59E−05 | −2.93E−06 | 1.12E−07 | −2.65E−09 | 0.00E+00 |
| R18 | Even aspheric surface | −7.38E−06 | 3.58E−05 | −1.36E−06 | −1.59E−07 | 4.64E−09 | 0.00E+00 |

In the 18 aspheric surfaces of the zoom lens shown in FIG. 53, a surface type z of each of the even aspheric surfaces may be defined by, including but not limited to, the following aspheric surface formula:

$$z = \frac{cr^2}{1+\sqrt{1 | Kc^2r^2}} + A_2 r^4 + A_3 r^6 + A_4 r^8 + A_5 r^{10} + A_6 r^{12} + A_7 r^{14}$$

z is a vector height of the aspheric surface, r is a radial coordinate of the aspheric surface, c is a spherical curvature of a vertex of the aspheric surface, and K is a conic constant. In this embodiment, a value of K is 0, and A2, A3, A4, A5, A6, and A7 are aspheric coefficients.

Still referring to FIG. 53, for the zoom lens, a ratio of its total track length to its effective focal length at the telephoto end (TTL/ft) is 1.17, and a ratio of its image height to its effective focal length at the telephoto end (IMH/ft) is 0.15. In FIG. 53, the zoom lens further has a stop (not shown in the figure). The stop is located on an object side of the third lens group G3, and certainly may alternatively be arranged in another lens group. For example, the stop is arranged on an object side or an image side of the first lens group G1 or the fifth lens group G5, or is arranged on an object side or an image side of the second lens group G2 or the fourth lens group G4.

As shown in FIG. 53, locations of the first lens group G1, the third lens group G3, and the fifth lens group G5 are fixed relative to an imaging plane, and the second lens group G2 and the fourth lens group G4 move along an optical axis to implement zooming.

Figure 54:
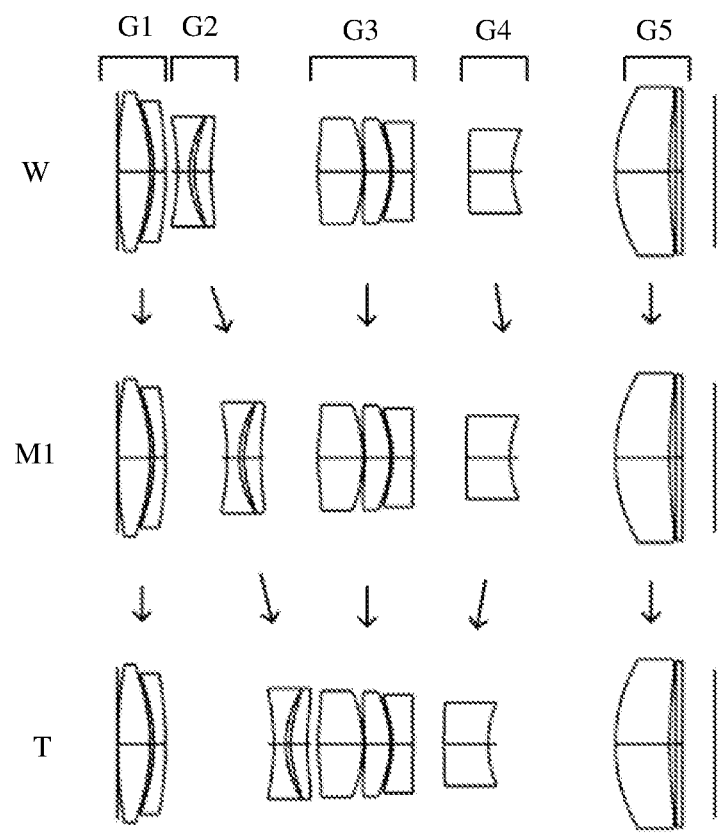
FIG. 54 shows an example zoom process of a zoom lens.

FIG. 54 shows a zoom process of the zoom lens. The zoom lens has three focal length states: W represents a wide-angle end state, M1 represents a first intermediate focal length state, and T represents a telephoto state. Relative locations of the lens groups corresponding to the W state of the zoom lens are as follows: the second lens group G2 is close to the image side of the first lens group G1, and the fourth lens group G4 is close to an image side of the third lens group G3. Upon zooming from the wide-angle end state W to the first intermediate focal length state M1, the second lens group G2 moves towards the third lens group G3, and the fourth lens group G4 moves towards the fifth lens group G5. Upon zooming from the first intermediate focal length state M1 to the telephoto state T, the second lens group G2 moves towards the third lens group G3, and the fourth lens group G4 moves towards the third lens group G3.

It can be seen from FIG. 54 that, when the zoom lens is zoomed from the wide-angle state to the telephoto state, the second lens group G2 moves towards an image space (close to the third lens group G3), and a distance between the fourth lens group G4 and the third lens group G3 first increases and then decreases. Upon zooming from the wide-angle state to the telephoto state, a ratio of a movement stroke of the second lens group G2 along the optical axis to the TTL is 0.16, and a ratio of a movement stroke of the fourth lens group G4 along the optical axis to the TTL is 0.041. Correspondingly, reference can be made to Table 7c and Table 7d. Table 7c lists basic parameters of the zoom lens, and Table 7d lists distances between the lens groups in cases that the zoom lens is in the W, M1, M2, and T states.

TABLE 7c

|  | W | M1 | T |
|---|---|---|---|
| Focal length F | 13.435 mm | 19.036 mm | 26.313 mm |
| F number | 3.509 | 3.505 | 3.451 |
| Image height IMH | 3.920 mm | 3.920 mm | 3.920 mm |
| HalfFOV | 16.502° | 11.422° | 8.252° |
| BFL | 2.324 mm | 2.324 mm | 2.324 mm |
| TTL | 30.800 mm | 30.800 mm | 30.800 mm |
| Designed wavelength | 650 nm, 610 nm, 555 nm, 510 nm, and 470 nm | | |

TABLE 7d

|  | W | M1 | T |
|---|---|---|---|
| a2 | 13.435 mm | 19.036 mm | 26.313 mm |
| a4 | 3.509 mm | 3.505 mm | 3.451 mm |
| a6 | 3.920 mm | 3.920 mm | 3.920 mm |
| a7 | 16.502 mm | 11.422 mm | 8.252 mm |

Simulation is performed on the zoom lens shown in FIG. 53. The following describes in detail simulation effects thereof with reference to accompanying drawings.

Figure 55A:
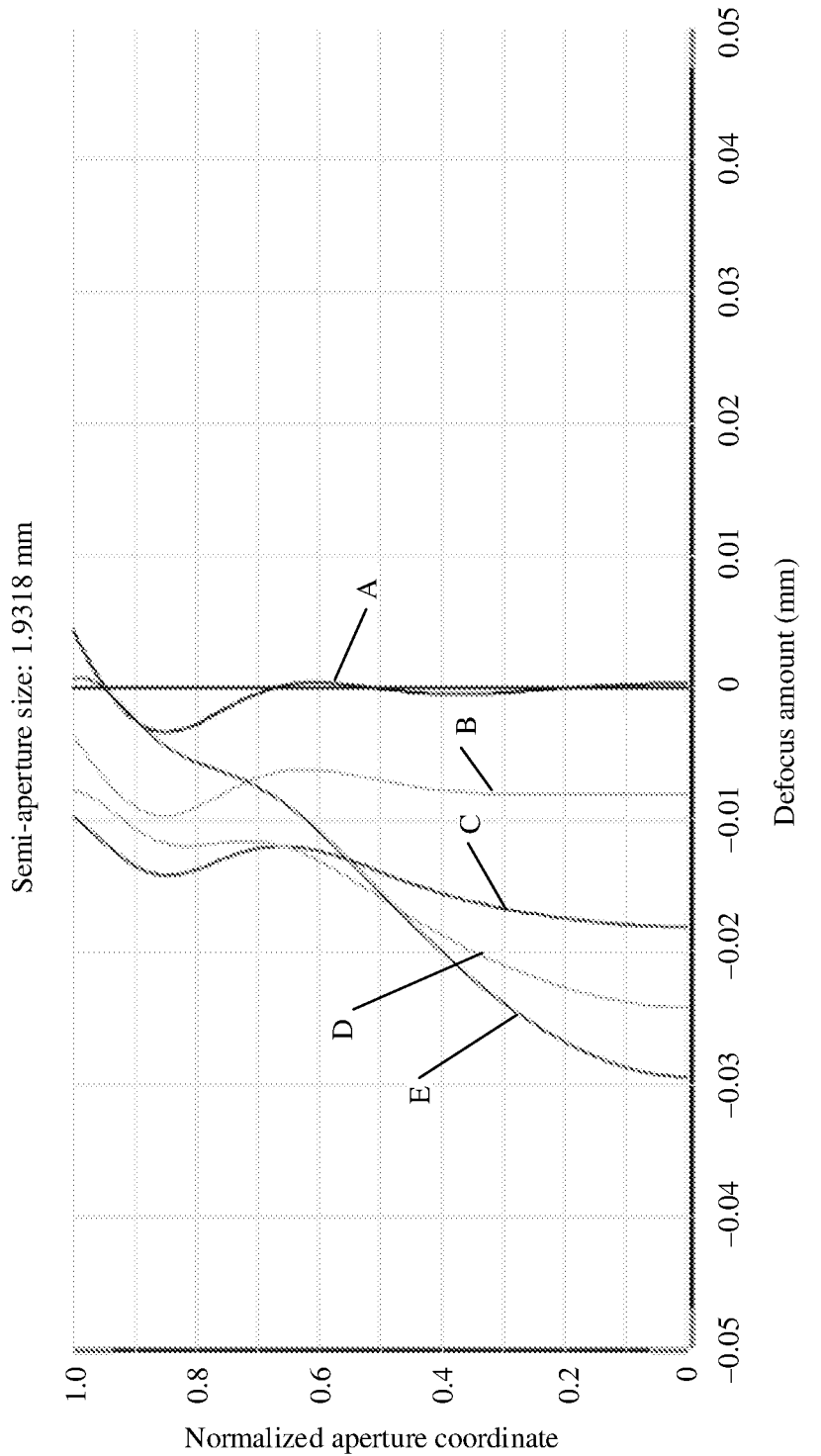
FIG. 55a shows example simulation results, of the zoom lens shown in FIG. 53 in a W state, of depth of focus locations for light with different wavelengths.

FIG. 55a shows simulation results, of the zoom lens shown in FIG. 53 in the W state, of depth of focus locations for light with the wavelengths of 650 nm, 610 nm, 555 nm, 510 nm, and 470 nm. A represents the light with the wavelength of 650 nm, and a defocus amount of the light A ranges from −0.005 mm to 0.005 mm. B represents the light with the wavelength of 610 nm, and a defocus amount of the light B ranges from −0.01 mm to −0.002 mm. C represents the light with the wavelength of 555 nm, and a defocus amount of the light C ranges from −0.018 mm to −0.01 mm. D represents the light with the wavelength of 510 nm, and a defocus amount of the light D ranges from −0.025 mm to −0.008 mm. E represents the light with the wavelength of 470 nm, and a defocus amount of the light E ranges from −0.03 mm to 0.002 mm.

Figure 55B:
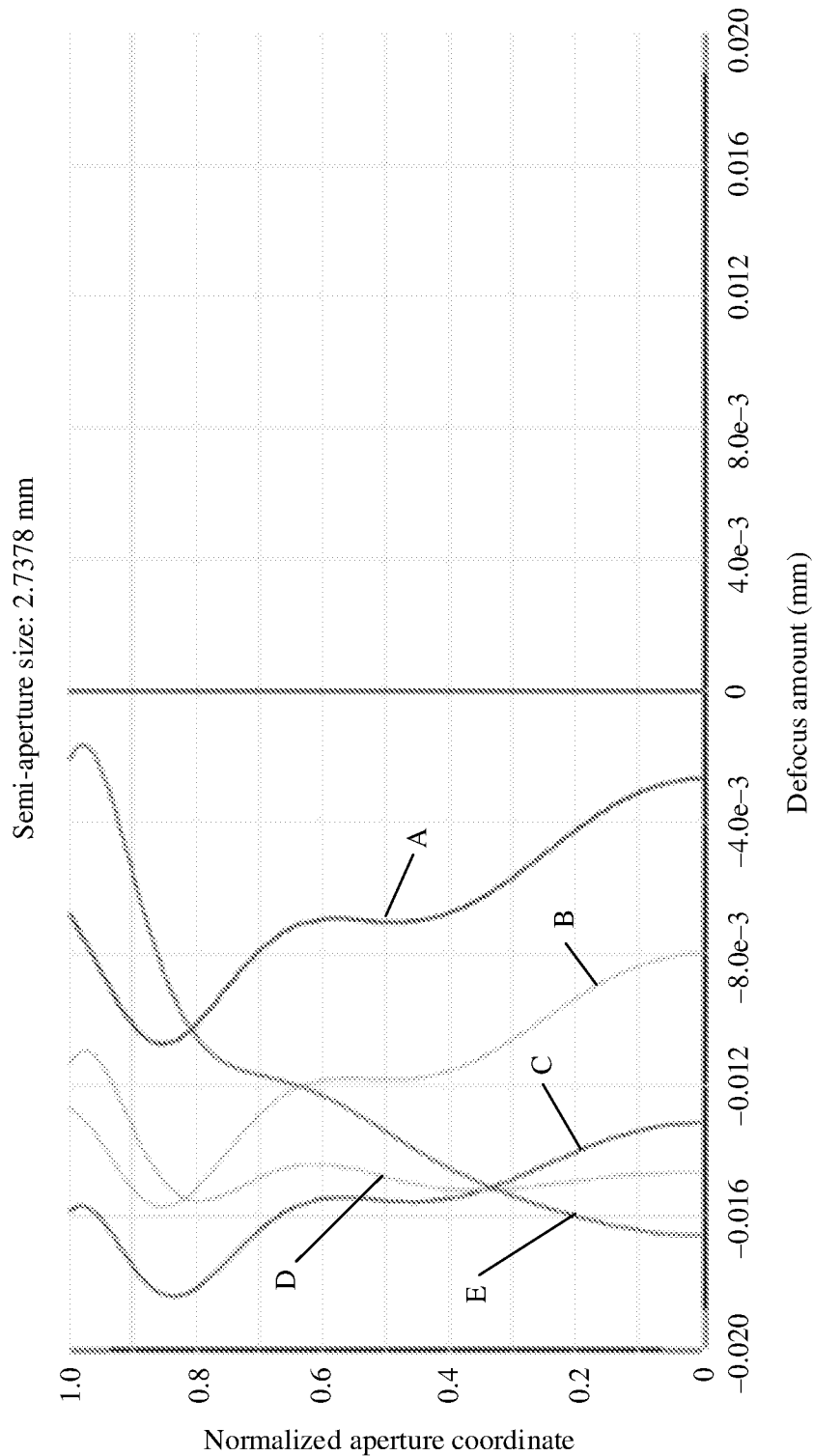
FIG. 55b shows example simulation results, of the zoom lens shown in FIG. 53 in an M1 state, of depth of focus locations for light with different wavelengths.

FIG. 55b shows simulation results, of the zoom lens shown in FIG. 53 in the M1 state, of depth of focus locations for light with the wavelengths of 650 nm, 610 nm, 555 nm, 510 nm, and 470 nm. A represents the light with the wavelength of 650 nm, and a defocus amount of the light A ranges from −0.012 mm to −0.002 mm. B represents the light with the wavelength of 610 nm, and a defocus amount of the light B ranges from −0.016 mm to −0.008 mm. C represents the light with the wavelength of 555 nm, and a defocus amount of the light C ranges from −0.019 mm to −0.014 mm. D represents the light with the wavelength of 510 nm, and a defocus amount of the light D ranges from −0.016 mm to −0.01 mm. E represents the light with the wavelength of 470 nm, and a defocus amount of the light E ranges from −0.017 mm to −0.002 mm.

Figure 55C:
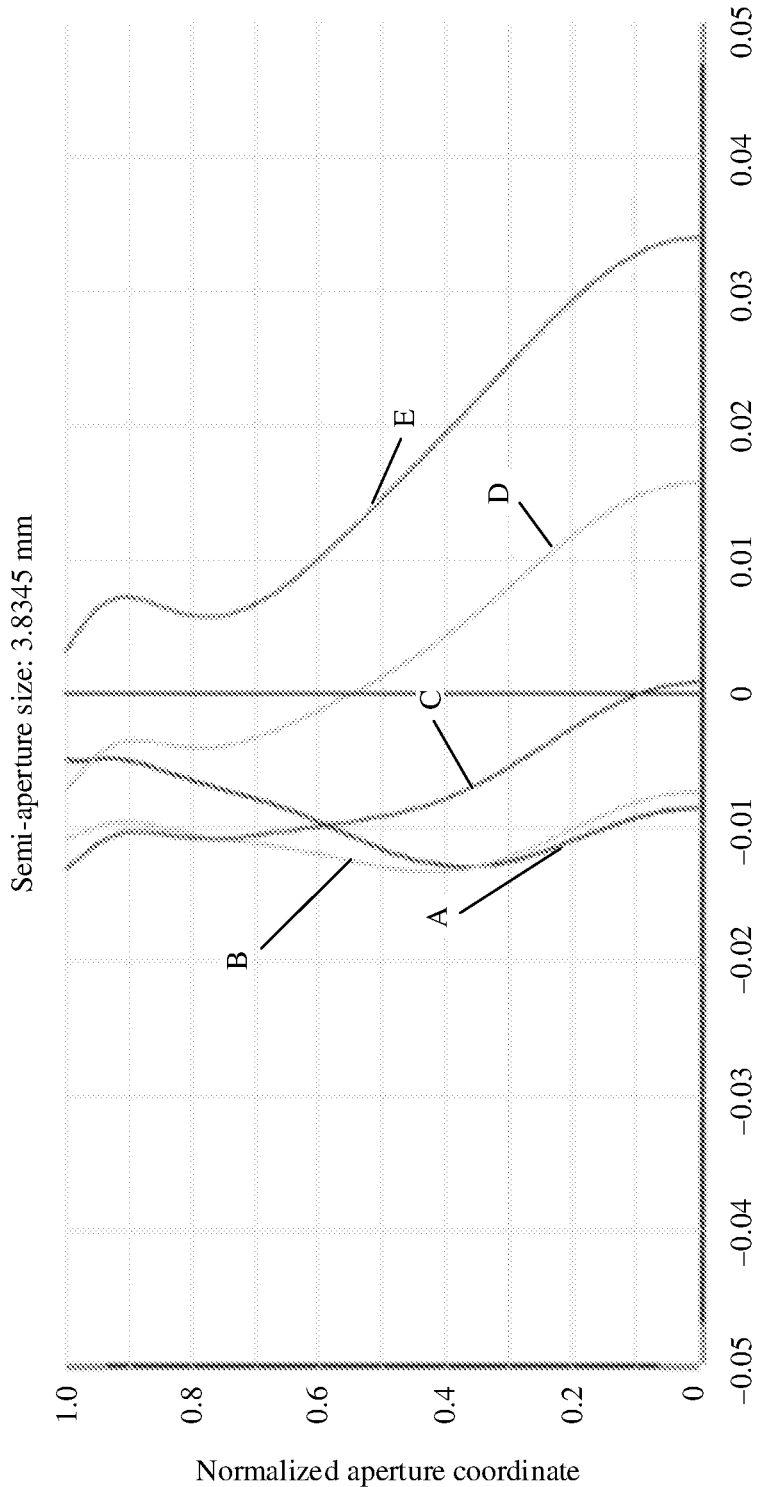
FIG. 55c shows example simulation results, of the zoom lens shown in FIG. 53 in a T state, of depth of focus locations for light with different wavelengths.

FIG. 55c shows simulation results, of the zoom lens shown in FIG. 53 in the telephoto state, of depth of focus locations for light with the wavelengths of 650 nm, 610 nm, 555 nm, 510 nm, and 470 nm. A represents the light with the wavelength of 650 nm, and a defocus amount of the light A ranges from −0.014 mm to −0.005 mm. B represents the light with the wavelength of 610 nm, and a defocus amount of the light B ranges from −0.014 mm to −0.008 mm. C represents the light with the wavelength of 555 nm, and a defocus amount of the light C ranges from −0.012 mm to 0.002 mm. D represents the light with the wavelength of 510 nm, and a defocus amount of the light D ranges from −0.008 mm to 0.16 mm. E represents the light with the wavelength of 470 nm, and a defocus amount of the light E ranges from 0.002 mm to 0.034 mm.

It can be seen from FIG. 55a, FIG. 55b, and FIG. 55c that, the defocus amounts of the light with the different wavelengths each fall within a very small range. An axial aberration of the zoom lens in each of the W, M1, M2, and T states is controlled within a very small range.

Figure 56A:
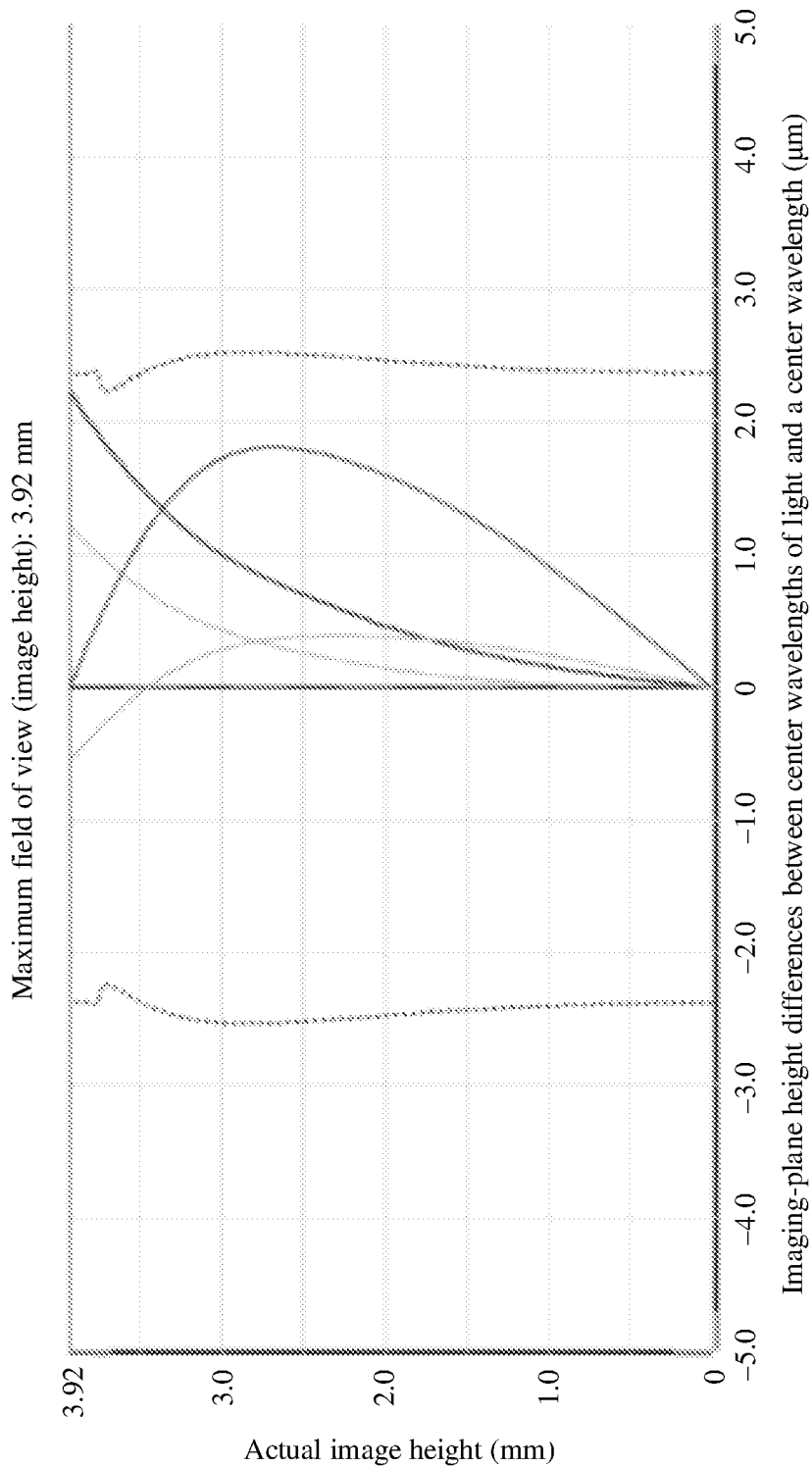
FIG. 56a shows example horizontal chromatic aberration curves of the zoom lens shown in FIG. 53 in a W state.

FIG. 56a shows horizontal chromatic aberration curves of the zoom lens in the W state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 56a that, horizontal chromatic aberrations of the five curves each substantially fall within the diffraction limit.

Figure 56B:
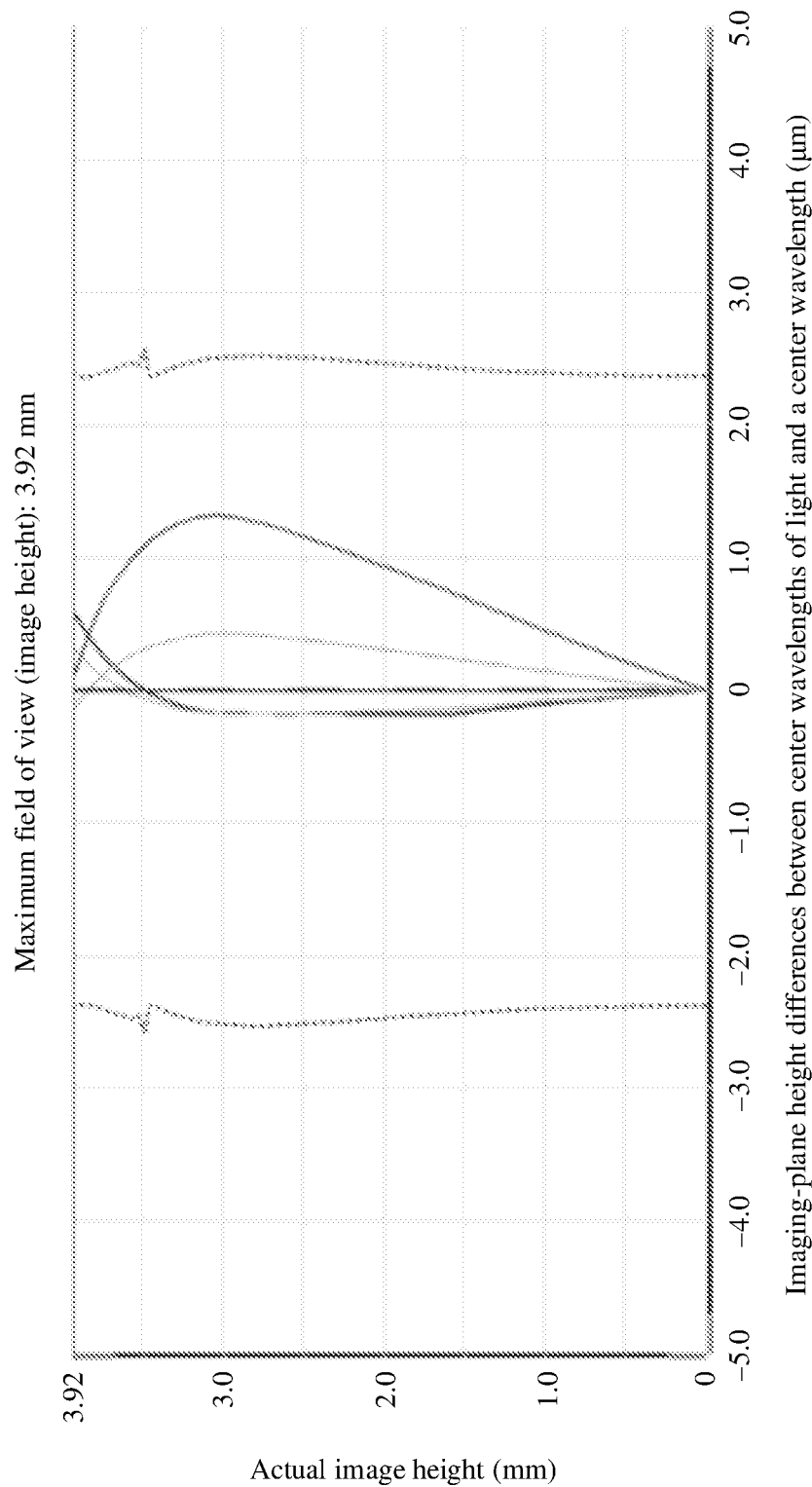
FIG. 56b shows example horizontal chromatic aberration curves of the zoom lens shown in FIG. 53 in an M1 state.

FIG. 56b shows horizontal chromatic aberration curves of the zoom lens in the M1 state. Five solid-line curves in the figure are color light with the wavelengths of 650 nm, 610 nm, 555 nm, 510 nm, and 470 nm, respectively. Dashed lines indicate that a diffraction limit ranges from −2.0 to 2.0. It can be seen from FIG. 56b that, horizontal chromatic aberrations of the five curves each fall within the diffraction limit.

Figure 56C:
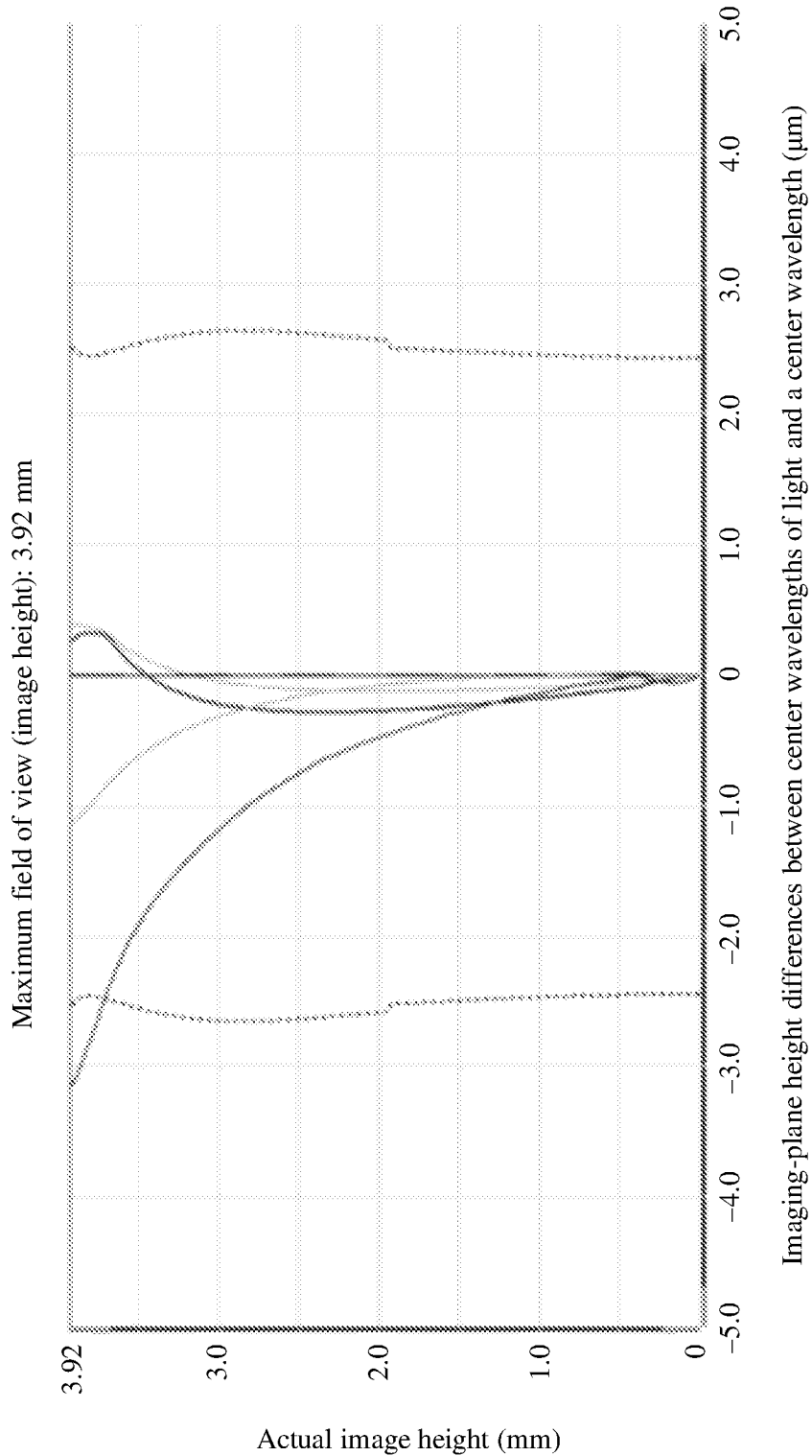

FIG. 56c shows horizontal chromatic aberration curves of the zoom lens in the T state. Five solid-line curves in the figure are color light with the wavelengths of 650 nm, 610 nm, 555 nm, 510 nm, and 470 nm, respectively. Dashed lines indicate that a diffraction limit ranges from −2.5 to 2.5. It can be seen from FIG. 56c that, horizontal chromatic aberrations of the five curves each fall within the diffraction limit.

Figure 57A:
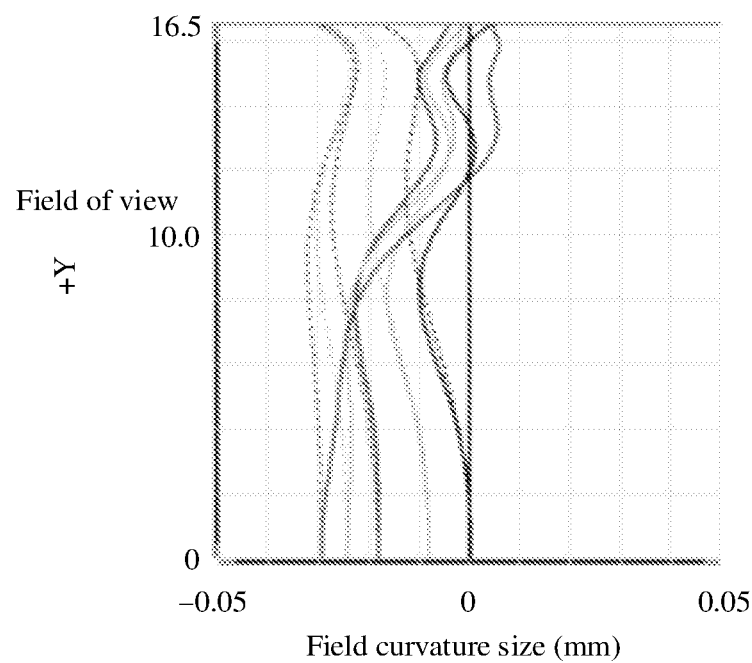
Figure 57B:
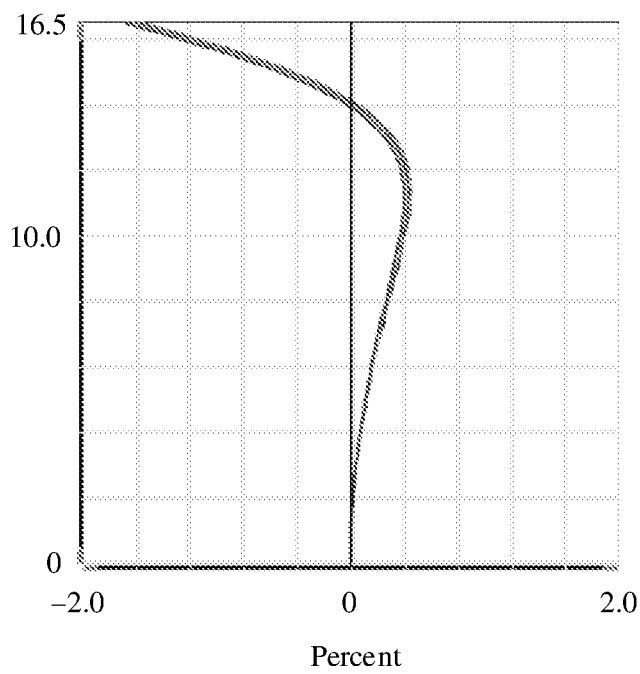

FIG. 57a shows distortion curves of the zoom lens in the W state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 57a that, the difference between the imaging deformation and the ideal shape is very small. FIG. 57b can be obtained by performing percentage calculation on the imaging deformation and the ideal shape of the light in FIG. 57a. It can be seen from FIG. 57b that, the zoom lens controls an optical distortion within a range of less than 2%.

Figure 58A:
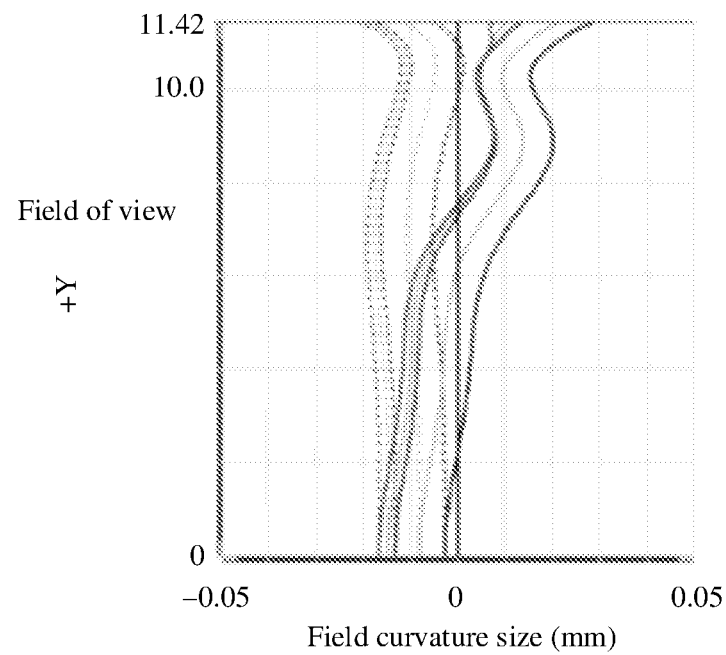
Figure 58B:
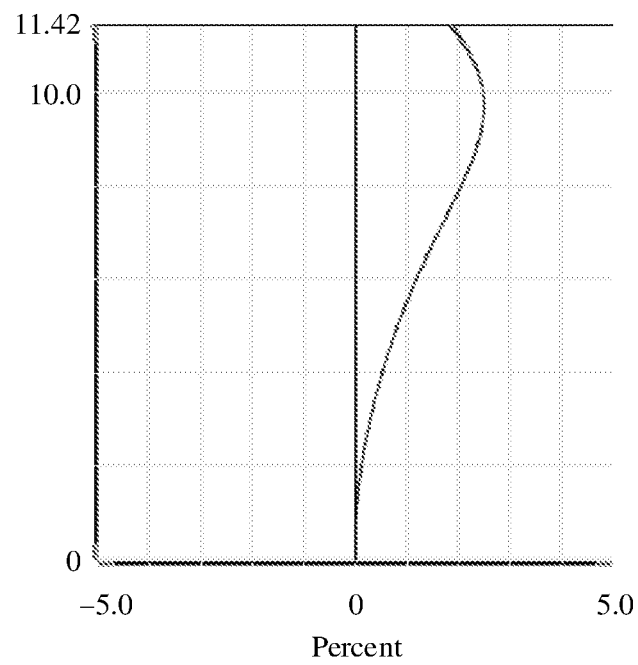

FIG. 58a shows distortion curves of the zoom lens in the M1 state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 58a that, the difference between the imaging deformation and the ideal shape is very small. FIG. 58b can be obtained by performing percentage calculation on the imaging deformation and the ideal shape of the light in FIG. 58a. It can be seen from FIG. 58b that, the zoom lens controls an optical distortion within a range of less than 2.5%.

Figure 59A:
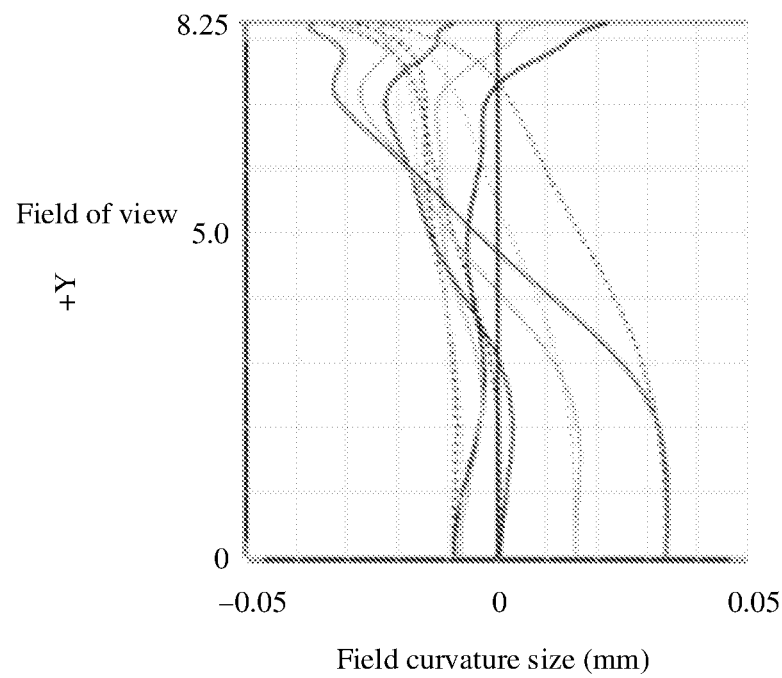
Figure 59B:
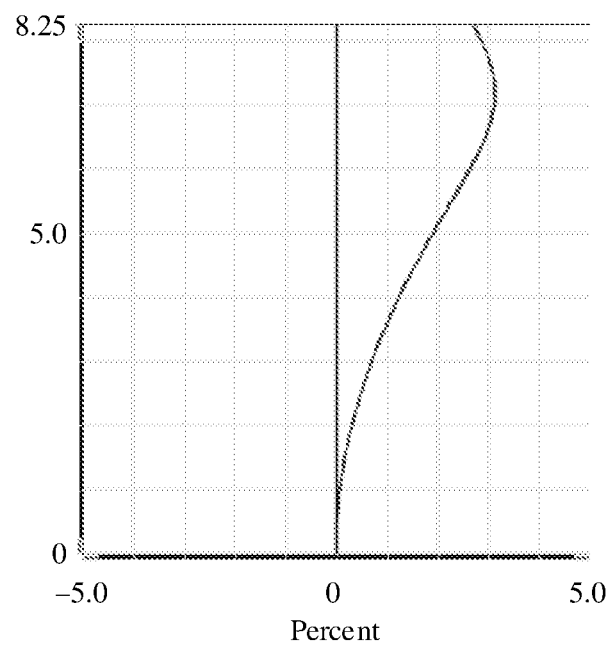

FIG. 59a shows distortion curves of the zoom lens in the T state, each indicating a difference between an imaging deformation and an ideal shape. Five solid-line curves are color light with the wavelengths of 650 nm, 610 nm, 555 nm, 510 nm, and 470 nm, respectively. A dashed line corresponding to each solid line is an ideal shape corresponding to the light. It can be seen from FIG. 59a that, the difference between the imaging deformation and the ideal shape is very small. FIG. 59b can be obtained by performing percentage calculation on the imaging deformation and the ideal shape of the light in FIG. 59a. It can be seen from FIG. 59b that, the zoom lens controls an optical distortion within a range of less than 3%.

From the structures and the simulation effects of the first specific zoom lens, the second specific zoom lens, the third specific zoom lens, the fourth specific zoom lens, the fifth specific zoom lens, the sixth specific zoom lens, and the seventh specific zoom lens, it can be learned that, the zoom lens provided in the embodiments of this application allows continuous zoom, and an object distance range from infinity to a near-object distance can be implemented for the zoom lens The near-object distance refers to a distance from an object to a first surface of the zoom lens, and may be specifically 40 mm. It can be learned from the simulation results that, the zoom lens achieves better imaging quality than conventional hybrid optical zoom in a zoom process of a mobile phone.

Figure 60:
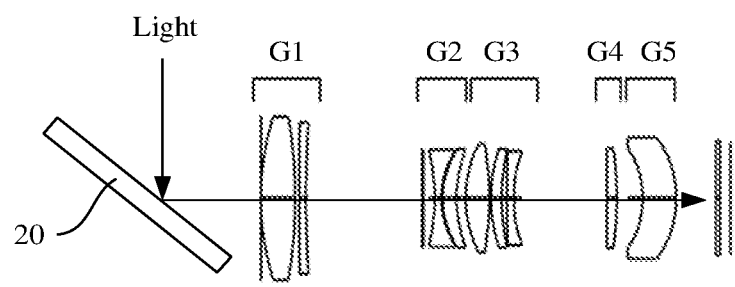

FIG. 60 shows another zoom lens according to an embodiment of this application. The zoom lens further includes a reflector 20, and the reflector 20 is located on an object side of a first lens group G1, and is configured to reflect light to the first lens group G1, so as to implement periscopic photographing, and improve a space for lens placement. Certainly, in addition to the reflector, a prism may be further used. The prism is disposed on the object side of the first lens group, and can also reflect light to the first lens group G1, so as to achieve the same effect.

Figure 61:
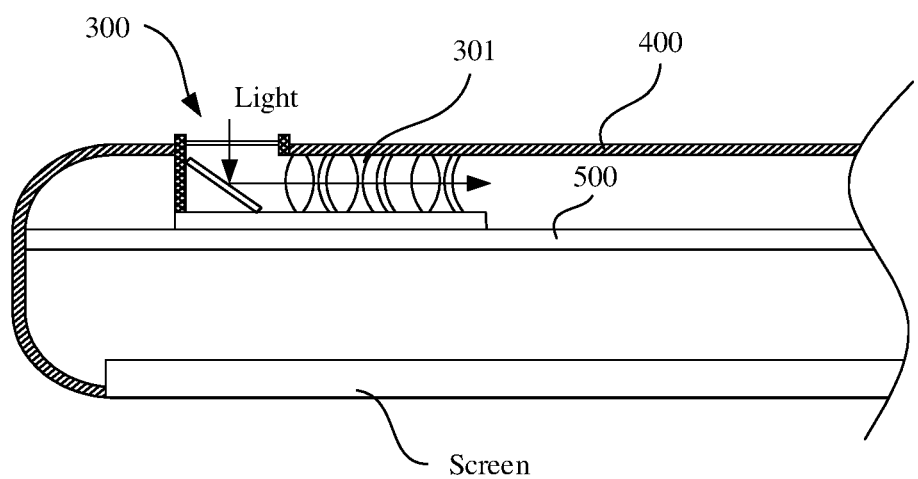

FIG. 61 shows an application scenario of a zoom lens in a mobile phone. When a zoom lens 300 is a periscope zoom lens, an arrangement direction of a lens group 301 in the zoom lens 300 may be parallel to a length direction of a mobile phone housing 400, and the lens group 301 is disposed between the mobile phone housing 300 and a middle frame 500. It should be understood that, FIG. 60 merely provides an example of a location and a manner for disposing the lens group 301, and the lens group 301 in FIG. 60 does not represent an actual quantity of lenses in the lens group 301. It can be seen from FIG. 60 that, when the zoom lens is a periscope zoom lens, impact on a thickness of the mobile phone can be reduced.

An embodiment of this application further provides a camera module. The camera module includes a camera chip and the zoom lens according to any one of the foregoing embodiments. Light is capable of passing through the zoom lens and being irradiated to the camera chip. The camera module has a housing, the camera chip is fixed in the housing, and the zoom lens is also disposed in the housing. The housing and the chip of the camera module each may use a structure known in a conventional technology. Three fixed lens groups and two movable lens groups are used in coordination in the zoom lens. The second lens group and the fourth lens group are disposed to implement continuous focusing on the zoom lens, thereby improving photographing quality of the zoom lens.

This application provides a mobile terminal. The mobile terminal may be a mobile phone, a tablet computer, a notebook computer, or the like. The mobile terminal includes a housing and the zoom lens according to any one of the foregoing embodiments that is disposed in the housing. The periscope zoom lens shown in FIG. 61 is disposed inside a mobile phone. With reference to the zoom lens shown in FIG. 5, three fixed lens groups and two movable lens groups are used in coordination in the zoom lens. The second lens group and the fourth lens group are disposed to implement continuous focusing on the zoom lens, thereby improving photographing quality of the zoom lens.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A zoom lens, comprising:
   a first lens group;
   a second lens group;
   a third lens group;
   a fourth lens group; and
   a fifth lens group, wherein the first lens group, the second lens group, the third lens group, the fourth lens group, and the fifth lens group are arranged from an object side to an image side, and wherein
   the first lens group has a positive focal power,
   the second lens group has a negative focal power,
   the third lens group has a positive focal power,
   the fourth lens group has a positive focal power or a negative focal power,
   the fifth lens group has a positive focal power or a negative focal power,
   the first lens group, the third lens group, and the fifth lens group are fixed lens groups,
   the second lens group is a zoom lens group and is configured to slide between the first lens group and the third lens group along an optical axis,
   the fourth lens group is a compensation lens group and is configured to slide between the third lens group and the fifth lens group along the optical axis,
   a movement stroke of the second lens group along the optical axis meets the following criteria:
   a ratio of the movement stroke of the second lens group along the optical axis to a total length from a surface of the zoom lens closest to the object side to an imaging plane is greater than or equal to 0.1 and less than or equal to 0.3, a movement stroke of the fourth lens group along the optical axis meets the following criteria:

a ratio of the movement stroke of the fourth lens group along the optical axis to a total length from the surface of the zoom lens closest to the object side to the imaging plane is greater than or equal to 0.01 and less than or equal to 0.25, and an image height IMH of the zoom lens and an effective focal length ft of the zoom lens at a telephoto end meet the following criteria: $0.02 \leq |IMH/ft| \leq 0.20$.

2. The zoom lens according to claim 1, wherein all lenses comprised in the first lens group, the second lens group, the third lens group, the fourth lens group, and the fifth lens group meet the following criteria:

$N \leq$ a quantity of aspheric surfaces $\leq 2*N$, wherein N is a total quantity of lenses, and the quantity of aspheric surfaces is a quantity of lenses with aspheric surfaces in all the lenses comprised in the first lens group, the second lens group, the third lens group, the fourth lens group, and the fifth lens group.

3. The zoom lens according to claim 1, wherein a total quantity N of lenses in the first lens group, the second lens group, the third lens group, the fourth lens group, and the fifth lens group meets the following criteria:

$7 \leq N \leq 12$.

4. The zoom lens according to claim 1, wherein a maximum clear aperture of the first lens group, the second lens group, the third lens group, the fourth lens group, and the fifth lens group meets the following criteria:

4 mm $\leq$ the maximum clear aperture $\leq$ 15 mm.

5. The zoom lens according to claim 1, wherein a focal length f1 of the first lens group and a focal length ft of the zoom lens at a telephoto end meet the following criteria: $0.3 \leq |f1/ft| \leq 1.5$;

a focal length f2 of the second lens group and ft meet the following criteria: $0.10 \leq |f2/ft| \leq 0.5$;

a focal length f3 of the third lens group and ft meet the following criteria: $0.10 \leq |f3/ft| \leq 0.5$;

a focal length f4 of the fourth lens group and ft meet the following criteria: $0.3 \leq |f4/ft| \leq 1.3$; and a focal length f5 of the fifth lens group and ft meet the following criteria: $0.5 \leq |f5/ft| \leq 4.0$.

6. The zoom lens according to claim 1, wherein the first lens group comprises at least one lens with a negative focal power.

7. The zoom lens according to claim 1, further comprising:

a prism; or a reflector, wherein the prism or the reflector is located on an object side of the first lens group, and the prism or the reflector is configured to reflect light to the first lens group.

8. The zoom lens according to claim 1, wherein a lens in each of the first lens group, the second lens group, the third lens group, the fourth lens group, and the fifth lens group has a cutout enabling height reduction.

9. The zoom lens according to claim 1, wherein a ratio of an effective focal length ft of the zoom lens at a telephoto end to an effective focal length fw of the zoom lens at a wide-angle end meet the following criteria: $1 \leq |ft/fw| \leq 3.7$.

10. The zoom lens according to claim 1, wherein an object distance range of the zoom lens is from infinity to a near-object distance.

11. The zoom lens of claim 1, wherein a maximum clear aperture of lenses in the first lens group, the second lens group, the third lens group, the fourth lens group, and the fifth lens group is 7.1 mm.

12. A camera module, comprising:

a camera chip; and a zoom lens, wherein the zoom lens is configured to pass light through and irradiate the camera chip, and the zoom lens comprises:

a first lens group;

a second lens group;

a third lens group;

a fourth lens group; and a fifth lens group, wherein the first lens group, the second lens group, the third lens group, the fourth lens group, and the fifth lens group are arranged from an object side to an image side, and wherein the first lens group has a positive focal power, the second lens group has a negative focal power, the third lens group has a positive focal power, the fourth lens group has a positive focal power or a negative focal power, the fifth lens group has a positive focal power or a negative focal power, the first lens group, the third lens group, and the fifth lens group are fixed lens groups, the second lens group is a zoom lens group and is configured to slide between the first lens group and the third lens group along an optical axis, the fourth lens group is a compensation lens group and is configured to slide between the third lens group and the fifth lens group along the optical axis, a movement stroke of the second lens group along the optical axis meets the following criteria:

a ratio of the movement stroke of the second lens group along the optical axis to a total length from a surface of the zoom lens closest to the object side to an imaging plane is greater than or equal to 0.1 and less than or equal to 0.3, and a movement stroke of the fourth lens group along the optical axis meets the following criteria:

a ratio of the movement stroke of the fourth lens group along the optical axis to a total length from the surface of the zoom lens closest to the object side to the imaging plane is greater than or equal to 0.01 and less than or equal to 0.25.

13. The camera module of claim 12, wherein a maximum clear aperture of the first lens group, the second lens group, the third lens group, the fourth lens group, and the fifth lens group meets the following criteria:

4 mm $\leq$ the maximum clear aperture $\leq$ 15 mm.

14. The camera module of claim 12, wherein a focal length f1 of the first lens group and a focal length ft of the zoom lens at a telephoto end meet the following criteria: $0.3 \leq |f1/ft| \leq 1.5$;

a focal length f2 of the second lens group and ft meet the following criteria: $0.10 \leq |f2/ft| \leq 0.5$;

a focal length f3 of the third lens group and ft meet the following criteria: $0.10 \leq |f3/ft| \leq 0.5$;

a focal length f4 of the fourth lens group and ft meet the following criteria: $0.3 \leq |f4/ft| \leq 1.3$; and a focal length f5 of the fifth lens group and ft meet the following criteria: $0.5 \leq |f5/ft| \leq 4.0$.

15. The camera module of claim 12, wherein a maximum clear aperture of lenses in the first lens group, the second lens group, the third lens group, the fourth lens group, and the fifth lens group is 7.1 mm.

16. A mobile terminal, comprising:
   a housing; and
   a zoom lens, wherein
      the zoom lens is disposed in the housing, and
      the zoom lens comprises:
         a first lens group;
         a second lens group;
         a third lens group;
         a fourth lens group; and
         a fifth lens group, wherein the first lens group, the second lens group, the third lens group, the fourth lens group, and the fifth lens group are arranged from an object side to an image side, and wherein
      the first lens group has a positive focal power,
      the second lens group has a negative focal power,
      the third lens group has a positive focal power,
      the fourth lens group has a positive focal power or a negative focal power,
      the fifth lens group has a positive focal power or a negative focal power,
      the first lens group, the third lens group, and the fifth lens group are fixed lens groups,
      the second lens group is a zoom lens group and is configured to slide between the first lens group and the third lens group along an optical axis,
      the fourth lens group is a compensation lens group and is configured to slide between the third lens group and the fifth lens group along the optical axis,
      a movement stroke of the second lens group along the optical axis meets the following criteria:
         a ratio of the movement stroke of the second lens group along the optical axis to a total length from a surface of the zoom lens closest to the object side to an imaging plane is greater than or equal to 0.1 and less than or equal to 0.3, and
      a movement stroke of the fourth lens group along the optical axis meets the following criteria:
         a ratio of the movement stroke of the fourth lens group along the optical axis to a total length from the surface of the zoom lens closest to the object side to the imaging plane is greater than or equal to 0.01 and less than or equal to 0.25.

17. The mobile terminal of claim 16, wherein a maximum clear aperture of the first lens group, the second lens group, the third lens group, the fourth lens group, and the fifth lens group meets the following criteria:
   4 mm ≤ the maximum clear aperture ≤ 15 mm.

18. The mobile terminal of claim 16, wherein a focal length f1 of the first lens group and a focal length ft of the zoom lens at a telephoto end meet the following criteria: $0.3 \le |f1/ft| \le 1.5$;
   a focal length f2 of the second lens group and ft meet the following criteria: $0.10 \le |f2/ft| \le 0.5$;
   a focal length f3 of the third lens group and ft meet the following criteria: $0.10 \le |f3/ft| \le 0.5$;
   a focal length f4 of the fourth lens group and ft meet the following criteria: $0.3 \le |f4/ft| \le 1.3$; and
   a focal length f5 of the fifth lens group and ft meet the following criteria: $0.5 \le |f5/ft| \le 4.0$.

19. The mobile terminal of claim 16, wherein a maximum clear aperture of lenses in the first lens group, the second lens group, the third lens group, the fourth lens group, and the fifth lens group is 7.1 mm.

* * * * *